(12) United States Patent
Harris et al.

(10) Patent No.: US 12,135,852 B1
(45) Date of Patent: Nov. 5, 2024

(54) SPATIAL FILTERING A TOUCH SIGNAL OF A TOUCH SCREEN DISPLAY

(71) Applicant: SIGMASENSE, LLC., Wilmington, DE (US)

(72) Inventors: Tyler Scott Harris, Austin, TX (US); John Christopher Price, Austin, TX (US); Grant Howard McGibney, Calgary (CA); Timothy W. Markison, Mesa, AZ (US); Timothy D. Taylor, Gilbert, AZ (US)

(73) Assignee: SIGMASENSE, LLC., Austin, TX (US)

( * ) Notice: Subject to any disclaimer, the term of this patent is extended or adjusted under 35 U.S.C. 154(b) by 0 days.

(21) Appl. No.: 18/242,298

(22) Filed: Sep. 5, 2023

Related U.S. Application Data

(60) Provisional application No. 63/462,853, filed on Apr. 28, 2023.

(51) Int. Cl.
*G06F 3/041* (2006.01)
(52) U.S. Cl.
CPC ........ *G06F 3/0418* (2013.01); *G06F 3/04182* (2019.05)
(58) Field of Classification Search
CPC .. G06F 3/0418; G06F 3/4182; G06F 3/04186; G06F 3/0412; G06F 3/0446;
(Continued)

(56) References Cited

U.S. PATENT DOCUMENTS

| 5,437,178 | A  | 8/1995 | Esin et al. |
| 6,218,972 | B1 | 4/2001 | Groshong |

(Continued)

FOREIGN PATENT DOCUMENTS

| CN | 103995626 A | 8/2014 |
| CN | 104182105 A | 12/2014 |

(Continued)

OTHER PUBLICATIONS

European Patent Office; Extended European Search Report; Application No. 19853507.2; Jun. 13, 2023; 7 pgs.

(Continued)

*Primary Examiner* — Xuemei Zheng
(74) *Attorney, Agent, or Firm* — Garlick & Markison; Timothy D. Taylor

(57) ABSTRACT

A method for execution by a touch screen computing device includes obtaining a touch signal associated with a row electrode of a touch screen display that is operable to render frames of data into visible images, where the touch screen display includes rows of electrodes oriented with columns of electrodes. The method further includes spatial filtering the touch signal in a first direction of the row electrode with respect to columns of the electrodes that form intersections with the row electrode to produce first direction touch signal data. The method further includes spatial filtering the touch signal in a second direction of the row electrode with respect to the intersections to produce second direction touch signal data. The method further includes combining the first and second direction touch signal data to produce a filtered touch signal. The method further includes processing the filtered touch signal to determine touch data.

20 Claims, 89 Drawing Sheets
(18 of 89 Drawing Sheet(s) Filed in Color)

(58) Field of Classification Search
CPC .. G06F 3/0416; G06F 3/04166; G06F 3/0443; G06F 3/0445; G06F 3/04182; G06F 3/044

See application file for complete search history.

(56) References Cited

U.S. PATENT DOCUMENTS

| | | | |
|---|---|---|---|
| 6,665,013 | B1 | 12/2003 | Fossum et al. |
| 7,476,233 | B1 | 1/2009 | Wiener et al. |
| 7,528,755 | B2 | 5/2009 | Hammerschmidt |
| 8,031,094 | B2 | 10/2011 | Hotelling |
| 8,089,289 | B1 | 1/2012 | Kremin et al. |
| 8,279,180 | B2 | 10/2012 | Hotelling et al. |
| 8,537,110 | B2 | 9/2013 | Kruglick |
| 8,547,114 | B2 | 10/2013 | Kremin |
| 8,587,535 | B2 | 11/2013 | Oda et al. |
| 8,625,726 | B2 | 1/2014 | Kuan |
| 8,657,681 | B2 | 2/2014 | Kim |
| 8,966,400 | B2 | 2/2015 | Yeap |
| 8,982,097 | B1 | 3/2015 | Kuzo et al. |
| 9,081,437 | B2 | 7/2015 | Oda |
| 9,201,547 | B2 | 12/2015 | Elias |
| 10,007,335 | B2 | 6/2018 | Lee |
| 2003/0052657 | A1 | 3/2003 | Koernle et al. |
| 2005/0235758 | A1 | 10/2005 | Kowal et al. |
| 2011/0063154 | A1 | 3/2011 | Hotelling et al. |
| 2011/0298745 | A1 | 12/2011 | Souchkov |
| 2012/0278031 | A1 | 11/2012 | Oda |
| 2013/0278447 | A1 | 10/2013 | Kremin |
| 2014/0327644 | A1 | 11/2014 | Mohindra |
| 2015/0091847 | A1 | 4/2015 | Chang |
| 2015/0346889 | A1 | 12/2015 | Chen |
| 2016/0188049 | A1 | 6/2016 | Yang et al. |
| 2017/0308195 | A1* | 10/2017 | Huang ................ G06F 3/04182 |
| 2018/0157354 | A1 | 6/2018 | Blondin et al. |
| 2018/0275824 | A1 | 9/2018 | Li |
| 2019/0034028 | A1* | 1/2019 | Stevenson ........... G06F 3/04186 |
| 2020/0133412 | A1* | 4/2020 | Kuan .................... G06F 3/0418 |

FOREIGN PATENT DOCUMENTS

| | | |
|---|---|---|
| CN | 104536627 A | 4/2015 |
| CN | 107771273 A | 3/2018 |
| EP | 2284637 A1 | 2/2011 |

OTHER PUBLICATIONS

Baker; How delta-sigma ADCs work, Part 1; Analog Applications Journal; Oct. 1, 2011; 6 pgs.

Brian Pisani, Digital Filter Types in Delta-Sigma ADCs, Application Report SBAA230, May 2017, pp. 1-8, Texas Instruments Incorporated, Dallas, Texas.

\* cited by examiner computing device 14 drive-sense circuit 28 display 83 with in-cell touch sensors

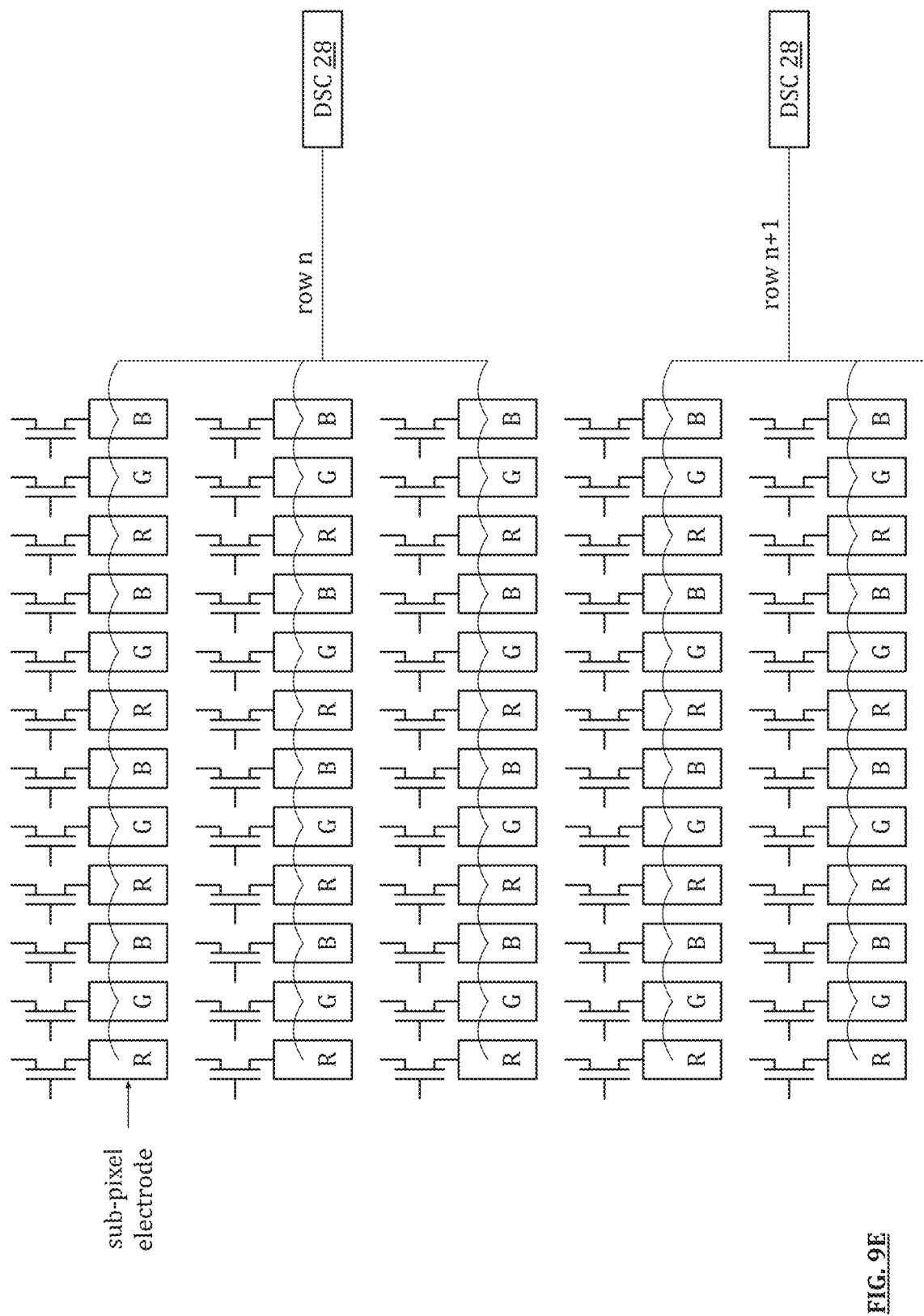

display 83-1 with on-cell touch sensors

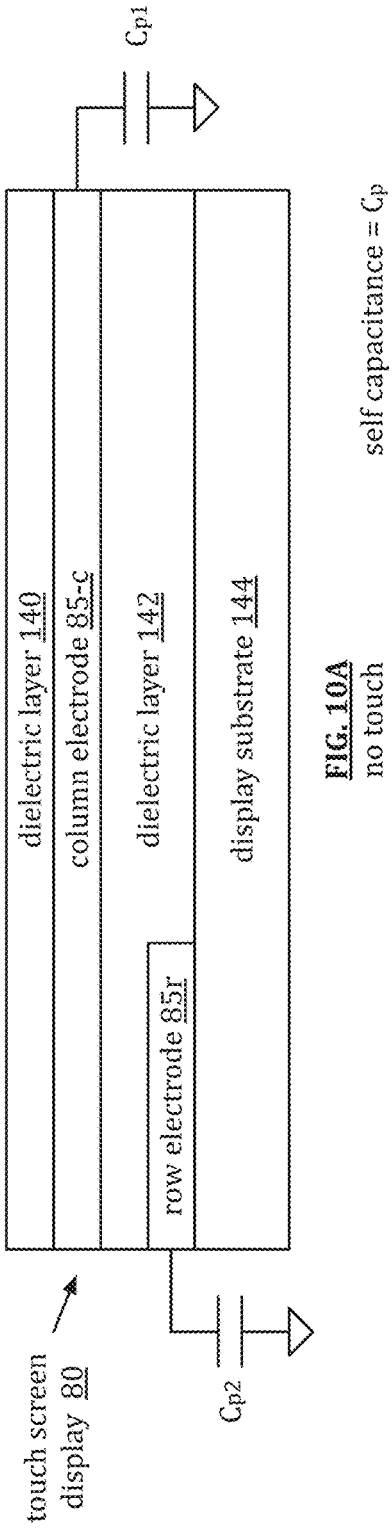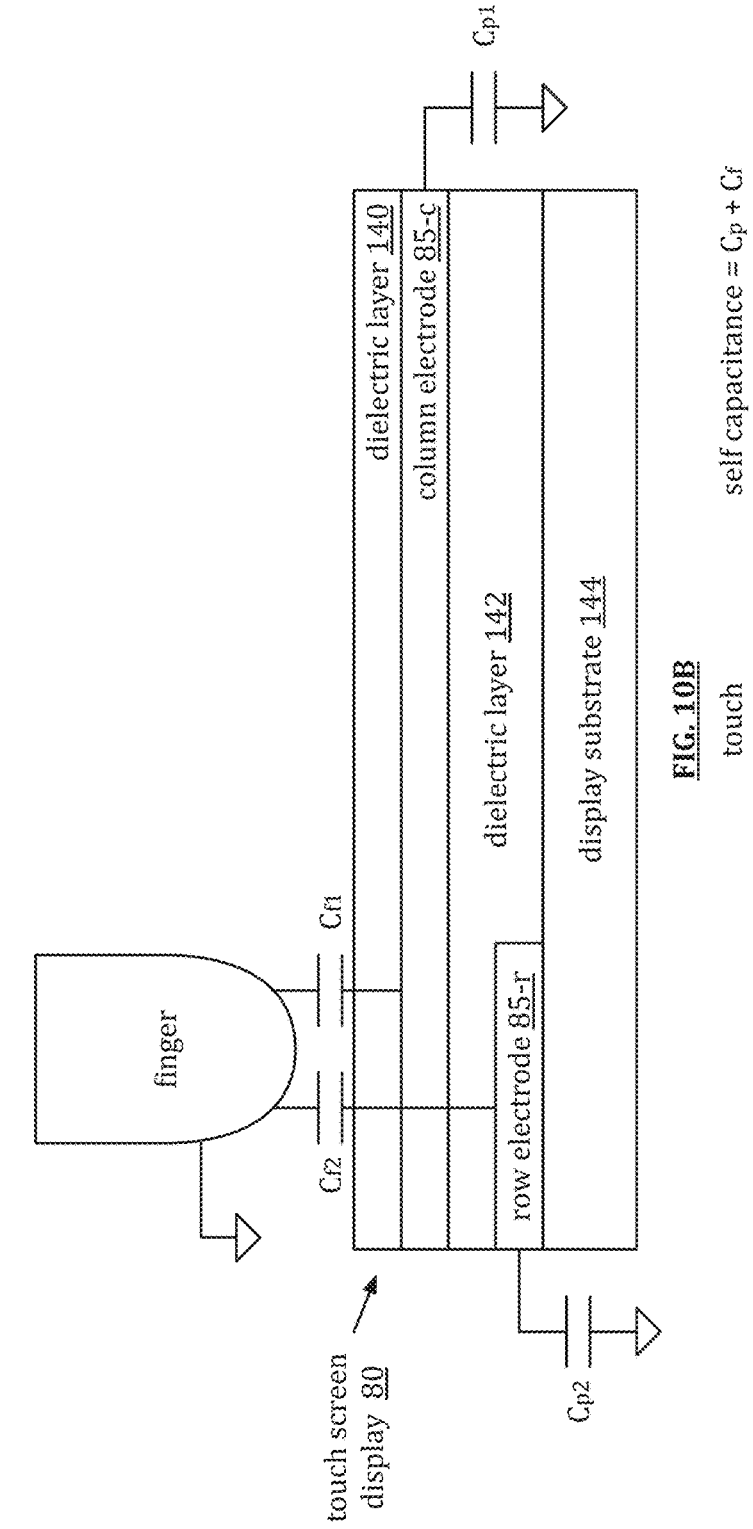

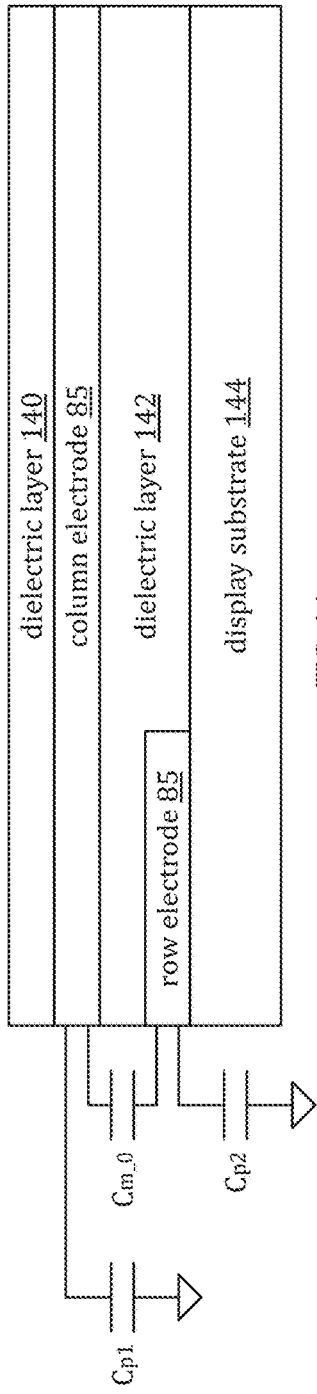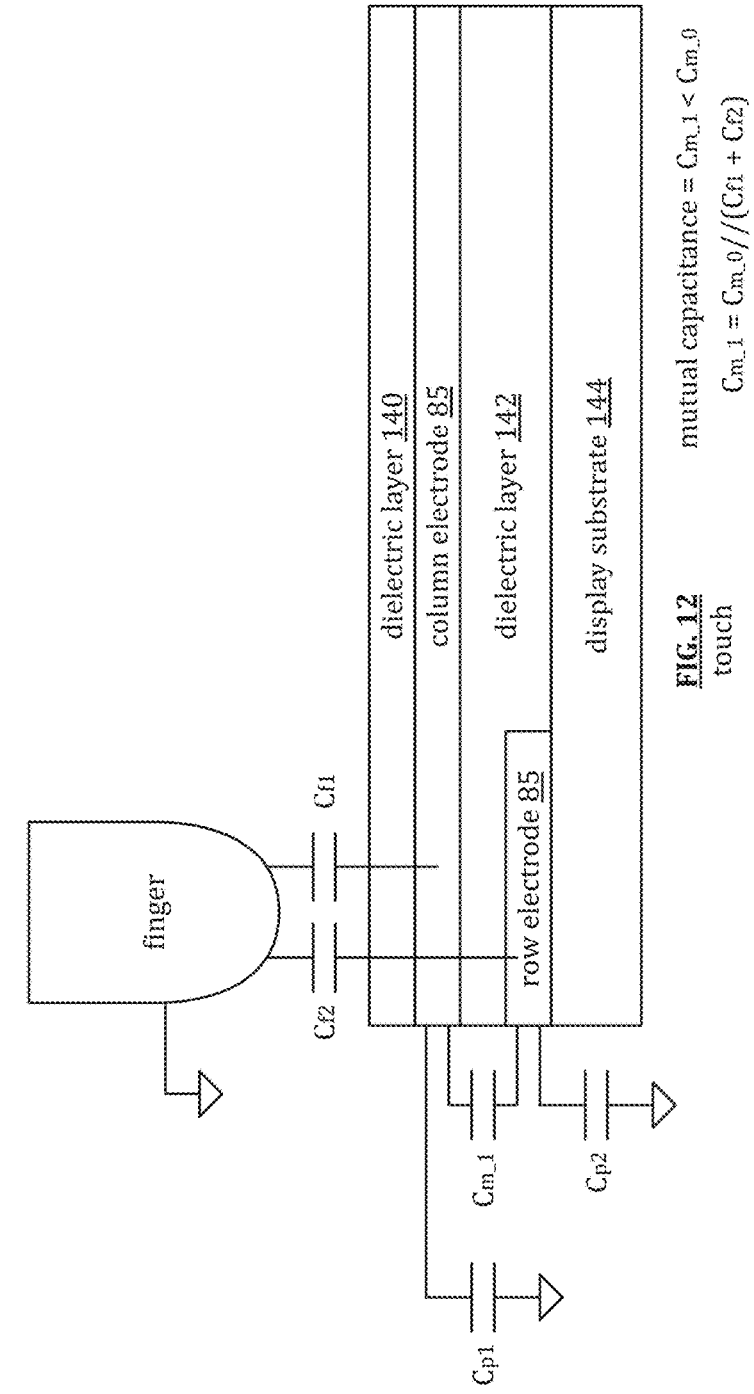

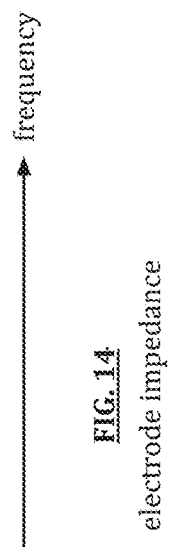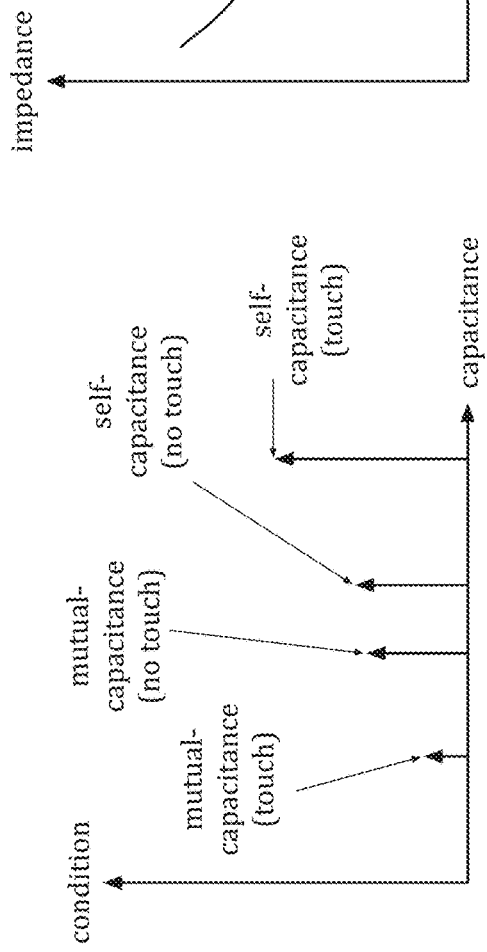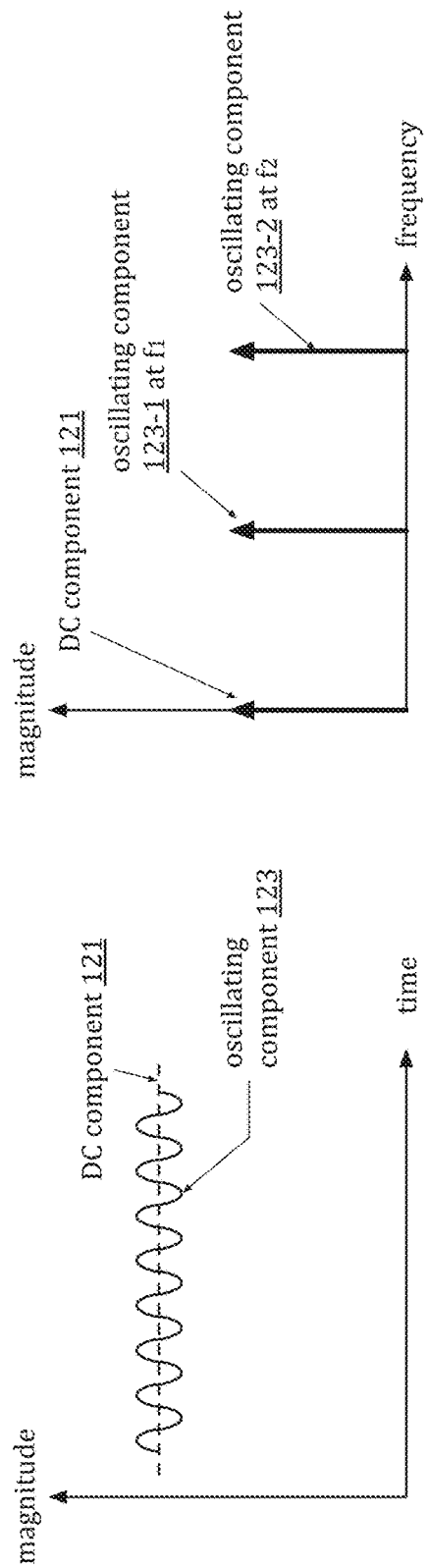

no touch with touch with pen with pen

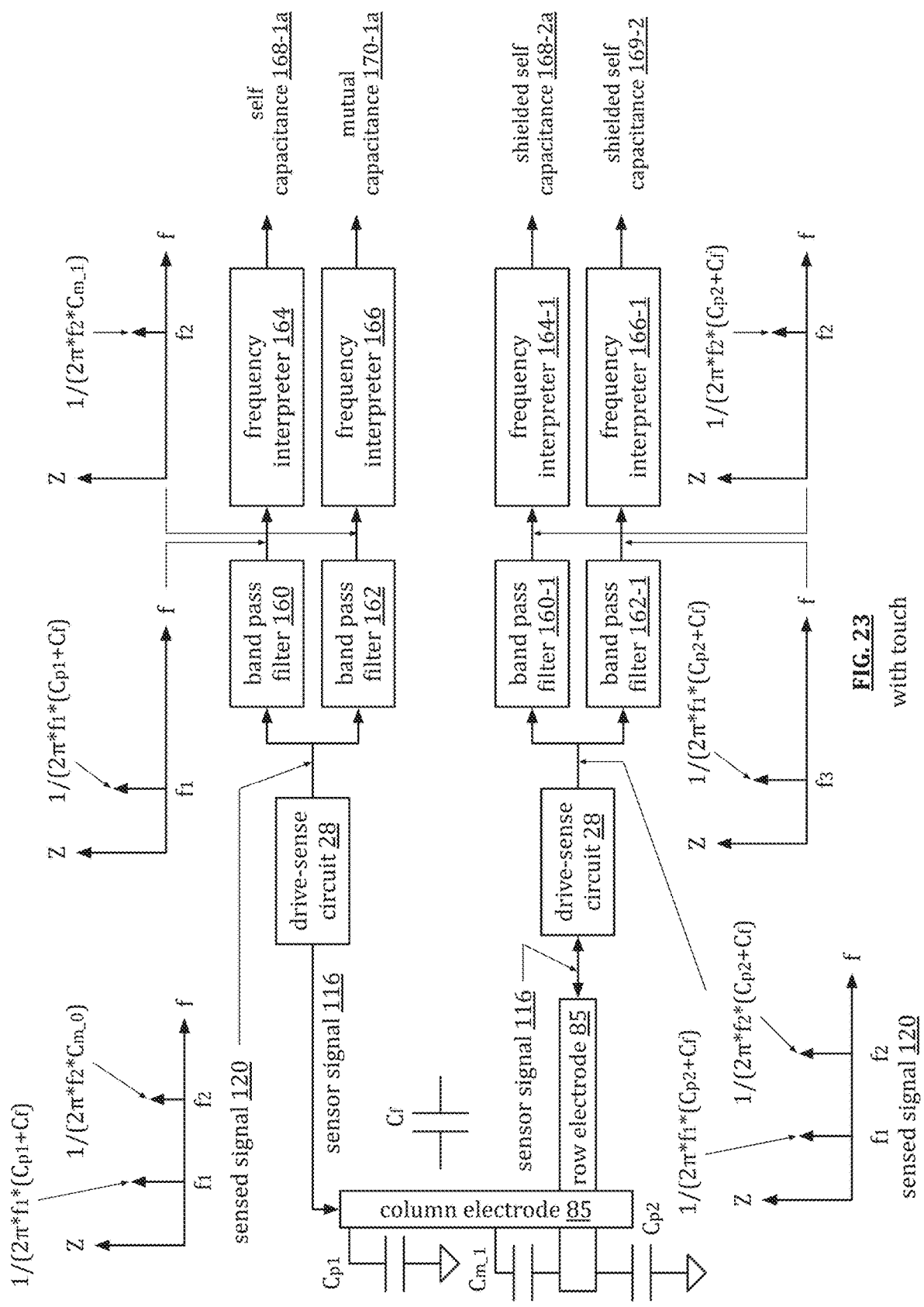
FIG. 23 with touch

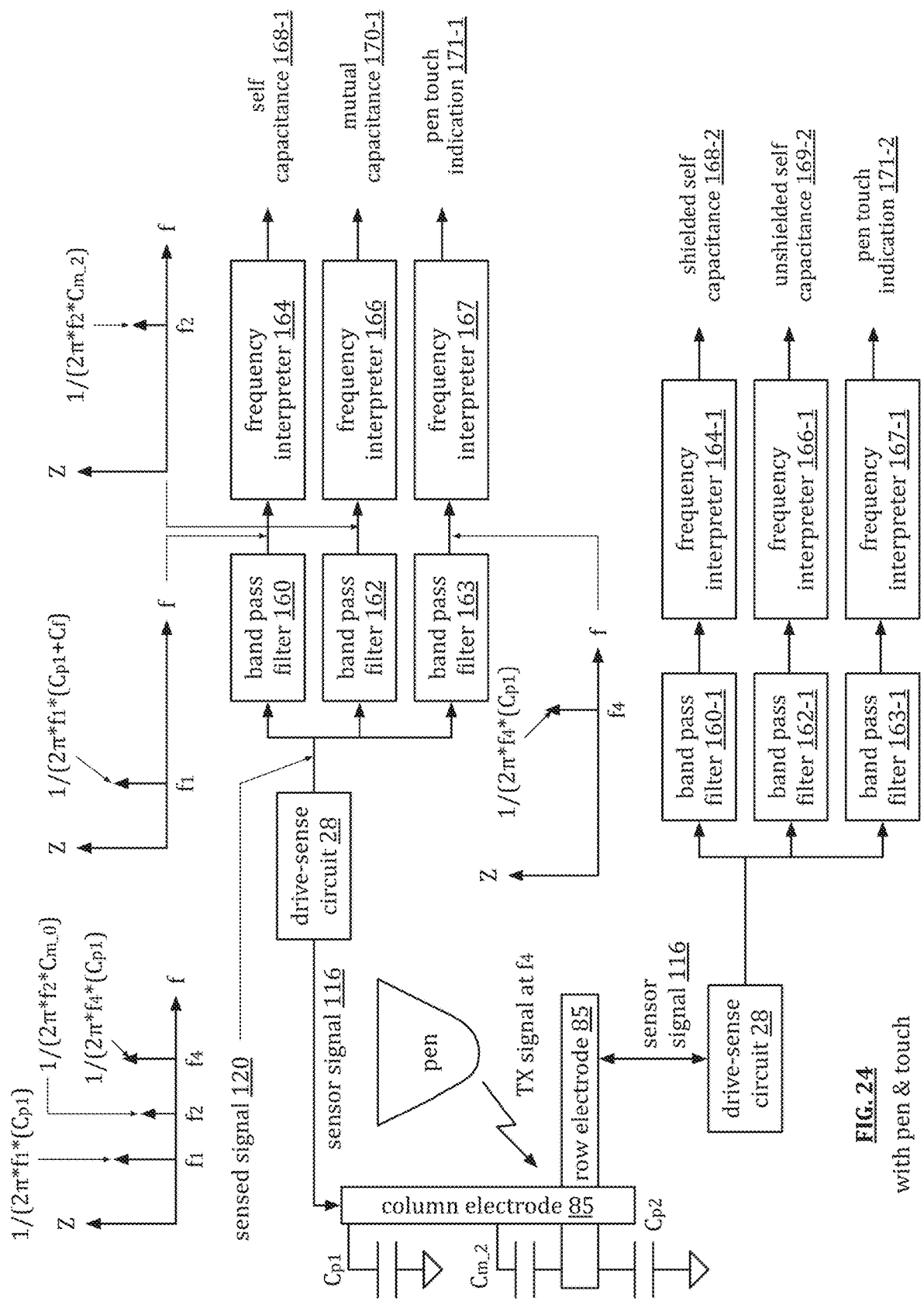

computing device 14-b computing device 14-a

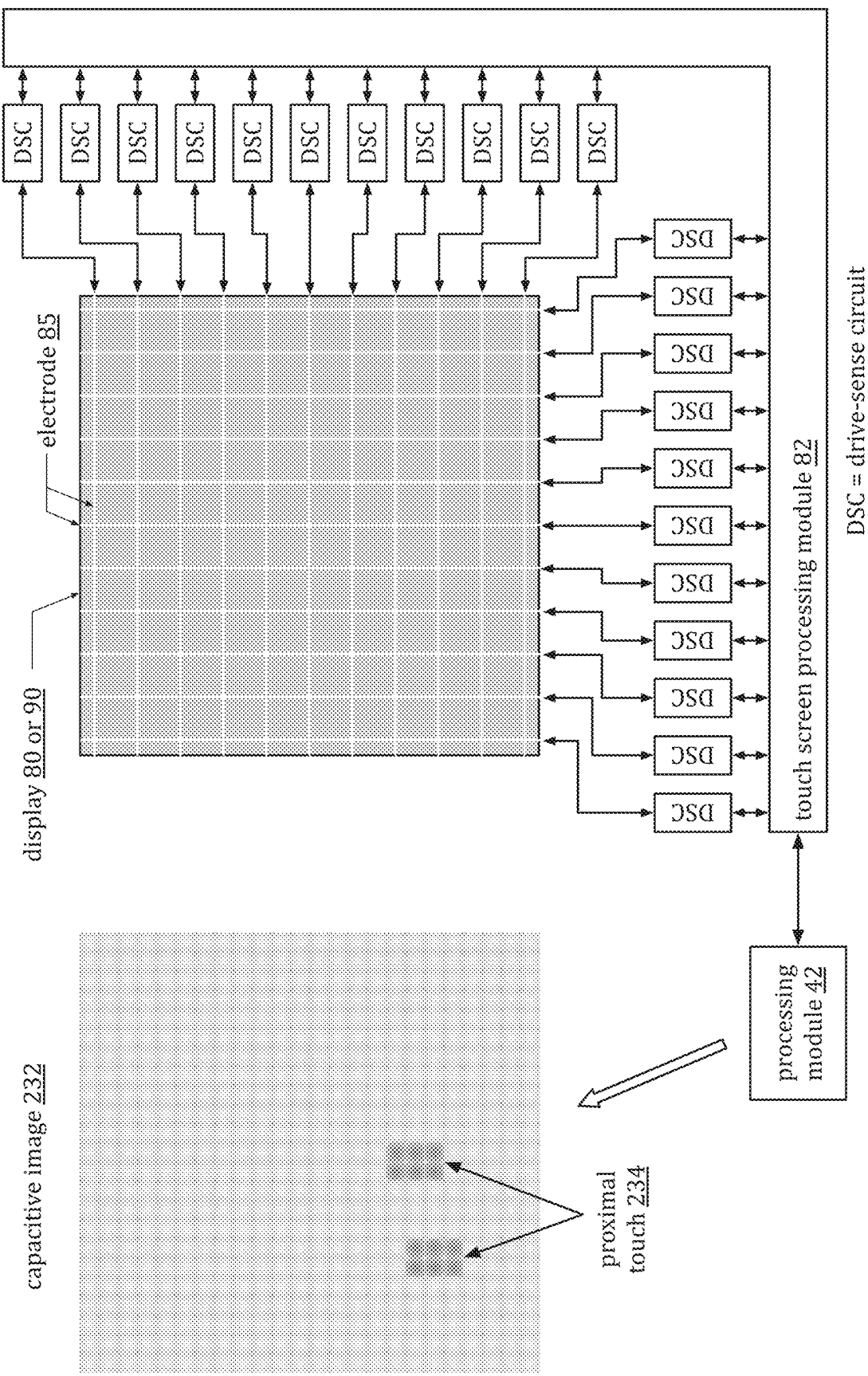

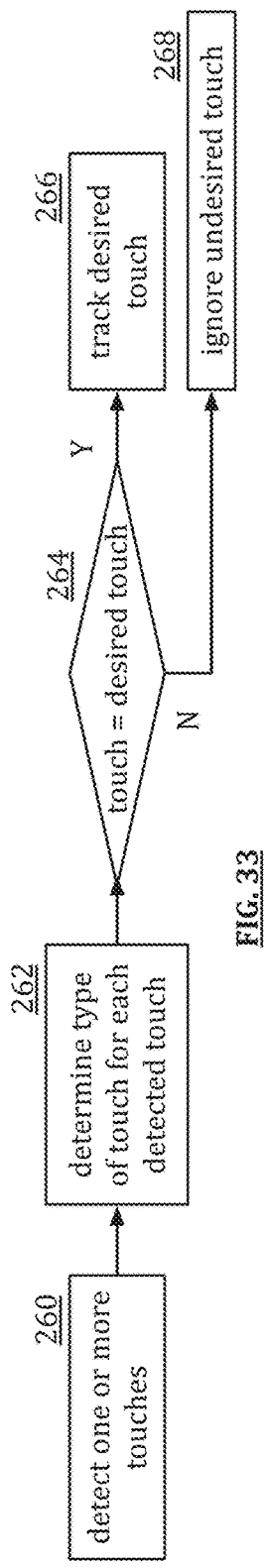
FIG. 33
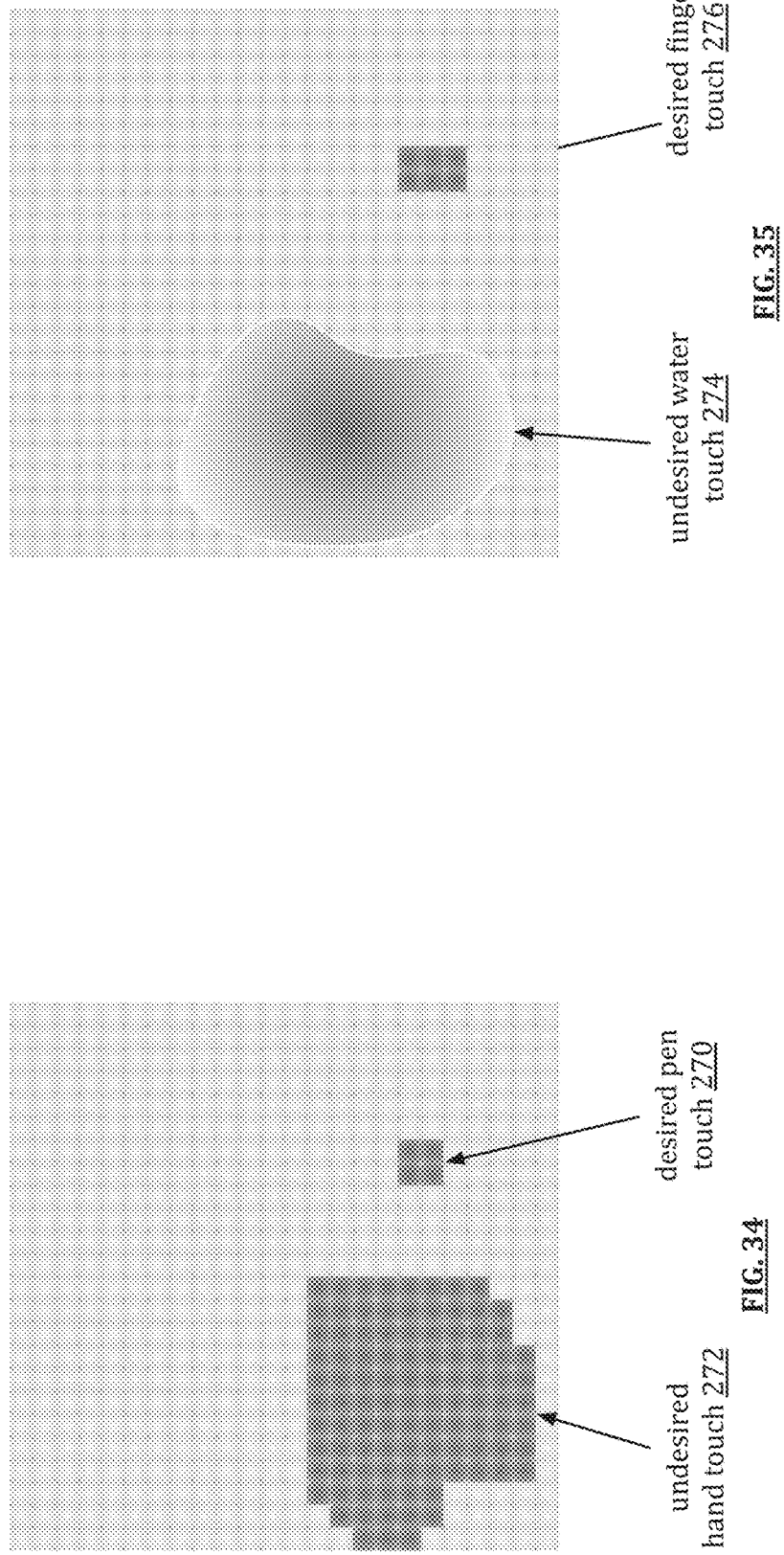
FIG. 35
FIG. 34 near bezel-less touch screen display 240

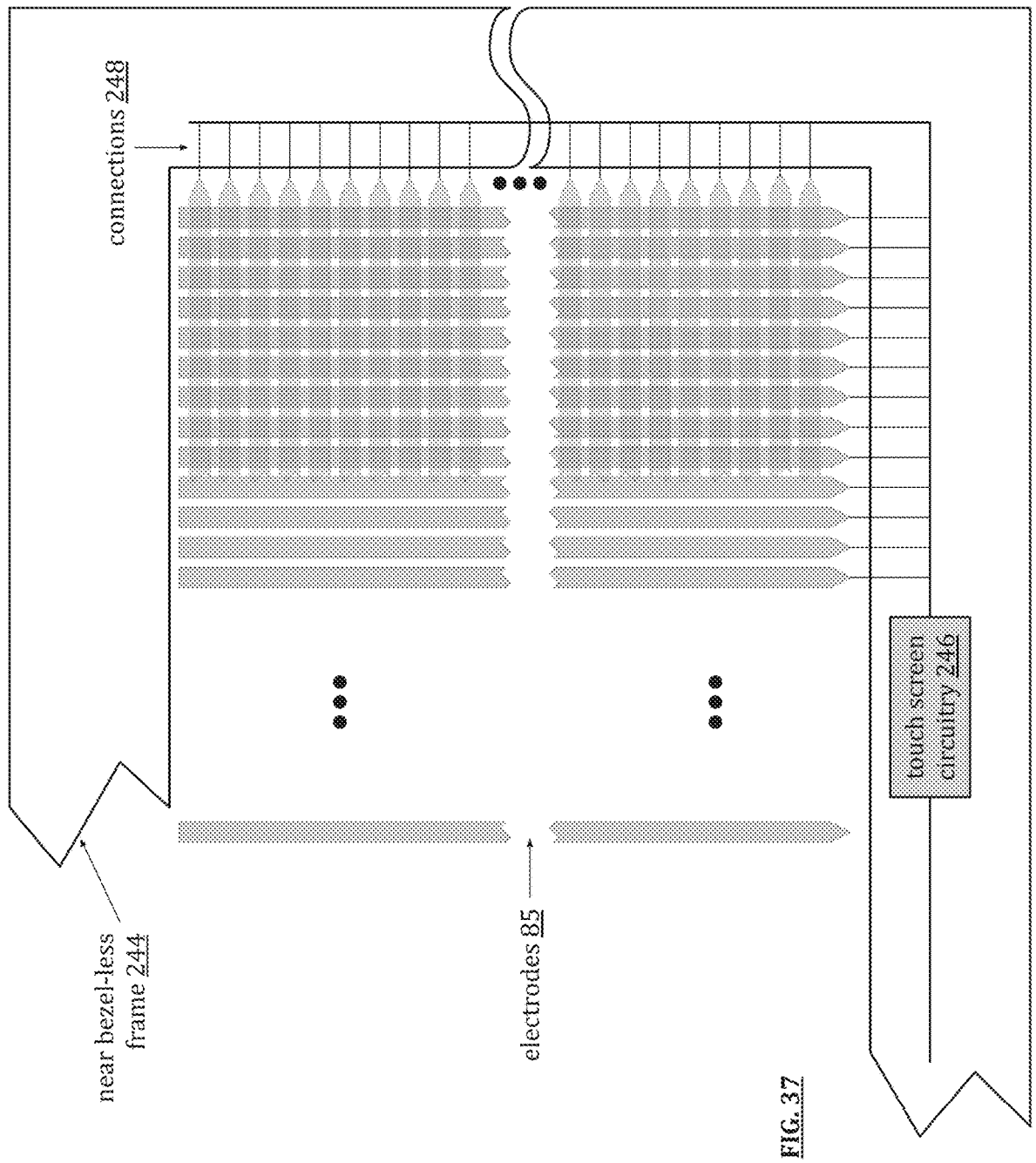

touch screen circuitry 246

DSC = drive-sense circuit near bezel-less touch screen display 240-1 multiple near bezel-less touch screen displays 250 no touch touch

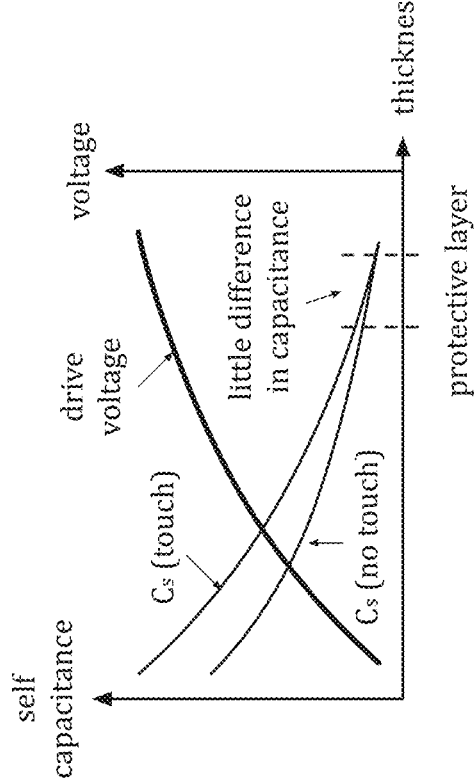
FIG. 48
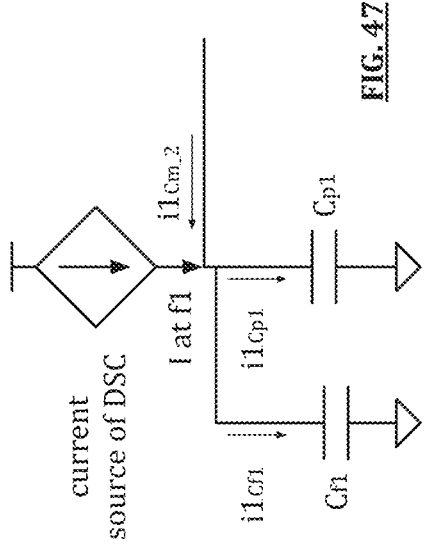
FIG. 47
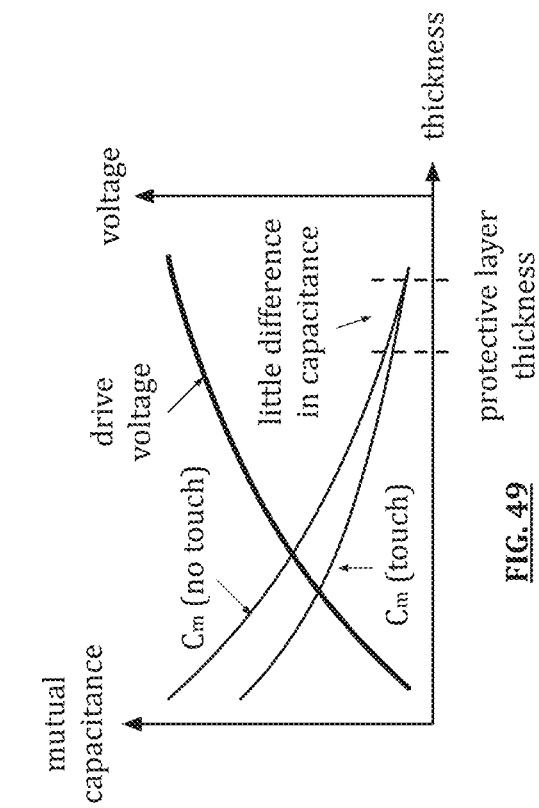
FIG. 50
FIG. 49 large touch screen display 270 large touch screen display 270

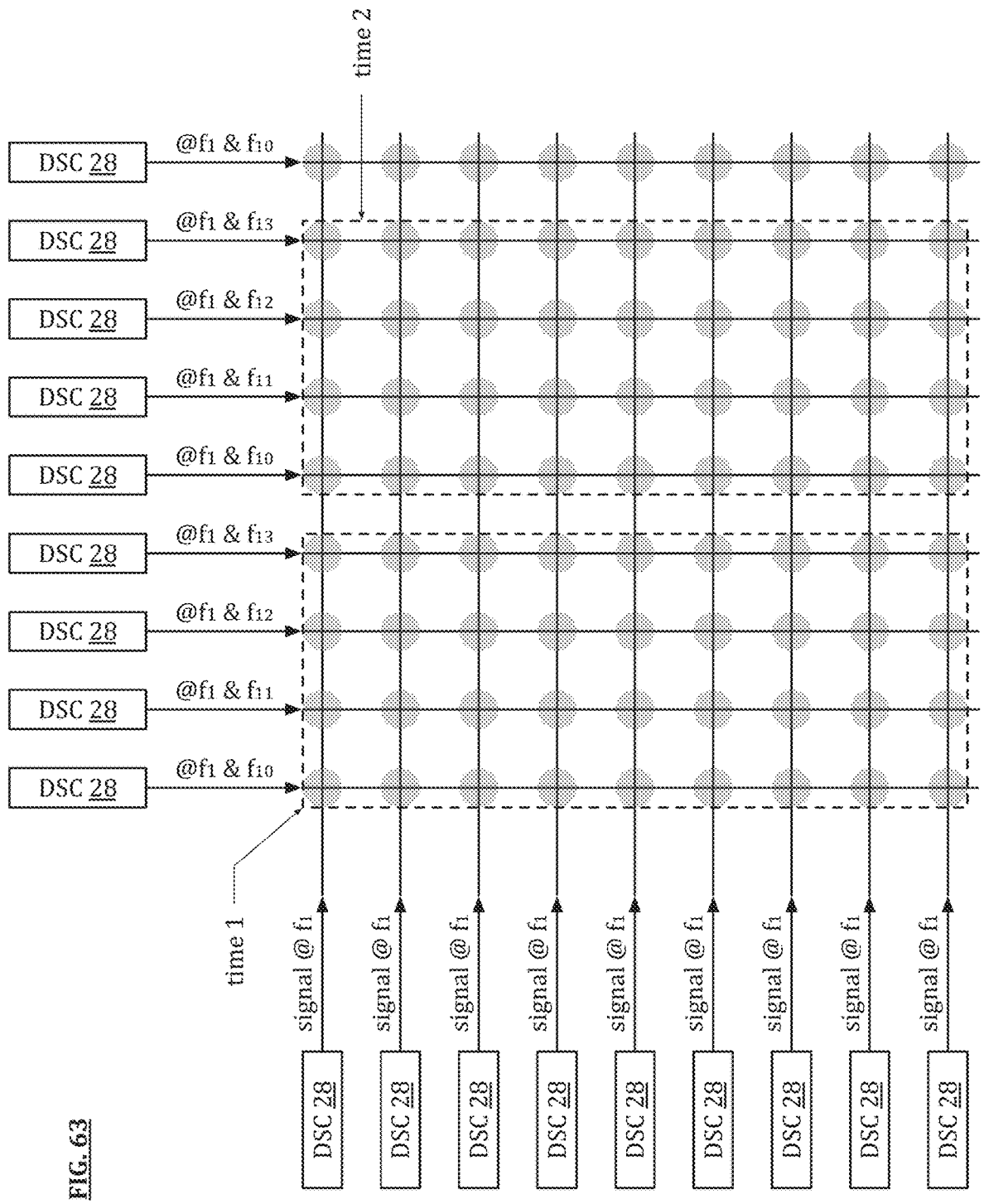

touch screen display 80

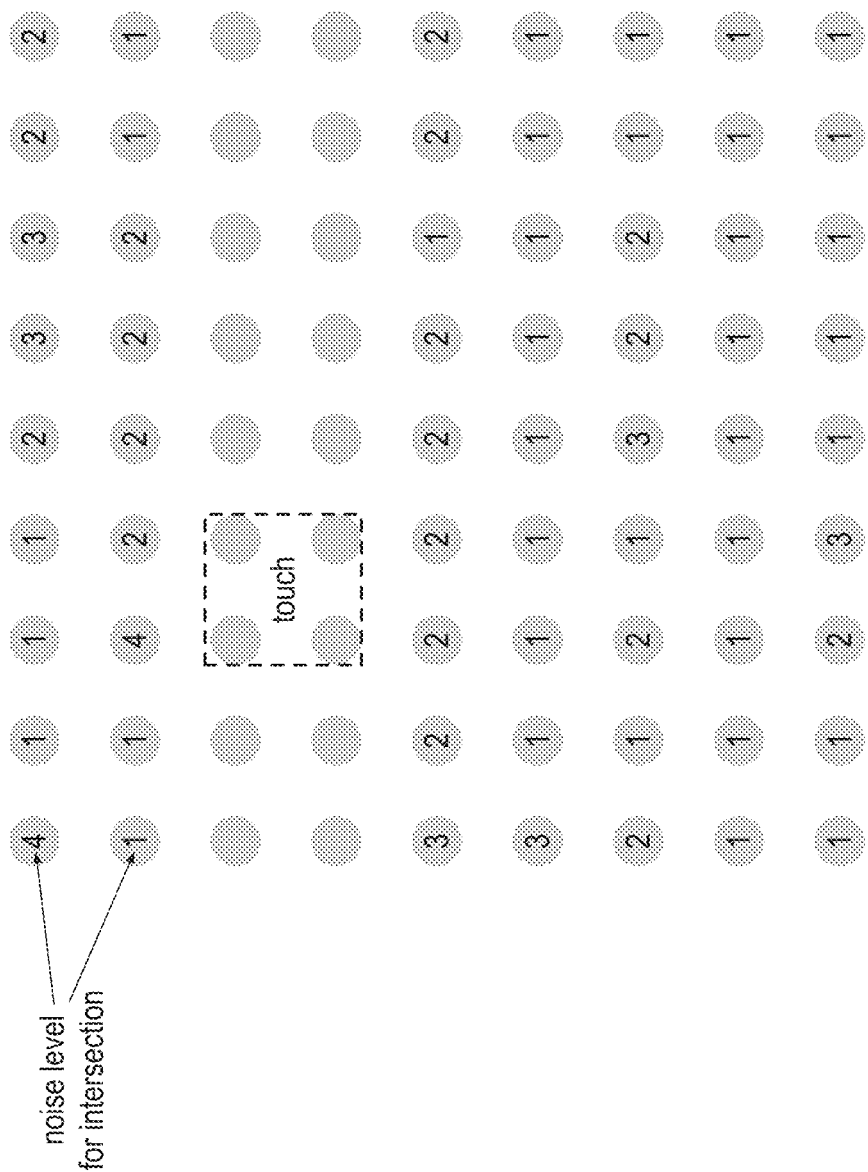

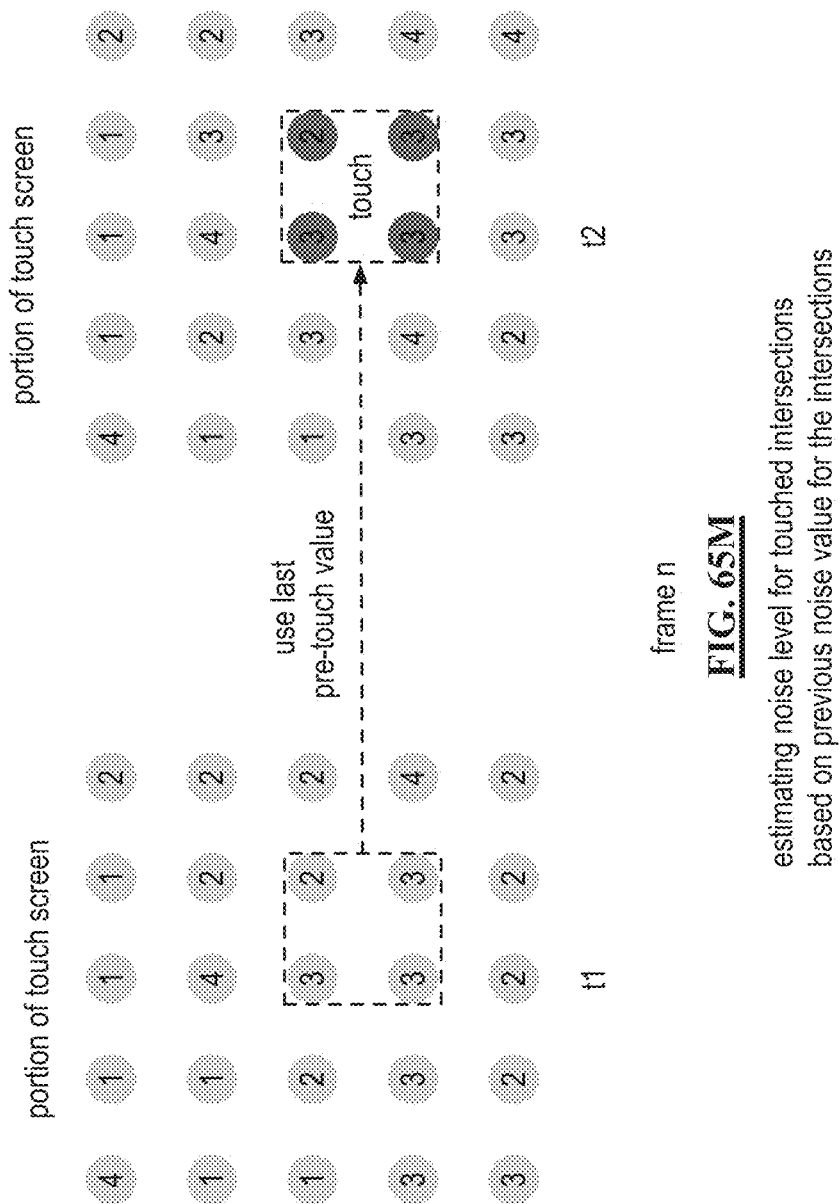

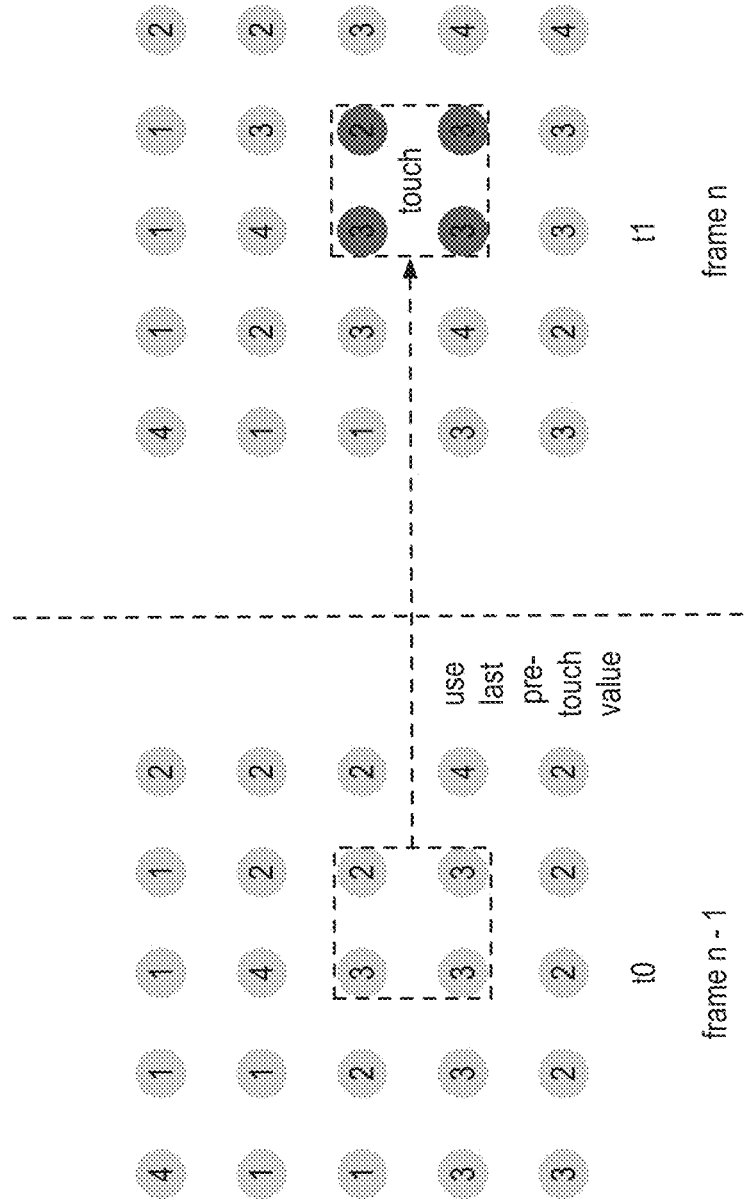

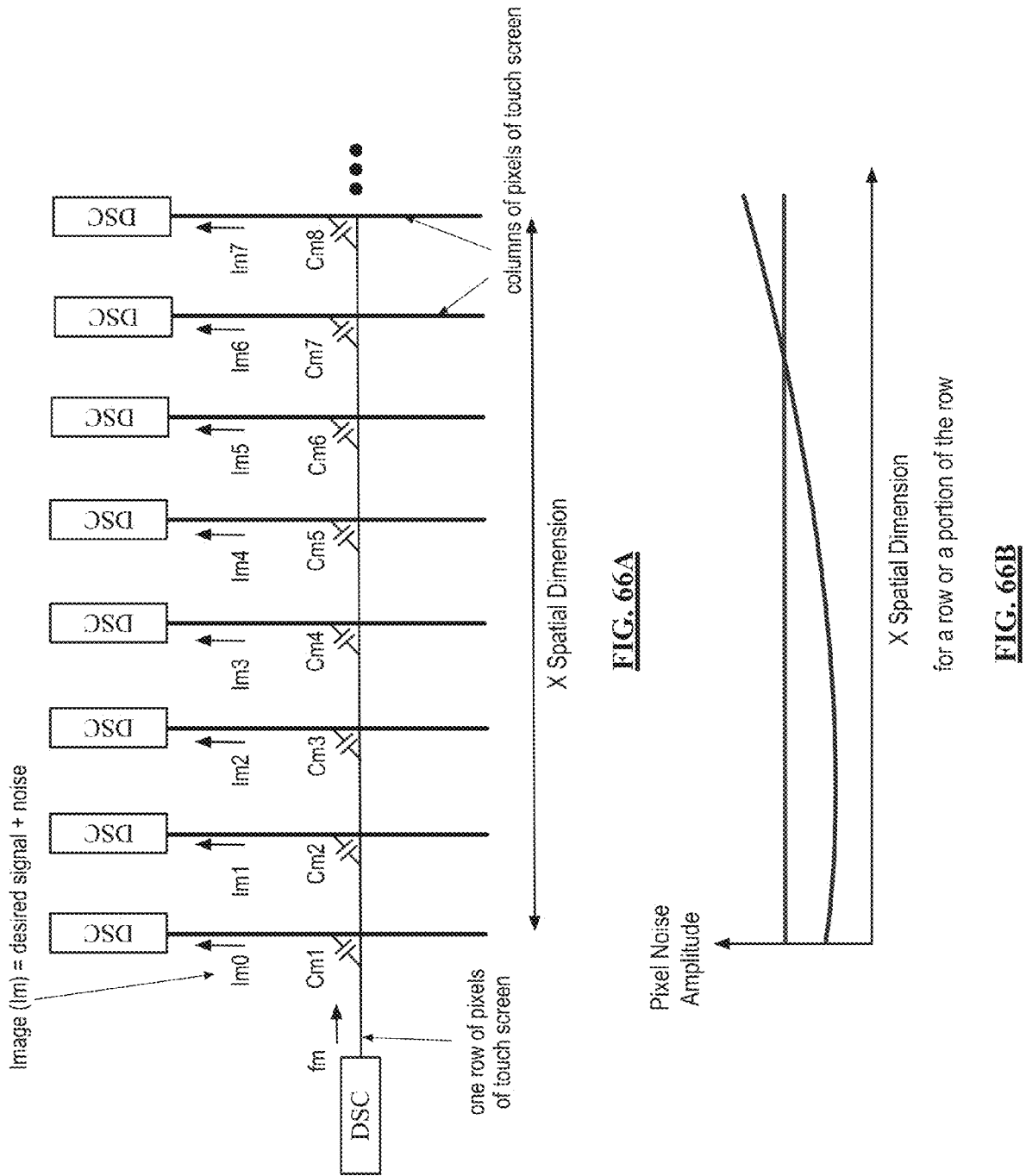

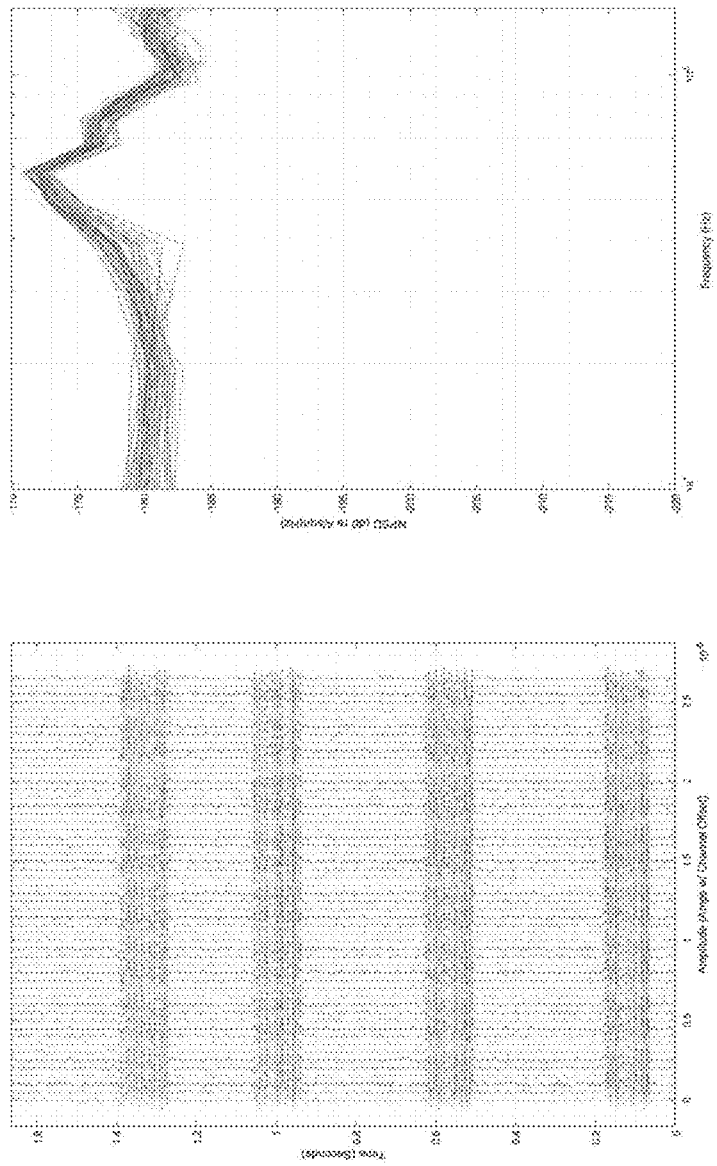
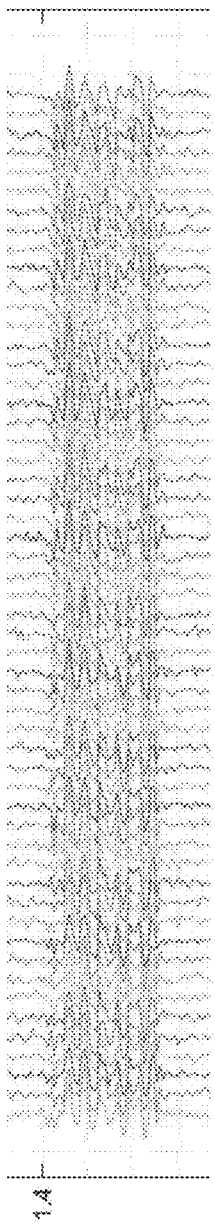

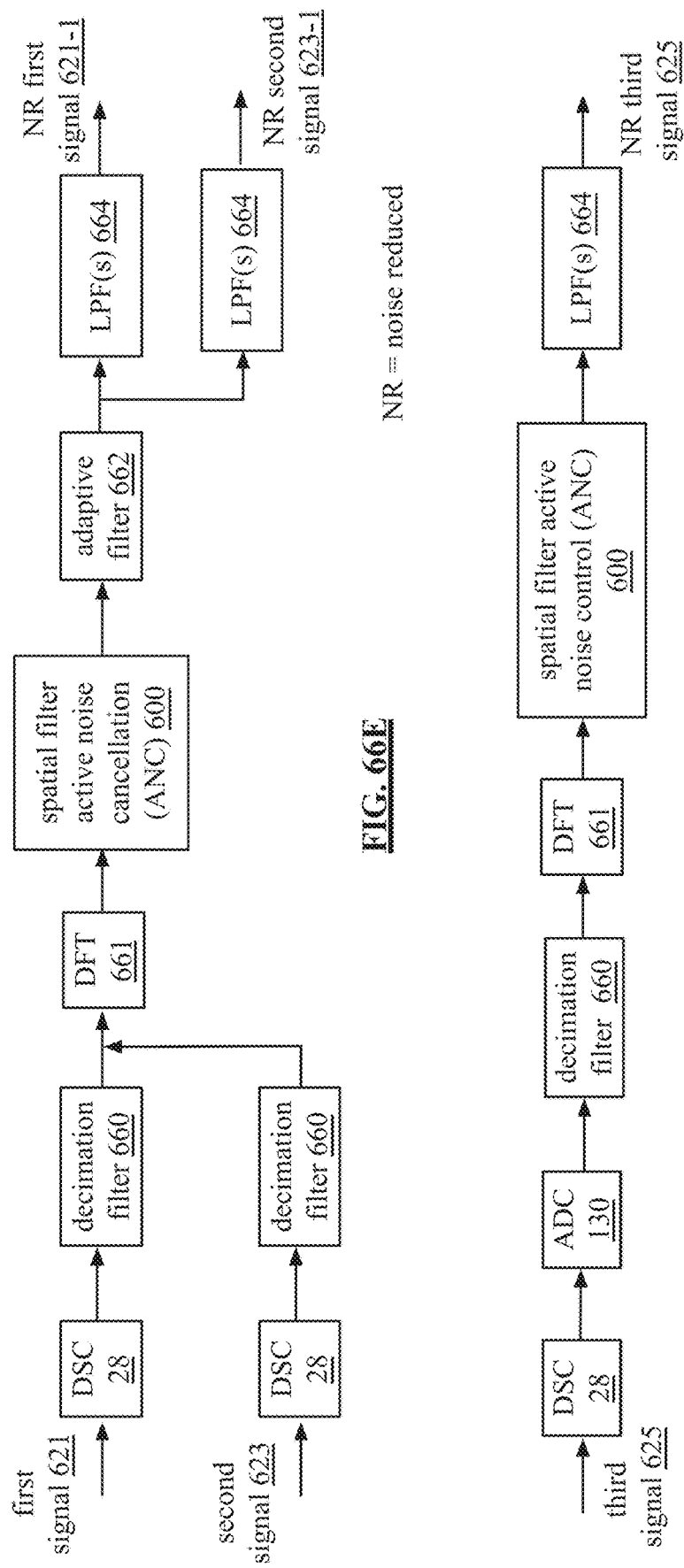

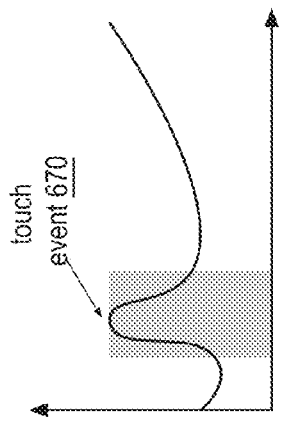
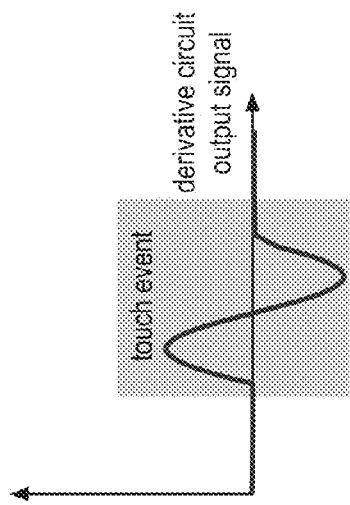
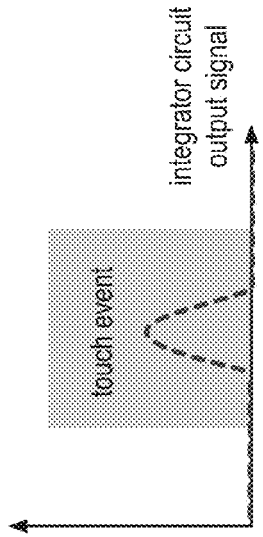
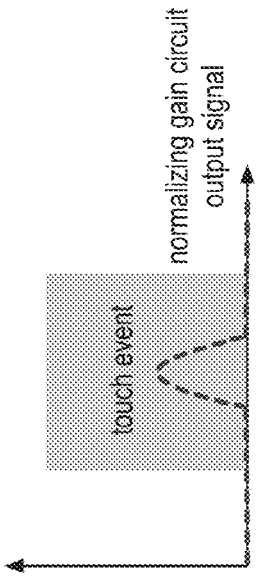
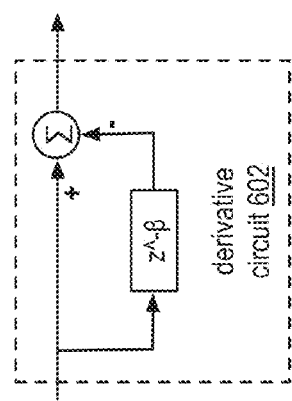
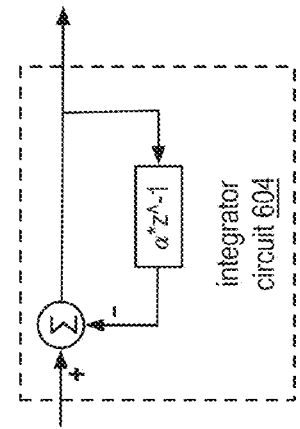
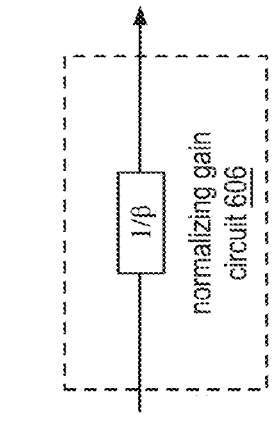
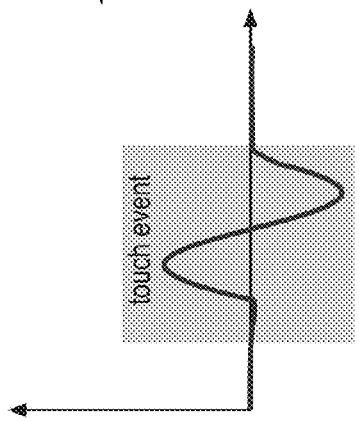
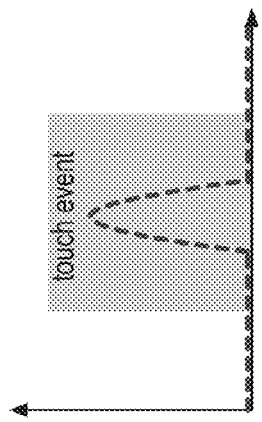
FIG. 66I
FIG. 66J
FIG. 66K

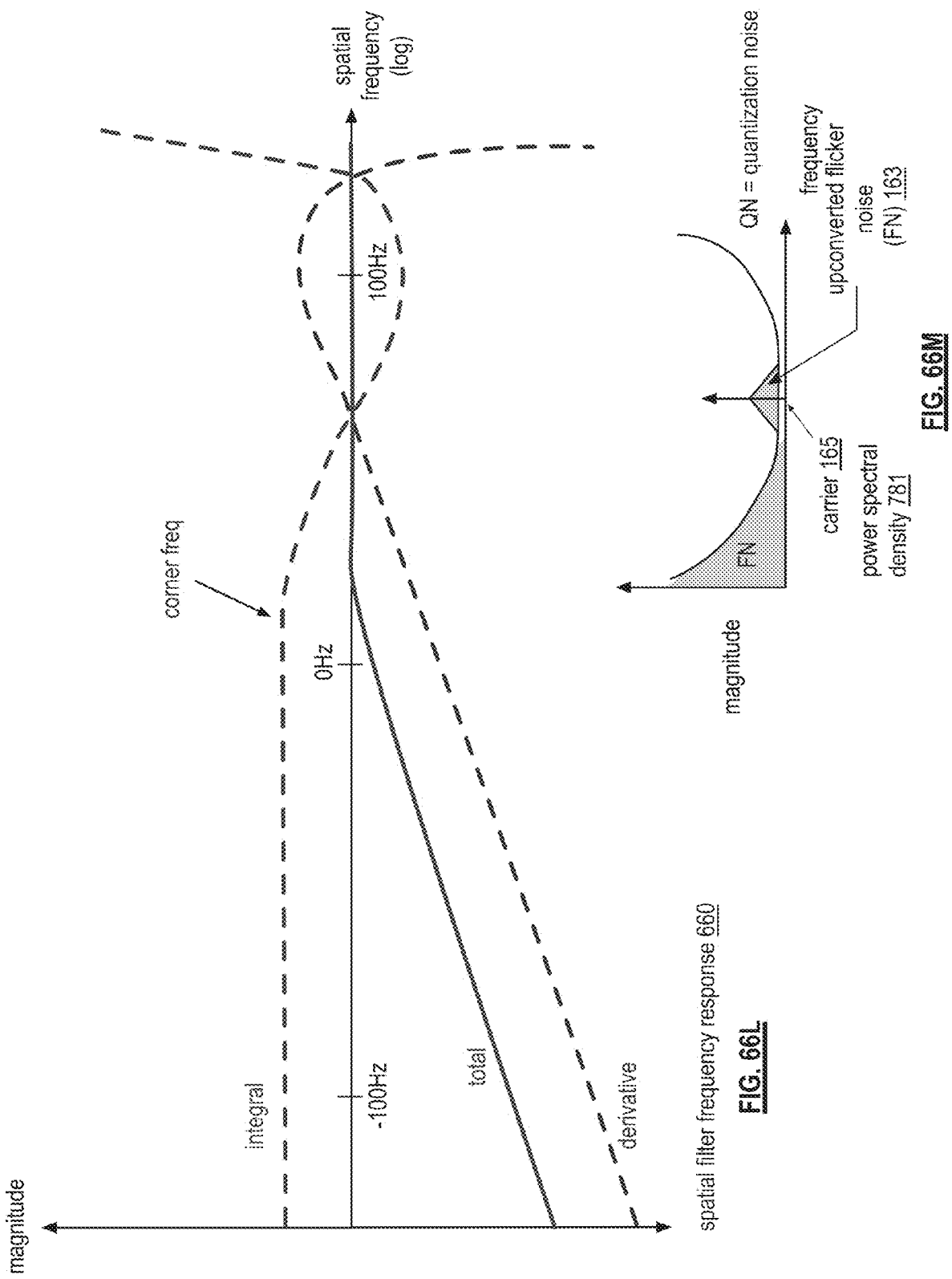

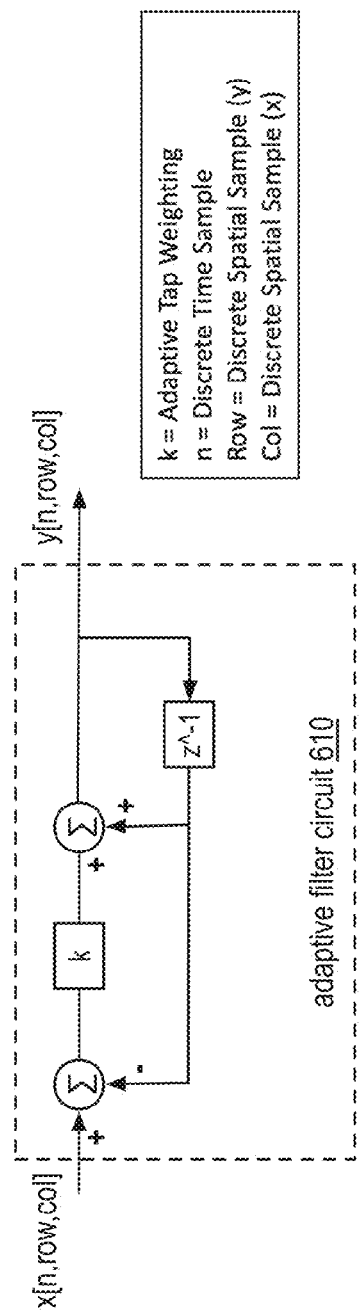
FIG. 66N
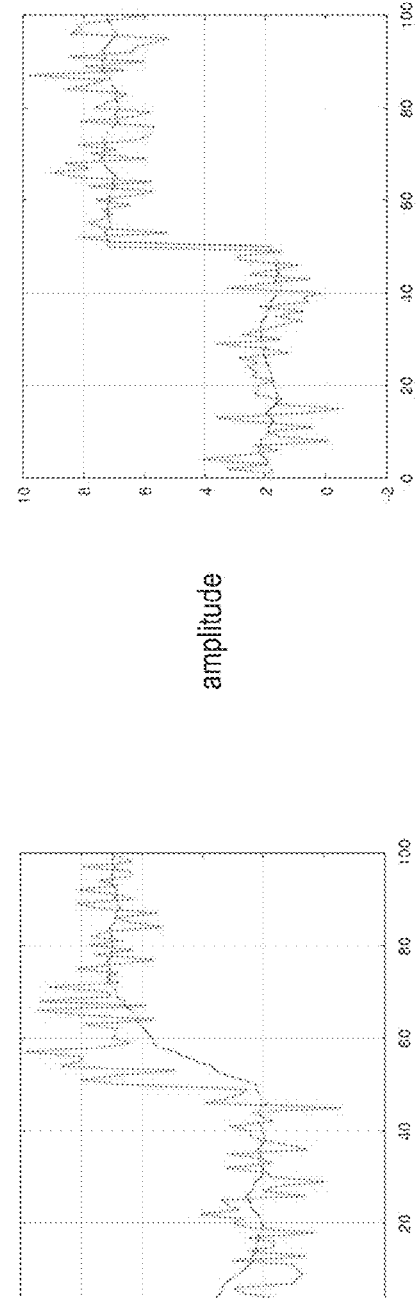
FIG. 66O
FIG. 66P

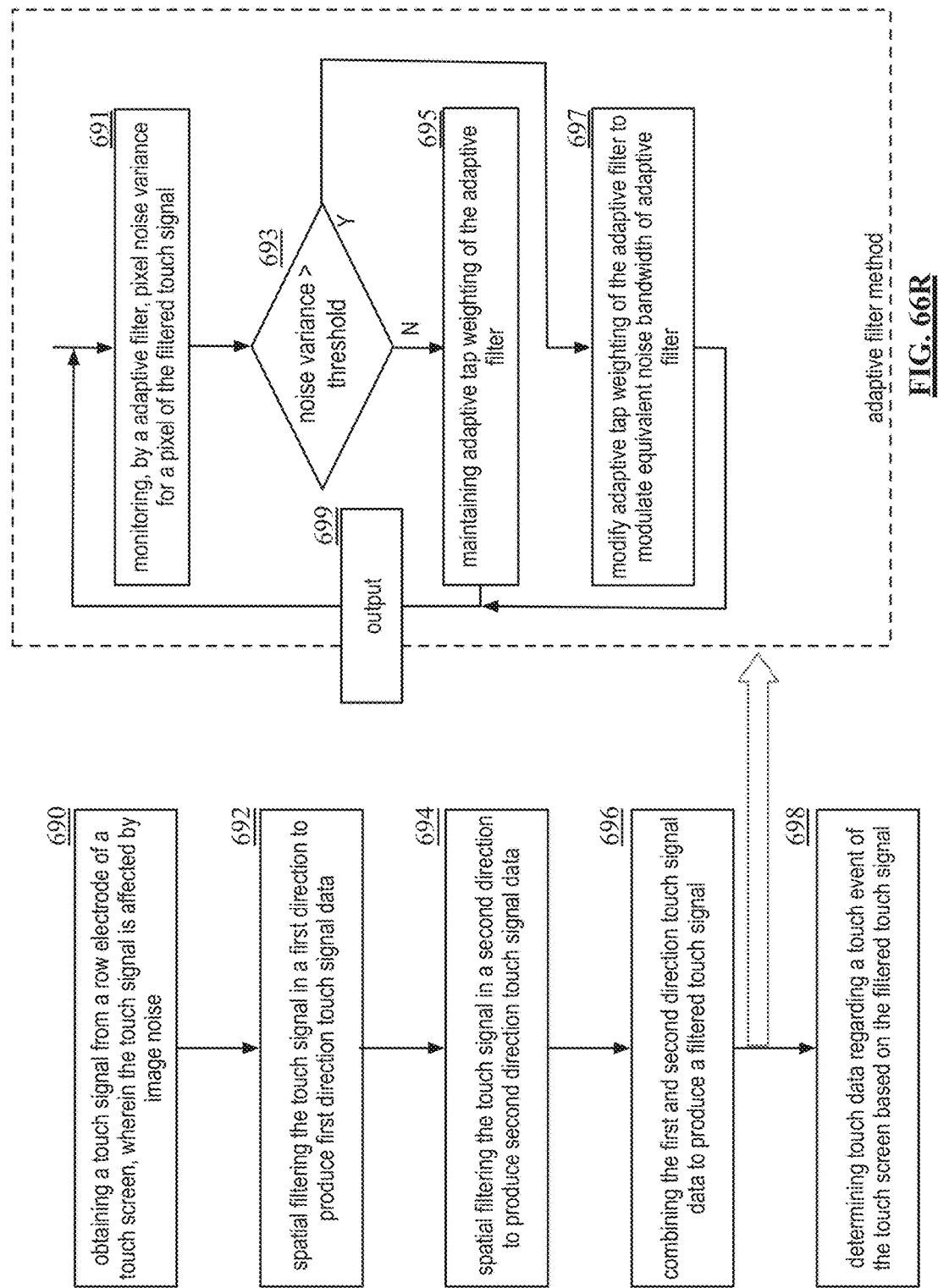

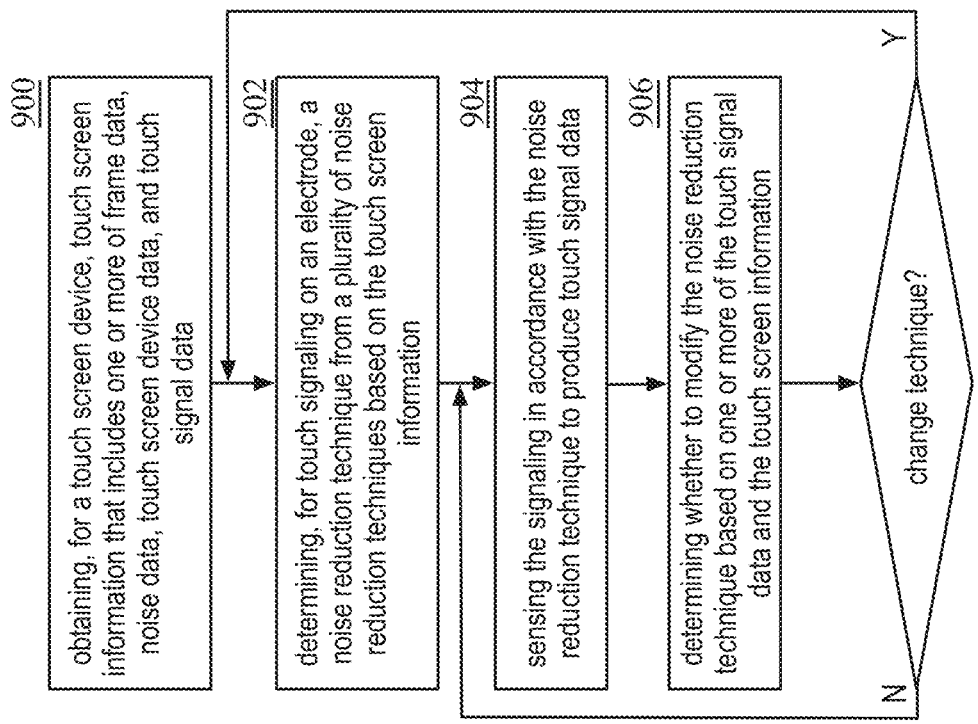

SPATIAL FILTERING A TOUCH SIGNAL OF A TOUCH SCREEN DISPLAY

CROSS REFERENCE TO RELATED PATENTS

The present U.S. Utility Patent application claims priority pursuant to 35 U.S.C. § 119(e) to U.S. Provisional Application No. 63/462,853, entitled "SPATIAL FILTERING ACTIVE NOISE CONTROL", filed Apr. 23, 2023, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to data communication systems and more particularly to sensed data collection and/or communication.

Description of Related Art

Sensors are used in a wide variety of applications ranging from in-home automation, to industrial systems, to health care, to transportation, and so on. For example, sensors are placed in bodies, automobiles, airplanes, boats, ships, trucks, motorcycles, cell phones, televisions, touch-screens, industrial plants, appliances, motors, checkout counters, etc. for the variety of applications.

In general, a sensor converts a physical quantity into an electrical or optical signal. For example, a sensor converts a physical phenomenon, such as a biological condition, a chemical condition, an electric condition, an electromagnetic condition, a temperature, a magnetic condition, mechanical motion (position, velocity, acceleration, force, pressure), an optical condition, and/or a radioactivity condition, into an electrical signal.

A sensor includes a transducer, which functions to convert one form of energy (e.g., force) into another form of energy (e.g., electrical signal). There are a variety of transducers to support the various applications of sensors. For example, a transducer is capacitor, a piezoelectric transducer, a piezoresistive transducer, a thermal transducer, a thermal-couple, a photoconductive transducer such as a photoresistor, a photodiode, and/or phototransistor.

A sensor circuit is coupled to a sensor to provide the sensor with power and to receive the signal representing the physical phenomenon from the sensor. The sensor circuit includes at least three electrical connections to the sensor: one for a power supply; another for a common voltage reference (e.g., ground); and a third for receiving the signal representing the physical phenomenon. The signal representing the physical phenomenon will vary from the power supply voltage to ground as the physical phenomenon changes from one extreme to another (for the range of sensing the physical phenomenon).

The sensor circuits provide the received sensor signals to one or more computing devices for processing. A computing device is known to communicate data, process data, and/or store data. The computing device may be a cellular phone, a laptop, a tablet, a personal computer (PC), a work station, a video game device, a server, and/or a data center that support millions of web searches, stock trades, or on-line purchases every hour.

The computing device processes the sensor signals for a variety of applications. For example, the computing device processes sensor signals to determine temperatures of a variety of items in a refrigerated truck during transit. As another example, the computing device processes the sensor signals to determine a touch on a touch screen. As yet another example, the computing device processes the sensor signals to determine various data points in a production line of a product.

BRIEF DESCRIPTION OF THE SEVERAL VIEWS OF THE DRAWING(S)

The patent or application file contains at least one drawing executed in color. Copies of this patent or patent application publication with color drawing(s) will be provided by the Office upon request and payment of the necessary fee.

FIG. 9E is a schematic block diagram of an example of sub-pixel electrodes coupled together to form row electrodes of a touch screen sensor;

FIG. 10A is a cross section schematic block diagram of an example of self-capacitance with no-touch on a touch screen display;

FIG. 10B is a cross section schematic block diagram of an example of self-capacitance with a touch on a touch screen display;

FIG. 11 is a cross section schematic block diagram of an example of self-capacitance and mutual capacitance with no-touch on a touch screen display;

FIG. 12 is a cross section schematic block diagram of an example of self-capacitance and mutual capacitance with a touch on a touch screen display;

FIG. 13 is an example graph that plots condition verses capacitance for an electrode of a touch screen display;

FIG. 14 is an example graph that plots impedance verses frequency for an electrode of a touch screen display;

FIG. 15 is a time domain example graph that plots magnitude verses time for an analog reference signal;

FIG. 16 is a frequency domain example graph that plots magnitude verses frequency for an analog reference signal;

FIG. 23 is a schematic block diagram of a finger touch example of a few drive sense circuits and a portion of the touch screen processing module of a touch screen display;

FIG. 24 is a schematic block diagram of a pen touch example of a few drive sense circuits and a portion of the touch screen processing module of a touch screen display;

FIG. 30 is a schematic block diagram of another example of a computing device generating a capacitive image of a touch screen display;

FIG. 33 is a logic diagram of an embodiment of a method for identifying desired and undesired touches using a capacitive image;

FIG. 34 is a schematic block diagram of an example of using capacitive images to identify desired and undesired touches;

FIG. 35 is a schematic block diagram of another example of using capacitive images to identify desired and undesired touches;

FIG. 37 is a schematic block diagram of another embodiment of a near bezel-less touch screen display;

FIG. 47 is a schematic block diagram of an electrical equivalent circuit of a drive sense circuit coupled to an electrode without a finger touch;

FIG. 48 is an example graph that plots finger capacitance verses protective layer thickness of a touch screen display;

FIG. 49 is an example graph that plots mutual capacitance verses protective layer thickness and drive voltage verses protective layer thickness of a touch screen display;

FIG. 50 is an example graph that plots self-capacitance verses protective layer thickness and drive voltage verses protective layer thickness of a touch screen display;

FIG. 63 is a schematic block diagram of an example of frequency and time dividing for reference signals for drive-sense circuits of a touch screen display;

FIG. 65I is a schematic block diagram of an embodiment of row-column intersections of a touch screen;

FIG. 65M is a diagram illustrating another embodiment of estimating noise associated with one or more intersections;

FIG. 65N is a diagram illustrating another embodiment of estimating noise associated with one or more intersections;

Figure 1:
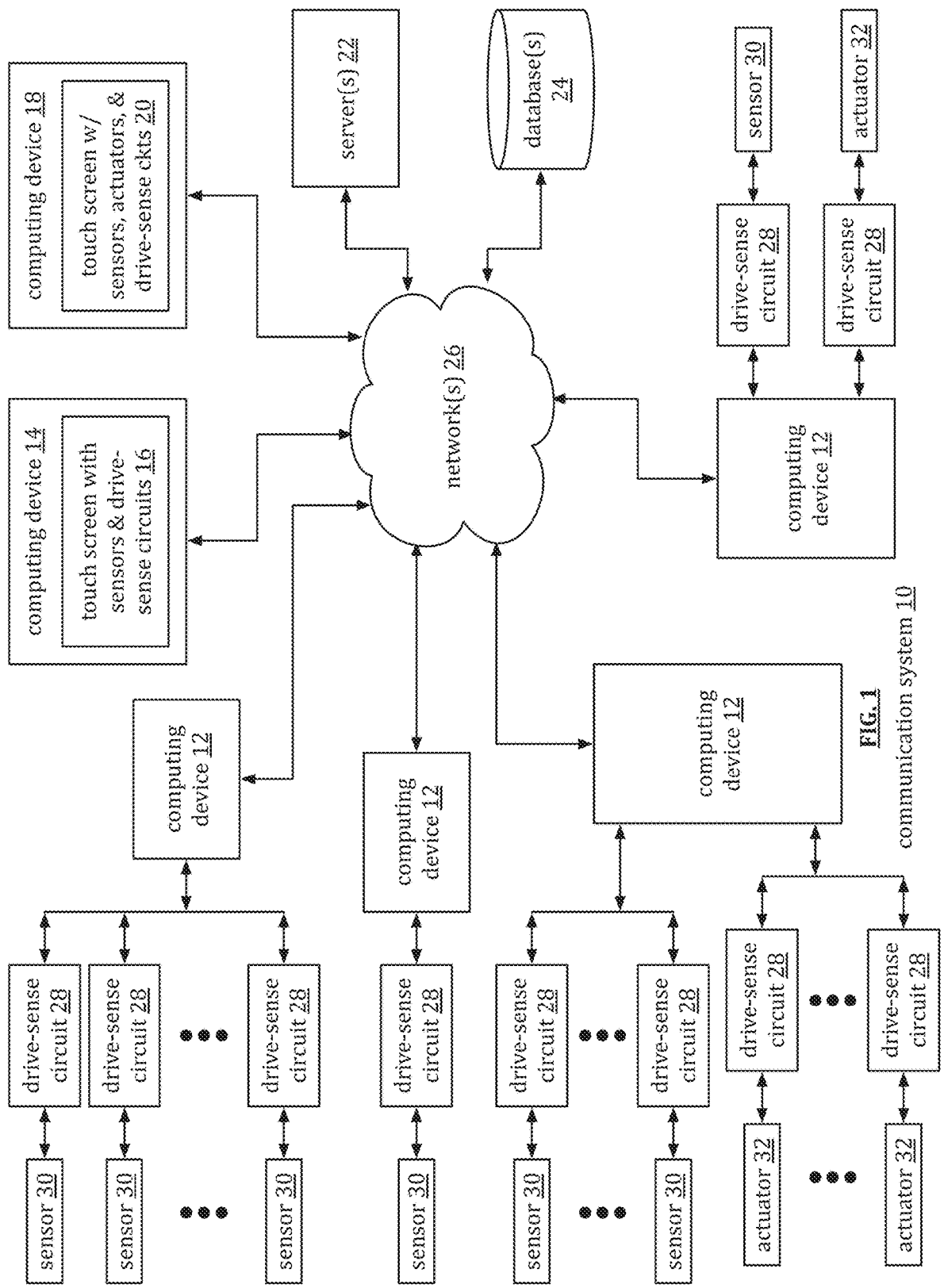
FIG. 1 is a schematic block diagram of an embodiment of a communication system.
Figure 2:
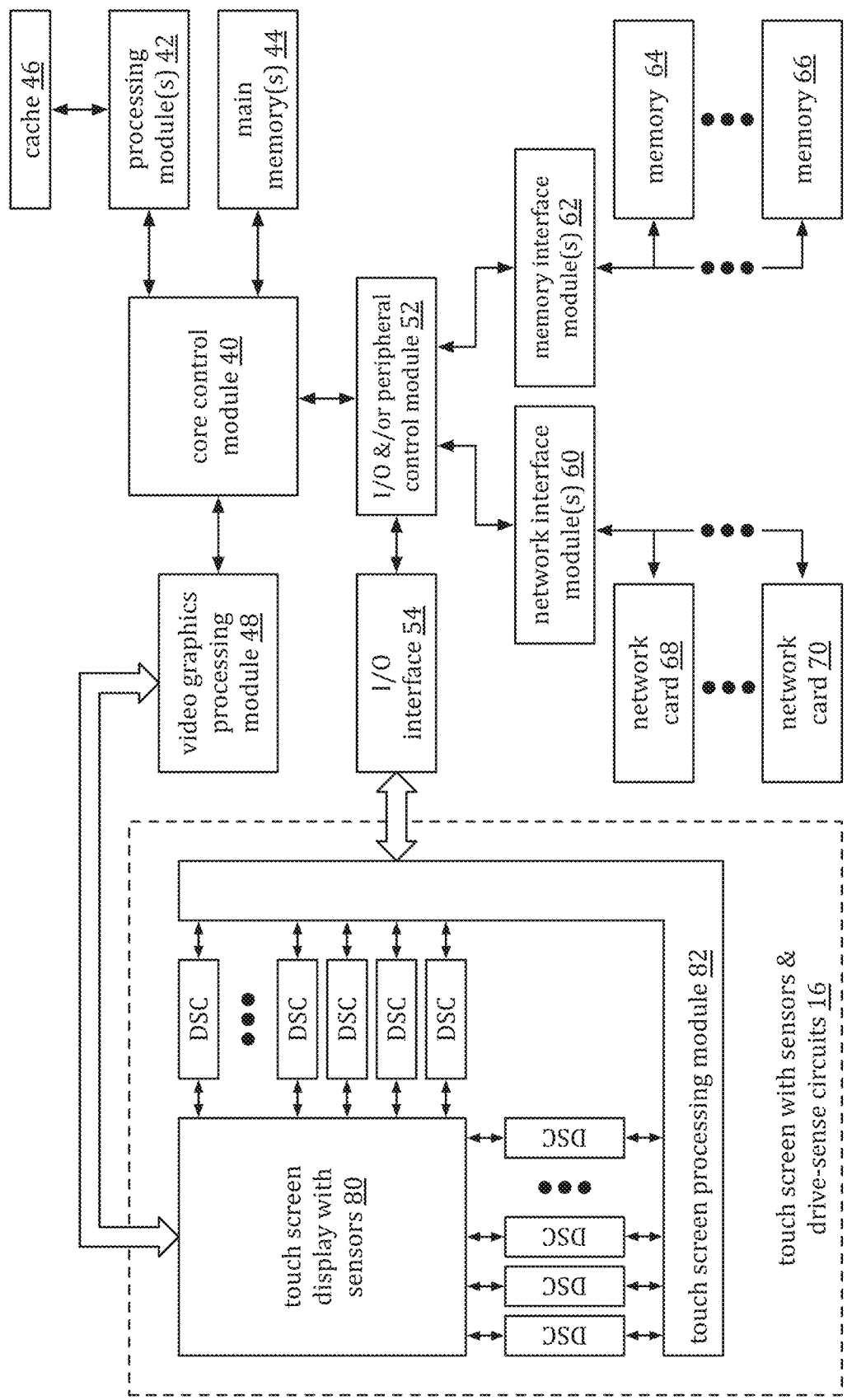
FIG. 2 is a schematic block diagram of an embodiment of a computing device.
Figure 66G:
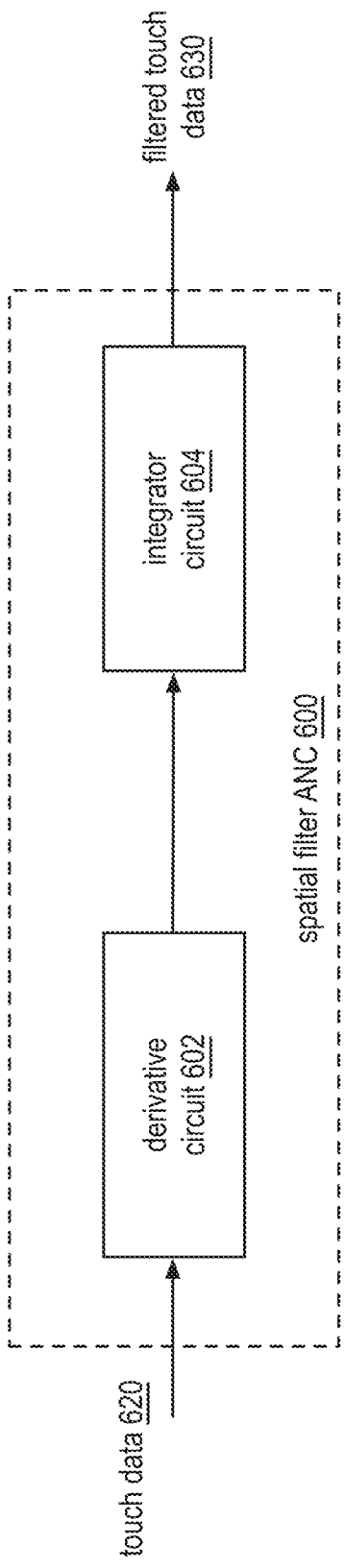
FIG. 66A is a schematic block diagram of an embodiment of a portion of a touch screen display.
FIG. 66B is a graph illustrating examples of spatial correlation of image noise.
Figure 66H:
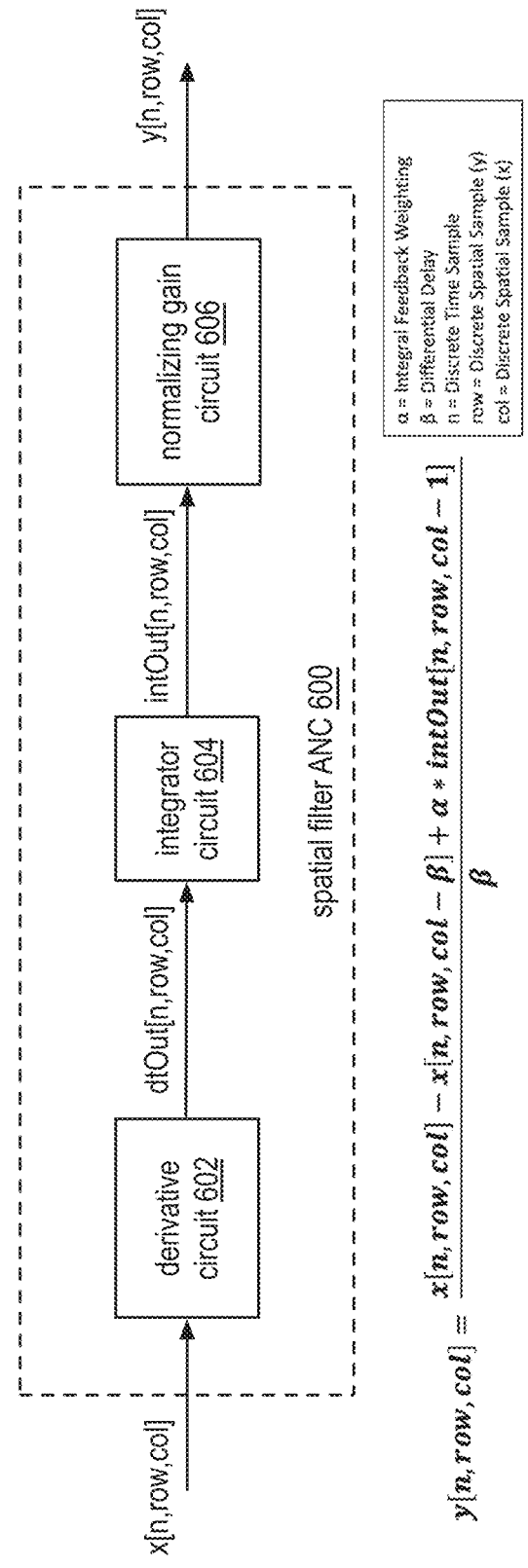
Figure 67C:
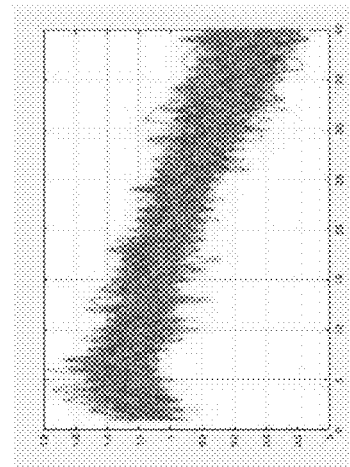
Figure 67D:
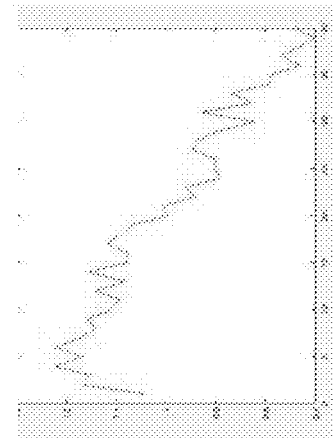
Figure 67A:
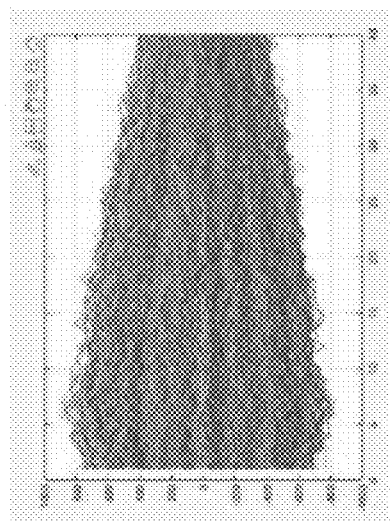
Figure 67B:
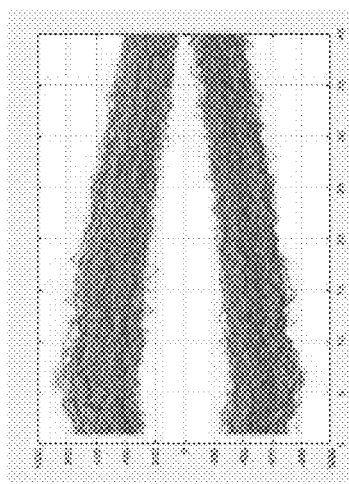
Figure 67E:
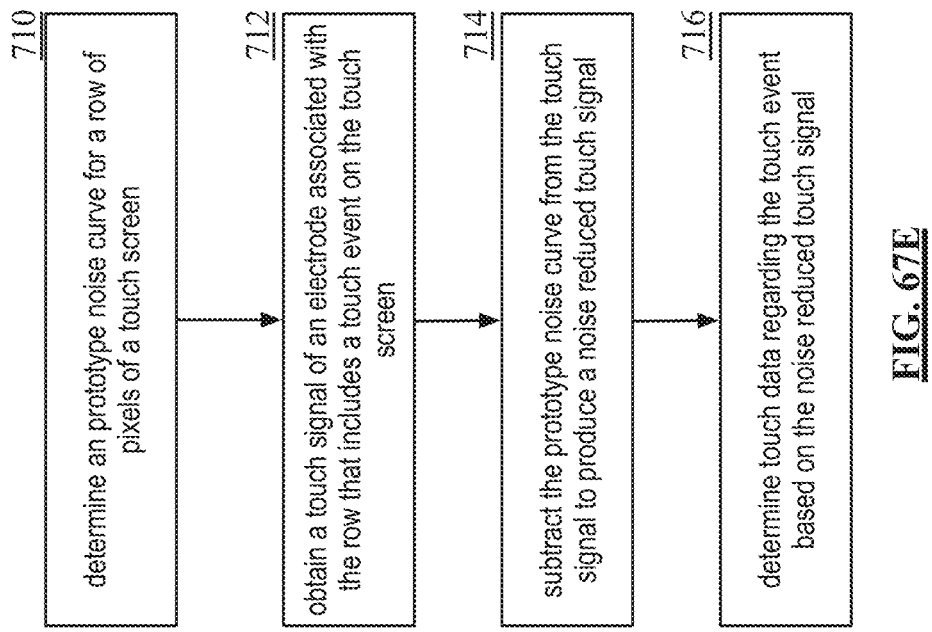
Figure 68A:
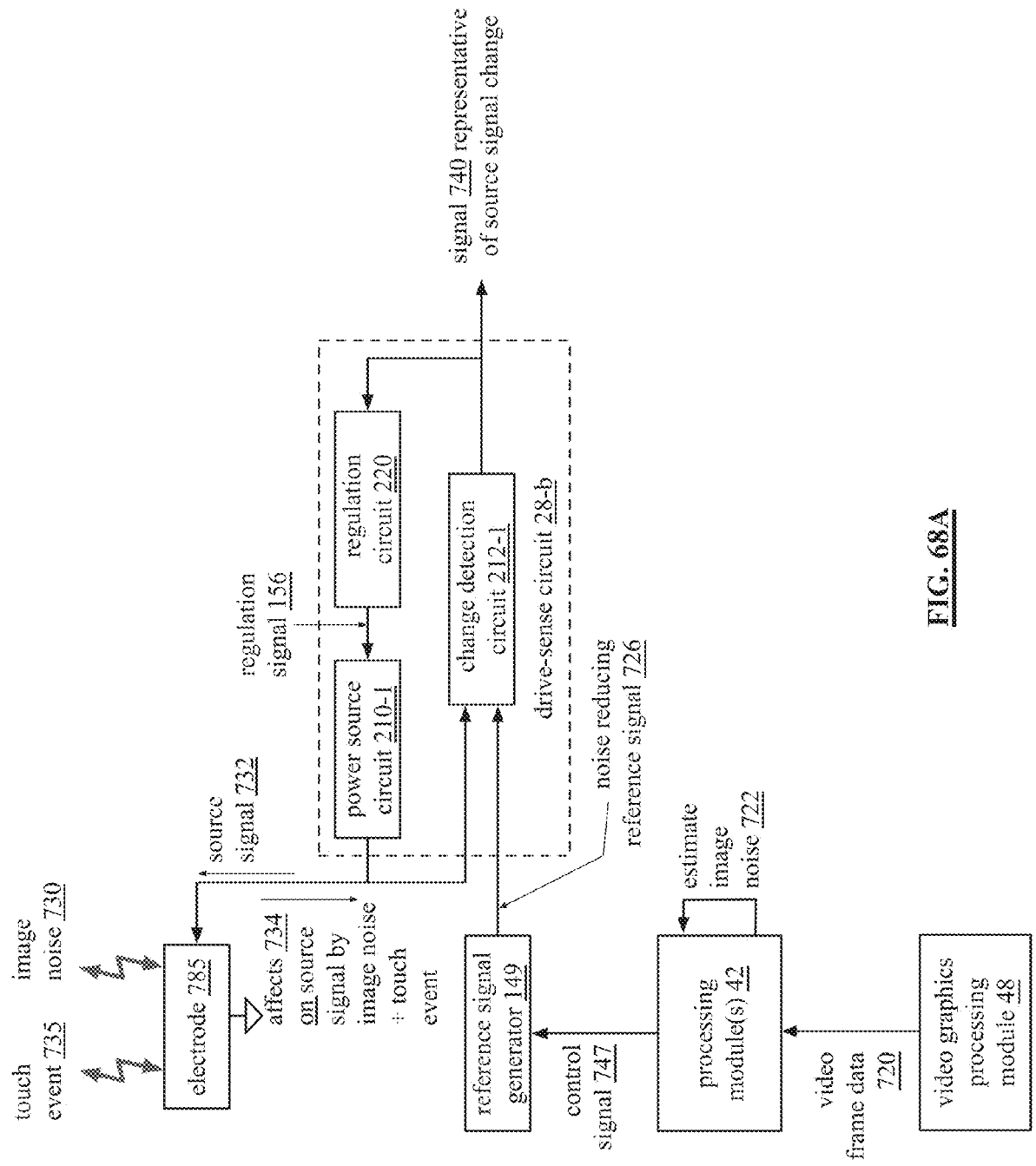
Figure 68B:
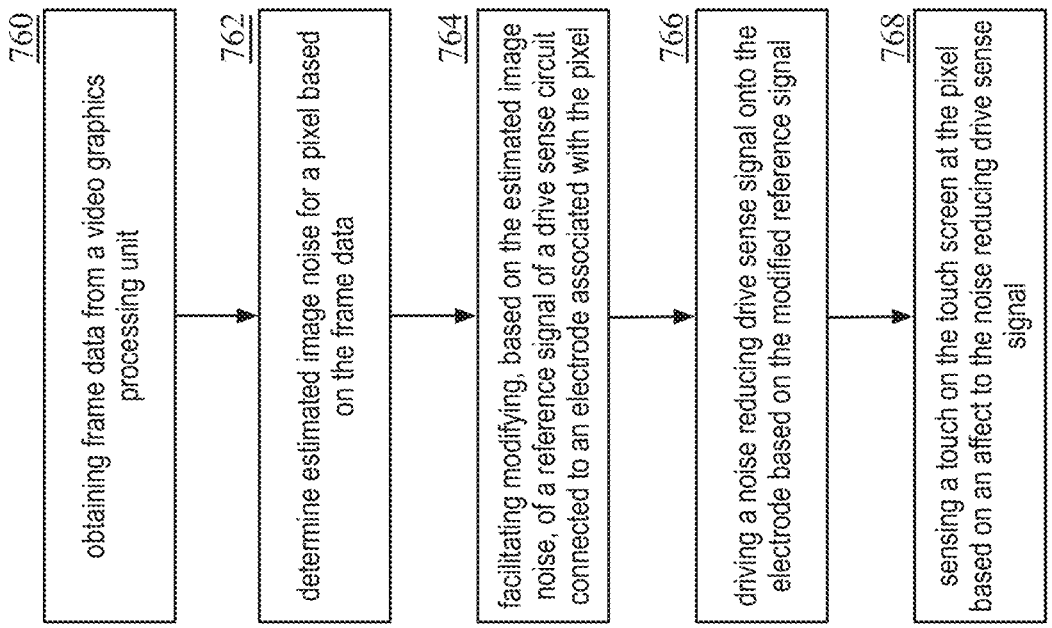
Figure 69A:
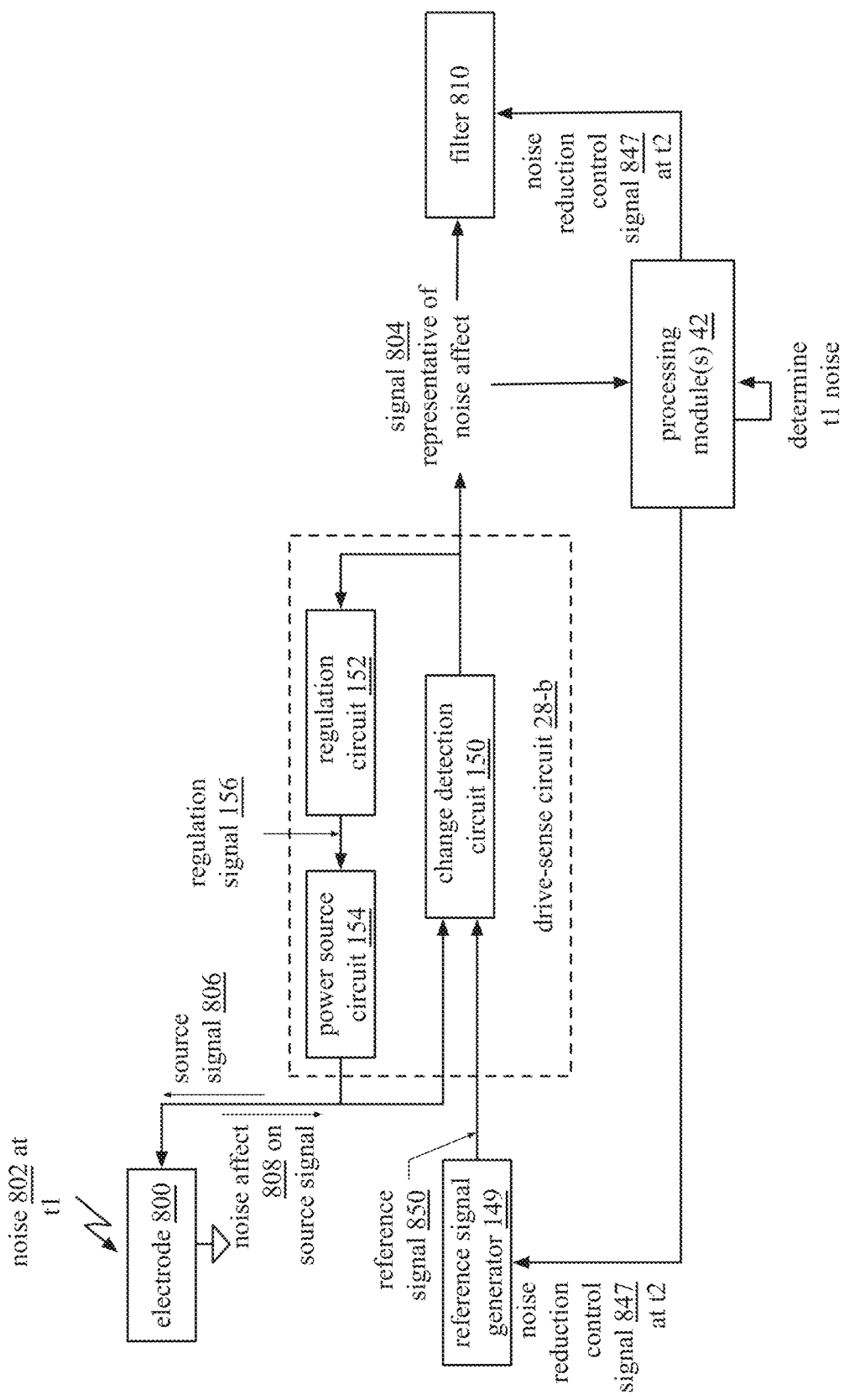
Figure 69B:
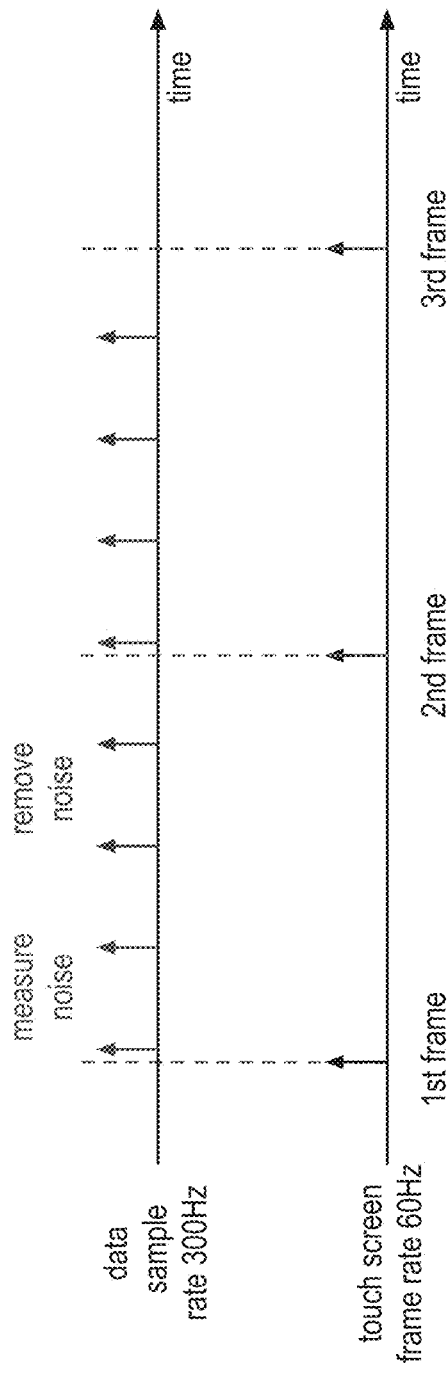
Figure 69C:
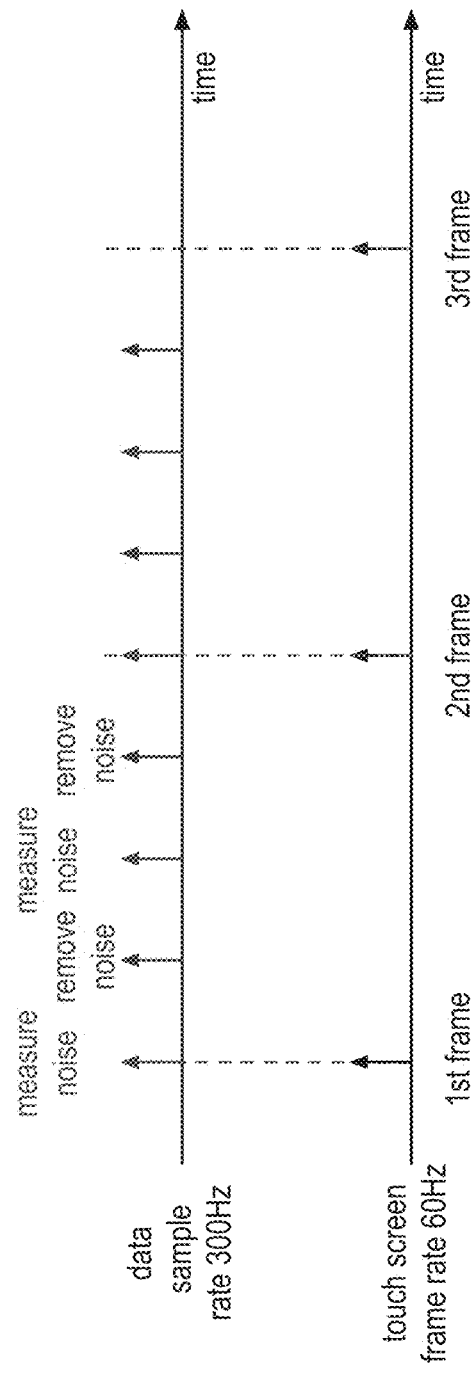
Figure 69D:
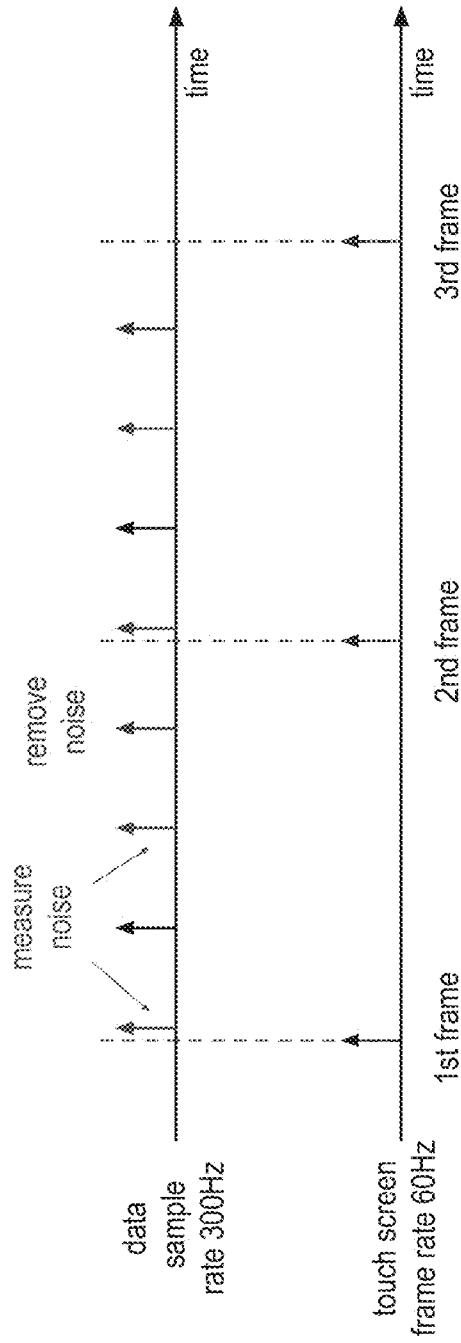
Figure 69E:
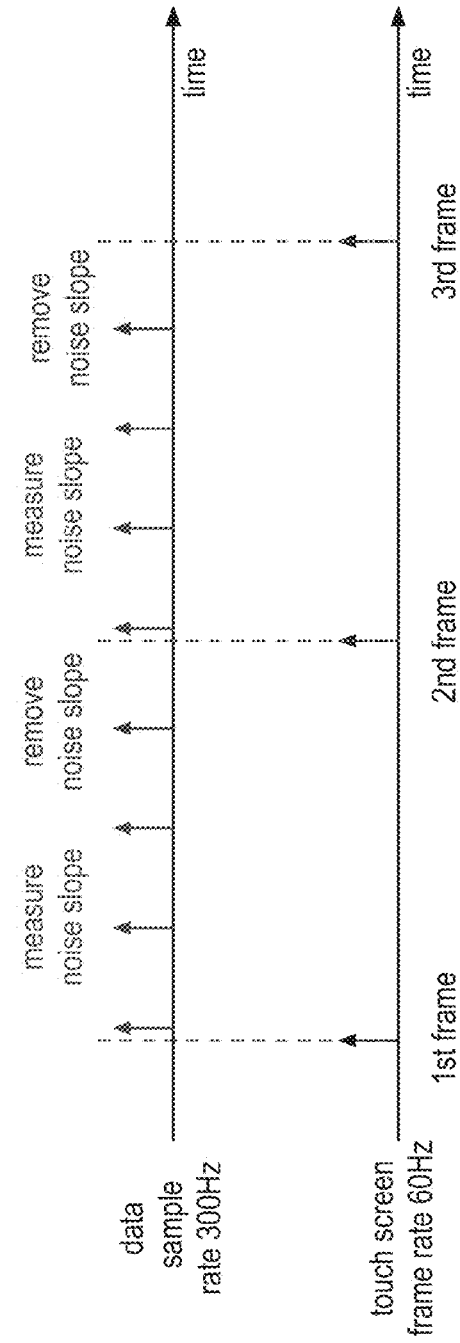
Figure 69F:
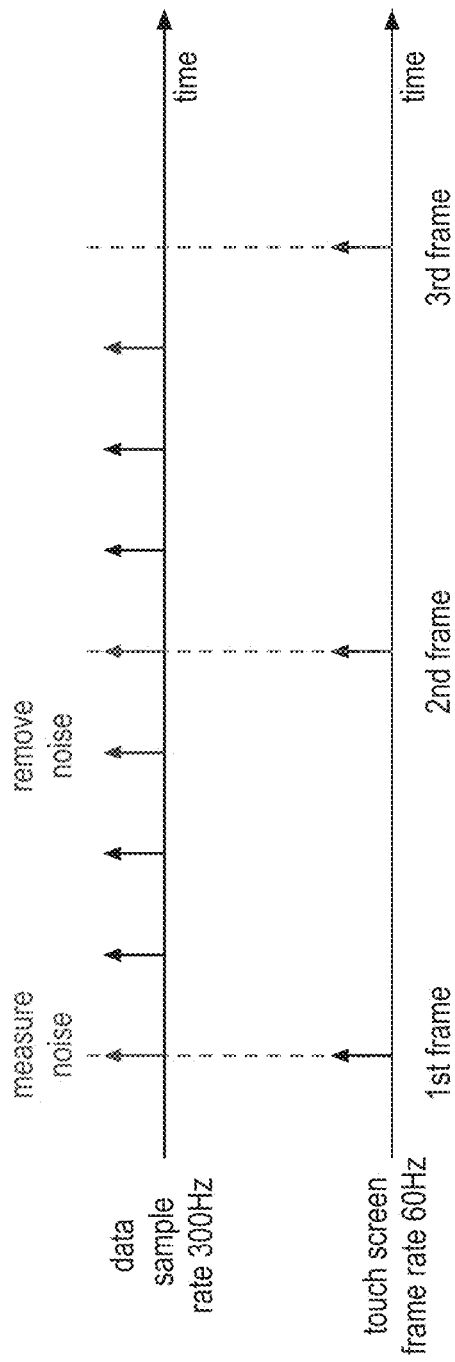
Figure 69G:
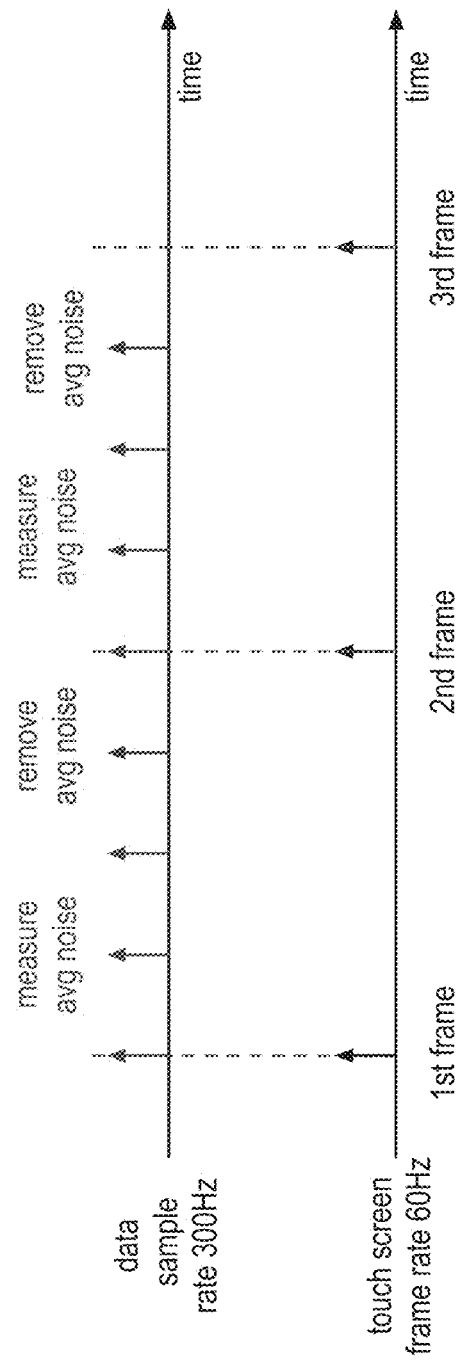
Figure 69H:
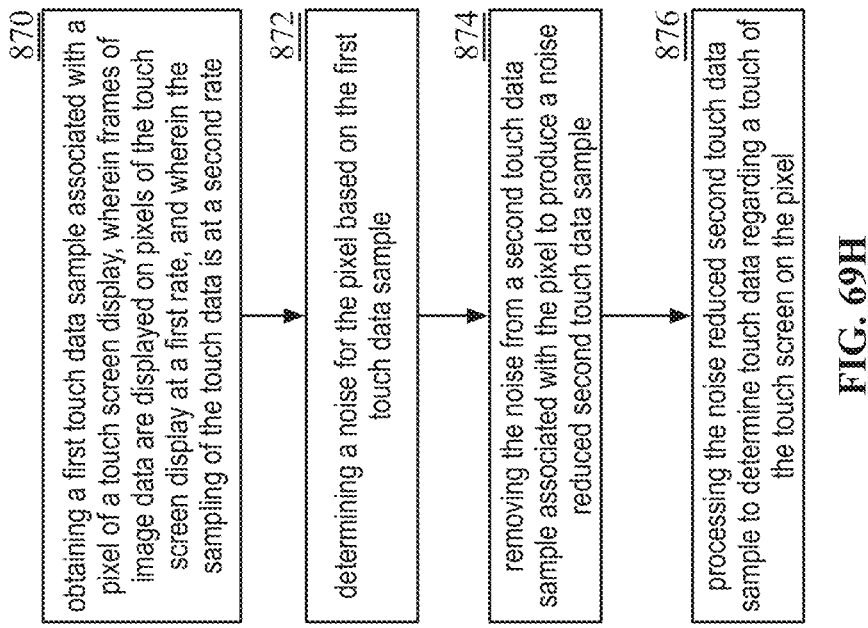

FIG. 66C1 is a time series graph of a specific example of image noise on a row of a touch display;

FIG. 66C2 is a zoomed in portion of FIG. 66C1;

FIG. 66D is an example of a noise power spectral density graph of image noise;

FIG. 66E is a schematic block diagram of an embodiment of a processing chain for producing a noise reduced signal;

FIG. 66F is a schematic block diagram of another embodiment of a processing chain for producing a noise reduced signal;

FIG. 66G is a schematic block diagram of an embodiment of a spatial filter active noise cancellation (ANC) circuit;

FIG. 66H is a schematic block diagram of another embodiment of a spatial filter active noise cancellation (ANC) circuit;

FIG. 66I is a schematic block diagram of an embodiment of a derivative circuit;

FIG. 66J is a schematic block diagram of an embodiment of an integrator circuit;

FIG. 66K is a schematic block diagram of an embodiment of a normalizing gain circuit;

FIG. 66L is a graph illustrating the spatial filter frequency response of the spatial filter ANC;

FIG. 66M is a graph illustrating a power spectral density graph of a touch signal;

FIG. 66N is a schematic block diagram of an example of an adaptive filter circuit;

FIG. 66O is a schematic block diagram of an example of an adaptive filter circuit output in accordance with a first feedback weighting:

FIG. 66P is a schematic block diagram of an example of an adaptive filter circuit output in accordance with a second feedback weighting:

FIG. 66Q is a logic flowchart of an example of a method of reducing image noise:

FIG. 66R is a logic flowchart illustrating an example of a method of noise smoothing on a filtered touch signal associated with a pixel:

FIG. 67A is a graph illustrating an example of image noise associated with a row of a touch screen display:

FIG. 67B is graph illustrating an example of removing frames from image noise data:

FIG. 67C is a graph illustrating an example of normalizing the noise of image data:

FIG. 67D is a graph illustrating an example of a result from averaging the curves for the frames of image data:

FIG. 67E is a logic flowchart of an example of a method of noise reduction for image noise on a touch screen:

FIG. 68A is a schematic block diagram of an embodiment of a touch screen computing device:

FIG. 68B is a logic flowchart illustrating an example of generating a noise reducing reference signal;

FIG. 69A is a schematic block diagram of an embodiment of a touch screen computing device:

FIG. 69B is a graph illustrating an example of a data sample rate and a touch screen frame rate:

FIG. 69C is a graph illustrating another example of a data sample rate and a touch screen frame rate:

FIG. 69D is a graph illustrating another example of a data sample rate and a touch screen frame rate:

FIG. 69E is a graph illustrating another example of a data sample rate and a touch screen frame rate;

FIG. 69F is a graph illustrating another example of a data sample rate and a touch screen frame rate:

FIG. 69G is a graph illustrating another example of a data sample rate and a touch screen frame rate:

FIG. 69H is a logic flowchart of an example of a method of removing noise from a touch data sample; and FIG. 70 is a logic flowchart of an example of determining a noise reduction technique for sensing touch signaling on an electrode of a touch screen computing device.

DETAILED DESCRIPTION OF THE INVENTION

FIG. 1 is a schematic block diagram of an embodiment of a communication system 10 that includes a plurality of computing, devices 12-10, one or more servers 22, one or more databases 24, one or more networks 26, a plurality of drive-sense circuits 28, a plurality of sensors 30, and a plurality of actuators 32. Computing devices 14 include a touch screen 16 with sensors and drive-sensor circuits and computing devices 18 include a touch & tactic screen 20 that includes sensors, actuators, and drive-sense circuits.

A sensor 30 functions to convert a physical input into an electrical output and/or an optical output. The physical input of a sensor may be one of a variety of physical input conditions. For example, the physical condition includes one or more of, but is not limited to, acoustic waves (e.g., amplitude, phase, polarization, spectrum, and/or wave velocity): a biological and/or chemical condition (e.g., fluid concentration, level, composition, etc.); an electric condition (e.g., charge, voltage, current, conductivity, permittivity, eclectic field, which includes amplitude, phase, and/or polarization); a magnetic condition (e.g., flux, permeability, magnetic field, which amplitude, phase, and/or polarization); an optical condition (e.g., refractive index, reflectivity, absorption, etc.); a thermal condition (e.g., temperature, flux, specific heat, thermal conductivity, etc.); and a mechanical condition (e.g., position, velocity, acceleration, force, strain, stress, pressure, torque, etc.). For example, piezoelectric sensor converts force or pressure into an eclectic signal. As another example, a microphone converts audible acoustic waves into electrical signals.

There are a variety of types of sensors to sense the various types of physical conditions. Sensor types include, but are not limited to, capacitor sensors, inductive sensors, accelerometers, piezoelectric sensors, light sensors, magnetic field sensors, ultrasonic sensors, temperature sensors, infrared (IR) sensors, touch sensors, proximity sensors, pressure sensors, level sensors, smoke sensors, and gas sensors. In many ways, sensors function as the interface between the physical world and the digital world by converting real world conditions into digital signals that are then processed by computing devices for a vast number of applications including, but not limited to, medical applications, production automation applications, home environment control, public safety, and so on.

The various types of sensors have a variety of sensor characteristics that are factors in providing power to the sensors, receiving signals from the sensors, and/or interpreting the signals from the sensors. The sensor characteristics include resistance, reactance, power requirements, sensitivity, range, stability, repeatability, linearity, error, response time, and/or frequency response. For example, the resistance, reactance, and/or power requirements are factors in determining drive circuit requirements. As another example, sensitivity, stability, and/or linear are factors for interpreting the measure of the physical condition based on the received electrical and/or optical signal (e.g., measure of temperature, pressure, etc.).

An actuator 32 converts an electrical input into a physical output. The physical output of an actuator may be one of a variety of physical output conditions. For example, the physical output condition includes one or more of, but is not limited to, acoustic waves (e.g., amplitude, phase, polarization, spectrum, and/or wave velocity): a magnetic condition (e.g., flux, permeability, magnetic field, which amplitude, phase, and/or polarization): a thermal condition (e.g., temperature, flux, specific heat, thermal conductivity, etc.); and a mechanical condition (e.g., position, velocity, acceleration, force, strain, stress, pressure, torque, etc.). As an example, a piezoelectric actuator converts voltage into force or pressure. As another example, a speaker converts electrical signals into audible acoustic waves.

An actuator 32 may be one of a variety of actuators. For example, an actuator 32 is one of a comb drive, a digital micro-mirror device, an electric motor, an electroactive polymer, a hydraulic cylinder, a piezoelectric actuator, a pneumatic actuator, a screw jack, a servomechanism, a solenoid, a stepper motor, a shape-memory allow, a thermal bimorph, and a hydraulic actuator.

The various types of actuators have a variety of actuators characteristics that are factors in providing power to the actuator and sending signals to the actuators for desired performance. The actuator characteristics include resistance, reactance, power requirements, sensitivity, range, stability, repeatability, linearity, error, response time, and/or frequency response. For example, the resistance, reactance, and power requirements are factors in determining drive circuit requirements. As another example, sensitivity, stability, and/or linear are factors for generating the signaling to send to the actuator to obtain the desired physical output condition.

The computing devices 12, 14, and 18 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. The computing devices 12, 14, and 18 will be discussed in greater detail with reference to one or more of FIGS. 2-4.

A server 22 is a special type of computing device that is optimized for processing large amounts of data requests in parallel. A server 22 includes similar components to that of the computing devices 12, 14, and/or 18 with more robust processing modules, more main memory, and/or more hard drive memory (e.g., solid state, hard drives, etc.). Further, a server 22 is typically accessed remotely: as such it does not generally include user input devices and/or user output devices. In addition, a server may be a standalone separate computing device and/or may be a cloud computing device.

A database 24 is a special type of computing device that is optimized for large scale data storage and retrieval. A database 24 includes similar components to that of the computing devices 12, 14, and/or 18 with more hard drive memory (e.g., solid state, hard drives, etc.) and potentially with more processing modules and/or main memory. Further, a database 24 is typically accessed remotely: as such it does not generally include user input devices and/or user output devices. In addition, a database 24 may be a stand-alone separate computing device and/or may be a cloud computing device.

The network 26 includes one more local area networks (LAN) and/or one or more wide area networks WAN), which may be a public network and/or a private network. A LAN may be a wireless-LAN (e.g., Wi-Fi access point, Bluetooth, ZigBee, etc.) and/or a wired network (e.g., Firewire, Ethernet, etc.). A WAN may be a wired and/or wireless WAN. For example, a LAN may be a personal home or business's wireless network and a WAN is the Internet, cellular telephone infrastructure, and/or satellite communication infrastructure.

In an example of operation, computing device 12-1 communicates with a plurality of drive-sense circuits 28, which, in turn, communicate with a plurality of sensors 30. The sensors 30 and/or the drive-sense circuits 28 are within the computing device 12-1 and/or external to it. For example, the sensors 30 may be external to the computing device 12-1 and the drive-sense circuits are within the computing device 12-1. As another example, both the sensors 30 and the drive-sense circuits 28 are external to the computing device 12-1. When the drive-sense circuits 28 are external to the computing device, they are coupled to the computing device 12-1 via wired and/or wireless communication links as will be discussed in greater detail with reference to one or more of FIGS. 5A-5C.

The computing device 12-1 communicates with the drive-sense circuits 28 to: (a) turn them on. (b) obtain data from the sensors (individually and/or collectively), (c) instruct the drive sense circuit on how to communicate the sensed data to the computing device 12-1. (d) provide signaling attributes (e.g., DC level, AC level, frequency, power level, regulated current signal, regulated voltage signal, regulation of an impedance, frequency patterns for various sensors, different frequencies for different sensing applications, etc.) to use with the sensors, and/or (e) provide other commands and/or instructions.

As a specific example, the sensors 30 are distributed along a pipeline to measure flow rate and/or pressure within a section of the pipeline. The drive-sense circuits 28 have their own power source (e.g., battery, power supply, etc.) and are proximally located to their respective sensors 30. At desired time intervals (milliseconds, seconds, minutes, hours, etc.), the drive-sense circuits 28 provide a regulated source signal or a power signal to the sensors 30. An electrical characteristic of the sensor 30 affects the regulated source signal or power signal, which is reflective of the condition (e.g., the flow rate and/or the pressure) that sensor is sensing.

The drive-sense circuits 28 detect the effects on the regulated source signal or power signals as a result of the electrical characteristics of the sensors. The drive-sense circuits 28 then generate signals representative of change to the regulated source signal or power signal based on the detected effects on the power signals. The changes to the regulated source signals or power signals are representative of the conditions being sensed by the sensors 30.

The drive-sense circuits 28 provide the representative signals of the conditions to the computing device 12-1. A representative signal may be an analog signal or a digital signal. In either case, the computing device 12-1 interprets the representative signals to determine the pressure and/or flow rate at each sensor location along the pipeline. The computing device may then provide this information to the server 22, the database 24, and/or to another computing device for storing and/or further processing.

As another example of operation, computing device 12-2 is coupled to a drive-sense circuit 28, which is, in turn, coupled to a senor 30. The sensor 30 and/or the drive-sense circuit 28 may be internal and/or external to the computing device 12-2. In this example, the sensor 30 is sensing a condition that is particular to the computing device 12-2. For example, the sensor 30 may be a temperature sensor, an ambient light sensor, an ambient noise sensor, etc. As described above, when instructed by the computing device 12-2 (which may be a default setting for continuous sensing or at regular intervals), the drive-sense circuit 28 provides the regulated source signal or power signal to the sensor 30 and detects an effect to the regulated source signal or power signal based on an electrical characteristic of the sensor. The drive-sense circuit generates a representative signal of the affect and sends it to the computing device 12-2.

In another example of operation, computing device 12-3 is coupled to a plurality of drive-sense circuits 28 that are coupled to a plurality of sensors 30 and is coupled to a plurality of drive-sense circuits 28 that are coupled to a plurality of actuators 32. The generally functionality of the drive-sense circuits 28 coupled to the sensors 30 in accordance with the above description.

Since an actuator 32 is essentially an inverse of a sensor in that an actuator converts an electrical signal into a physical condition, while a sensor converts a physical condition into an electrical signal, the drive-sense circuits 28 can be used to power actuators 32. Thus, in this example, the computing device 12-3 provides actuation signals to the drive-sense circuits 28 for the actuators 32. The drive-sense circuits modulate the actuation signals on to power signals or regulated control signals, which are provided to the actuators 32. The actuators 32 are powered from the power signals or regulated control signals and produce the desired physical condition from the modulated actuation signals.

As another example of operation, computing device 12-x is coupled to a drive-sense circuit 28 that is coupled to a sensor 30 and is coupled to a drive-sense circuit 28 that is coupled to an actuator 32. In this example, the sensor 30 and the actuator 32 are for use by the computing device 12-x. For example, the sensor 30 may be a piezoelectric microphone and the actuator 32 may be a piezoelectric speaker.

FIG. 2 is a schematic block diagram of an embodiment of a computing device 12 (e.g., any one of 12-1 through 12-x). The computing device 12 includes a touch screen 16, a core control module 40, one or more processing modules 42, one or more main memories 44, cache memory 46, a video graphics processing module 48, a display 50, an Input-Output (I/O) peripheral control module 52, one or more input interface modules 56, one or more output interface modules 58, one or more network interface modules 60, and one or more memory interface modules 62. A processing module 42 is described in greater detail at the end of the detailed description of the invention section and, in an alternative embodiment, has a direction connection to the main memory 44. In an alternate embodiment, the core control module 40 and the I/O and/or peripheral control module 52 are one module, such as a chipset, a quick path interconnect (QPI), and/or an ultra-path interconnect (UPI).

The touch screen 16 includes a touch screen display 80, a plurality of sensors 30, a plurality of drive-sense circuits (DSC), and a touch screen processing module 82. In general, the sensors (e.g., electrodes, capacitor sensing cells, capacitor sensors, inductive sensor, etc.) detect a proximal touch of the screen. For example, when one or more fingers touches the screen, capacitance of sensors proximal to the touch(es) are affected (e.g., impedance changes). The drive-sense circuits (DSC) coupled to the affected sensors detect the change and provide a representation of the change to the touch screen processing module 82, which may be a separate processing module or integrated into the processing module 42.

The touch screen processing module 82 processes the representative signals from the drive-sense circuits (DSC) to determine the location of the touch(es). This information is inputted to the processing module 42 for processing as an input. For example, a touch represents a selection of a button on screen, a scroll function, a zoom in-out function, etc.

Each of the main memories 44 includes one or more Random Access Memory (RAM) integrated circuits, or chips. For example, a main memory 44 includes four DDR4 (4th generation of double data rate) RAM chips, each running at a rate of 2.400 MHZ. In general, the main memory 44 stores data and operational instructions most relevant for the processing module 42. For example, the core control module 40 coordinates the transfer of data and/or operational instructions from the main memory 44 and the memory 64-66. The data and/or operational instructions retrieve from memory 64-66 are the data and/or operational instructions requested by the processing module or will most likely be needed by the processing module. When the processing module is done with the data and/or operational instructions in main memory, the core control module 40 coordinates sending updated data to the memory 64-66 for storage.

The memory 64-66 includes one or more hard drives, one or more solid state memory chips, and/or one or more other large capacity storage devices that, in comparison to cache memory and main memory devices, is/are relatively inexpensive with respect to cost per amount of data stored. The memory 64-66 is coupled to the core control module 40 via the I/O and/or peripheral control module 52 and via one or more memory interface modules 62. In an embodiment, the I/O and/or peripheral control module 52 includes one or more Peripheral Component Interface (PCI) buses to which peripheral components connect to the core control module 40. A memory interface module 62 includes a software driver and a hardware connector for coupling a memory device to the I/O and/or peripheral control module 52. For example, a memory interface 62 is in accordance with a Serial Advanced Technology Attachment (SATA) port.

The core control module 40 coordinates data communications between the processing module(s) 42 and the network(s) 26 via the I/O and/or peripheral control module 52, the network interface module(s) 60, and a network card 68 or 70. A network card 68 or 70 includes a wireless communication unit or a wired communication unit. A wireless communication unit includes a wireless local area network (WLAN) communication device, a cellular communication device, a Bluetooth device, and/or a ZigBee communication device. A wired communication unit includes a Gigabit LAN connection, a Firewire connection, and/or a proprietary computer wired connection. A network interface module 60 includes a software driver and a hardware connector for coupling the network card to the I/O and/or peripheral control module 52. For example, the network interface module 60 is in accordance with one or more versions of IEEE 802.11, cellular telephone protocols. 10/100/1000 Gigabit LAN protocols, etc.

The core control module 40 coordinates data communications between the processing module(s) 42 and input device(s) 72 via the input interface module(s) 56 and the I/O and/or peripheral control module 52. An input device 72 includes a keypad, a keyboard, control switches, a touchpad, a microphone, a camera, etc. An input interface module 56 includes a software driver and a hardware connector for coupling an input device to the I/O and/or peripheral control module 52. In an embodiment, an input interface module 56 is in accordance with one or more Universal Serial Bus (USB) protocols.

The core control module 40 coordinates data communications between the processing module(s) 42 and output device(s) 74 via the output interface module(s) 58 and the I/O and/or peripheral control module 52. An output device 74 includes a speaker, etc. An output interface module 58 includes a software driver and a hardware connector for coupling an output device to the I/O and/or peripheral control module 52. In an embodiment, an output interface module 56 is in accordance with one or more audio codec protocols.

The processing module 42 communicates directly with a video graphics processing module 48 to display data on the display 50. The display 50 includes an LED (light emitting diode) display, an LCD (liquid crystal display), and/or other type of display technology. The display has a resolution, an aspect ratio, and other features that affect the quality of the display. The video graphics processing module 48 receives data from the processing module 42, processes the data to produce rendered data in accordance with the characteristics of the display, and provides the rendered data to the display 50.

Figure 3:
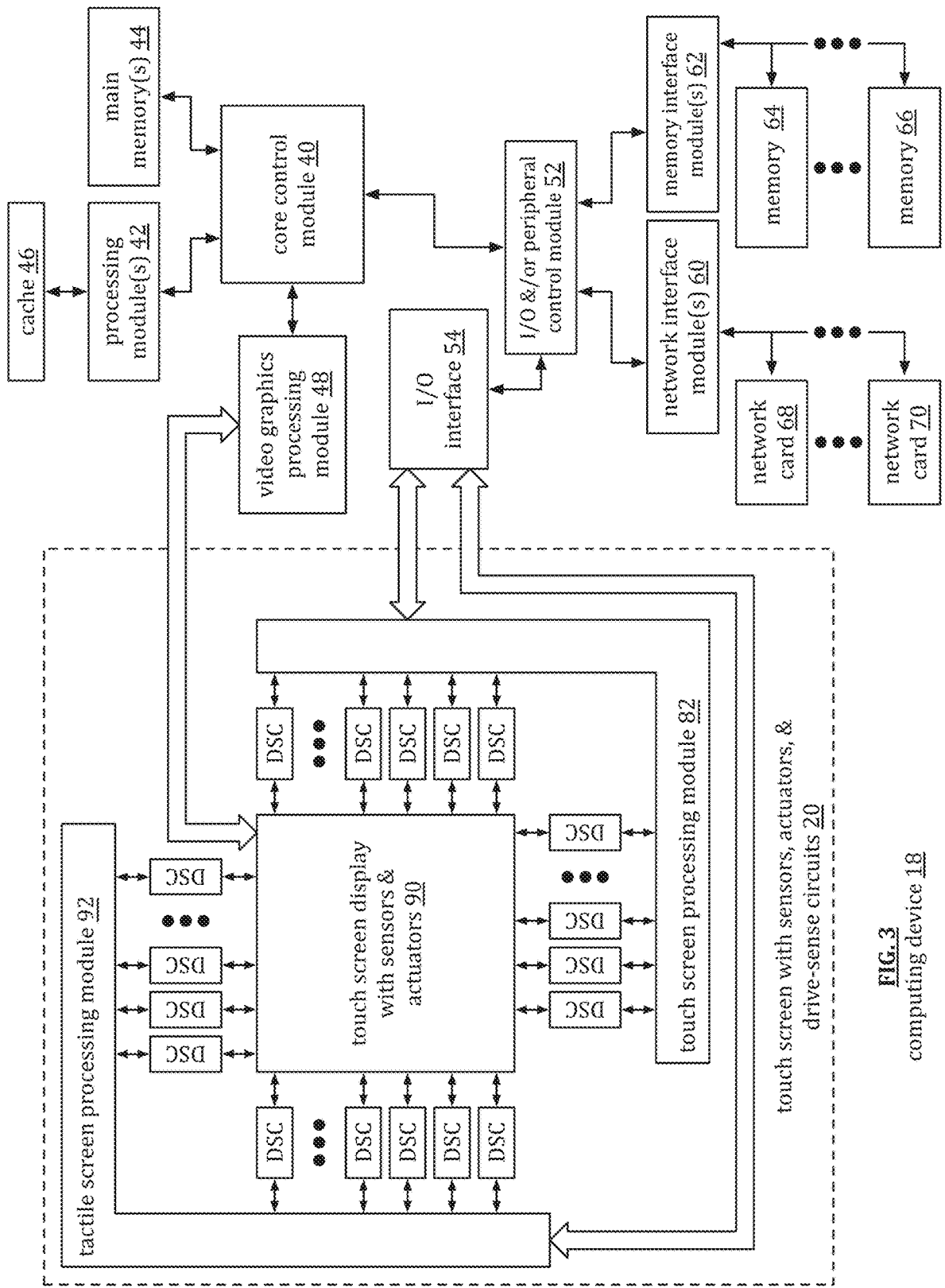
FIG. 3 is a schematic block diagram of another embodiment of a computing device.

FIG. 3 is a schematic block diagram of another embodiment of a computing device 18 that includes a core control module 40, one or more processing modules 42, one or more main memories 44, cache memory 46, a video graphics processing module 48, a touch and tactile screen 20, an Input-Output (I/O) peripheral control module 52, one or more input interface modules 56, one or more output interface modules 58, one or more network interface modules 60, and one or more memory interface modules 62. The touch and tactile screen 20 includes a touch and tactile screen display 90, a plurality of sensors 30, a plurality of actuators 32, a plurality of drive-sense circuits (DSC), a touch screen processing module 82, and a tactile screen processing module 92.

Computing device 18 operates similarly to computing device 14 of FIG. 2 with the addition of a tactile aspect to the screen 20 as an output device. The tactile portion of the screen 20 includes the plurality of actuators (e.g., piezoelectric transducers to create vibrations, solenoids to create movement, etc.) to provide a tactile feel to the screen 20. To do so, the processing module creates tactile data, which is provided to the appropriate drive-sense circuits (DSC) via the tactile screen processing module 92, which may be a stand-alone processing module or integrated into processing module 42. The drive-sense circuits (DSC) convert the tactile data into drive-actuate signals and provide them to the appropriate actuators to create the desired tactile feel on the screen 20.

Figure 4:
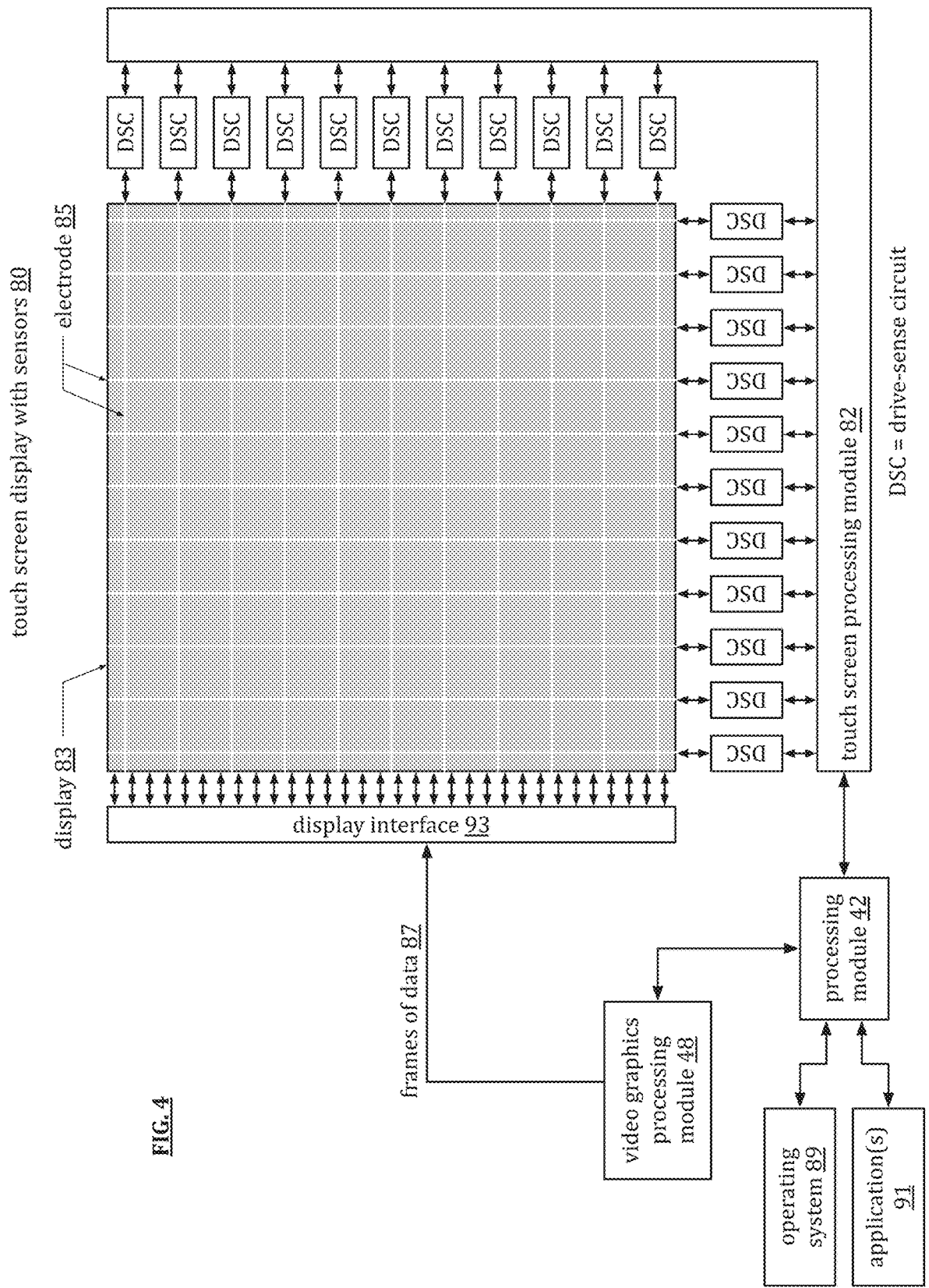
FIG. 4 is a schematic block diagram of an embodiment of a touch screen display.

FIG. 4 is a schematic block diagram of an embodiment of a touch screen display 80 that includes a plurality of drive-sense circuits (DSC), a touch screen processing module 82, a display 83, and a plurality of electrodes 85. The touch screen display 80 is coupled to a processing module 42, a video graphics processing module 48, and a display interface 93, which are components of a computing device (e.g., 14-18), an interactive display, or other device that includes a touch screen display. An interactive display functions to provide users with an interactive experience (e.g., touch the screen to obtain information, be entertained, etc.). For example, a store provides interactive displays for customers to find certain products, to obtain coupons, to contests, etc.

There are a variety of other devices that include a touch screen display. For example, a vending machine includes a touch screen display to select and/or pay for an item. As another example of a device having a touch screen display is an Automated Teller Machine (ATM). As yet another example, an automobile includes a touch screen display for entertainment media control, navigation, climate control, etc.

The touch screen display 80 includes a large display 83 that has a resolution equal to or greater than full high-definition (HD), an aspect ratio of a set of aspect ratios, and a screen size equal to or greater than thirty-two inches. The following table lists various combinations of resolution, aspect ratio, and screen size for the display 83, but it's not an exhaustive list.

| Resolution | Width (lines) | Height (lines) | pixel aspect ratio | screen aspect ratio | screen size (inches) |
|---|---|---|---|---|---|
| HD (high definition) | 1280 | 720 | 1:1 | 16:9 | 32, 40, 43, 50, 55, 60, 65, 70, 75, &/or >80 |
| Full HD | 1920 | 1080 | 1:1 | 16:9 | 32, 40, 43, 50, 55, 60, 65, 70, 75, &/or >80 |
| HD | 960 | 720 | 4:3 | 16:9 | 32, 40, 43, 50, 55, 60, 65, 70, 75, &/or >80 |
| HD | 1440 | 1080 | 4:3 | 16:9 | 32, 40, 43, 50, 55, 60, 65, 70, 75, &/or >80 |
| HD | 1280 | 1080 | 3:2 | 16:9 | 32, 40, 43, 50, 55, 60, 65, 70, 75, &/or >80 |
| QHD (quad HD) | 2560 | 1440 | 1:1 | 16:9 | 32, 40, 43, 50, 55, 60, 65, 70, 75, &/or >80 |
| UHD (Ultra HD) or 4K | 3840 | 2160 | 1:1 | 16:9 | 32, 40, 43, 50, 55, 60, 65, 70, 75, &/or >80 |
| 8K | 7680 | 4320 | 1:1 | 16:9 | 32, 40, 43, 50, 55, 60, 65, 70, 75, &/or >80 |
| HD and above | 1280->=7680 | 720->=4320 | 1:1, 2:3, etc. | 2:3 | 50, 55, 60, 65, 70, 75, &/or >80 |

The display 83 is one of a variety of types of displays that is operable to render frames of data into visible images. For example, the display is one or more of: a light emitting diode (LED) display, an electroluminescent display (ELD), a plasma display panel (PDP), a liquid crystal display (LCD), an LCD high performance addressing (HPA) display, an LCD thin film transistor (TFT) display, an organic light emitting diode (OLED) display, a digital light processing (DLP) display, a surface conductive electron emitter (SED) display, a field emission display (FED), a laser TV display, a carbon nanotubes display, a quantum dot display, an interferometric modulator display (IMOD), and a digital microshutter display (DMS). The display is active in a full display mode or a multiplexed display mode (i.e., only part of the display is active at a time).

The display 83 further includes integrated electrodes 85 that provide the sensors for the touch sense part of the touch screen display. The electrodes 85 are distributed throughout the display area or where touch screen functionality is desired. For example, a first group of the electrodes are arranged in rows and a second group of electrodes are arranged in columns. As will be discussed in greater detail with reference to one or more of FIGS. 9-12, the row electrodes are separated from the column electrodes by a dielectric material.

The electrodes 85 are comprised of a transparent conductive material and are in-cell or on-cell with respect to layers of the display. For example, a conductive trace is placed in-cell or on-cell of a layer of the touch screen display. The transparent conductive material, which is substantially transparent and has negligible effect on video quality of the display with respect to the human eye. For instance, an electrode is constructed from one or more of: Indium Tin Oxide. Graphene. Carbon Nanotubes, Thin Metal Films, Silver Nanowires Hybrid Materials, Aluminum-doped Zinc Oxide (AZO), Amorphous Indium-Zinc Oxide, Gallium-doped Zinc Oxide (GZO), and poly polystyrene sulfonate (PEDOT).

In an example of operation, the processing module 42 is executing an operating system application 89 and one or more user applications 91. The user applications 91 includes, but is not limited to, a video playback application, a spreadsheet application, a word processing application, a computer aided drawing application, a photo display application, an image processing application, a database application, etc. While executing an application 91, the processing module generates data for display (e.g., video data, image data, text data, etc.). The processing module 42 sends the data to the video graphics processing module 48, which converts the data into frames of video 87.

The video graphics processing module 48 sends the frames of video 87 (e.g., frames of a video file, refresh rate for a word processing document, a series of images, etc.) to the display interface 93. The display interface 93 provides the frames of video to the display 83, which renders the frames of video into visible images.

While the display 83 is rendering the frames of video into visible images, the drive-sense circuits (DSC) provide sensor signals to the electrodes 85. When the screen is touched, capacitance of the electrodes 85 proximal to the touch (i.e., directly, or close by) is changed. The DSCs detect the capacitance change for effected electrodes and provide the detected change to the touch screen processing module 82.

The touch screen processing module 82 processes the capacitance change of the effected electrodes to determine one or more specific locations of touch and provides this information to the processing module 42. Processing module 42 processes the one or more specific locations of touch to determine if an operation of the application is to be altered. For example, the touch is indicative of a pause command, a fast forward command, a reverse command, an increase volume command, a decrease volume command, a stop command, a select command, a delete command, etc.

Figure 5:
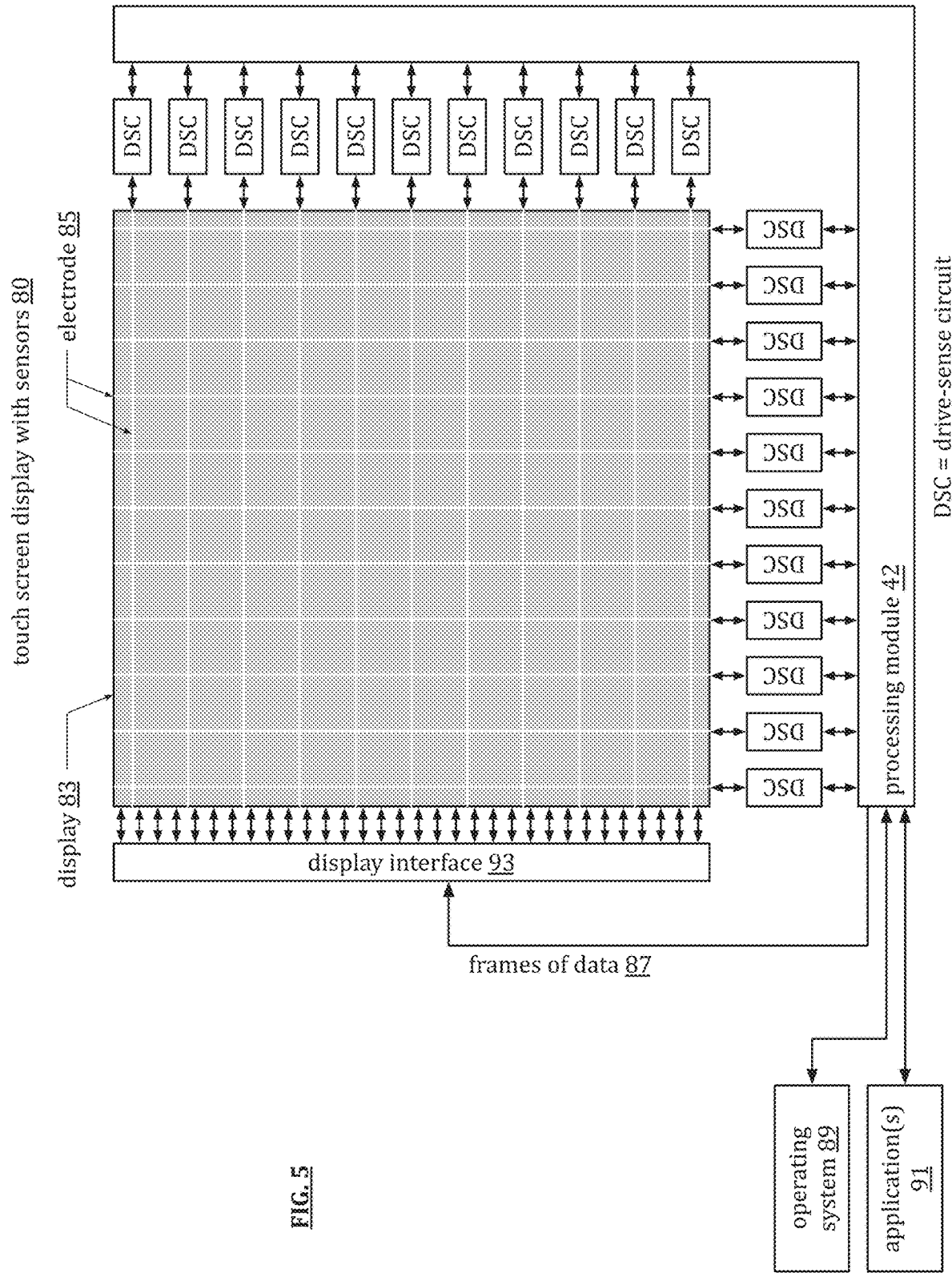
FIG. 5 is a schematic block diagram of another embodiment of a touch screen display.

FIG. 5 is a schematic block diagram of another embodiment of a touch screen display 80 that includes a plurality of drive-sense circuits (DSC), the processing module 42, a display 83, and a plurality of electrodes 85. The processing module 42 is executing an operating system 89 and one or more user applications 91 to produce frames of data 87. The processing module 42 provides the frames of data 87 to the display interface 93. The touch screen display 80 operates similarly to the touch screen display 80 of FIG. 4 with the above noted differences.

Figure 6:
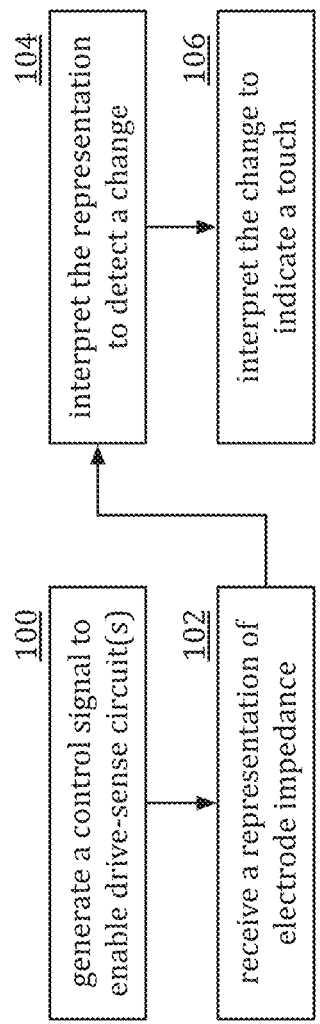
FIG. 6 is a logic diagram of an embodiment of a method for sensing a touch on a touch screen display.

FIG. 6 is a logic diagram of an embodiment of a method for sensing a touch on a touch screen display that is executed by one or more processing modules (e.g., 42, 82, and/or 48 of the previous figures). The method begins at step 100 where the processing module generate a control signal (e.g., power enable, operation enable, etc.) to enable a drive-sense circuit to monitor the sensor signal on the electrode. The processing module generates additional control signals to enable other drive-sense circuits to monitor their respective sensor signals. In an example, the processing module enables all of the drive-sense circuits for continuous sensing for touches of the screen. In another example, the processing module enables a first group of drive-sense circuits coupled to a first group of row electrodes and enables a second group of drive-sense circuits coupled to a second group of column electrodes.

The method continues at step 102 where the processing module receives a representation of the impedance on the electrode from a drive-sense circuit. In general, the drive-sense circuit provides a drive signal to the electrode. The impedance of the electrode affects the drive signal. The effect on the drive signal is interpreted by the drive-sense circuit to produce the representation of the impedance of the electrode. The processing module does this with each activated drive-sense circuit in serial, in parallel, or in a serial-parallel manner.

The method continues at step 104 where the processing module interprets the representation of the impedance on the electrode to detect a change in the impedance of the electrode. A change in the impedance is indicative of a touch. For example, an increase in self-capacitance (e.g., the capacitance of the electrode with respect to a reference (e.g., ground, etc.)) is indicative of a touch on the electrode. As another example, a decrease in mutual capacitance (e.g., the capacitance between a row electrode and a column electrode) is also indicative of a touch near the electrodes. The processing module does this for each representation of the impedance of the electrode it receives. Note that the representation of the impedance is a digital value, an analog signal, an impedance value, and/or any other analog or digital way of representing a sensor's impedance.

The method continues at step 106 where the processing module interprets the change in the impedance to indicate a touch of the touch screen display in an area corresponding to the electrode. For each change in impedance detected, the processing module indicates a touch. Further processing may be done to determine if the touch is a desired touch or an undesired touch. Such further processing will be discussed in greater detail with reference to one or more of FIGS. 33-35.

Figure 7:
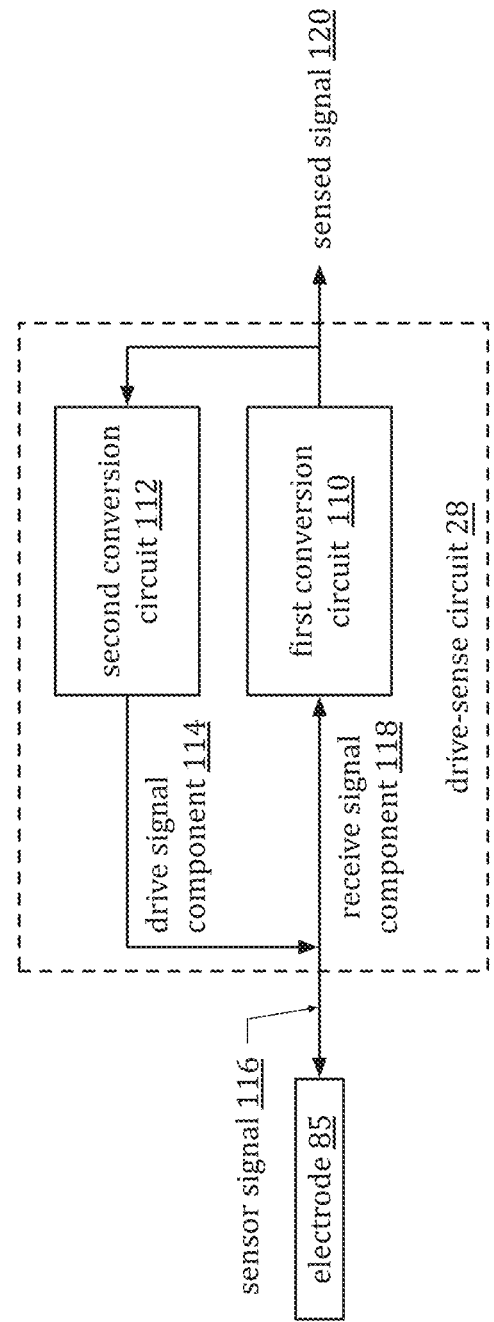
FIG. 7 is a schematic block diagram of an embodiment of a drive sense circuit.

FIG. 7 is a schematic block diagram of an embodiment of a drive sense circuit 28 that includes a first conversion circuit 110 and a second conversion circuit 112. The first conversion circuit 110 converts a sensor signal 116 into a sensed signal 120. The second conversion circuit 112 generates the drive signal component 114 from the sensed signal 112. As an example, the first conversion circuit 110 functions to keep the sensor signal 116 substantially constant (e.g., substantially matching a reference signal) by creating the sensed signal 120 to correspond to changes in a receive signal component 118 of the sensor signal. The second conversion circuit 112 functions to generate a drive signal component 114 of the sensor signal based on the sensed signal 120 to substantially compensate for changes in the receive signal component 118 such that the sensor signal 116 remains substantially constant.

In an example, the drive signal 116 is provided to the electrode 85 as a regulated current signal. The regulated current (I) signal in combination with the impedance (Z) of the electrode creates an electrode voltage (V), where V=I*Z. As the impedance (Z) of electrode changes, the regulated current (I) signal is adjusted to keep the electrode voltage (V) substantially unchanged. To regulate the current signal, the first conversion circuit 110 adjusts the sensed signal 120 based on the receive signal component 118, which is indicative of the impedance of the electrode and change thereof. The second conversion circuit 112 adjusts the regulated current based on the changes to the sensed signal 120.

As another example, the drive signal 116 is provided to the electrode 85 as a regulated voltage signal. The regulated voltage (V) signal in combination with the impedance (Z) of the electrode creates an electrode current (I), where I=V/Z. As the impedance (Z) of electrode changes, the regulated voltage (V) signal is adjusted to keep the electrode current (I) substantially unchanged. To regulate the voltage signal, the first conversion circuit 110 adjusts the sensed signal 120 based on the receive signal component 118, which is indicative of the impedance of the electrode and change thereof. The second conversion circuit 112 adjusts the regulated voltage based on the changes to the sensed signal 120.

Figure 8:
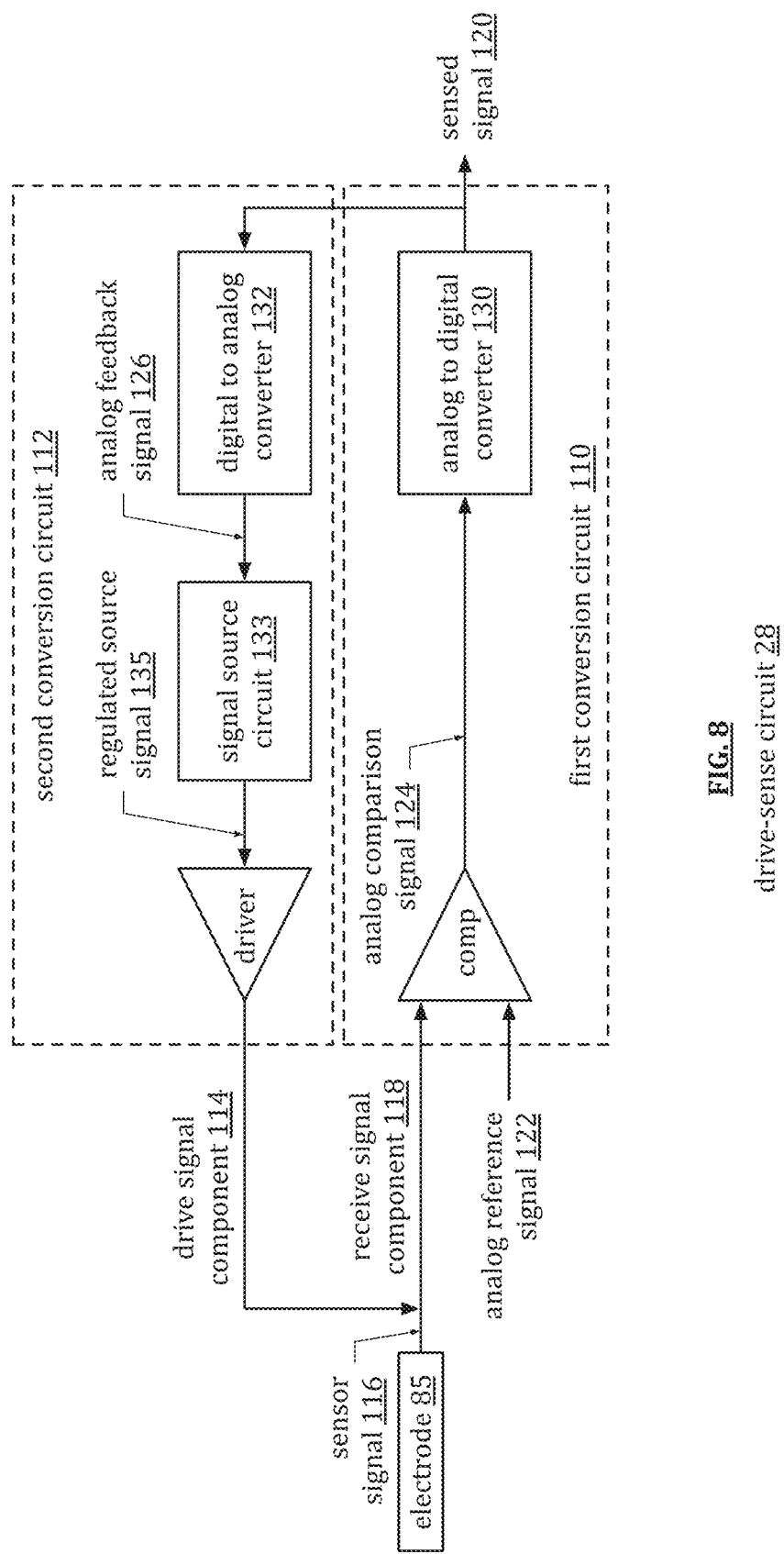
FIG. 8 is a schematic block diagram of another embodiment of a drive sense circuit.

FIG. 8 is a schematic block diagram of another embodiment of a drive sense circuit 28 that includes a first conversion circuit 110 and a second conversion circuit 112. The first conversion circuit 110 includes a comparator (comp) and an analog to digital converter 130. The second conversion circuit 112 includes a digital to analog converter 132, a signal source circuit 133, and a driver.

In an example of operation, the comparator compares the sensor signal 116 to an analog reference signal 122 to produce an analog comparison signal 124. The analog reference signal 124 includes a DC component and an oscillating component. As such, the sensor signal 116 will have a substantially matching DC component and oscillating component. An example of an analog reference signal 122 will be described in greater detail with reference to FIG. 15.

The analog to digital converter 130 converts the analog comparison signal 124 into the sensed signal 120. The analog to digital converter (ADC) 130 may be implemented in a variety of ways. For example, the (ADC) 130 is one of: a flash ADC, a successive approximation ADC, a ramp-compare ADC, a Wilkinson ADC, an integrating ADC, a delta encoded ADC, and/or a sigma-delta ADC. The digital to analog converter (DAC) 214 may be a sigma-delta DAC, a pulse width modulator DAC, a binary weighted DAC, a successive approximation DAC, and/or a thermometer-coded DAC.

The digital to analog converter (DAC) 132 converts the sensed signal 120 into an analog feedback signal 126. The signal source circuit 133 (e.g., a dependent current source, a linear regulator, a DC-DC power supply, etc.) generates a regulated source signal 135 (e.g., a regulated current signal or a regulated voltage signal) based on the analog feedback signal 126. The driver increases power of the regulated source signal 135 to produce the drive signal component 114.

Figure 9A:
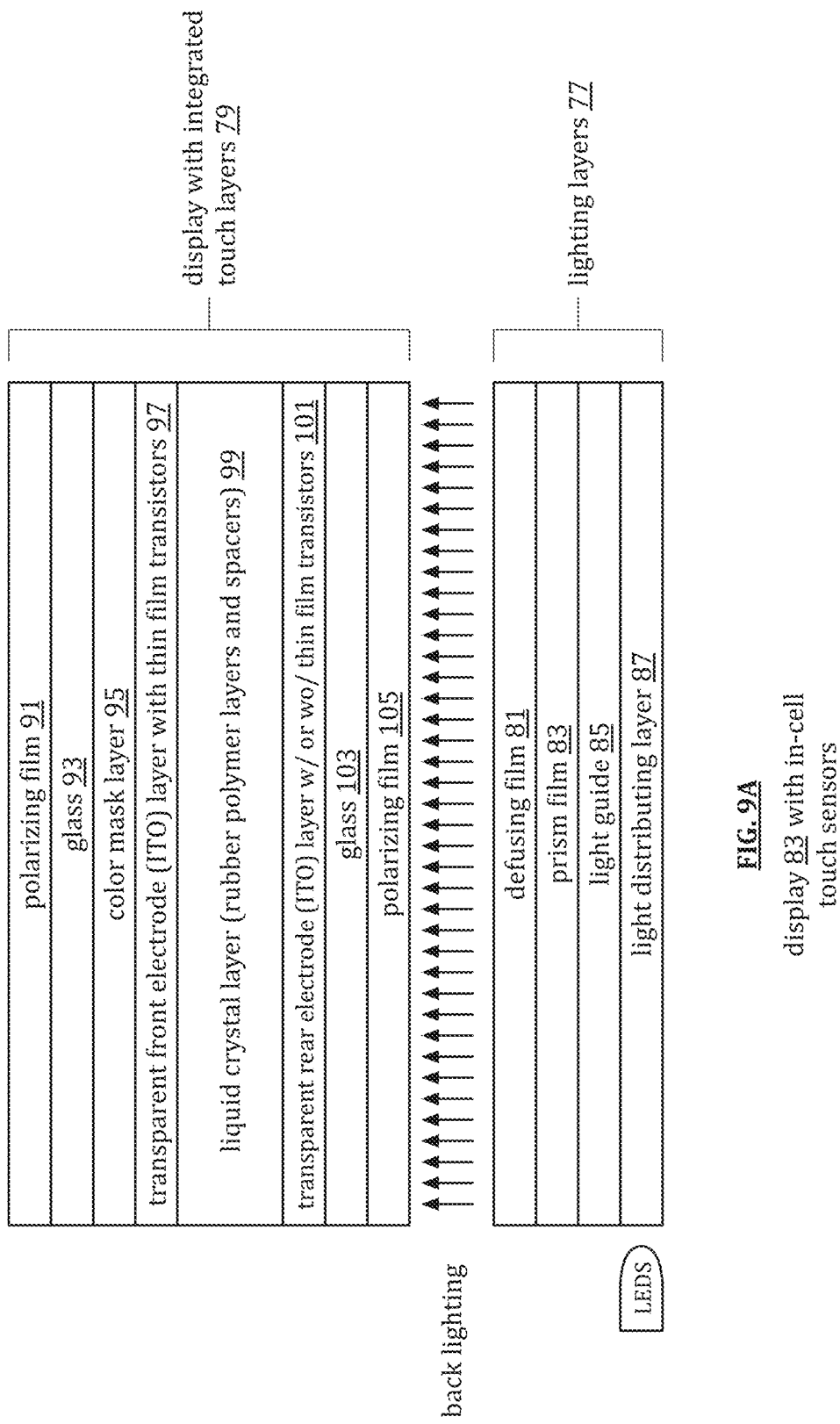
FIG. 9A is a cross section schematic block diagram of an example of a touch screen display with in-cell touch sensors.

FIG. 9A is a cross section schematic block diagram of an example of a touch screen display 83 with in-cell touch sensors, which includes lighting layers 77 and display with integrated touch sensing layers 79. The lighting layers 77 include a light distributing layer 87, a light guide layer 85, a prism film layer 83, and a defusing film layer 81. The display with integrated touch sensing layers 79 include a rear polarizing film layer 105, a glass layer 103, a rear transparent electrode layer with thin film transistors 101 (which may be two or more separate layers), a liquid crystal layer (e.g., a rubber polymer layer with spacers) 99, a front electrode layer with thin film transistors 97, a color mask layer 95, a glass layer 93, and a front polarizing film layer 91. Note that one or more protective layers may be applied over the polarizing film layer 91.

In an example of operation, a row of LEDs (light emitted diodes) projects light into the light distributing player 87, which projects the light towards the light guide 85. The light guide includes a plurality of holes that let's some light components pass at differing angles. The prism film layer 83 increases perpendicularity of the light components, which are then defused by the defusing film layer 81 to provide a substantially even back lighting for the display with integrated touch sense layers 79.

The two polarizing film layers 105 and 91 are orientated to block the light (i.e., provide black light). The front and rear electrode layers 97 and 101 provide an electric field at a sub-pixel level to orientate liquid crystals in the liquid crystal layer 99 to twist the light. When the electric field is off, or is very low, the liquid crystals are orientated in a first manner (e.g., end-to-end) that does not twist the light, thus, for the sub-pixel, the two polarizing film layers 105 and 91 are blocking the light. As the electric field is increased, the orientation of the liquid crystals change such that the two polarizing film layers 105 and 91 pass the light (e.g., white light). When the liquid crystals are in a second orientation (e.g., side by side), intensity of the light is at its highest point.

The color mask layer 95 includes three sub-pixel color masks (red, green, and blue) for each pixel of the display, which includes a plurality of pixels (e.g., 1440×1080). As the electric field produced by electrodes change the orientations of the liquid crystals at the sub-pixel level, the light is twisted to produce varying sub-pixel brightness. The sub-pixel light passes through its corresponding sub-pixel color mask to produce a color component for the pixel. The varying brightness of the three sub-pixel colors (red, green, and blue), collectively produce a single color to the human eye. For example, a blue shirt has a 12% red component, a 20% green component, and 55% blue component.

The in-cell touch sense functionality uses the existing layers of the display layers 79 to provide capacitance-based sensors. For instance, one or more of the transparent front and rear electrode layers 97 and 101 are used to provide row electrodes and column electrodes. Various examples of creating row and column electrodes from one or more of the transparent front and rear electrode layers 97 and 101 is discussed in some of the subsequent figures.

Figure 9B:
FIG. 9B is a schematic block diagram of an example of a transparent electrode layer with thin film transistors.

FIG. 9B is a schematic block diagram of an example of a transparent electrode layer 97 and/or 101 with thin film transistors (TFT). Sub-pixel electrodes are formed on the transparent electrode layer and each sub-pixel electrode is coupled to a thin film transistor (TFT). Three sub-pixels (R-red. G-green, and B-blue) form a pixel. The gates of the TFTs associated with a row of sub-electrodes are coupled to a common gate line. In this example, each of the four rows has its own gate line. The drains (or sources) of the TFTs associated with a column of sub-electrodes are coupled to a common R. B. or G data line. The sources (or drains) of the TFTs are coupled to its corresponding sub-electrode.

In an example of operation, one gate line is activated at a time and RGB data for each pixel of the corresponding row is placed on the RGB data lines. At the next time interval, another gate line is activated and the RGB data for the pixels of that row is placed on the RGB data lines. For 1080 rows and a refresh rate of 60 Hz, each row is activated for about 15 microseconds each time it is activated, which is 60 times per second. When the sub-pixels of a row are not activated, the liquid crystal layer holds at least some of the charge to keep an orientation of the liquid crystals.

Figure 9C:
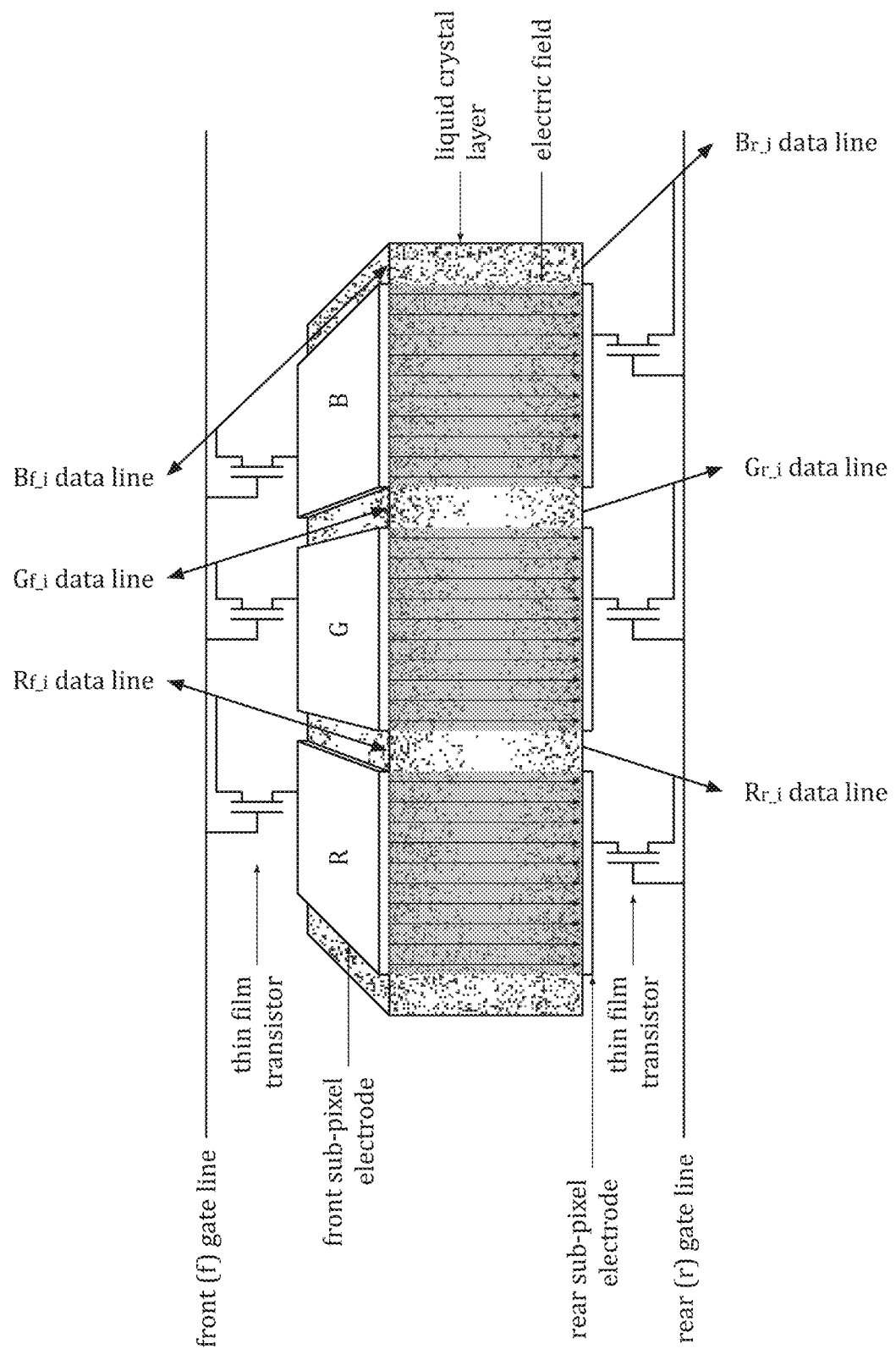
FIG. 9C is a schematic block diagram of an example of a pixel with three sub-pixels.

FIG. 9C is a schematic block diagram of an example of a pixel with three sub-pixels (R-red. G-green, and B-blue). In this example, the front sub-pixel electrodes are formed in the front transparent conductor layer 97 and the rear sub-pixel electrodes are formed in the rear transparent conductor layer 101. Each front and rear sub-pixel electrode is coupled to a corresponding thin film transistor. The thin film transistors coupled to the top sub-pixel electrodes are coupled to a front (f) gate line and to front R. G. and B data lines. The thin film transistors coupled to the bottom sub-pixel electrodes are coupled to a rear (f) gate line and to rear R. G, and B data lines.

To create an electric field between related sub-pixel electrodes, a differential gate signal is applied to the front and rear gate lines and differential R. G. and B data signals are applied to the front and rear R. G. and B data lines. For example, for the red (R) sub-pixel, the thin film transistors are activated by the signal on the gate lines. The electric field created by the red sub-pixel electrodes is depending on the front and rear red data signals. As a specific example, a large differential voltage creates a large electric field, which twists the light towards maximum light passing and increases the red component of the pixel.

The gate lines and data lines are non-transparent wires (e.g., copper) that are positioned between the sub-pixel electrodes such that they are hidden from human sight. The non-transparent wires may be on the same layer as the sub-pixel electrodes or on different layers and coupled using vias.

Figure 9D:
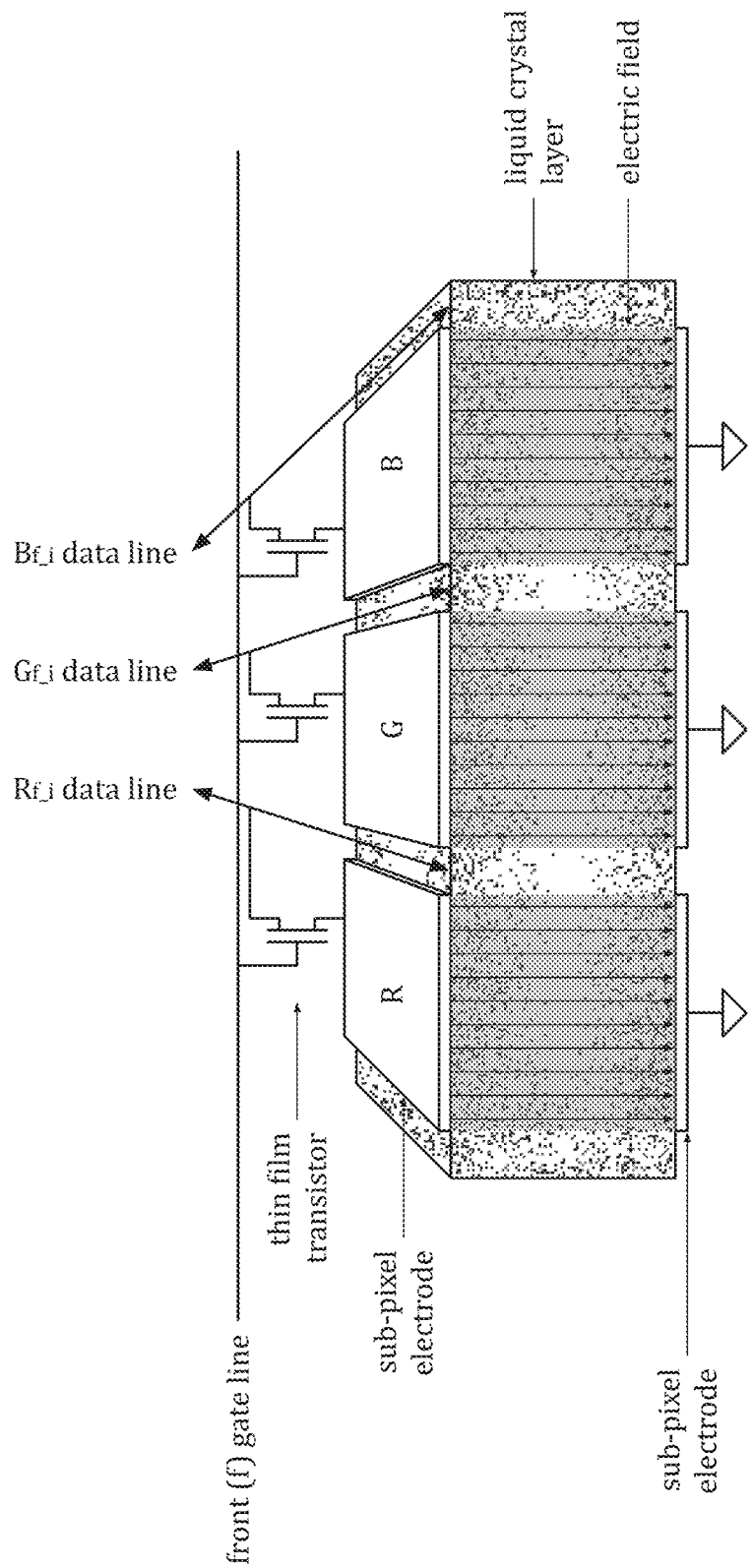
FIG. 9D is a schematic block diagram of another example of a pixel with three sub-pixels.

FIG. 9D is a schematic block diagram of another example of a pixel with three sub-pixels (R-red, G-green, and B-blue). In this example, the front sub-pixel electrodes are formed in the front transparent conductor layer 97 and the rear sub-pixel electrodes are formed in the rear transparent conductor layer 101. Each front sub-pixel electrode is coupled to a corresponding thin film transistor. The thin film transistors coupled to the top sub-pixel electrodes are coupled to a front (f) gate line and to front R. G. and B data lines. Each rear sub-pixel electrode is coupled to a common voltage reference (e.g., ground, which may be a common ground plane or a segmented common ground plane (e.g., separate ground planes coupled together to form a common ground plane)).

To create an electric field between related sub-pixel electrodes, a single-ended gate signal is applied to the front gate lines and a single-ended R. G. and B data signals are applied to the front R. G, and B data lines. For example, for the red (R) sub-pixel, the thin film transistors are activated by the signal on the gate lines. The electric field created by the red sub-pixel electrodes is depending on the front red data signals.

FIG. 9E is a schematic block diagram of an example of sub-pixel electrodes of the front or back electrode layer 97 or 101 coupled together to form row electrodes of a touch screen sensor. In this example, 3 rows of sub-pixel electrodes are coupled together by conductors (e.g., wires, metal traces, vias, etc.) to form one row electrode, which is coupled to a drive sense circuit (DSC) 28. More or less rows of sub-pixel electrodes may be coupled together to form a row electrode.

Figure 9F:
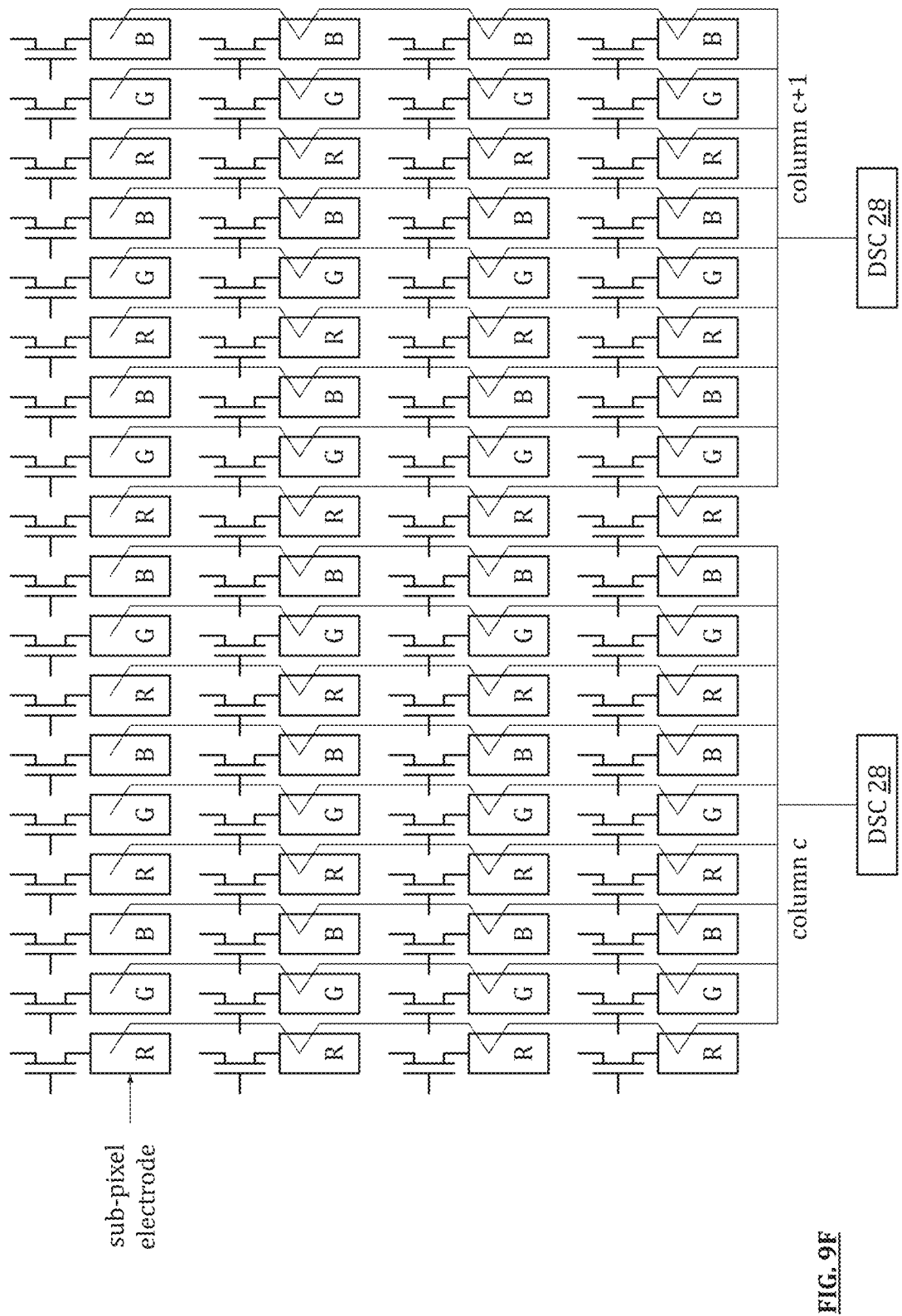
FIG. 9F is a schematic block diagram of an example of sub-pixel electrodes coupled together to form column electrodes of a touch screen sensor.

FIG. 9F is a schematic block diagram of an example of sub-pixel electrodes front or back electrode layer 97 or 101 coupled together to form column electrodes of a touch screen sensor. In this example, 9 columns of sub-pixel electrodes are coupled together by conductors (e.g., wires, metal traces, vias, etc.) to form one column electrode, which is coupled to a drive sense circuit (DSC) 28. More or less columns of sub-pixel electrodes may be coupled together to form a column electrode.

With respect to FIGS. 9E and 9F, the row electrodes may be formed on one of the transparent conductor layers 97 or 101 and the column electrodes are formed on the other. In this instance, differential signaling is used for display functionality of sub-pixel electrodes and a common mode voltage is used for touch sensing on the row and column electrodes. This allows for concurrent display and touch sensing operations with negligible adverse effect on display operation.

Figure 9G:
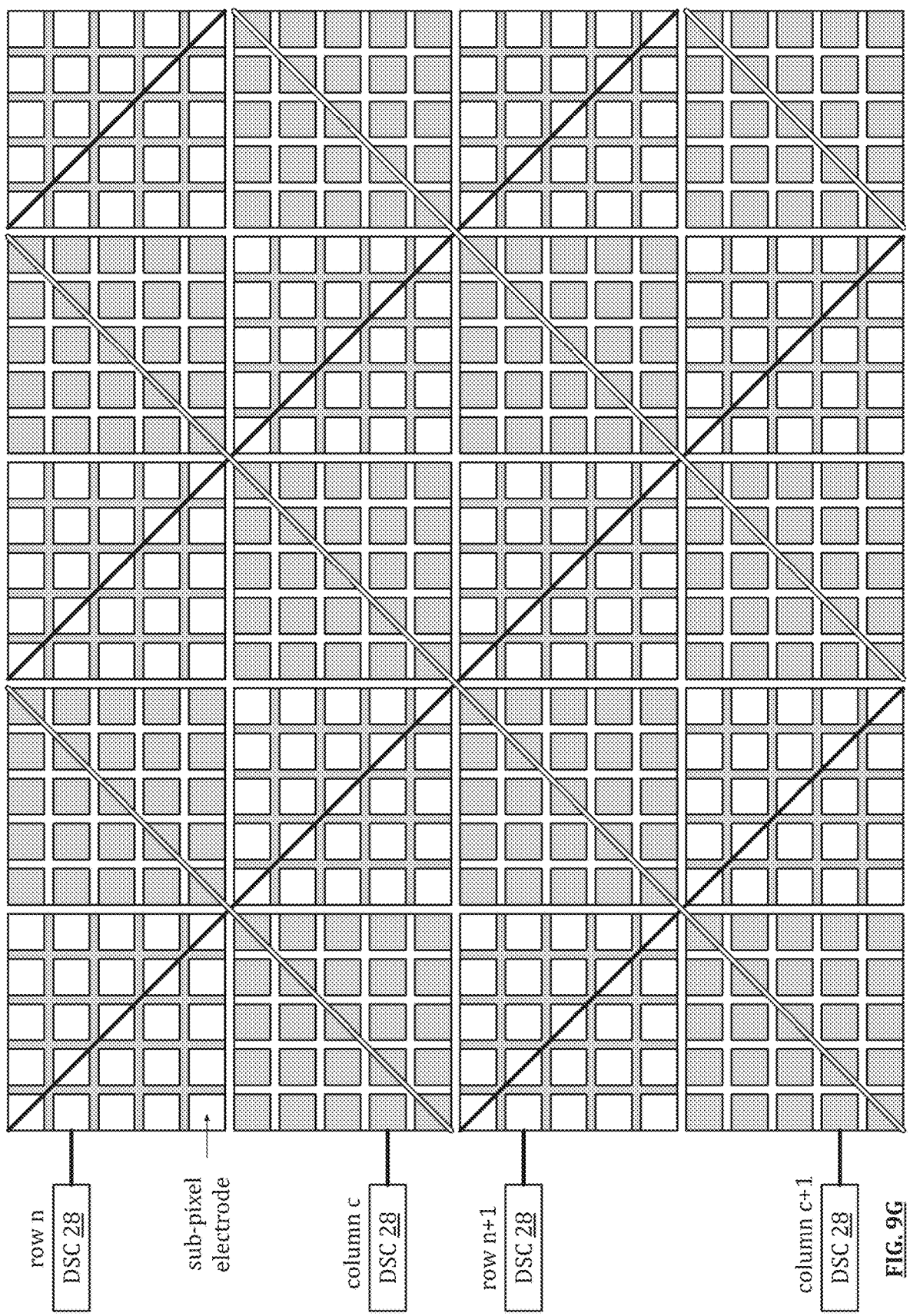
FIG. 9G is a schematic block diagram of an example of sub-pixel electrodes coupled together to form row electrodes and column electrodes of a touch screen sensor.

FIG. 9G is a schematic block diagram of an example of sub-pixel electrodes coupled together to form row electrodes and column electrodes of a touch screen sensor on one of the transparent conductive layers 97 or 101. In this example, 5×5 sub-pixel electrodes are coupled together to form a square (or diamond, depending on orientation), or other geometric shape. The 5 by 5 squares are then cross coupled together to form a row electrode or a column electrode.

In this example, white sub-pixel sub-electrodes with a grey background are grouped to form a row electrode for touch sensing and the grey sub-pixels with the white background are grouped to form a column electrode. Each row electrode and column electrode is coupled to a drive sense circuit (DSC) 28. As shown, the row and column electrodes for touch sensing are diagonal. Note that the geometric shape of the row and column electrodes may be of a different configuration (e.g., zig-zag pattern, lines, etc.) and that the number of sub-pixel electrodes per square (or other shape) may include more or less than 25.

Figure 9H:
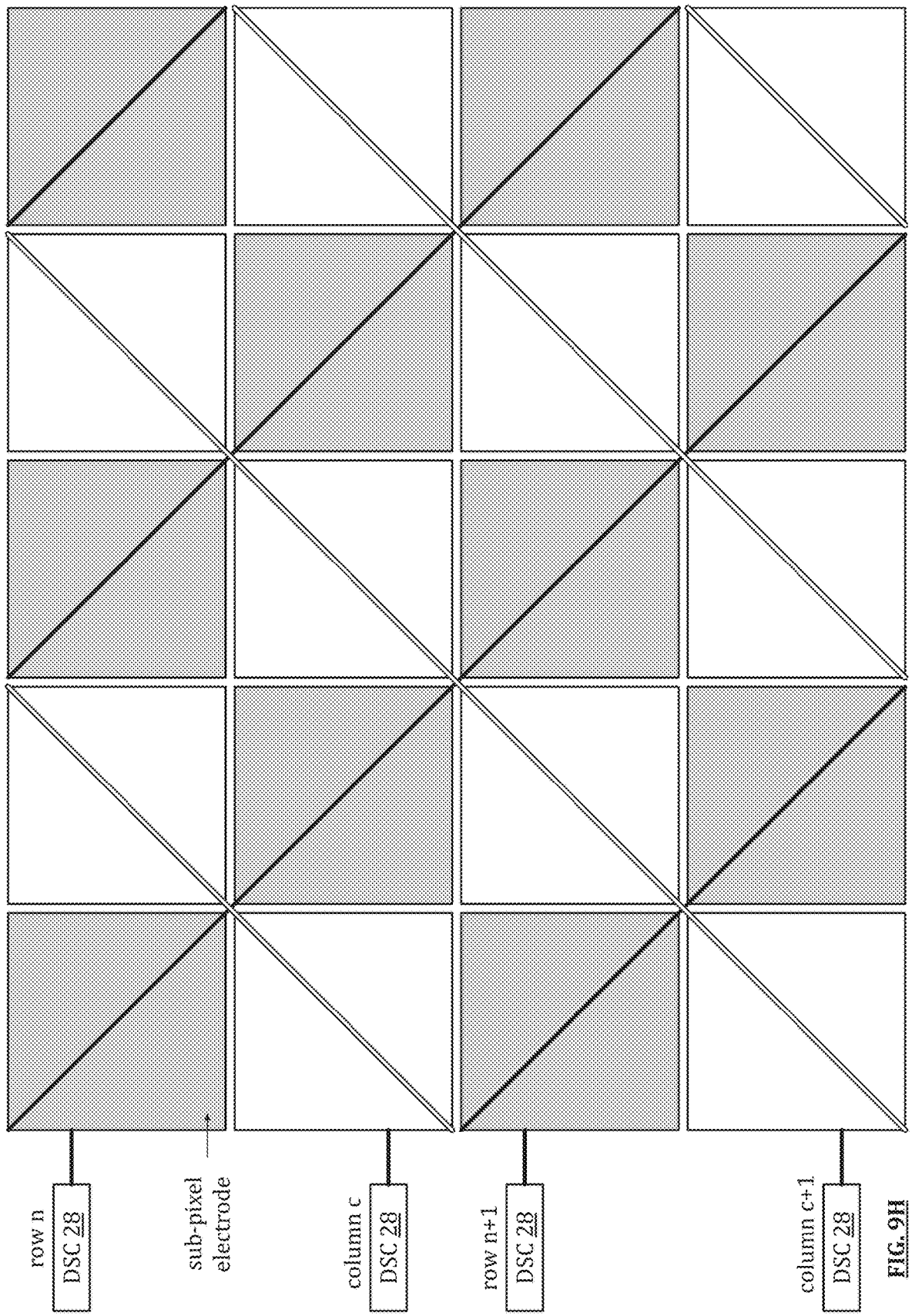
FIG. 9H is a schematic block diagram of an example of a segmented common ground plane forming row electrodes and column electrodes of a touch screen sensor.

FIG. 9H is a schematic block diagram of an example of a segmented common ground plane forming row electrodes and column electrodes of a touch screen sensor on the rear transparent conductive layer 101. In this instance, each square (or other shape) corresponds to a segment of a common ground plane that services a group of sub-pixel electrodes on the front transparent layer 97. The squares (or other shape) are coupled together to form row electrodes and column electrodes. The white segmented common ground planes are coupled together to form column electrodes and the grey segmented common ground planes are coupled together to form row electrodes. By implementing the on-cell touch screen row and column electrodes in the common ground plane, display and touch sense functionalities may be concurrently executed with negligible adverse effects on the display functionality.

Figure 9I:
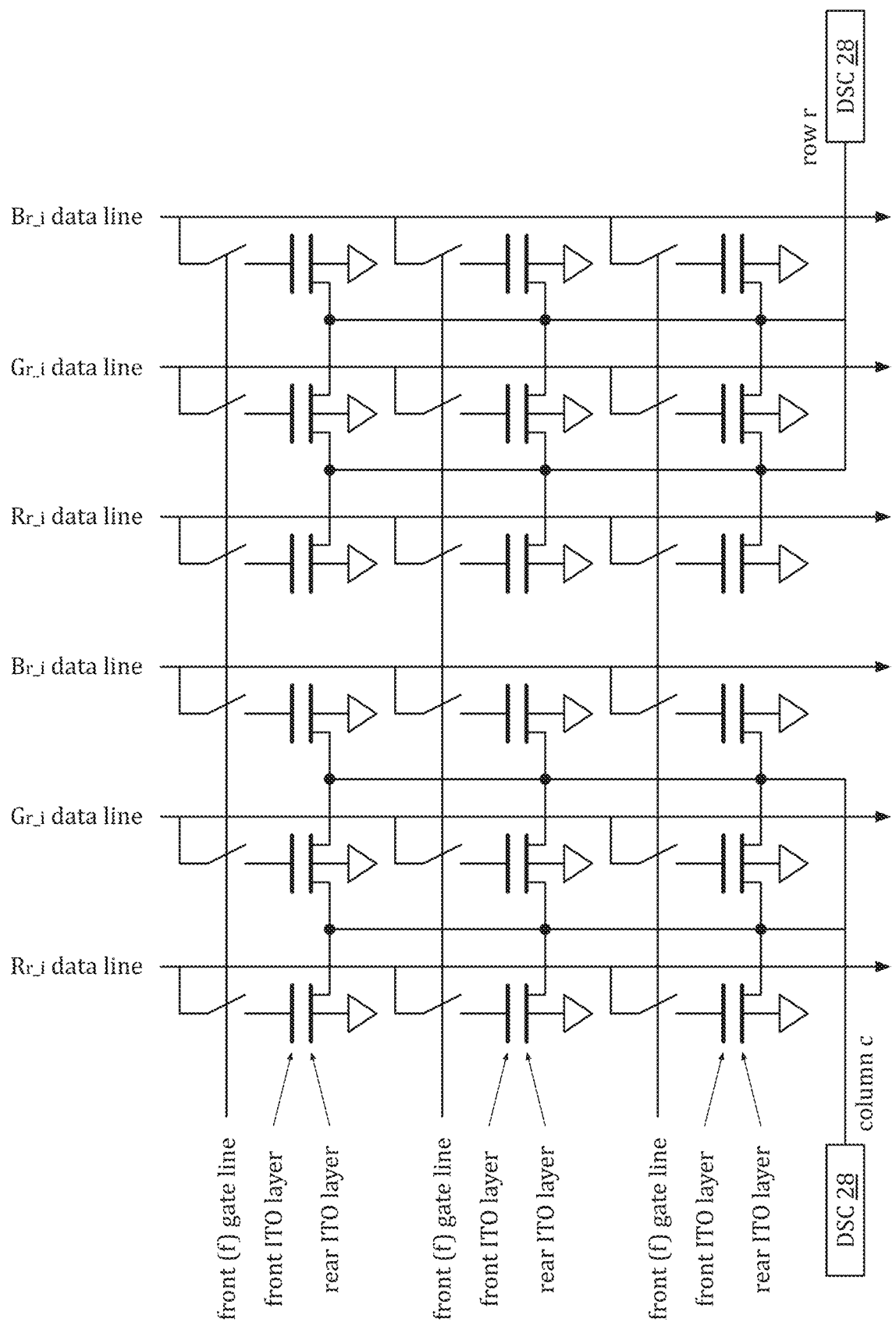
FIG. 9I is a schematic block diagram of another example of sub-pixel electrodes coupled together to form row and column electrodes of a touch screen sensor.

FIG. 9I is a schematic block diagram of another example of sub-pixel electrodes coupled together to form row and column electrodes of a touch screen sensor. In this example, a sub-pixel is represented as a capacitor, with the top plate being implemented in the front ITO layer 97 and the bottom plate being implemented in the back ITO layer 101, which is implemented as a common ground plan. The thin film transistors are represented as switches. In this example, 3×3 sub-pixel electrodes on the rear ITO layer are coupled together to form a portion of a row electrode for touch sensing or a column electrode for touch sensing. With each of the drive sense circuits 28 injecting a common signal for self-capacitance sensing, the common signal has negligible adverse effects on the display operation of the sub-pixels.

Figure 9J:
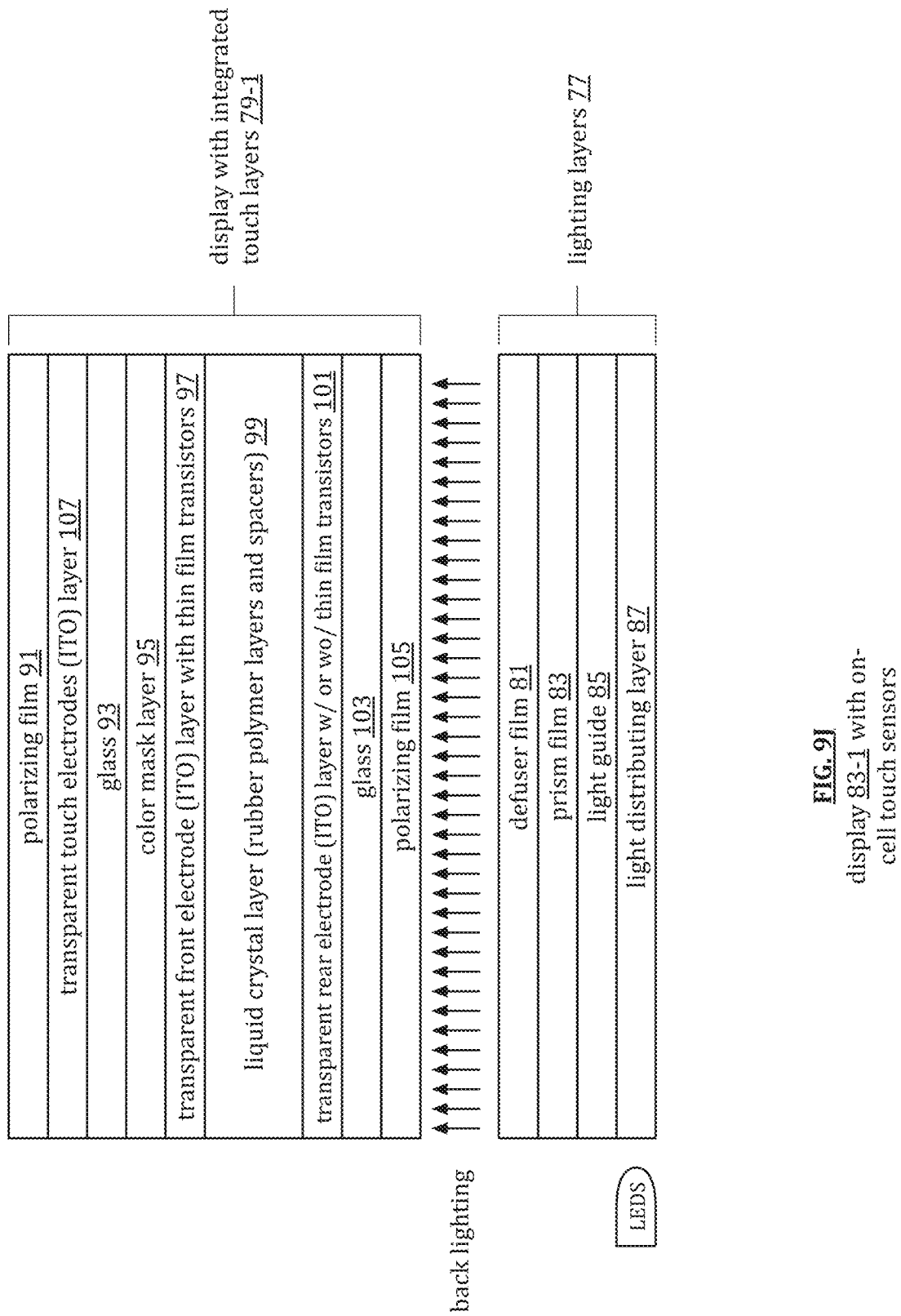
FIG. 9J is a cross section schematic block diagram of an example of a touch screen display with on-cell touch sensors.

FIG. 9J is a cross section schematic block diagram of an example of a touch screen display 83-1 with on-cell touch sensors, which includes lighting layers 77 and display with integrated touch sensing layers 79. The lighting layers 77 include a light distributing layer 87, a light guide layer 85, a prism film layer 83, and a defusing film layer 81. The display with integrated touch sensing layers 79 include a rear polarizing film layer 105, a glass layer 103, a rear transparent electrode layer with thin film transistors 101 (which may be two or more separate layers), a liquid crystal layer (e.g., a rubber polymer layer with spacers) 99, a front electrode layer with thin film transistors 97, a color mask layer 95, a glass layer 93, a transparent touch layer 107, and a front polarizing film layer 91. Note that one or more protective layers may be applied over the polarizing film layer 91.

The lighting layer 77 and the display with integrated touch sensing layer 79-1 function as described with reference to FIG. 9A for generating a display. A difference lies in how on-cell touch sensing of this embodiment in comparison to the in-cell touch sensing of FIG. 9A. In particular, this embodiment includes an extra transparent conductive layer 107 to provide, or assist, with capacitive-based touch sensing. For example, the extra transparent conductive layer 107 includes row and column electrodes as shown in FIG. 9H. As another example, the extra transparent conductive layer 107 includes row electrodes or column electrodes and another one of the conductive layers 97 or 101 includes the other electrodes (e.g., column electrodes if the extra transparent layer includes row electrodes).

FIG. 10A is a cross section schematic block diagram of a touch screen display 80 without a touch of a finger or a pen. The cross section is taken parallel to a column electrode 85-c and a perpendicular to a row electrode 85-r. The column electrode 85-c is positioned between two dielectric layers 140 and 142. Alternatively, the column electrode 85-c is in the second dielectric layer 142. The row electrode 85-r is positioned in the second dielectric layer 142. Alternatively, the row electrode 85-r is positioned between the dielectric layer 142 and the display substrate 144. As another alternative, the row and column electrodes are in the same layer. In one or more embodiments, the row and column electrodes are formed as discussed in one or more of FIGS. 9A-9J.

Each electrode 85 has a self-capacitance, which corresponds to a parasitic capacitance created by the electrode with respect to other conductors in the display (e.g., ground, conductive layer(s), and/or one or more other electrodes).

For example, row electrode 85-$r$ has a parasitic capacitance $C_{p2}$ and column electrode 85-$c$ has a parasitic capacitance $C_{p1}$. Note that each electrode includes a resistance component and, as such, produces a distributed R-C circuit. The longer the electrode, the greater the impedance of the distributed R-C circuit. For simplicity of illustration the distributed R-C circuit of an electrode will be represented as a single parasitic capacitance.

As shown, the touch screen display 80 includes a plurality of layers 140-144. Each illustrated layer may itself include one or more layers. For example, dielectric layer 140 includes a surface protective film, a glass protective film, and/or one or more pressure sensitive adhesive (PSA) layers. As another example, the second dielectric layer 142 includes a glass cover, a polyester (PET) film, a support plate (glass or plastic) to support, or embed, one or more of the electrodes 85-$c$ and 85-$r$, a base plate (glass, plastic, or PET), and one or more PSA layers. As yet another example, the display substrate 144 includes one or more LCD layers, a back-light layer, one or more reflector layers, one or more polarizing layers, and/or one or more PSA layers.

FIG. 10B is a cross section schematic block diagram of a touch screen display 80, which is the same as in FIG. 9. This figure further includes a finger touch, which changes the self-capacitance of the electrodes. In essence, a finger touch creates a parallel capacitance with the parasitic self-capacitances. For example, the self-capacitance of the column electrode 85-$c$ is $C_{p1}$ (parasitic capacitance)+$C_{f1}$ (finger capacitance) and the self-capacitance of the row electrode 85-$r$ is $C_{p2}$+$C_{f2}$. As such, the finger capacitance increases the self-capacitance of the electrodes, which decreases the impedance for a given frequency. The change in impedance of the self-capacitance is detectable by a corresponding drive sense circuit and is subsequently processed to indicate a screen touch.

FIG. 11 is a cross section schematic block diagram of a touch screen display 80, which is the same as in FIG. 9. This figure further includes a mutual capacitance (Cm_0) between the electrodes when a touch is not present.

FIG. 12 is a cross section schematic block diagram of a touch screen display 80, which is the same as in FIG. 9. This figure further includes a mutual capacitance (Cm_1) between the electrodes when a touch is present. In this example, the finger capacitance is effectively in series with the mutual capacitance, which decreasing capacitance of the mutual capacitance. As the capacitance decreases for a given frequency, the impedance increases. The change in impedance of the mutual-capacitance is detectable by a corresponding drive sense circuit and is subsequently processed to indicate a screen touch. Note that, depending on the various properties (e.g., thicknesses, dielectric constants, electrode sizes, electrode spacing, etc.) of the touch screen display, the parasitic capacitances, the mutual capacitances, and/or the finger capacitance are in the range of a few pico-Farads to tens of nano-Farads. In equation form, the capacitance (C) equals:

$$C = \in A/d \text{ where A is plate area, } \in \text{ is the dielectric constant(s),}$$

and d is the distance between the plates.

FIG. 13 is an example graph that plots condition verses capacitance for an electrode of a touch screen display. As shown, the mutual capacitance decreases with a touch and the self-capacitance increases with a touch. Note that the mutual capacitance and self-capacitance for a no-touch condition are shown to be about the same. This is done merely for ease of illustration. In practice, the mutual capacitance and self-capacitance may or may not be about the same capacitance based on the various properties of the touch screen display discussed above.

FIG. 14 is an example graph that plots impedance verses frequency for an electrode of a touch screen display. Since the impedance of an electrode is primarily based on its capacitance (self and/or mutual), as the frequency increases for a fixed capacitance, the impedance decreases based on $\frac{1}{2}\pi * f * C$, where f is the frequency and C is the capacitance.

FIG. 15 is a time domain example graph that plots magnitude verses time for an analog reference signal 122. As discussed with reference to FIG. 8, the analog reference signal 122 (e.g., a current signal or a voltage signal) is inputted to a comparator and is compared to the sensor signal 116. The feedback loop of the drive sense circuit 28 functions to keep the senor signal 116 substantially matching the analog reference signal 122. As such, the sensor signal 116 will have a similar waveform to that of the analog reference signal 122.

In an example, the analog reference signal 122 includes a DC component 121 and/or one or more oscillating components 123. The DC component 121 is a DC voltage in the range of a few hundred milli-volts to tens of volts or more. The oscillating component 123 includes a sinusoidal signal, a square wave signal, a triangular wave signal, a multiple level signal (e.g., has varying magnitude over time with respect to the DC component), and/or a polygonal signal (e.g., has a symmetrical or asymmetrical polygonal shape with respect to the DC component).

In another example, the frequency of the oscillating component 123 may vary so that it can be tuned to the impedance of the sensor and/or to be off set in frequency from other sensor signals in a system. For example, a capacitance sensor's impedance decreases with frequency. As such, if the frequency of the oscillating component is too high with respect to the capacitance, the capacitor looks like a short and variances in capacitances will be missed. Similarly, if the frequency of the oscillating component is too low with respect to the capacitance, the capacitor looks like an open and variances in capacitances will be missed.

FIG. 16 is a frequency domain example graph that plots magnitude verses frequency for an analog reference signal 122. As shown, the analog reference signal 122 includes the DC component 121 at DC (e.g., 0 Hz or near 0 Hz), a first oscillating component 123-1 at a first frequency (f1), and a second oscillating component 123-2 at a second frequency (f2). In an example, the DC component is used to measure resistance of an electrode (if desired), the first oscillating component 123-1 is used to measure the impedance of self-capacitance, and the second oscillating component 123-2 is used to measure the impedance of mutual-capacitance. Note that the second frequency may be greater than the first frequency.

Figure 17:
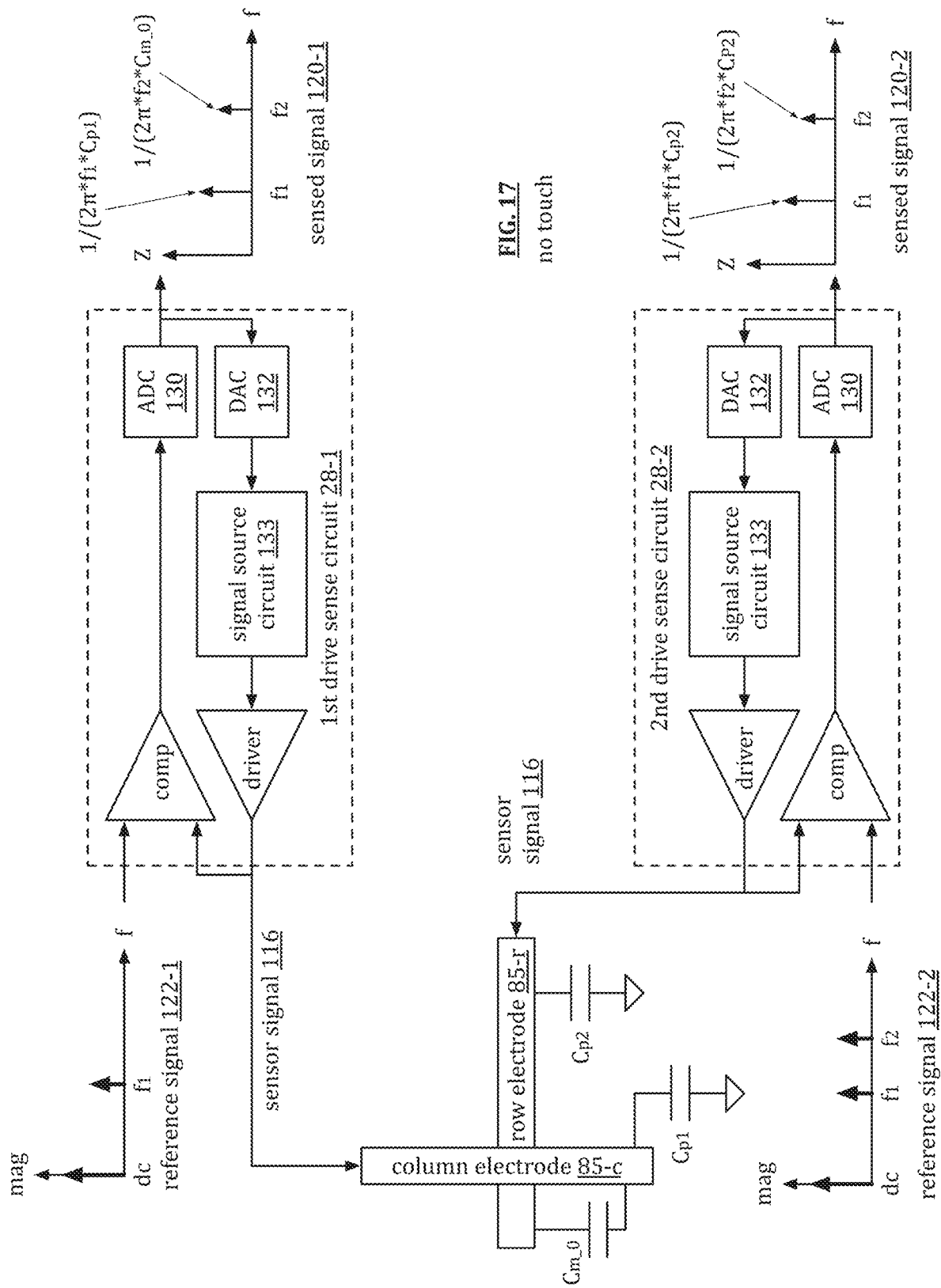
FIG. 17 is a schematic block diagram of an example of a first drive sense circuit coupled to a first electrode and a second drive sense circuit coupled to a second electrode without a touch proximal to the electrodes.

FIG. 17 is a schematic block diagram of an example of a first drive sense circuit 28-1 coupled to a first electrode 85-$c$ and a second drive sense circuit 28-2 coupled to a second electrode 85-$r$ without a touch proximal to the electrodes. Each of the drive sense circuits include a comparator, an analog to digital converter (ADC) 130, a digital to analog converter (DAC) 132, a signal source circuit 133, and a driver. The functionality of this embodiment of a drive sense circuit was described with reference to FIG. 8. For additional embodiments of a drive sense circuit see patent application entitled. "Drive Sense Circuit with Drive-Sense Line" having a filing date of Aug. 27, 2018, and an application number of 16/113.379.

As an example, a first reference signal 122-1 (e.g., analog, or digital) is provided to the first drive sense circuit 28-1 and a second reference signal 122-2 (e.g., analog, or digital) is provided to the second drive sense circuit 28-2. The first reference signal includes a DC component and/or an oscillating at frequency f1. The second reference signal includes a DC component and/or two oscillating components: the first at frequency f1 and the second at frequency f2.

The first drive sense circuit 28-1 generates a sensor signal 116 based on the reference signal 122-1 and provides the sensor signal to the column electrode 85-c. The second drive sense circuit generates another sensor signal 116 based on the reference signal 122-2 and provides the sensor signal to the column electrode.

In response to the sensor signals being applied to the electrodes, the first drive sense circuit 28-1 generates a first sensed signal 120-1, which includes a component at frequency $f_1$ and a component a frequency $f_2$. The component at frequency $f_1$ corresponds to the self-capacitance of the column electrode 85-c and the component a frequency $f_2$ corresponds to the mutual capacitance between the row and column electrodes 85-c and 85-r. The self-capacitance is expressed as $1/(2\pi f1 Cp1)$ and the mutual capacitance is expressed as $1/(2\times 2Cm\_0)$.

Also, in response to the sensor signals being applied to the electrodes, the second drive sense circuit 28-1 generates a second sensed signal 120-2, which includes a component at frequency $f_1$ and a component a frequency $f_2$. The component at frequency $f_1$ corresponds to a shielded self-capacitance of the row electrode 85-r and the component a frequency $f_2$ corresponds to an unshielded self-capacitance of the row electrode 85-r. The shielded self-capacitance of the row electrode is expressed as $1/(2\pi f1\ C_{p2})$ and the unshielded self-capacitance of the row electrode is expressed as $1/(2\pi f2 C_{p2})$.

With each active drive sense circuit using the same frequency for self-capacitance (e.g., $f_1$), the row and column electrodes are at the same potential, which substantially eliminates cross-coupling between the electrodes. This provides a shielded (i.e., low noise) self-capacitance measurement for the active drive sense circuits. In this example, with the second drive sense circuit transmitting the second frequency component, it has a second frequency component in its sensed signal, but is primarily based on the row electrode's self-capacitance with some cross coupling from other electrodes carrying signals at different frequencies. The cross coupling of signals at other frequencies injects unwanted noise into this self-capacitance measurement and hence it is referred to as unshielded.

Figure 18:
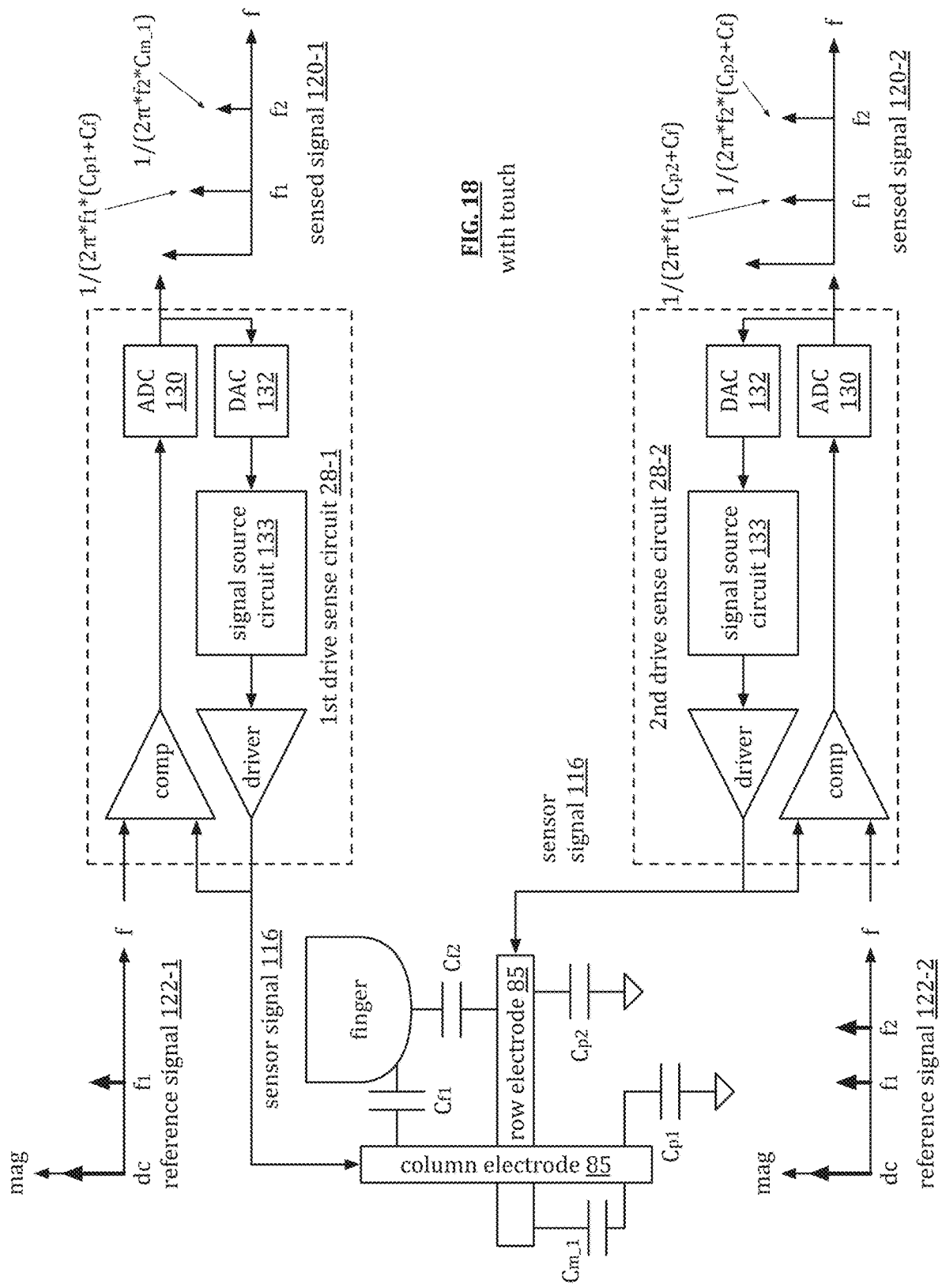
FIG. 18 is a schematic block diagram of an example of a first drive sense circuit coupled to a first electrode and a second drive sense circuit coupled to a second electrode with a finger touch proximal to the electrodes.

FIG. 18 is a schematic block diagram of an example of a first drive sense circuit 28-1 coupled to a first electrode 85-c and a second drive sense circuit 28-2 coupled to a second electrode 85-r with a finger touch proximal to the electrodes. This example is similar to the one of FIG. 17 with the difference being a finger touch proximal to the electrodes (e.g., a touch that shadows the intersection of the electrodes or is physically close to the intersection of the electrodes). With the finger touch, the self-capacitance and the mutual capacitance of the electrodes are changed.

In this example, the impedance of the self-capacitance at f1 of the column electrode 85-c now includes the effect of the finger capacitance. As such, the impedance of the self-capacitance of the column electrode equals $1/(2\pi f1 * (Cp1+Cf1))$, which is included the sensed signal 120-1. The second frequency component at f2 corresponds to the impedance of the mutual-capacitance at f2, which includes the effect of the finger capacitance. As such, the impedance of the mutual capacitance equals $1/(2\pi f2 Cm\ 1)$, where $C_{m\_1}=(C_{m\_0}*C_{f1})/(C_{m\_0}+C_{f1})$.

Continuing with this example, the first frequency component at f1 of the second sensed signal 120-2 corresponds to the impedance of the shielded self-capacitance of the row electrode 85-r at f1, which is effected by the finger capacitance. As such, the impedance of the capacitance of the row electrode 85-r equals $1/(2\pi f1*(Cp2+Cf2))$. The second frequency component at f2 of the second sensed signal 120-2 corresponds to the impedance of the unshielded self-capacitance at f2, which includes the effect of the finger capacitance and is equal to $1/(2\pi f2*(Cp2+Cf2))$.

Figure 19:
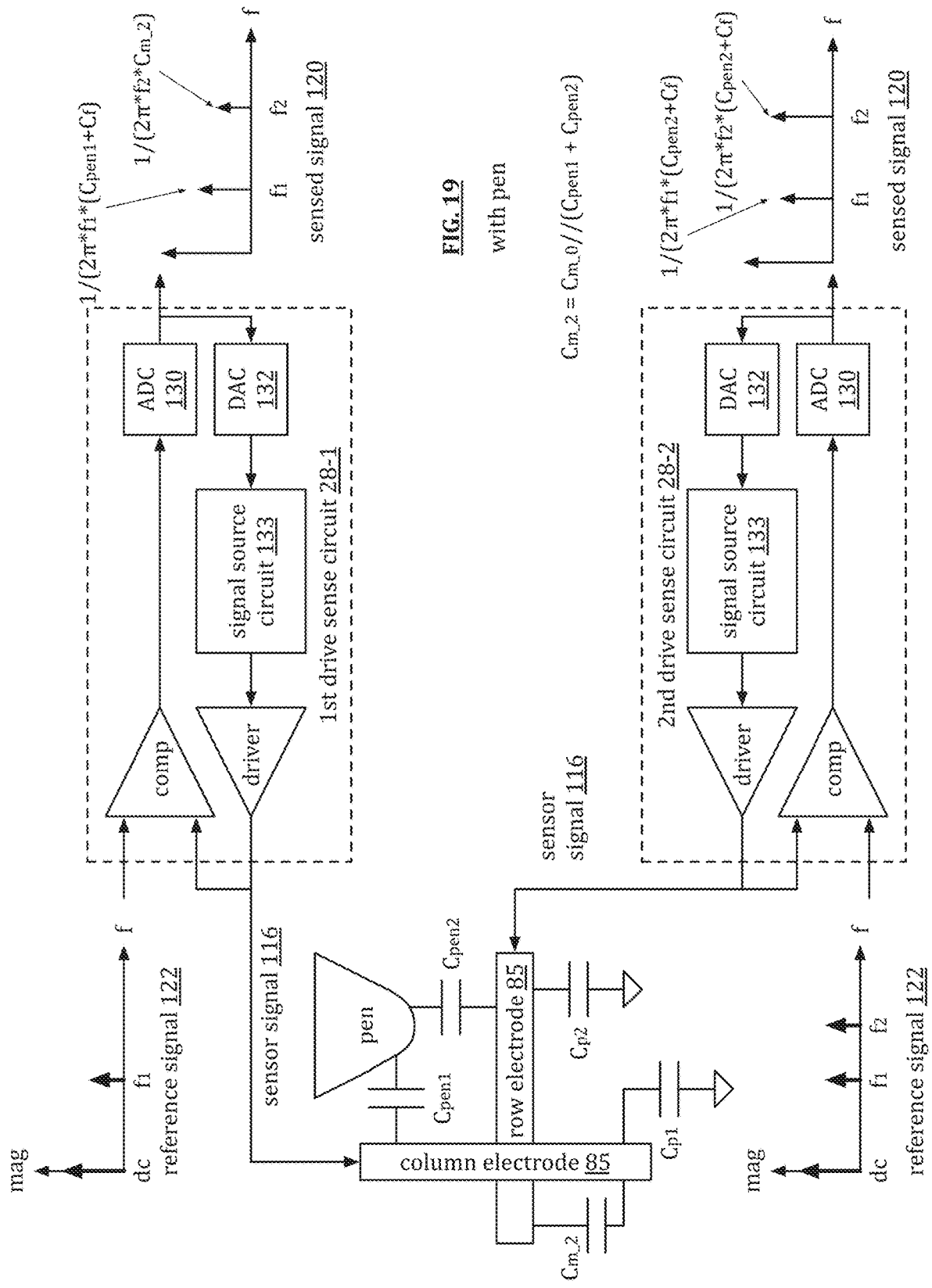
FIG. 19 is a schematic block diagram of an example of a first drive sense circuit coupled to a first electrode and a second drive sense circuit coupled to a second electrode with a pen touch proximal to the electrodes.

FIG. 19 is a schematic block diagram of an example of a first drive sense circuit 28-1 coupled to a first electrode 85-c and a second drive sense circuit 28-2 coupled to a second electrode 85-r with a pen touch proximal to the electrodes. This example is similar to the one of FIG. 17 with the difference being a pen touch proximal to the electrodes (e.g., a touch that shadows the intersection of the electrodes or is physically close to the intersection of the electrodes). With the pen touch, the self-capacitance and the mutual capacitance of the electrodes are changed based on the capacitance of the pen Cpen1 and $C_{pen2}$.

In this example, the impedance of the self-capacitance at f1 of the column electrode 85-c now includes the effect of the pen's capacitance. As such, the impedance of the self-capacitance of the column electrode equals $1/(2\pi f1*(Cp1+Cpen1))$, which is included the sensed signal 120-1. The second frequency component at f2 corresponds to the impedance of the mutual-capacitance at f2, which includes the effect of the pen capacitance. As such, the impedance of the mutual capacitance equals $1/(2\pi f2 Cm\_2)$, where $C_{m\_2}=(C_{m\_0})*C_{pen2})/(C_{m\_0}+C_{pen1})$.

Continuing with this example, the first frequency component at f1 of the second sensed signal 120-2 corresponds to the impedance of the shielded self-capacitance of the row electrode 85-r at f3, which is effected by the pen capacitance. As such, the impedance of the shielded self-capacitance of the row electrode 85-r equals $1/(2\pi f1*(Cp2+Cpen2))$. The second frequency component at f2 of the second sensed signal 120-2 corresponds to the impedance of the unshielded self-capacitance at f2, which includes the effect of the pen capacitance and is equal to $1/(2\pi f2*(Cp2+Cpen2))$. Note that the pen capacitance is represented as two capacitances, but may be one capacitance value or a plurality of distributed capacitance values.

Figure 20:
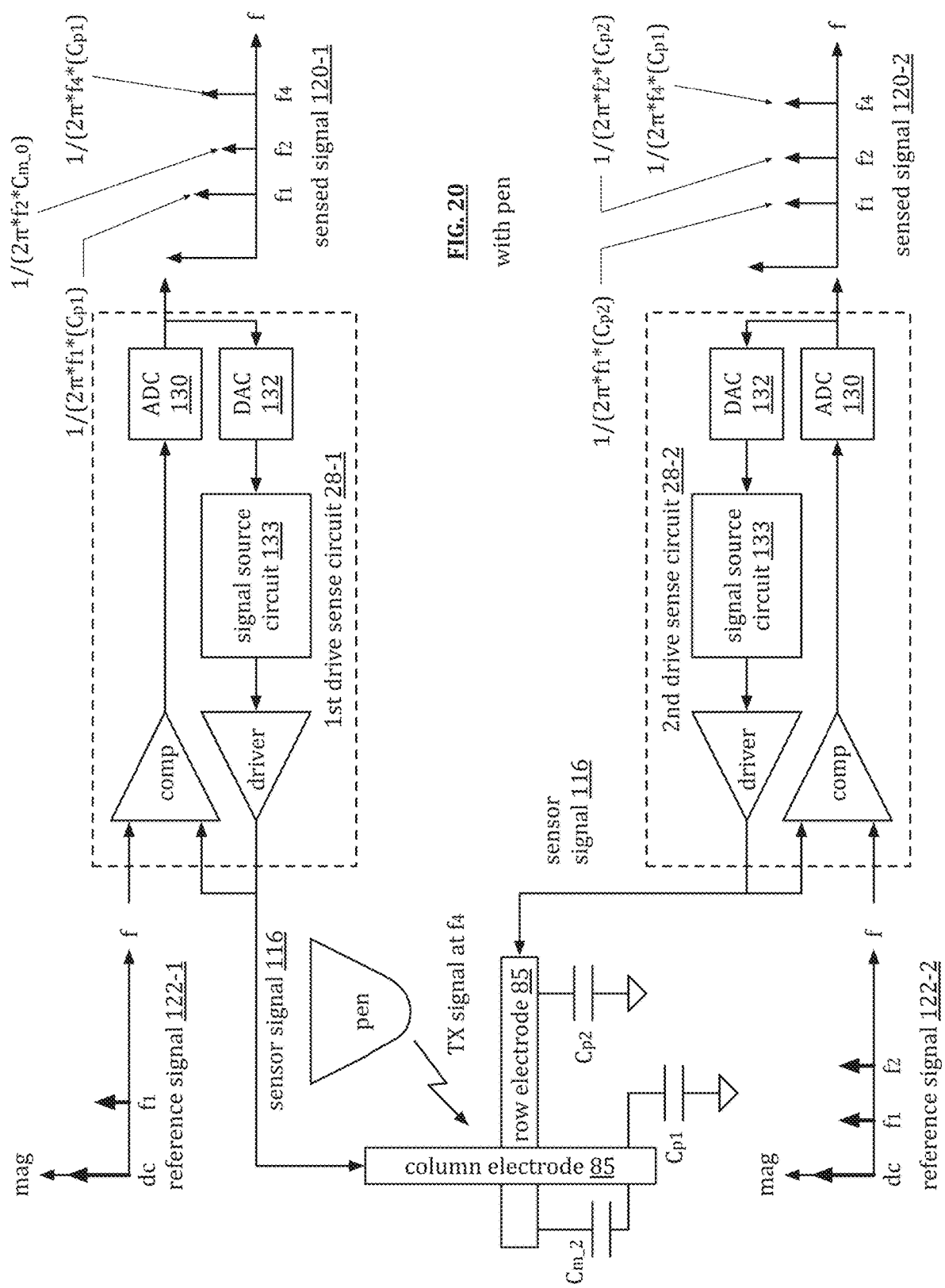
FIG. 20 is a schematic block diagram of another example of a first drive sense circuit coupled to a first electrode and a second drive sense circuit coupled to a second electrode with a pen touch proximal to the electrodes.

FIG. 20 is a schematic block diagram of an example of a first drive sense circuit 28-1 coupled to a first electrode 85-c and a second drive sense circuit 28-2 coupled to a second electrode 85-r with a pen proximal to the electrodes. Each of the drive sense circuits include a comparator, an analog to digital converter (ADC) 130, a digital to analog converter (DAC) 132, a signal source circuit 133, and a driver. The functionality of this embodiment of a drive sense circuit was described with reference to FIG. 8. The pen is operable to transmit a signal at a frequency of f4, which affects the self and mutual capacitances of the electrodes 85.

In this example, a first reference signal 122-1 is provided to the first drive sense circuit 28-1. The first reference signal includes a DC component and/or an oscillating component at frequency f1. The first oscillating component at f1 is used to sense impedance of the self-capacitance of the column electrode 85-c. The first drive sense circuit 28-1 generates a first sensed signal 120-1 that includes three frequency dependent components. The first frequency component at f1 corresponds to the impedance of the self-capacitance at f1, which equals $1/(2\pi f1 Cp1)$. The second frequency component at f2 corresponds to the impedance of the mutual-capacitance at f2, which equals $1/(2\pi f2C_{m\_0})$. The third frequency component at f4 corresponds to the signal transmitted by the pen.

Continuing with this example, a second reference signal 122-2 is provided to the second drive sense circuit 28-2. The second analog reference signal includes a DC component and/or two oscillating components; the first at frequency f1 and the second at frequency f2. The first oscillating component at f1 is used to sense impedance of the shielded self-capacitance of the row electrode 85-r and the second oscillating component at f2 is used to sense the unshielded self-capacitance of the row electrode 85-r. The second drive sense circuit 28-2 generates a second sensed signal 120-2 that includes three frequency dependent components. The first frequency component at f1 corresponds to the impedance of the shielded self-capacitance at f3, which equals $1/(2\pi f1Cp2)$. The second frequency component at f2 corresponds to the impedance of the unshielded self-capacitance at f2, which equals $1/(2\pi f2Cp2)$. The third frequency component at f4 corresponds to signal transmitted by the pen.

As a further example, the pen transmits a sinusoidal signal having a frequency of f4. When the pen is near the surface of the touch screen, electromagnetic properties of the signal increase the voltage on (or current in) the electrodes proximal to the touch of the pen. Since impedance is equal to voltage/current and as a specific example, when the voltage increases for a constant current, the impedance increases. As another specific example, when the current increases for a constant voltage, the impedance increases. The increase in impedance is detectable and is used as an indication of a touch.

Figure 21:
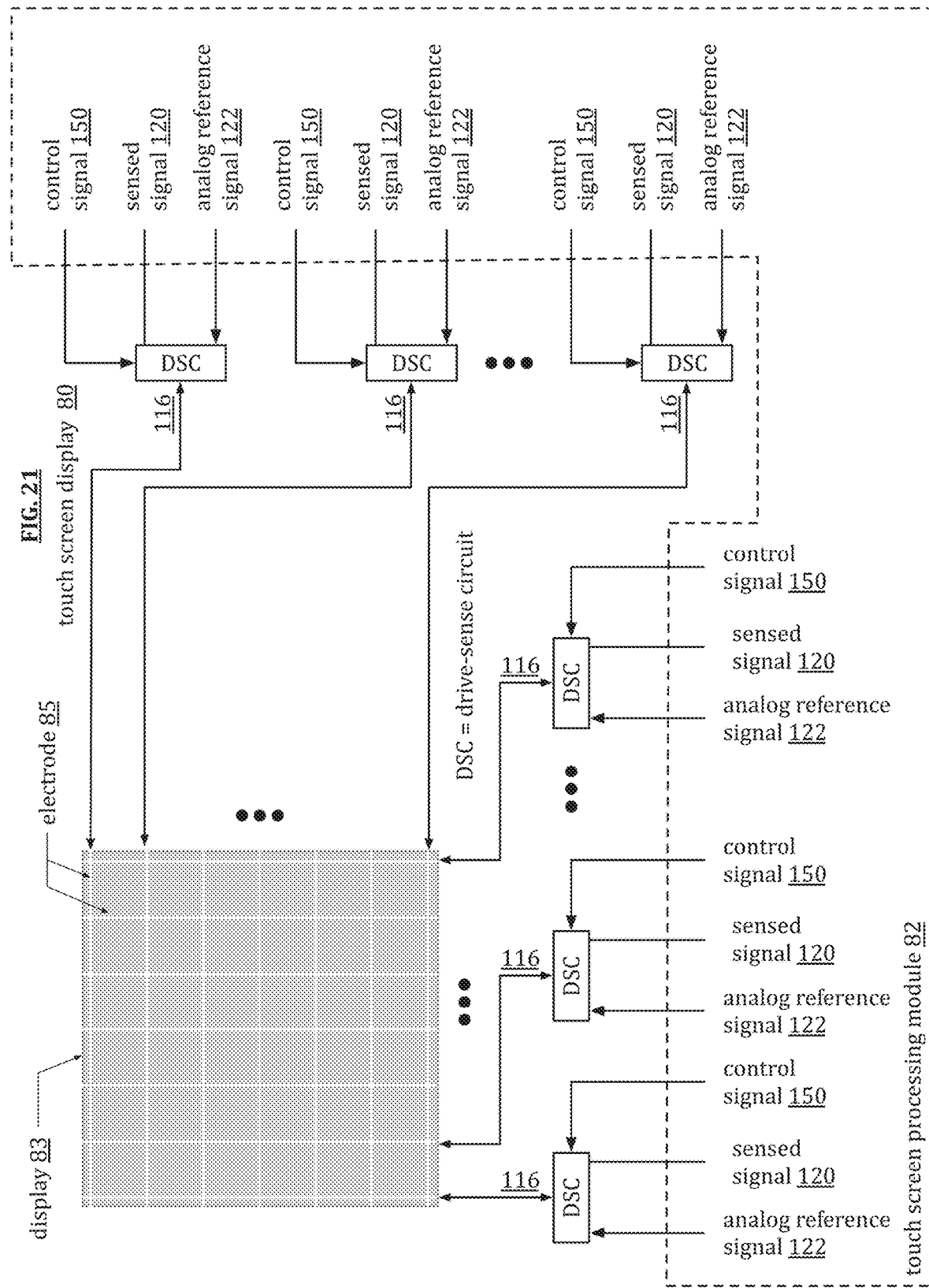
FIG. 21 is a schematic block diagram of another embodiment of a touch screen display.

FIG. 21 is a schematic block diagram of another embodiment of a touch screen display 80 that includes the display 83, the electrodes 85, a plurality of drive sense circuits (DSC), and the touch screen processing module 82, which function as previously discussed. In addition, the touch screen processing module 82 generates a plurality of control signals 150 to enable the drive-sense circuits (DSC) to monitor the sensor signals 120 on the electrodes 85. For example, the processing module 82 provides an individual control signal 150 to each of the drive sense circuits to individually enable or disable the drive sense circuits. In an embodiment, the control signal 150 closes a switch to provide power to the drive sense circuit. In another embodiment, the control signal 150 enables one or more components of the drive sense circuit.

The processing module 82 further provides analog reference signals 122 to the drive sense circuits. In an embodiment, each drive sense circuit receives a unique analog reference signal. In another embodiment, a first group of drive sense circuits receive a first analog reference signal and a second group of drive sense circuits receive a second analog reference signal. In yet another embodiment, the drive sense circuits receive the same analog reference signal. Note that the processing module 82 uses a combination of analog reference signals with control signals to ensure that different frequencies are used for oscillating components of the analog reference signal.

The drive sense circuits provide sensed signals 116 to the electrodes. The impedances of the electrodes affect the sensed signal, which the drive sense circuits sense via the received signal component and generate the sensed signal 120 therefrom. The sensed signals 120 are essentially representations of the impedances of the electrodes, which are provided to the touch screen processing module 82.

The processing module 82 interprets the sensed signals 122 (e.g., the representations of impedances of the electrodes) to detect a change in the impedance of one or more electrodes. For example, a finger touch increases the self-capacitance of an electrode, thereby decreasing its impedance at a given frequency. As another example, a finger touch decreases the mutual capacitance of an electrode, thereby increasing its impedance at a given frequency. The processing module 82 then interprets the change in the impedance of one or more electrodes to indicate one or more touches of the touch screen display 80.

Figure 22:
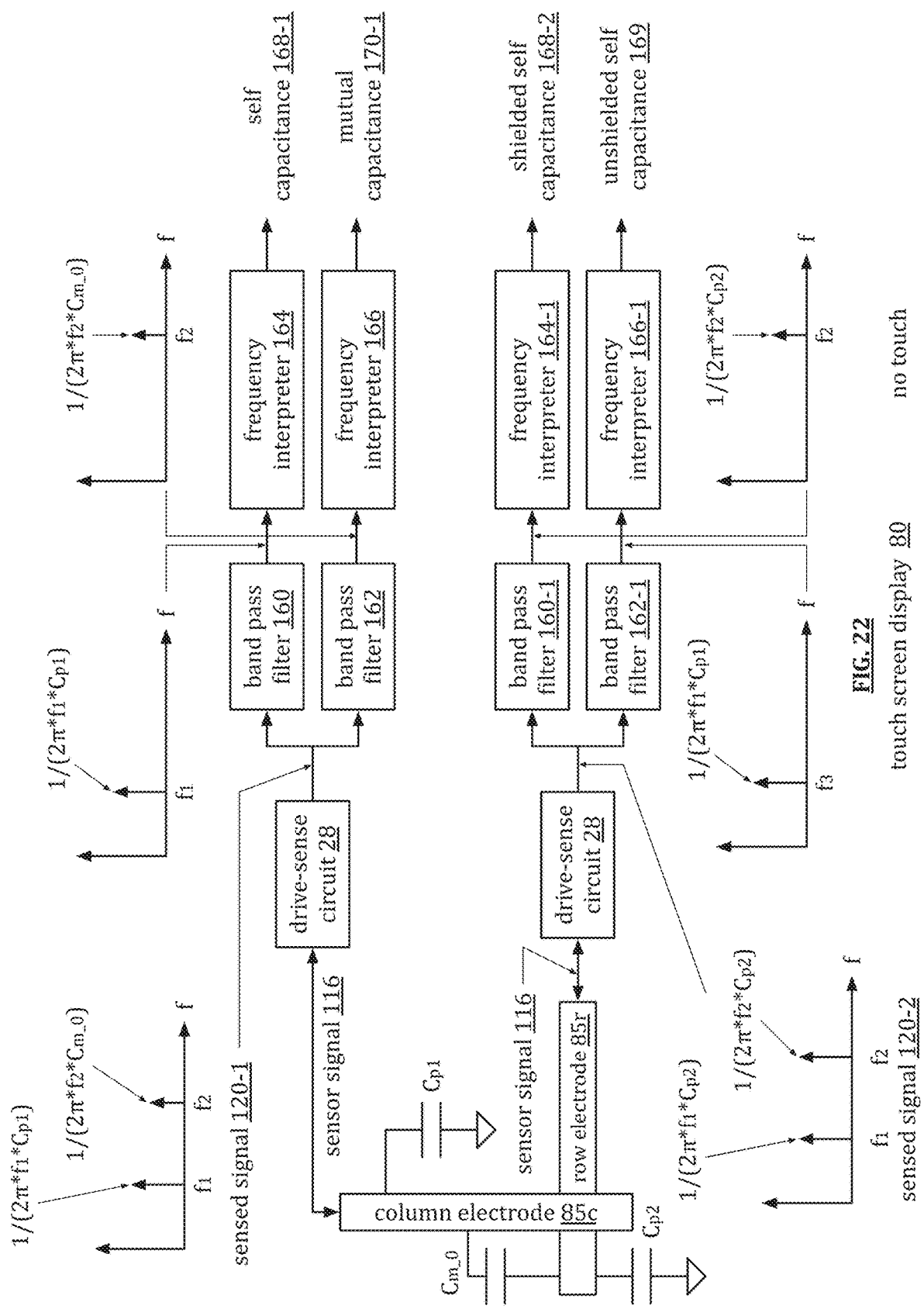
FIG. 22 is a schematic block diagram of a touchless example of a few drive sense circuits and a portion of the touch screen processing module of a touch screen display.

FIG. 22 is a schematic block diagram of a touchless example of a few drive sense circuits 28 and a portion of the touch screen processing module 82 of a touch screen display 80. The portion of the processing module 82 includes band pass filters 160, 162, 160-1, & 160-2, self-frequency interpreters 164 & 164-1, and 166 & 166-1. As previously discussed, a first drive sense circuit is coupled to column electrode 85c and a second drive sense circuit is coupled to a row electrode 85r.

The drive sense circuits provide sensor signals 116 to their respective electrodes 85 and produce therefrom respective sensed signals 120. The first sensed signal 120-1 includes a first frequency component at $f_1$ that corresponds to the self-capacitance of the column electrode 85c and a second frequency component at $f_2$ that corresponds to the mutual capacitance of the column electrode 85c. The second sensed signal 120-2 includes a first frequency component at $f_1$ that corresponds to the shielded self-capacitance of the row electrode 85r and/or a second frequency component at $f_2$ that corresponds to the unshielded self-capacitance of the row electrode 85r. In an embodiment, the sensed signals 120 are frequency domain digital signals.

The first bandpass filter 160 passes (i.e., substantially unattenuated) signals in a bandpass region (e.g., tens of Hertz to hundreds of thousands of Hertz, or more) centered about frequency $f_1$ and attenuates signals outside of the bandpass region. As such, the first bandpass filter 160 passes the portion of the sensed signal 120-1 that corresponds to the self-capacitance of the column electrode 85c. In an embodiment, the sensed signal 116 is a digital signal, thus, the first bandpass filter 160 is a digital filter such as a cascaded integrated comb (CIC) filter, a finite impulse response (FIR) filter, an infinite impulse response (IIR) filter, a Butterworth filter, a Chebyshev filter, an elliptic filter, etc.

The frequency interpreter 164 receives the first bandpass filter sensed signal and interprets it to render a self-capacitance value 168-1 for the column electrode. As an example, the frequency interpreter 164 is a processing module, or portion thereof, that executes a function to convert the first bandpass filter sensed signal into the self-capacitance value 168-1, which is an actual capacitance value, a relative capacitance value (e.g., in a range of 0-100), or a difference capacitance value (e.g., is the difference between a default capacitance value and a sensed capacitance value). As another example, the frequency interpreter 164 is a look up table where the first bandpass filter sensed signal is an index for the table.

The second bandpass filter 162 passes, substantially unattenuated, signals in a second bandpass region (e.g., tens of Hertz to hundreds of thousands of Hertz, or more) centered about frequency $f_2$ and attenuates signals outside of the bandpass region. As such, the second bandpass filter 160 passes the portion of the sensed signal 120-1 that corresponds to the mutual-capacitance of the column electrode 85c and the row electrode 85r. In an embodiment, the sensed signal 116 is a digital signal, thus, the second bandpass filter 162 is a digital filter such as a cascaded integrated comb (CIC) filter, a finite impulse response (FIR) filter, an infinite impulse response (IIR) filter, a Butterworth filter, a Chebyshev filter, an elliptic filter, etc.

The frequency interpreter 166 receives the second bandpass filter sensed signal and interprets it to render a mutual-capacitance value 170-1. As an example, the frequency interpreter 166 is a processing module, or portion thereof, that executes a function to convert the second bandpass filter sensed signal into the mutual-capacitance value 170-1, which is an actual capacitance value, a relative capacitance value (e.g., in a range of 0-100), and/or a difference capacitance value (e.g., is the difference between a default capacitance value and a sensed capacitance value). As another example, the frequency interpreter 166 is a look up table where the first bandpass filter sensed signal is an index for the table.

For the row electrode 85r, the drive-sense circuit 28 produces a second sensed signal 120-2, which includes a shielded self-capacitance component and/or an unshielded self-capacitance component. The third bandpass filter 160-1 is similar to the first bandpass filter 160 and, as such passes signals in a bandpass region centered about frequency f1 and attenuates signals outside of the bandpass region. In this example, the third bandpass filter 160-1 passes the portion of the second sensed signal 120-2 that corresponds to the shielded self-capacitance of the row electrode 85r.

The frequency interpreter 164-1 receives the second bandpass filter sensed signal and interprets it to render a second and shielded self-capacitance value 168-2 for the row electrode. The frequency interpreter 164-1 may be implemented similarly to the first frequency interpreter 164 or an integrated portion thereof. In an embodiment, the second self-capacitance value 168-2 is an actual capacitance value, a relative capacitance value (e.g., in a range of 0-100), or a difference capacitance value (e.g., is the difference between a default capacitance value and a sensed capacitance value).

The fourth bandpass filter 162-2, if included, is similar to the second bandpass filter 162. As such, it passes, substantially unattenuated, signals in a bandpass region centered about frequency $f_2$ and attenuates signals outside of the bandpass region. In this example, the fourth bandpass filter 162-2 passes the portion of the second sensed signal 120-2 that corresponds to the unshielded self-capacitance of the row electrode 85r.

The frequency interpreter 166-1, if included, receives the fourth bandpass filter sensed signal, and interprets it to render an unshielded self-capacitance value 168-2. The frequency interpreter 166-1 may be implemented similarly to the first frequency interpreter 166 or an integrated portion thereof. In an embodiment, the unshielded self-capacitance value 170-2 is an actual capacitance value, a relative capacitance value (e.g., in a range of 0-100), or a difference capacitance value (e.g., is the difference between a default capacitance value and a sensed capacitance value). Note that the unshielded self-capacitance may be ignored, thus band pass filter 162-1 and frequency interpreter 166-1 may be omitted.

FIG. 23 is a schematic block diagram of a finger touch example of a few drive sense circuits and a portion of the touch screen processing module of a touch screen display that is similar to FIG. 22, with the difference being a finger touch as represented by the finger capacitance Cf. In this example, the self-capacitance and mutual capacitance of each electrode is effected by the finger capacitance.

The effected self-capacitance of the column electrode 85c is processed by the first bandpass filter 160 and the frequency interpreter 164 to produce a self-capacitance value 168-1a. The mutual capacitance of the column electrode 85c and row electrode is processed by the second bandpass filter 162 and the frequency interpreter 166 to produce a mutual-capacitance value 170-1a.

The effected shielded self-capacitance of the row electrode 85r is processed by the third bandpass filter 160-1 and the frequency interpreter 164-1 to produce a self-capacitance value 168-2a. The effected unshielded self-capacitance of the row electrode 85r is processed by the fourth bandpass filter 162-1 and the frequency interpreter 166-1 to produce an unshielded self-capacitance value 170-2a.

FIG. 24 is a schematic block diagram of a pen touch example of a few drive sense circuits and a portion of the touch screen processing module of a touch screen display that is similar to FIG. 22, with the difference being a pen touch as represented by the pen capacitance $C_{pen}$. In this example, the self-capacitance and mutual capacitance of each electrode is effected by the pen capacitance.

The effected self-capacitance of the column electrode 85c is processed by the first bandpass filter 160 and the frequency interpreter 164 to produce a self-capacitance value 168-1a. The effected mutual capacitance of the column electrode 85c and row electrode 85r is processed by the second bandpass filter 162 and the frequency interpreter 166 to produce a mutual-capacitance value 170-1a.

The effected shielded self-capacitance of the row electrode 85r is processed by the third bandpass filter 160-1 and the frequency interpreter 164-1 to produce a shielded self-capacitance value 168-2a. The effected unshielded self-capacitance of the row electrode 85r is processed by the fourth bandpass filter 162-1 and the frequency interpreter 166-1 to produce an unshielded self-capacitance value 170-2a.

Figure 25:
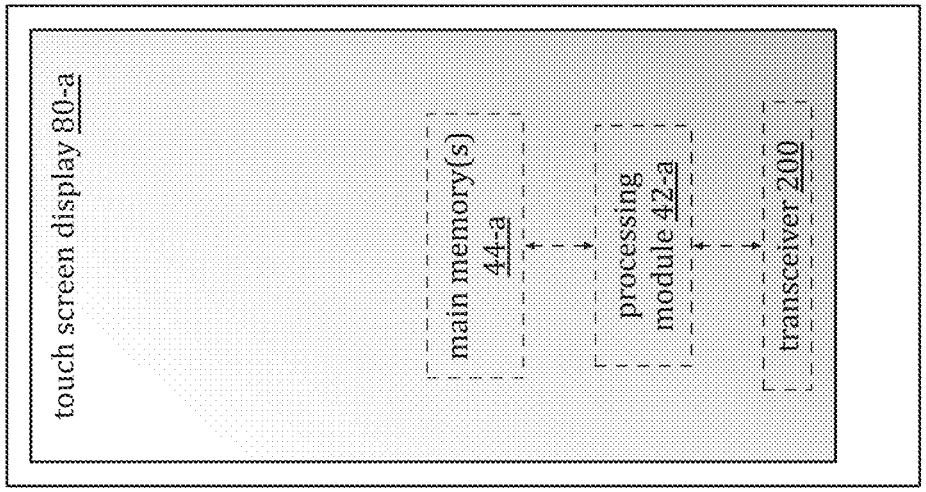
FIG. 25 is a schematic block diagram of an embodiment of a computing device having touch screen display.

FIG. 25 is a schematic block diagram of an embodiment of a computing device 14-a having touch screen display 80-a. The computing device 14-a is a cell phone, a personal video device, a tablet, or the like and the touch screen display has a screen size that is equal to or less than 15 inches. The computing device 14-a includes a processing module 42-a, main memory 44-a, and a transceiver 200. An embodiment of the transceiver 200 will be discussed with reference to FIG. 27. The processing module 42-a and the main memory 44-a are similar to the processing module 42 and the main memory 44 of the computing device 14 of FIG. 2.

Figure 26:
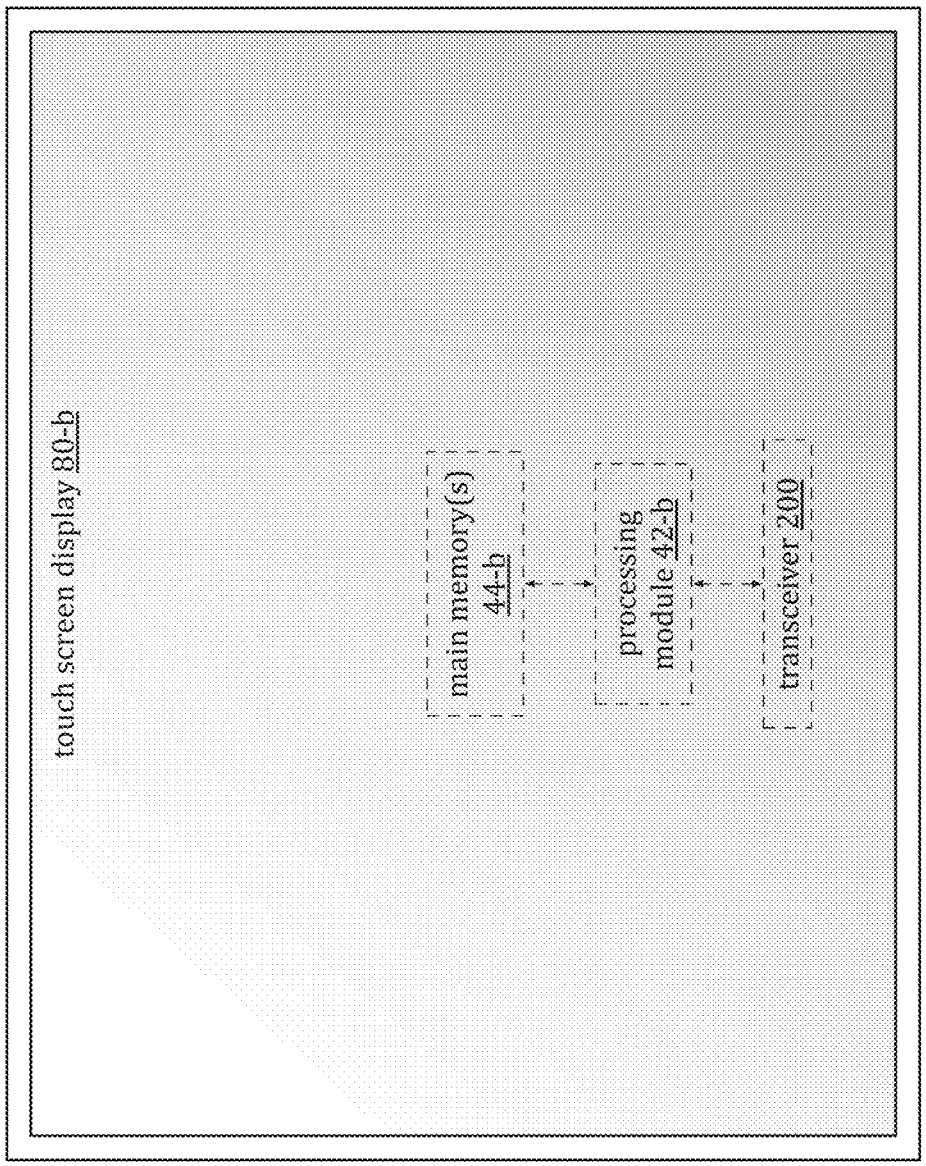
FIG. 26 is a schematic block diagram of another embodiment of a computing device having touch screen display.

FIG. 26 is a schematic block diagram of another embodiment of a computing device 14-b having touch screen display 80-b. The computing device 14-b is a computer, an interactive display, a large tablet, or the like and the touch screen display 80-b has a screen size that is greater than 15 inches. The computing device 14-b includes a processing module 42-b, main memory 44-b, and a transceiver 200. An embodiment of the transceiver 200 will be discussed with reference to FIG. 27. The processing module 42-b and the main memory 44-b are similar to the processing module 42 and the main memory 44 of the computing device 14 of FIG. 2.

Figure 27:
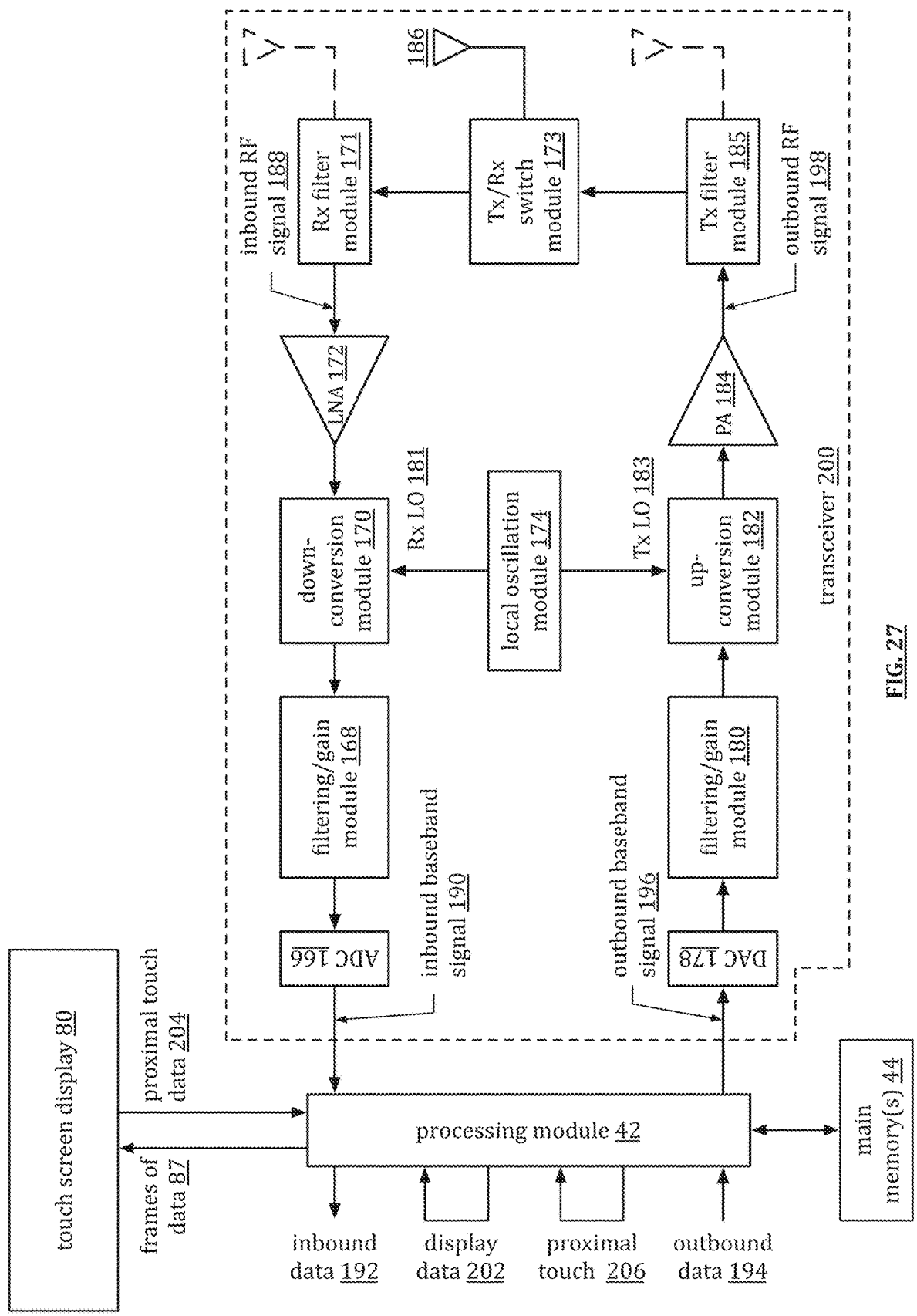
FIG. 27 is a schematic block diagram of another embodiment of a computing device having touch screen display.

FIG. 27 is a schematic block diagram of another embodiment of a computing device 14-a and/or 14-b that includes the processing module 42 (e.g., a and/or b), the main memory 44 (e.g., a and/or b), the touch screen display 80 (e.g., a and/or b), and the transceiver 200. The transceiver 200 includes a transmit/receive switch module 173, a receive filter module 171, a low noise amplifier (LNA) 172, a down conversion module 170, a filter/gain module 168, an analog to digital converter (ADC) 166, a digital to analog converter (DAC) 178, a filter/gain module 170, an up-conversion module 182, a power amplifier (PA) 184, a transmit filter module 185, one or more antennas 186, and a local oscillation module 174. In an alternate embodiment, the transceiver 200 includes a transmit antenna and a receiver antenna (as shown using dashed lines) and omit the common antenna 186 and the transmit/receive (Tx/Rx) switch module 173.

In an example of operation using the common antenna 186, the antenna receives an inbound radio frequency (RF) signal, which is routed to the receive filter module 171 via the Tx/Rx switch module 173 (e.g., a balun, a cross-coupling circuit, etc.). The receive filter module 171 is a bandpass or low pass filter that passes the inbound RF signal to the LNA 172, which amplifies it.

The down conversion module 170 converts the amplified inbound RF signal into a first inbound symbol stream corresponding to a first signal component (e.g., RX 1adj) and into a second inbound symbol stream corresponding to the second signal component (e.g., RX 2adj). In an embodiment, the down conversion module 170 mixes in-phase (I) and quadrature (Q) components of the amplified inbound RF signal (e.g., amplified RX 1adj and RX 2adj) with in-phase and quadrature components of receiver local oscillation 181 to produce a mixed I signal and a mixed Q signal for each component of the amplified inbound RF signal. Each pair of the mixed I and Q signals are combined to produce the first and second inbound symbol streams. In this embodiment, each of the first and second inbound symbol streams includes phase information (e.g., $+/-\Delta\theta$ [phase shift] and/or $\theta(t)$ [phase modulation]) and/or frequency information (e.g., $+/-\Delta f$ [frequency shift] and/or $f(t)$ [frequency modulation]). In another embodiment and/or in furtherance of the preceding embodiment, the inbound RF signal includes amplitude information (e.g., $+/-\Delta A$ [amplitude shift] and/or $A(t)$ [amplitude modulation]).

The filter/gain module 168 filters the down-converted inbound signal, which is then converted into a digital inbound baseband signal 190 by the ADC 166. The processing module 42 converts the inbound symbol stream(s) into inbound data 192 (e.g., voice, text, audio, video, graphics, etc.) in accordance with one or more wireless communication standards (e.g., GSM, CDMA, WCDMA, HSUPA, HSDPA, WiMAX, EDGE, GPRS, IEEE 802.11. Bluetooth, ZigBee, universal mobile telecommunications system (UMTS), long term evolution (LTE). IEEE 802.16, evolution data optimized (EV-DO), etc.). Such a conversion may include one or more of: digital intermediate frequency to baseband conversion, time to frequency domain conversion, space-time-block decoding, space-frequency-block decoding, demodulation, frequency spread decoding, frequency hopping decoding, beamforming decoding, constellation demapping, deinterleaving, decoding, depuncturing, and/or descrambling. Note that the processing module converts a single inbound symbol stream into the inbound data for Single Input Single Output (SISO) communications and/or for Multiple Input Single Output (MISO) communications and converts the multiple inbound symbol streams into the inbound data for Single Input Multiple Output (SIMO) and Multiple Input Multiple Output (MIMO) communications.

In an example, the inbound data 192 includes display data 202. For example, the inbound RF signal 188 includes streaming video over a wireless link. As such, the inbound data 192 includes the frames of data 87 of the video file, which the processing module 42 provides to the touch screen display 80 for display. The processing module 42 further processes proximal touch data 204 (e.g., finger or pen touches) of the touch screen display 80. For example, a touch corresponds to a command that is to be wirelessly sent to the content provider of the streaming wireless video.

In this example, the processing module interprets the proximal touch data 204 to generate a command (e.g., pause, stop, etc.) regarding the streaming video. The processing module processes the command as outbound data 194 e.g., voice, text, audio, video, graphics, etc.) by converting it into one or more outbound symbol streams (e.g., outbound baseband signal 196) in accordance with one or more wireless communication standards (e.g., GSM, CDMA, WCDMA, HSUPA, HSDPA, WiMAX, EDGE, GPRS, IEEE 802.11. Bluetooth, ZigBee, universal mobile telecommunications system (UMTS), long term evolution (LTE), IEEE 802.16, evolution data optimized (EV-DO), etc.). Such a conversion includes one or more of: scrambling, puncturing, encoding, interleaving, constellation mapping, modulation, frequency spreading, frequency hopping, beamforming, space-time-block encoding, space-frequency-block encoding, frequency to time domain conversion, and/or digital baseband to intermediate frequency conversion. Note that the processing module converts the outbound data into a single outbound symbol stream for Single Input Single Output (SISO) communications and/or for Multiple Input Single Output (MISO) communications and converts the outbound data into multiple outbound symbol streams for Single Input Multiple Output (SIMO) and Multiple Input Multiple Output (MIMO) communications.

The DAC 178 converts the outbound baseband signal 196 into an analog signal, which is filtered by the filter/gain module 180. The up-conversion module 182 mixes the filtered analog outbound baseband signal with a transmit local oscillation 183 to produce an up-converted signal. This may be done in a variety of ways. In an embodiment, in-phase and quadrature components of the outbound baseband signal are mixed with in-phase and quadrature components of the transmit local oscillation to produce the up-converted signal. In another embodiment, the outbound baseband signal provides phase information (e.g., $+/-\Delta\theta$ [phase shift] and/or $\theta(t)$ [phase modulation]) that adjusts the phase of the transmit local oscillation to produce a phase adjusted up-converted signal. In this embodiment, the phase adjusted up-converted signal provides the up-converted signal. In another embodiment, the outbound baseband signal further includes amplitude information (e.g., $A(t)$ [amplitude modulation]), which is used to adjust the amplitude of the phase adjusted up converted signal to produce the up-converted signal. In yet another embodiment, the outbound baseband signal provides frequency information (e.g., $+/-\Delta f$ [frequency shift] and/or $f(t)$ [frequency modulation]) that adjusts the frequency of the transmit local oscillation to produce a frequency adjusted up-converted signal. In this embodiment, the frequency adjusted up-converted signal provides the up-converted signal. In another embodiment, the outbound baseband signal further includes amplitude information, which is used to adjust the amplitude of the frequency adjusted up-converted signal to produce the up-converted signal. In a further embodiment, the outbound baseband signal provides amplitude information (e.g., $+/-\Delta A$ [amplitude shift] and/or $A(t)$ [amplitude modulation]) that adjusts the amplitude of the transmit local oscillation to produce the up-converted signal.

The power amplifier 184 amplifies the up-converted signal to produce an outbound RF signal 198. The transmit filter module 185 filters the outbound RF signal 198 and provides the filtered outbound RF signal to the antenna 186 for transmission, via the transmit/receive switch module 173.

Note that processing module may produce the display data from the inbound data, the outbound data, application data, and/or system data.

Figure 28:
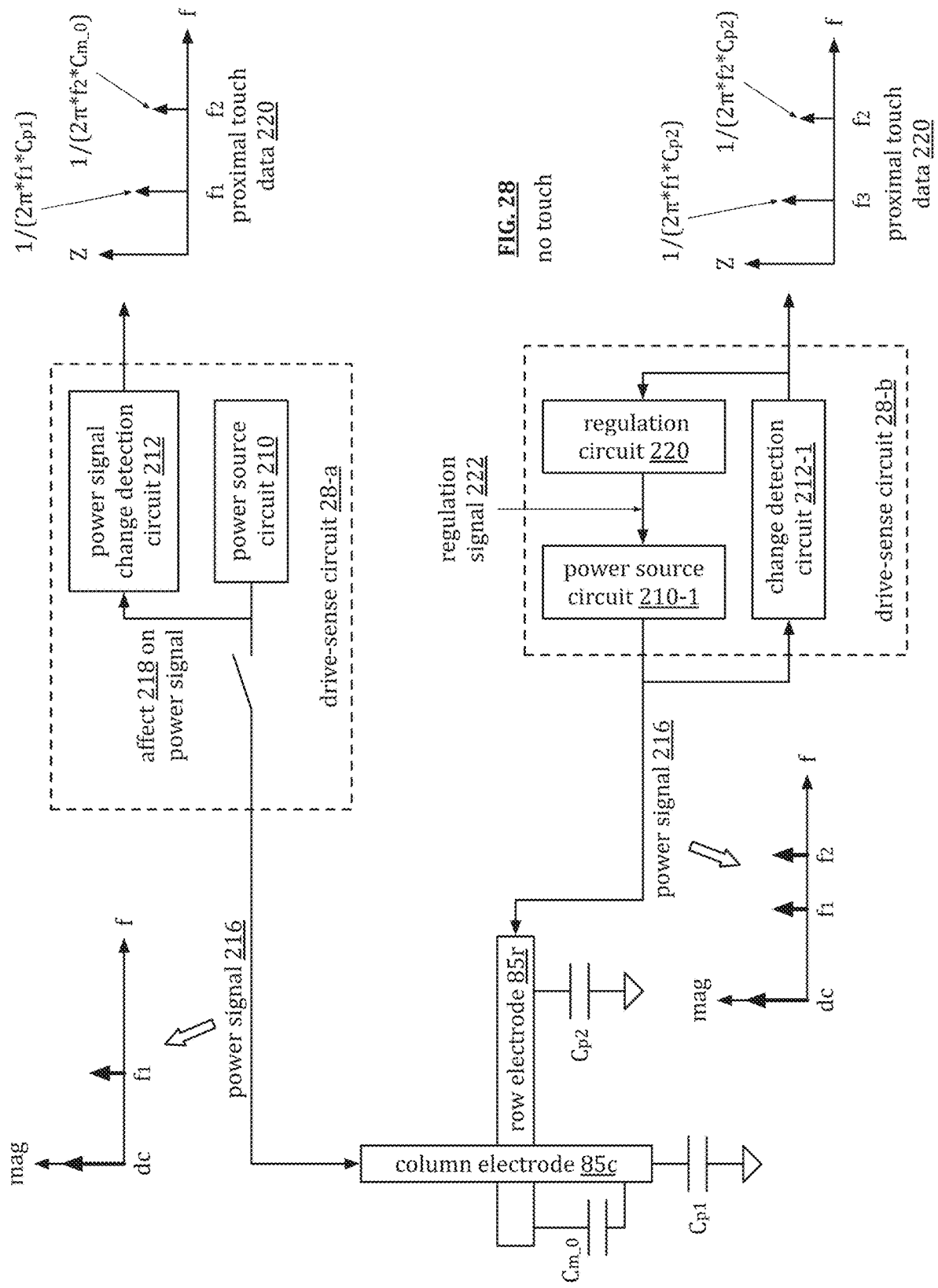
FIG. 28 is a schematic block diagram of another example of a first drive sense circuit coupled to a first electrode and a second drive sense circuit coupled to a second electrode without a touch proximal to the electrodes.

FIG. 28 is a schematic block diagram of another example of a first drive sense circuit 28-*a* coupled to a column electrode 85*c* and a second drive sense circuit 28-*b* coupled to a row electrode 85*r* without a touch proximal to the electrodes. The first drive sense circuit 28-*a* includes a power source circuit 210 and a power signal change detection circuit 212. The second drive sense circuit 28-*b* includes a power source circuit 210-1, a power signal change detection circuit 212-1, and a regulation circuit 220.

The power source circuit 210 of the first drive sense circuit 28-*a* is operably coupled to the column electrode 85*c* and, when enabled (e.g., from a control signal from the processing module 42, power is applied, a switch is closed, a reference signal is received, etc.) provides a power signal 216 to the column electrode 85*c*. The power source circuit 210 may be a voltage supply circuit (e.g., a battery, a linear regulator, an unregulated DC-to-DC converter, etc.) to produce a voltage-based power signal, a current supply circuit (e.g., a current source circuit, a current mirror circuit, etc.) to produce a current-based power signal, or a circuit that provides a desired power level to the sensor and substantially matches impedance of the sensor. The power source circuit 110 generates the power signal 116 to include a DC (direct current) component and/or an oscillating component.

When receiving the power signal 216, the impedance of the electrode affects 218 the power signal. When the power signal change detection circuit 212 is enabled, it detects the affect 218 on the power signal as a result of the impedance of the electrode. For example, the power signal is a 1.5 voltage signal and, under a first condition, the sensor draws 1 milliamp of current, which corresponds to an impedance of 1.5 K Ohms. Under a second conditions, the power signal remains at 1.5 volts and the current increases to 1.5 milliamps. As such, from condition 1 to condition 2, the impedance of the electrode changed from 1.5 K Ohms to 1 K Ohms. The power signal change detection circuit 212 determines the change and generates a sensed signal, or proximal touch data 220 therefrom.

The power source circuit 210-1 of the second drive sense circuit 28-*b* is operably coupled to the row electrode 85*r* and, when enabled (e.g., from a control signal from the processing module 42, power is applied, a switch is closed, a reference signal is received, etc.) provides a power signal 216 to the electrode 85*r*. The power source circuit 210-1 may be implemented similarly to power source circuit 210 and generates the power signal 216 to include a DC (direct current) component and/or an oscillating component.

When receiving the power signal 216, the impedance of the row electrode 85*r* affects the power signal. When the change detection circuit 212-1 is enabled, it detects the affect on the power signal as a result of the impedance of the electrode 85*r*. The change detection circuit 210-1 is further operable to generate a sensed signal 120, or proximal touch data 220, that is representative of change to the power signal based on the detected effect on the power signal.

The regulation circuit 152, when its enabled, generates regulation signal 22 to regulate the DC component to a desired DC level and/or regulate the oscillating component to a desired oscillating level (e.g., magnitude, phase, and/or frequency) based on the sensed signal 120. The power source circuit 210-1 utilizes the regulation signal 222 to keep the power signal 216 at a desired setting regardless of the impedance changes of the electrode 85*r*. In this manner, the amount of regulation is indicative of the affect the impedance of the electrode has on the power signal.

In an example, the power source circuit 210-1 is a DC-DC converter operable to provide a regulated power signal 216 having DC and AC components. The change detection circuit 212-1 is a comparator and the regulation circuit 220 is a pulse width modulator to produce the regulation signal 222. The comparator compares the power signal 216, which is affected by the electrode, with a reference signal that includes DC and AC components. When the impedance is at a first level, the power signal is regulated to provide a voltage and current such that the power signal substantially resembles the reference signal.

When the impedance changes to a second level, the change detection circuit 212-1 detects a change in the DC and/or AC component of the power signal 216 and generates the sensed signal 120, which indicates the changes. The regulation circuit 220 detects the change in the sensed signal 120 and creates the regulation signal 222 to substantially remove the impedance change effect on the power signal 216. The regulation of the power signal 216 may be done by regulating the magnitude of the DC and/or AC components, by adjusting the frequency of AC component, and/or by adjusting the phase of the AC component.

Figure 29:
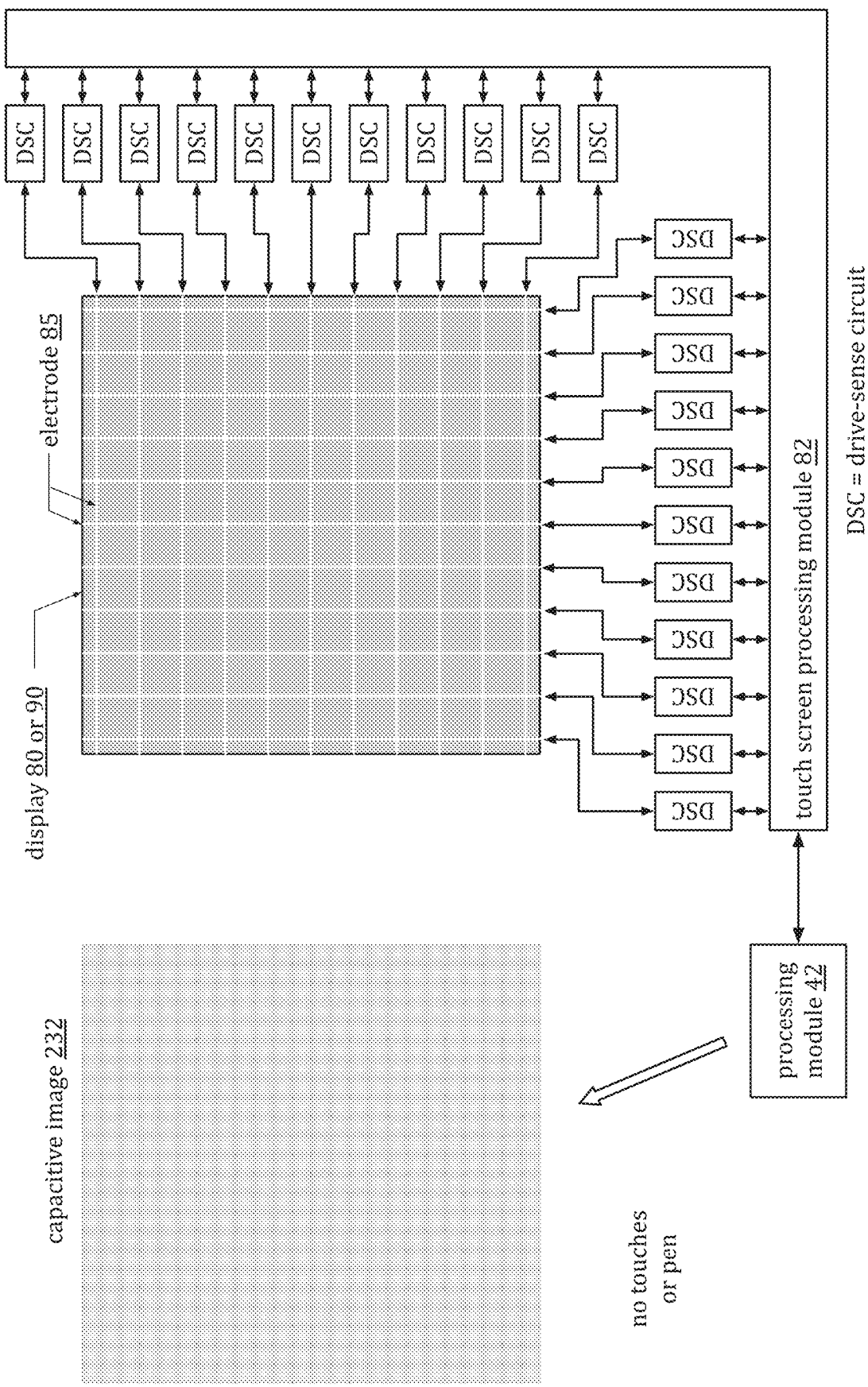
FIG. 29 is a schematic block diagram of an example of a computing device generating a capacitive image of a touch screen display.

FIG. 29 is a schematic block diagram of an example of a computing device 14 or 18 that includes the components of FIG. 2 and/or FIG. 3. Only the processing module 42, the touch screen processing module 82, the display 80 or 90, the electrodes 85, and the drive sense circuits (DSC) are shown.

In an example of operation, the touch screen processing module 82 receives sensed signals from the drive sense circuits and interprets them to identify a finger or pen touch. In this example, there are no touches. The touch screen processing module 82 provides touch data (which includes location of touches, if any, based on the row and column electrodes having an impedance change due to the touch(es)) to the processing module 42.

The processing module 42 processes the touch data to produce a capacitive image 232 of the display 80 or 90. In this example, there are no touches, so the capacitive image 232 is substantially uniform across the display. The refresh rate of the capacitive image ranges from a few frames of capacitive images per second to a hundred or more frames of capacitive images per second. Note that the capacitive image may be generated in a variety of ways. For example, the self-capacitance and/or mutual capacitance of each touch cell (e.g., intersection of a row electrode with a column electrode) is represented by a color. When the touch cells have substantially the same capacitance, their representative color will be substantially the same. As another example, the capacitance image is topological mapping of differences between the capacitances of the touch cells.

FIG. 30 is a schematic block diagram of another example of a computing device that is substantially similar to the example of FIG. 29 with the exception that the touch data includes two touches. As such, the touch data generated by the touch screen processing module 82 includes the location of two touches based on effected rows and columns. The processing module 42 processes the touch data to determine the x-y coordinates of the touches on the display 80 or 90 and generates the capacitive image, which includes the touches.

Figure 31:
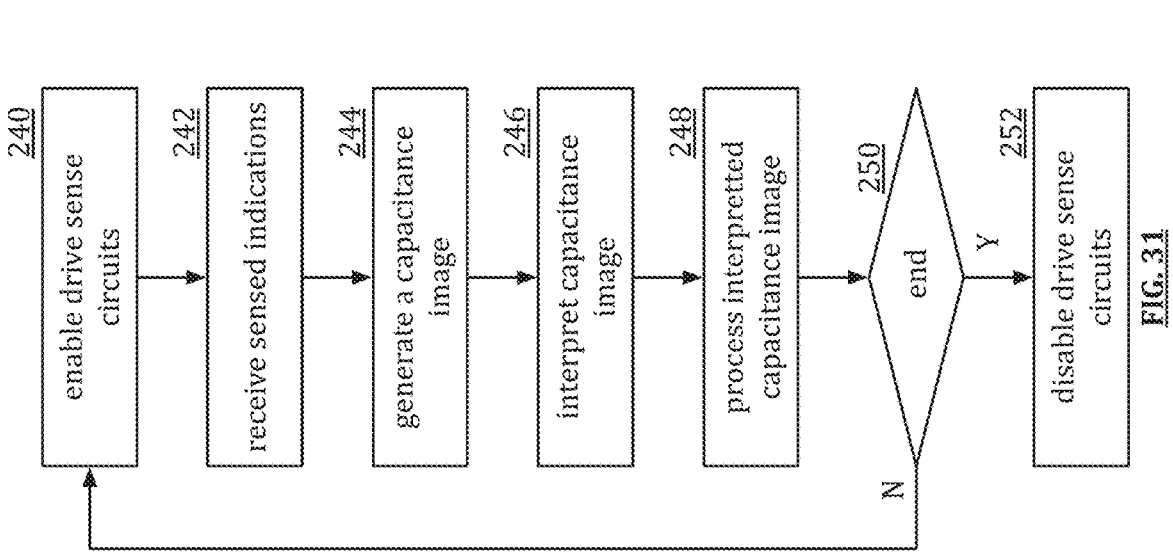
FIG. 31 is a logic diagram of an embodiment of a method for generating a capacitive image of a touch screen display.

FIG. 31 is a logic diagram of an embodiment of a method for generating a capacitive image of a touch screen display that is executed by the processing module 42 and/or 82. The method begins at step 240 where the processing module enables (for continuous or periodic operation) the drive-sense circuits to provide a sensor signals to the electrodes. For example, the processing module 42 and/or 82 provides a control signal to the drive sense circuits to enable them. The control signal allows power to be supplied to the drive sense circuits, to turn-on one or more of the components of the drive sense circuits, and/or close a switch coupling the drive sense circuits to their respective electrodes.

The method continues at step 242 where the processing module receives, from the drive-sense circuits, sensed indications regarding (self and/or mutual) capacitance of the electrodes. The method continues at step 244 where the processing module generates a capacitive image of the display based on the sensed indications. As part of step 244, the processing module stores the capacitive image in memory. The method continues at step 246 where the processing module interprets the capacitive image to identify one or more proximal touches (e.g., actual physical contact or near physical contact) of the touch screen display.

The method continues at step 248 where the processing module processes the interpreted capacitance image to determine an appropriate action. For example, if the touch(es) corresponds to a particular part of the screen, the appropriate action is a select operation. As another example, of the touches are in a sequence, then the appropriate action is to interpret the gesture and then determine the particular action.

The method continues at step 250 where the processing module determines whether to end the capacitance image generation and interpretation. If so, the method continues to step 252 where the processing module disables the drive sense circuits. If the capacitance image generation and interpretation is to continue, the method reverts to step 240.

Figure 32:
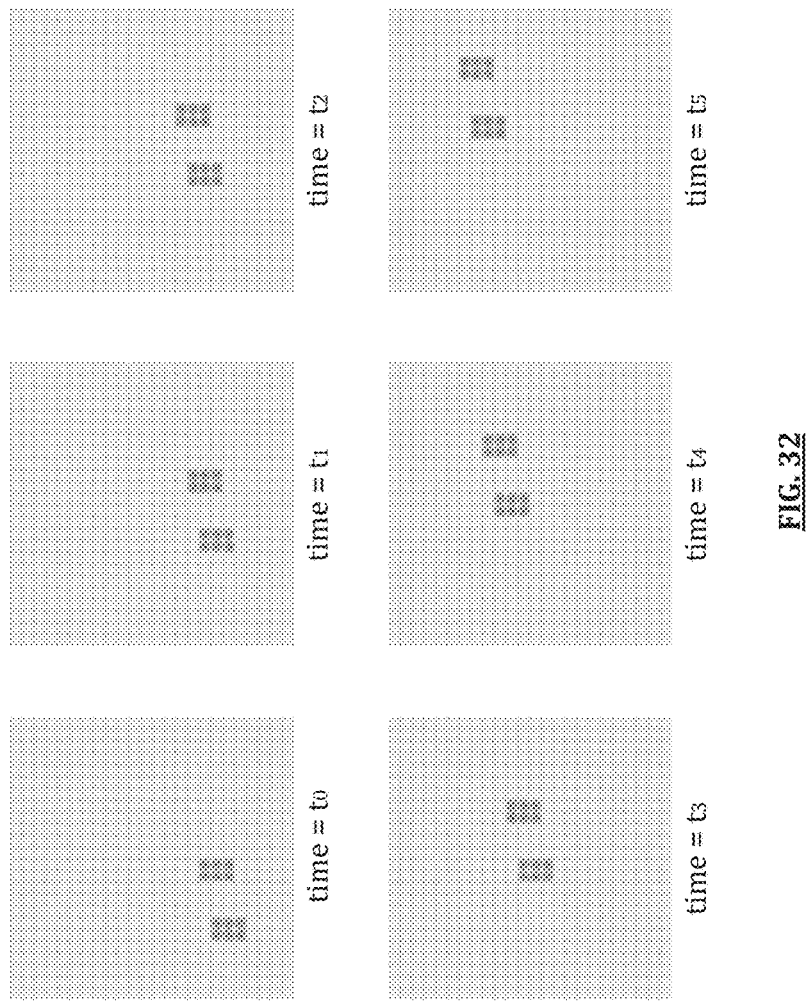
FIG. 32 is a schematic block diagram of an example of generating capacitive images over a time period.

FIG. 32 is a schematic block diagram of an example of generating capacitive images over a time period. In this example, two touches are detected at time to and move across and upwards through the display over times t1 through t5. The movement corresponds to a gesture or action. For instance, the action is dragging a window across and upwards through the display.

FIG. 33 is a logic diagram of an embodiment of a method for identifying desired and undesired touches using a capacitive image that is executed by processing module 42 and/or 82. The method starts are step 260 where the processing module detects one or more touches. The method continues at step 262 where the processing module determines the type of touch for each detected touch. For example, a desired touch is a finger touch or a pen touch. As a further example, an undesired touch is a water droplet, a side of a hand, and/or an object.

The method continues at step 264 where the processing module determines, for each touch, whether it is a desired or undesired touch. For example, a desired touch of a pen and/or a finger will have a known effect on the self-capacitance and mutual-capacitance of the effected electrodes. As another example, an undesired touch will have an effect on the self-capacitance and/or mutual-capacitance outside of the know effect of a finger and/or a pen. As another example, a finger touch will have a known and predictable shape, as will a pen touch. An undesired touch will have a shape that is different from the known and desired touches.

If the touch is desired, the method continues at step 266 where the processing module continues to monitor the desired touch. If the touch is undesired, the method continues at step 268 where the processing module ignores the undesired touch.

FIG. 34 is a schematic block diagram of an example of using capacitive images to identify desired and undesired touches. In this example, the desired pen touch 270 will be processed and the undesired hand touch 272 will be ignored.

FIG. 35 is a schematic block diagram of another example of using capacitive images to identify desired and undesired touches. In this example, the desired finger touch 276 will be processed and the undesired water touch 274 will be ignored. The undesired water touch 274 would not produce a change to the self-capacitance of the effected electrodes since the water does not have a path to ground and the same frequency component is used for self-capacitance for activated electrodes.

Figure 36:
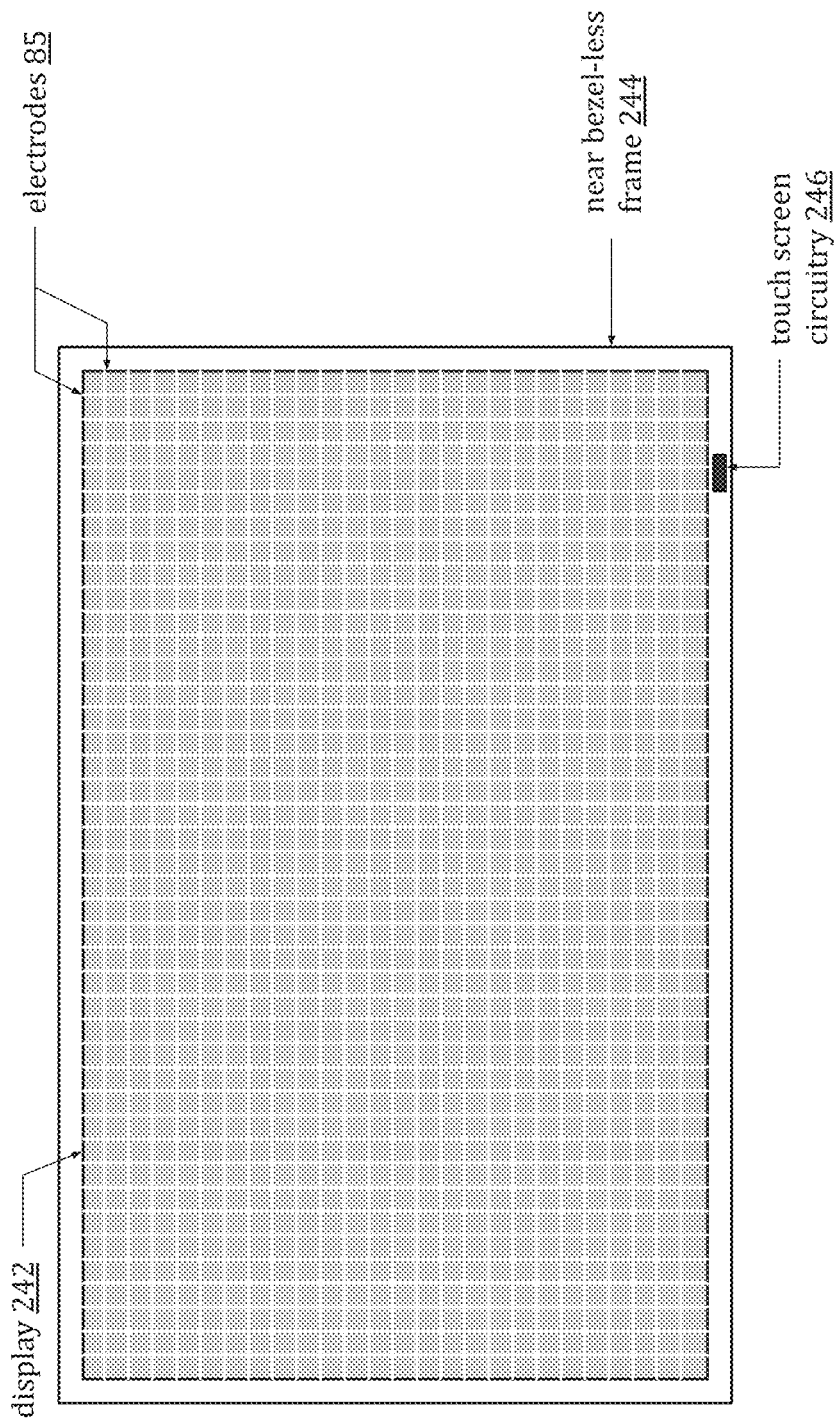
FIG. 36 is a schematic block diagram of an embodiment of a near bezel-less touch screen display.

FIG. 36 is a schematic block diagram of an embodiment of a near bezel-less touch screen display 240 that includes a display 242, a near bezel-less frame 244, touch screen circuit 246, and a plurality of electrodes 85. The touch screen display 240 is a large screen with a diagonal dimension of 32 inches or more. The near bezel-less frame 244 has a visible width with respect to the display of one inch or less. In an embodiment, the width of the near bezel-less frame 244 is ½ inch or less on two or more sides. The display 242 has properties in accordance with the table of paragraph 107.

An issue with a large display and very small bezel of the frame 244 is running leads to the electrodes 85 from the touch screen circuitry 246. The connecting leads, which are typically conventional wires, need to be located with the frame 244 or they will adversely effect the display. The larger the display, the more electrodes and the more leads that connect to them. To get the connecting leads to fit within the frame, they need to be tightly packed together (i.e., very little space between them). This creates two problems for conventional touch screen circuitry: (1) with conventional low voltage signaling to the electrodes (e.g., signals swinging from rail to rail of the power supply voltage, which is at least 1 volt and typically greater than 1.5), electromagnetic cross-coupling between the leads causing interference between the signal; and (2) the tight coupling of the leads increases the parasitic capacitance of each lead, which increases the power requirements. With conventional touch screen circuitry, the larger the screen, the more cross-coupling interference and more power is required. Because of these issues, display sizes for touch screen displays have been effectively limited to smaller display sizes (e.g., less than 32 inches).

With the touch screen circuitry 246 disclosed herein, effective, and efficient large touch screen displays can be practically realized. For instance, the touch screen circuitry 246 uses very low voltage signaling (e.g., 25-250 milli-volt RMS of the oscillating component of the sensor signal or power signal), which reduces power requirements and substantially reduces adverse effects of cross-coupling between the leads. For example, when the oscillating component is a sinusoidal signal at 25 milli-volt RMS and each electrode (or at least some of them) are driven by oscillating components of different frequencies, the cross-coupling is reduced and, what cross-coupled does exist, is easily filtered out. Continuing with the example, with a 25 milli-voltage signal and increased impedance of longer electrodes and tightly packed leads, the power requirement is dramatically reduced. As a specific example, for conventional touch screen circuitry operating with a power supply of 1.5 volts and the touch screen circuitry 246 operating with 25 milli-volt signaling, the power requirements are reduced by as much as 60 times.

Figure 40:
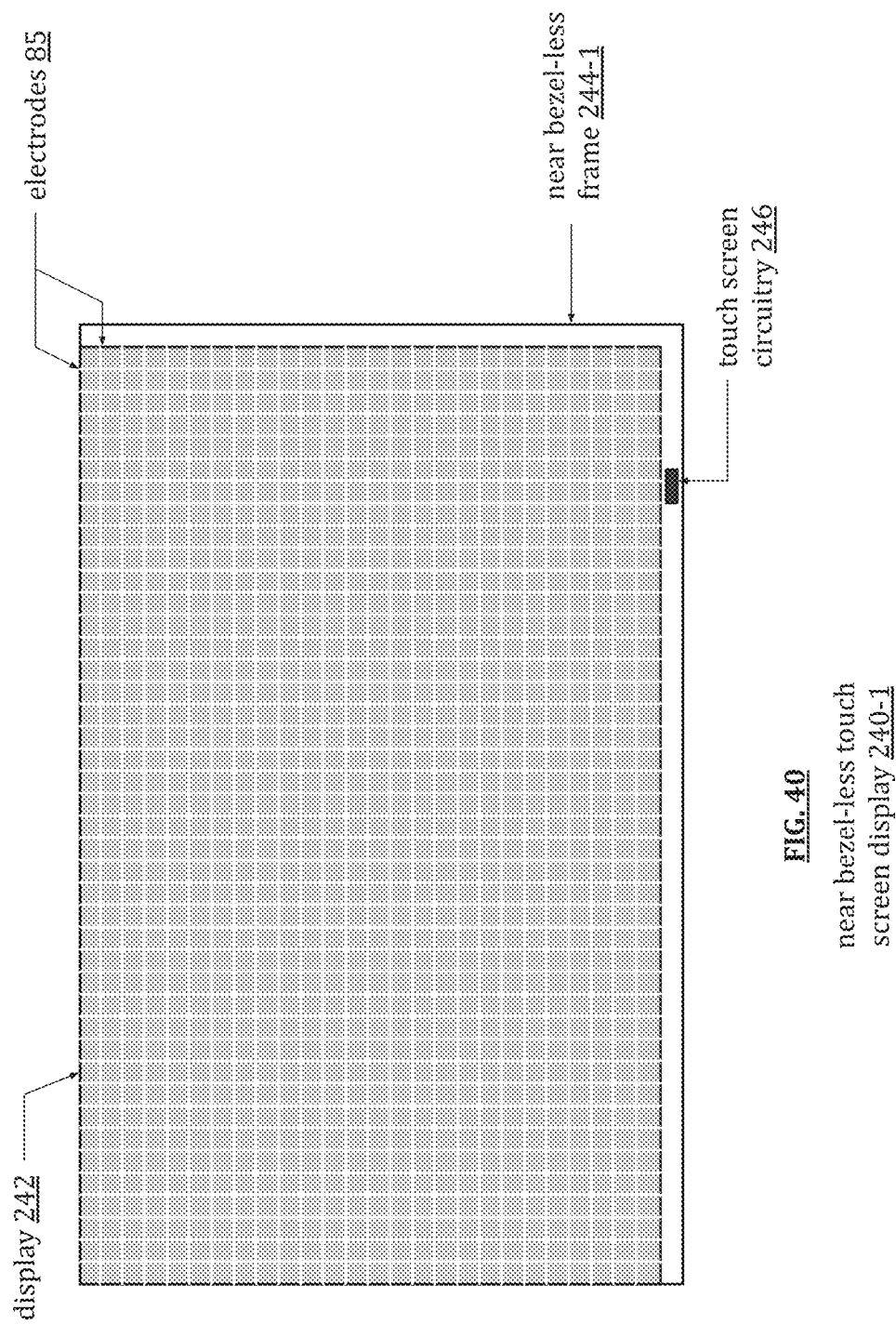
FIG. 40 is a schematic block diagram of another embodiment of a near bezel-less touch screen display.

In an embodiment, the near bezel-less touch screen display 240 includes the display 242, the near bezel-less frame 244, electrodes 85, and the touch screen circuitry 246, which includes drive sense circuits (DSC) and a processing module. The display 242 is operable to render frames of data into visible images. The near bezel-less frame 244 at least partially encircles the display 242. In this example, the frame 244 fully encircles the frame and the touch screen circuitry 246 is positioned in the bezel area to have about the same number of electrode connections on each side of it. In FIG. 40, as will be subsequently discussed, the frame 244 partially encircles the display 242.

The drive-sense circuits are coupled to the electrodes via connections, which are substantially within the near bezel-less frame. The connections include wires and connectors, which are achieved by welds, crimping, soldering, male-female connectors, etc. The drive-sense circuits are operable to provide and monitor sensor signals of the electrodes 85 to detect impedance and impedance changes of the electrodes. The processing module processes the impedances of the electrodes to determine one or more touches on the touch screen display 240.

In the present FIG. 36, the electrodes 85 are shown in a first arrangement (e.g., as rows) and a second arrangement (e.g., as columns). Other patterns for the electrodes may be used to detect touches to the screen. For example, the electrodes span only part of the way across the display and other electrodes span the remaining part of the display. As another example, the electrodes are patterned at an angle different than 90 degrees with respect to each other.

FIG. 37 is a schematic block diagram that further illustrates an embodiment of a near bezel-less touch screen display 242. As shown, the touch screen circuit 246 is coupled to the electrodes 85 via a plurality of connectors 248. The electrodes are arranged in rows and columns, are constructive of a transparent conductive material (e.g., ITO) and distributed throughout the display 242. The larger the touch screen display, the more electrodes are needed. For example, a touch screen display includes hundreds to hundreds of thousands, or more, of electrodes.

The connections 248 and the touch screen circuitry 246 are physically located with the near bezel-less frame 244. The more tightly packed the connectors, the thinner the bezel can be. A drive sense circuit of the touch screen circuitry 246 is coupled to an individual electrode 85. Thus, if there are 10,000 electrodes, there are 10.000 drive sense circuits and 10,000 connections. In an embodiment, the connections 248 include traces on a multi-layer printed circuit board, where the traces are spaced at a few microns or less. As another example, the spacing between the connections is a minimum spacing needed to ensure that the insulation between the connections does not break down. Note that the touch screen circuitry 246 may be implemented in multiple integrated circuits that are distributed about the frame 244.

Figure 38:
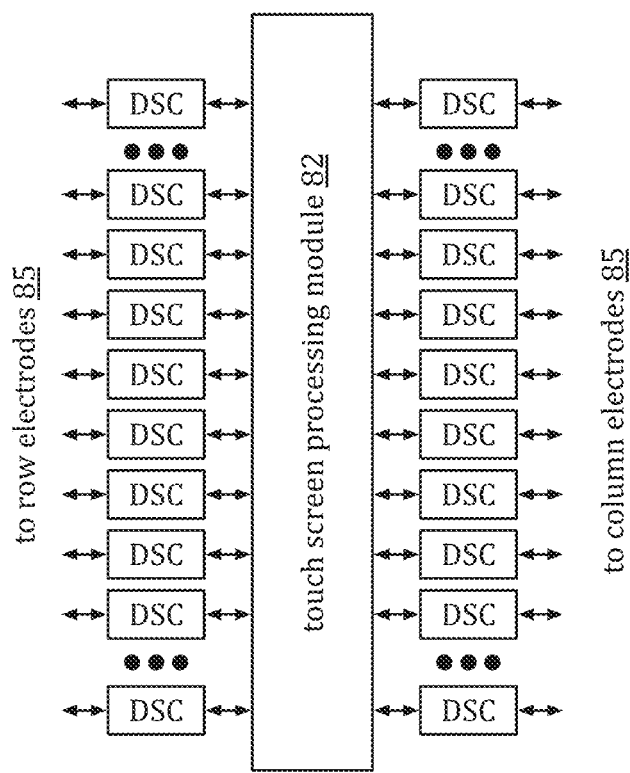
FIG. 38 is a schematic block diagram of an embodiment of touch screen circuitry of a near bezel-less touch screen display.

FIG. 38 is a schematic block diagram of an embodiment of touch screen circuitry 246 that includes a touch screen processing module 82 and a plurality of drive sense circuits (DSC). Some of the drive sense circuits are coupled to row electrodes and other drive sense circuits are coupled to column electrodes. The touch screen circuitry 246 may be implemented in one or more integrated circuits. For example, the touch screen processing module 82 and a certain number (e.g., a hundred to thousands) of drive sense circuits are implemented one a single die. An integrated circuit may include one or more of the dies. Thus, depending on the number of electrodes in the touch screen display, one or more dies in one or more integrated circuits is needed.

When more than a single die is used, the touch screen circuitry 246 includes more than one processing module 82. In this instance, the processing modules 82 on different dies function as peer processing modules, in that, they communicate with their own drive sense circuits and process the data from the drive sense circuits and then coordinate to provide the process data upstream for further processing (e.g., determining whether touches have occurred, where on the screen, is the touch a desired touch, and what does the touch mean). The upstream processing may be done by another processing module (e.g., processing module 42), as a distributed function among the processing modules 82, and/or by a designed processing module of the processing modules 82.

Figure 39:
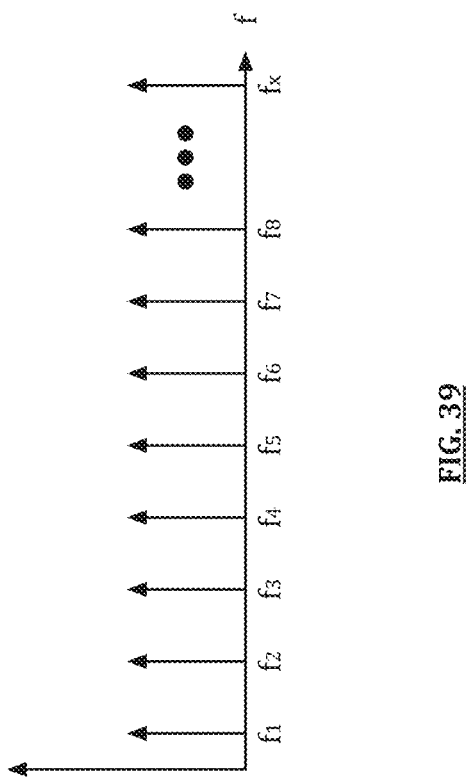
FIG. 39 is a schematic block diagram of an example of frequencies for the various analog reference signals for the drive-sense circuits.

FIG. 39 is a schematic block diagram of an example of frequencies for the various analog reference signals for the drive-sense circuits. As mentioned above, to reduce the adverse effects of cross-coupling, the drive sense circuits use a common frequency component for self-capacitance measurements and uses different frequencies components for mutual capacitance measurements. In this example, there are x number of equally-spaced different frequencies. The frequency spacing is dependent on the filtering of the sensed signals. For example, the frequency spacing is in the range of 10 Hz to 10's of thousands of Hz. Note that the spacing between the frequencies does not need to be equal or that every frequency needs to be used. Further note that, for very large touch screen displays having tens to hundreds of thousands of electrodes, a frequency reuse pattern may be used.

FIG. 40 is a schematic block diagram of another embodiment of a near bezel-less touch screen display 240-1 that includes the display 242, the electrodes 85, the touch screen display circuitry 246, and a near bezel-less frame 244-1. In this embodiment, the frame 244-1 is on two sides of the display 242: the other two sides are bezel-less. The functionality of the display 242, the electrodes 85, the touch screen display circuitry 246 are as previously discussed.

Figure 41:
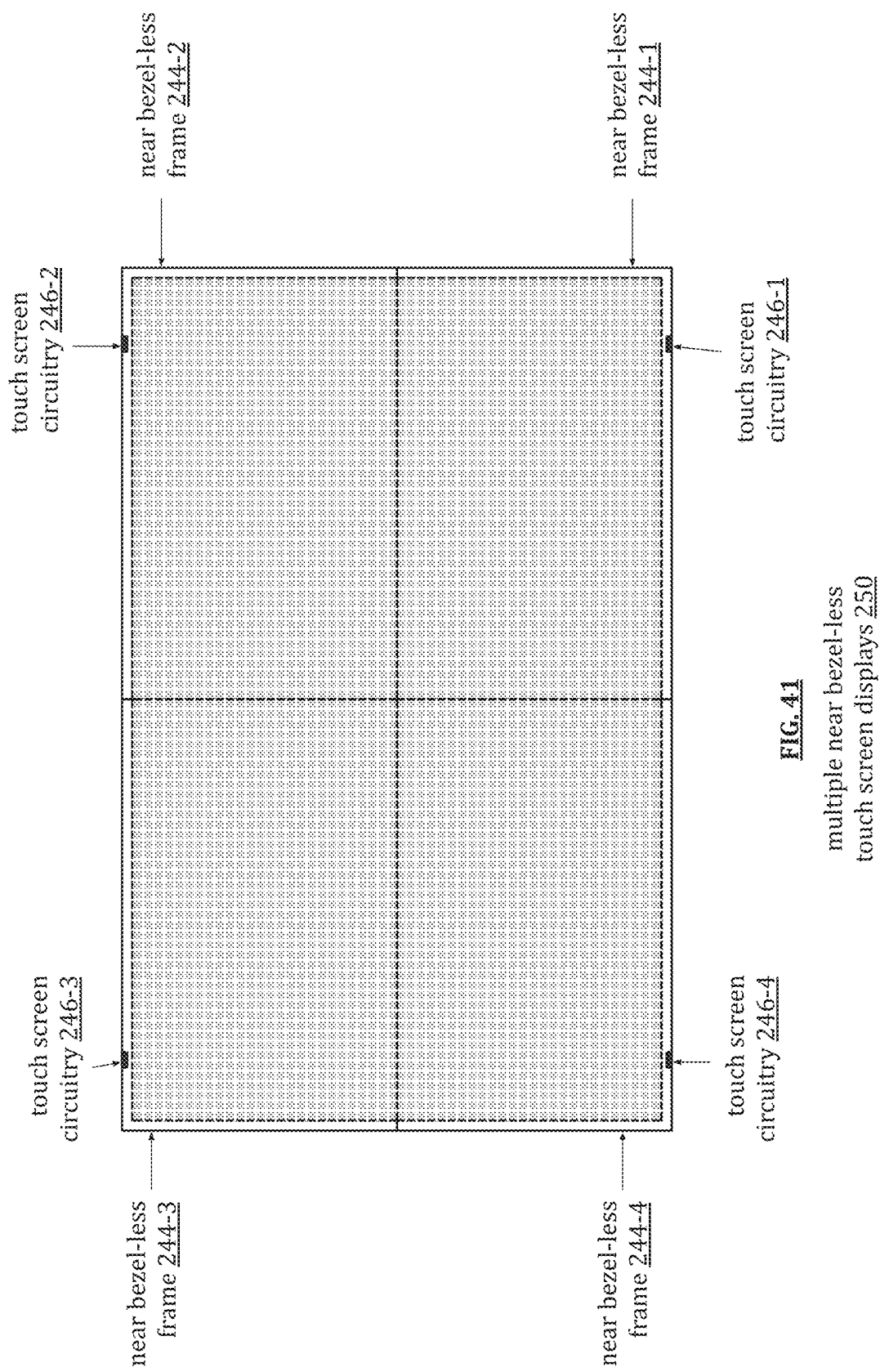
FIG. 41 is a schematic block diagram of another embodiment of multiple near bezel-less touch screen displays.

FIG. 41 is a schematic block diagram of another embodiment of multiple near bezel-less touch screen displays 250 that includes a plurality of near bezel-less touch screen displays 240-1. Each of the near bezel-less touch screen displays 240-1 have two sides that are bezel-less and two sides that include a near bezel-less frame. The location of the two bezel-less sides can vary such that the displays 240-1 can be positioned to create one large multiple touch screen display 250.

In an alternate embodiment, a near bezel-less touch screen display includes three sides that are bezel-less and one side that includes a near bezel-less frame. The side having the near bezel-less frame is variable to allow different combinations of the near bezel-less touch screen displays to create a large multiple touch screen display.

Figure 42:
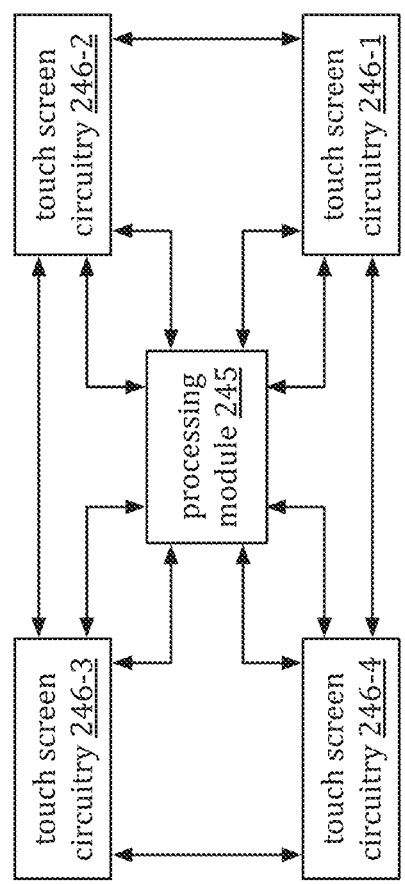
FIG. 42 is a schematic block diagram of an embodiment of processing modules for the multiple near bezel-less touch screen displays of FIG. 41.

FIG. 42 is a schematic block diagram of an embodiment of the touch screen circuitry 246 and one or more processing modules for the multiple near bezel-less touch screen displays of FIG. 41. Each of the displays 240-1 includes touch screen circuitry 246-1 through 246-4, which are coupled together and to a centralized processing module 245. Each of the touch screen circuitry 246-1 through 246-4 interacts with the electrodes of its touch screen display 240-1 to produce capacitance information (e.g., self-capacitance, mutual capacitance, change in capacitance, location of the cells having a capacitance change, etc.).

The centralized processing module 245 processes the capacitance information form the touch screen circuitry 246-1 through 246-4 to determine location of a touch, or touches, meaning of the touch(es), etc. In an embodiment, the centralized processing module 245 is processing module 42. In another embodiment, the centralized processing module 245 is one of the processing modules of the touch screen circuitry 246-1 through 246-4. In yet another embodiment, the centralized processing module 245 includes two or more of the processing modules of the touch screen circuitry 246-1 through 246-4 functioning as a distributed processing module.

Figure 43:
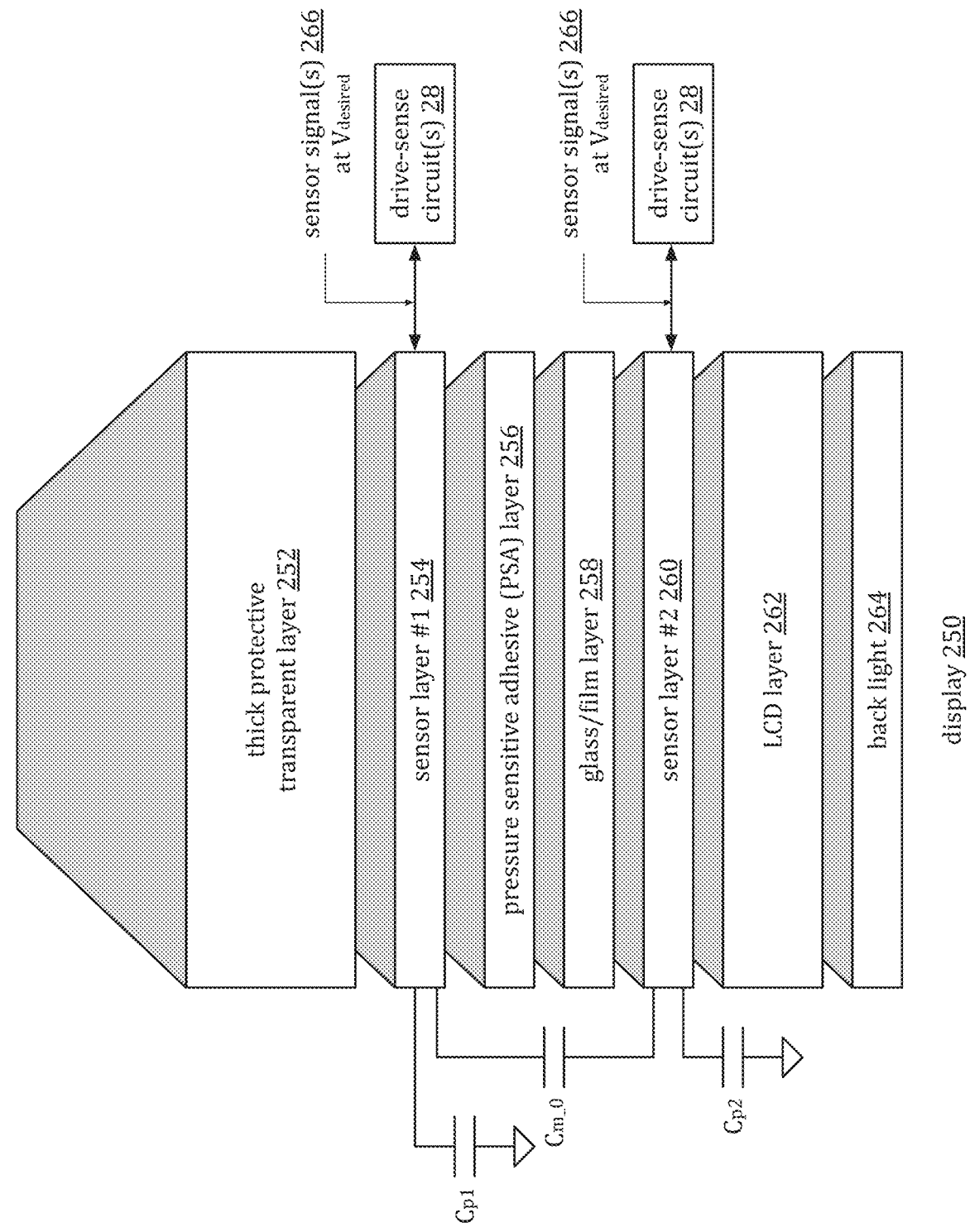
FIG. 43 is a cross section schematic block diagram of an example of a touch screen display having a thick protective transparent layer.

FIG. 43 is a cross section schematic block diagram of an example of a touch screen display 80 having a thick protective transparent layer 252. The display 80 further includes a first sensor layer 254, one or more pressure sensitive adhesive (PSA) layers 256, a glass/film layer 258, a second sensor layer 260, an LCD layer 262, and a back-light layer 264. A first group of drive sense circuits 28 is coupled to the first sensor layer 254 and a second group of drive sense circuits 28 is coupled to the second sensor layer 260.

The thick protective transparent layer 252 includes one or more layers of glass, film, etc. to protect the display 250 from damaging impacts (e.g., impact force, impact pressure, etc.). In many instances, the thicker the protective transparent layer 252 is, the more protection it provides. For example, the protective transparent layer 252 is at least a ¼ inch thick and, in some applications, is thicker than 1 inch or more.

The protective transparent layer 252 acts as a dielectric for finger capacitance and/or for pen capacitance. The material, or materials, comprising the protective transparent layer 252 will have a dielectric constant (e.g., 5-10 for glass). The capacitance (finger or pen) is then at least partially based on the dielectric constant and thickness of the protective transparent layer 252. In particular, the capacitance (C) equals:

$C = \in A/d$ where A is plate area, $\in$ is the dielectric constant(s), and d is the distance between the plates, which includes the thickness of the protective layer 252.

As such, the thicker the protective transparent layer, the smaller the capacitance (finger and/or pen). As the capacitance decreases, its effect on the self-capacitance of the sensor layers and the effect on the mutual capacitance between the sensor layer is reduced. Accordingly, the drive sense circuits 28 provide the sensor signals 266 at a desired voltage level, which increases as the finger and/or pen capacitance decreases due to the thickness of the protective transparent layer 252. In an embodiment, the first sensor layer includes a plurality of column electrodes and the second sensor layer includes a plurality of row electrodes.

There are a variety of ways to implement a touch sensor electrode. For example, the sensor electrode is implemented using a glass-glass configuration. As another example, the sensor electrode is implemented using a glass-film configuration. Other examples include a film-film configuration, a 2-sided film configuration, a glass and 2-sided film configuration, or a 2-sided glass configuration.

Figure 44:
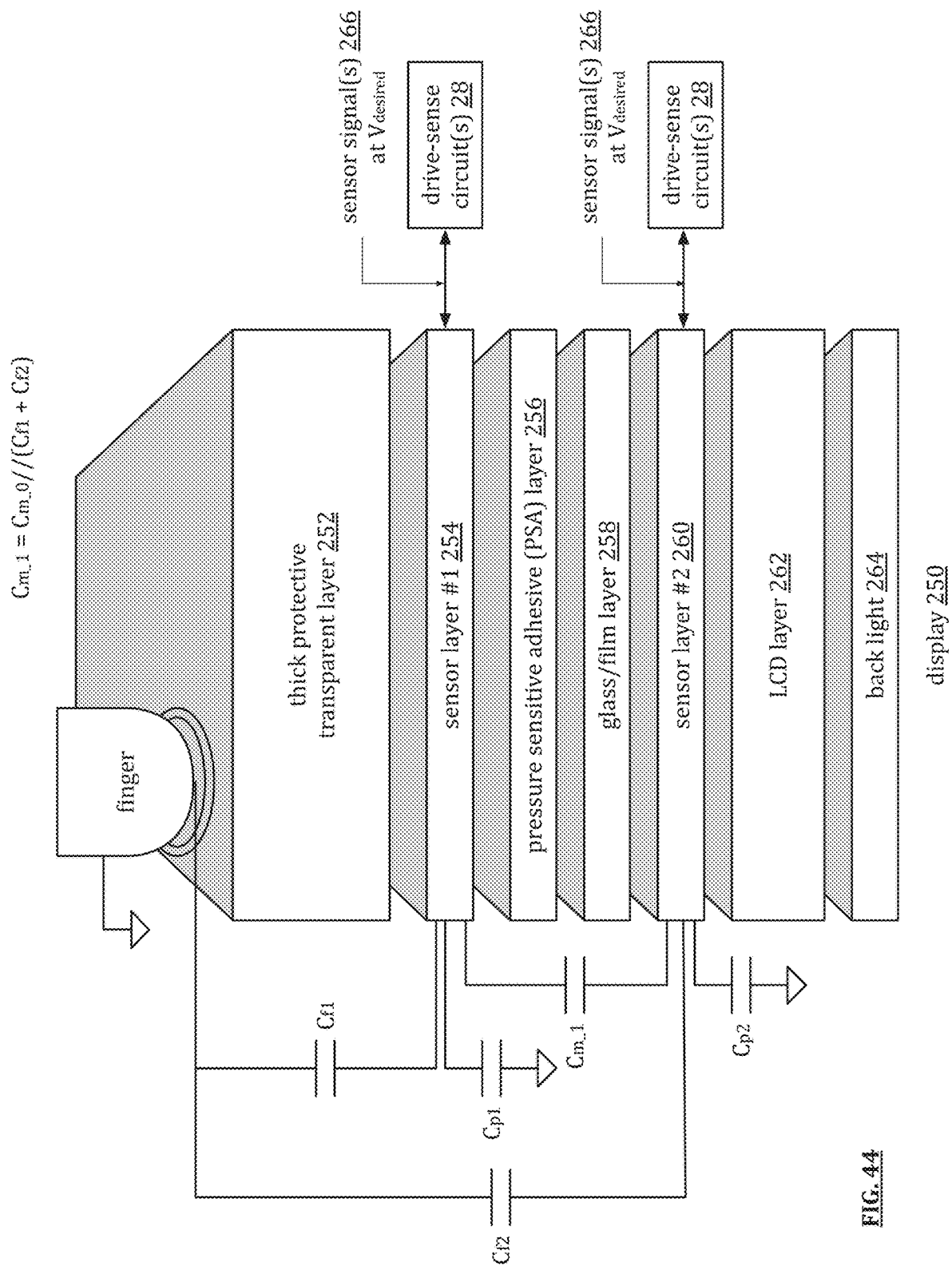
FIG. 44 is a cross section schematic block diagram of another example of a touch screen display having a thick protective transparent layer.

FIG. 44 is a cross section schematic block diagram that is similar to FIG. 43, with the exception that this figure includes a finger touch. The finger touch provides a finger capacitance with respect the sensor layers 254 and 260. As is shown, the finger capacitance includes a first capacitance component from the finger to the first sensor layer ($C_{f1}$) and a second capacitance component from the finger to the second sensor layer ($C_{f2}$). As previously discussed, the finger capacitance is effectively in parallel with the self-capacitances ($C_{p0}$ and $C_{p1}$) of the sensor layers, which increases the effective self-capacitance and decreases impedance at a given frequency. As also previously discussed, the finger capacitance is effectively in series with the mutual-capacitance ($C_{m\_0}$) of the sensor layers, which decreases the effective mutual-capacitance ($C_{m\_1}$) and increases impedance at a given frequency.

Thus, the smaller the finger capacitance due to a thicker protective layer 252, the less effect it has on the self-capacitance and mutual-capacitance. This can be better illustrated with reference to FIGS. 45-50.

Figure 45:
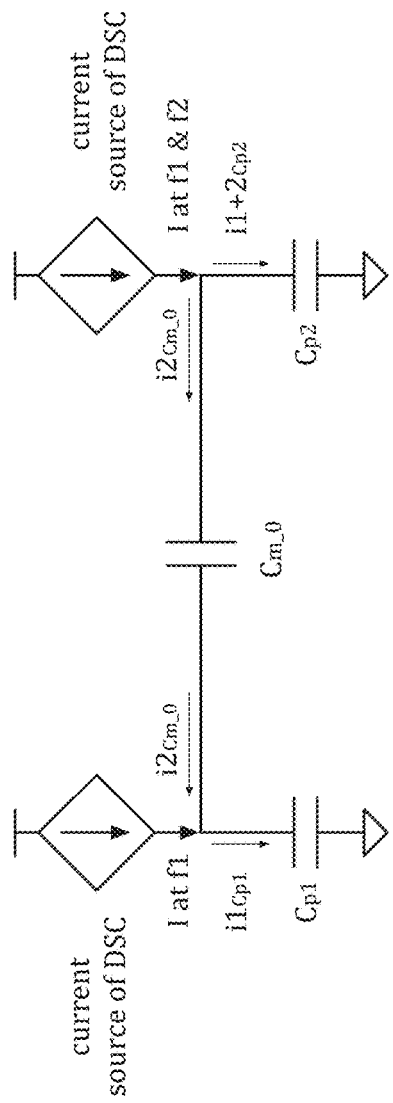
FIG. 45 is a schematic block diagram of an electrical equivalent circuit of two drive sense circuits coupled to two electrodes without a finger touch.

FIG. 45 is a schematic block diagram of an electrical equivalent circuit of two drive sense circuits coupled to two electrodes without a finger touch. The drive sense circuits are represented as dependent current sources, the self-capacitance of a first electrode is referenced as $C_{p1}$, the self-capacitance of the second electrode is referenced as $C_{p2}$, and the mutual capacitance between the electrodes is referenced as $C_{m\_0}$. In this example, the current source of the first drive sense circuit is providing a controlled current (I at f1) that includes a DC component and an oscillating component, which oscillates at frequency f1. The current source of the second drive sense circuit is providing a controlled current (I at f1 and at f2) that includes a DC component and two oscillating components at frequency f1 and frequency f2.

The first controlled current (I at f1) has one components: $i1_{Cp1}$ and the second controlled current (I at f1 and f2) has two components: $i1+2_{Cp2}$ and $i2_{Cm\_0}$. The current ratio between the two components for a controlled current is based on the respective impedances of the two paths.

Figure 46:
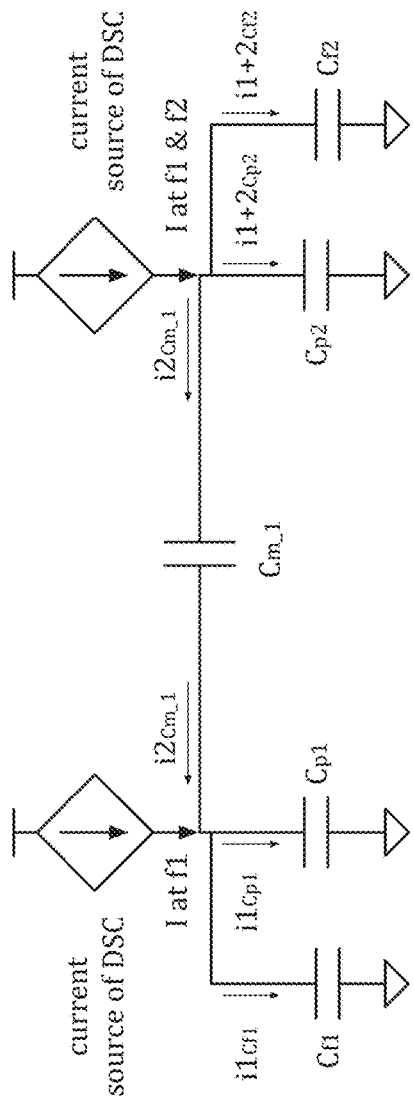
FIG. 46 is a schematic block diagram of an electrical equivalent circuit of two drive sense circuits coupled to two electrodes with a finger touch.

FIG. 46 is a schematic block diagram of an electrical equivalent circuit of two drive sense circuits coupled to two electrodes as shown in FIG. 45, but this figure includes a finger touch. The finger touch is represented by the finger capacitances ($C_{f1}$ and $C_{f2}$), which are in parallel with the self-capacitance ($C_{p1}$ and $C_{p2}$). The dependent current sources are providing the same levels of current as in FIG. 45 (I at f1 and 1 at f1 and f2).

In this example, however, more current is being directed towards the self-capacitance in parallel with the finger capacitance than in FIG. 45. Further, less current is being directed towards the mutual capacitance ($C_{m\_1}$) (i.e., taking charge away from the mutual capacitance, where C=Q/V). With the self-capacitance effectively having an increase in capacitance due to the finger capacitance, its impedance decreases and, with the mutual-capacitance effectively having a decrease in capacitance, its impedance increases.

The drive sense circuits can detect the change in the impedance of the self-capacitance and of the mutual capacitance when the change is within the sensitivity of the drive sense circuits. For example, V=I*Z. I*t =C*V. and Z=½πfC (where V is voltage, I is current. Z is impedance, t is time. C is capacitance, and f is the frequency), thus V=I*½πfC. If the change between C is small, then the change in V will be small. If the change in V is too small to be detected by the drive sense circuit, then a finger touch will go undetected. To reduce the chance of missing a touch due to a thick protective layer, the voltage (V) and/or the current (I) can be increased. As such, for small capacitance changes, the increased voltage and/or current allows the drive sense circuit to detect a change in impedance. As an example, as the thickness of the protective layer increases, the voltage and/or current is increased by 2 to more than 100 times.

FIG. 47 is a schematic block diagram of an electrical equivalent circuit of a drive sense circuit coupled to an electrode without a finger touch. This similar to FIG. 45, but for just one drive sense circuit and one electrode. Thus, the current source of the first drive sense circuit is providing a controlled current (I at f1) that includes a DC component and an oscillating component, which oscillates at frequency f1 and the first controlled current (I at f1) has two components: $i1_{Cp1}$ and $i1_{cf1}$.

FIG. 48 is an example graph that plots finger capacitance verses protective layer thickness of a touch screen display 250. As shown, as the thickness increases, the finger capacitance decreases. This effects changes in the mutual-capacitance as shown in FIG. 49 and in self-capacitance as shown in FIG. 50.

FIG. 49 is an example graph that plots mutual capacitance verses protective layer thickness and drive voltage verses protective layer thickness of a touch screen display 150. As shown, as the thickness increases, the difference between the mutual capacitance without a touch and mutual capacitance with a touch decreases. In order for the decreasing difference to be detected, the voltage (or current) sourced to the electrode increases substantially inversely proportion to the decrease in finger capacitance.

FIG. 50 is an example graph that plots self-capacitance verses protective layer thickness and drive voltage verses protective layer thickness of a touch screen display 150. As shown, as the thickness increases, the difference between the self-capacitance without a touch and self-capacitance with a touch decreases. In order for the decreasing difference to be detected, the voltage (or current) sourced to the electrode increases substantially inversely proportion to the decrease in finger capacitance.

Figure 51:
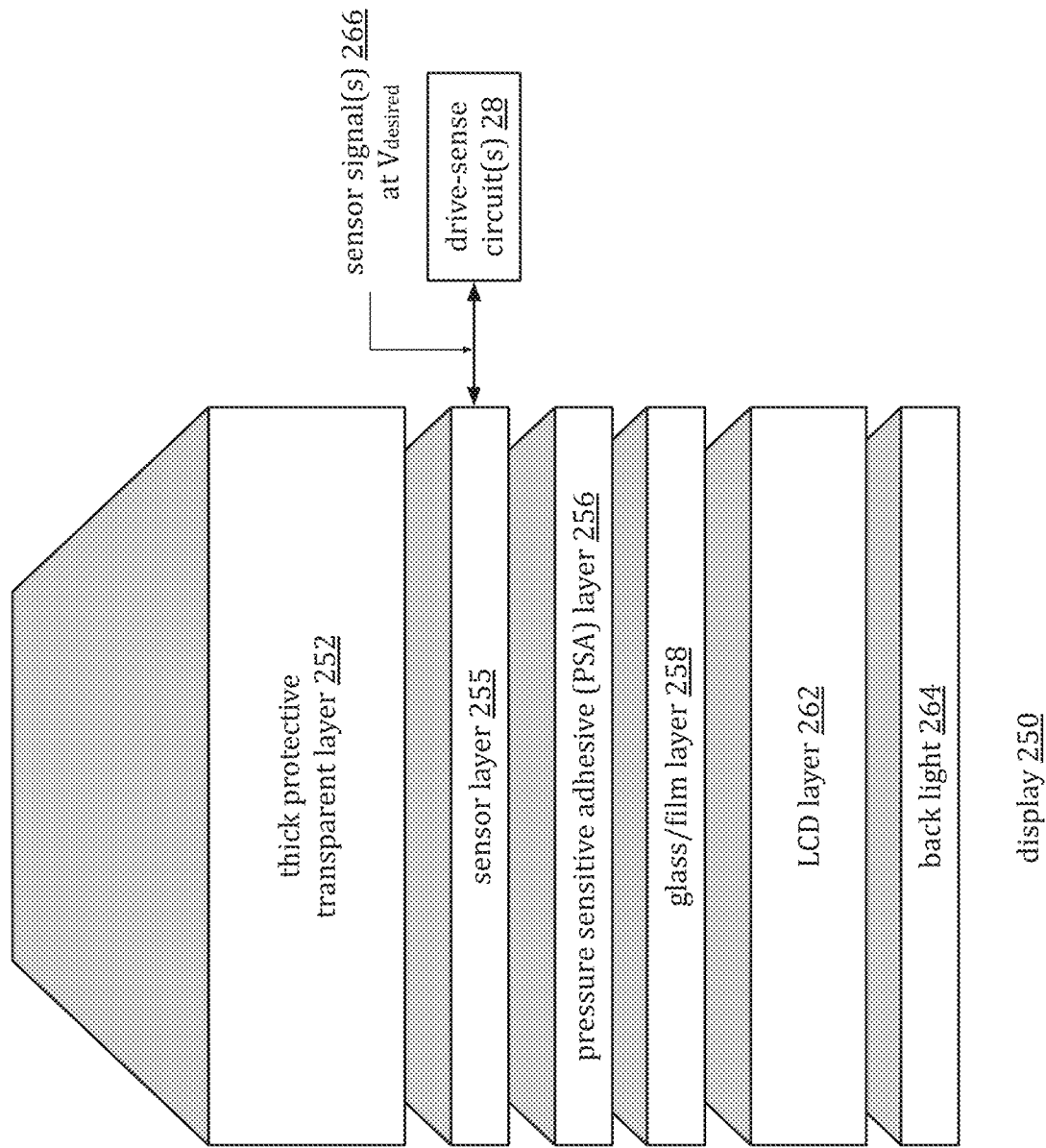
FIG. 51 is a cross section schematic block diagram of another example of a touch screen display having a thick protective transparent layer.

FIG. 51 is a cross section schematic block diagram of another example of a touch screen display 250 having a thick protective transparent layer 252. This embodiment is similar to the embodiment of FIG. 43 with the exception that this embodiment includes a single sensor layer 255. The sensor layer 255 may be implemented in a variety of ways. For example, the sensor layer 255 includes a plurality of capacitor sensors. As another example, the sensor layer includes a voltage applied to the corners of the layer to detect touches (i.e., surface capacitance touch sensor).

Figure 52:
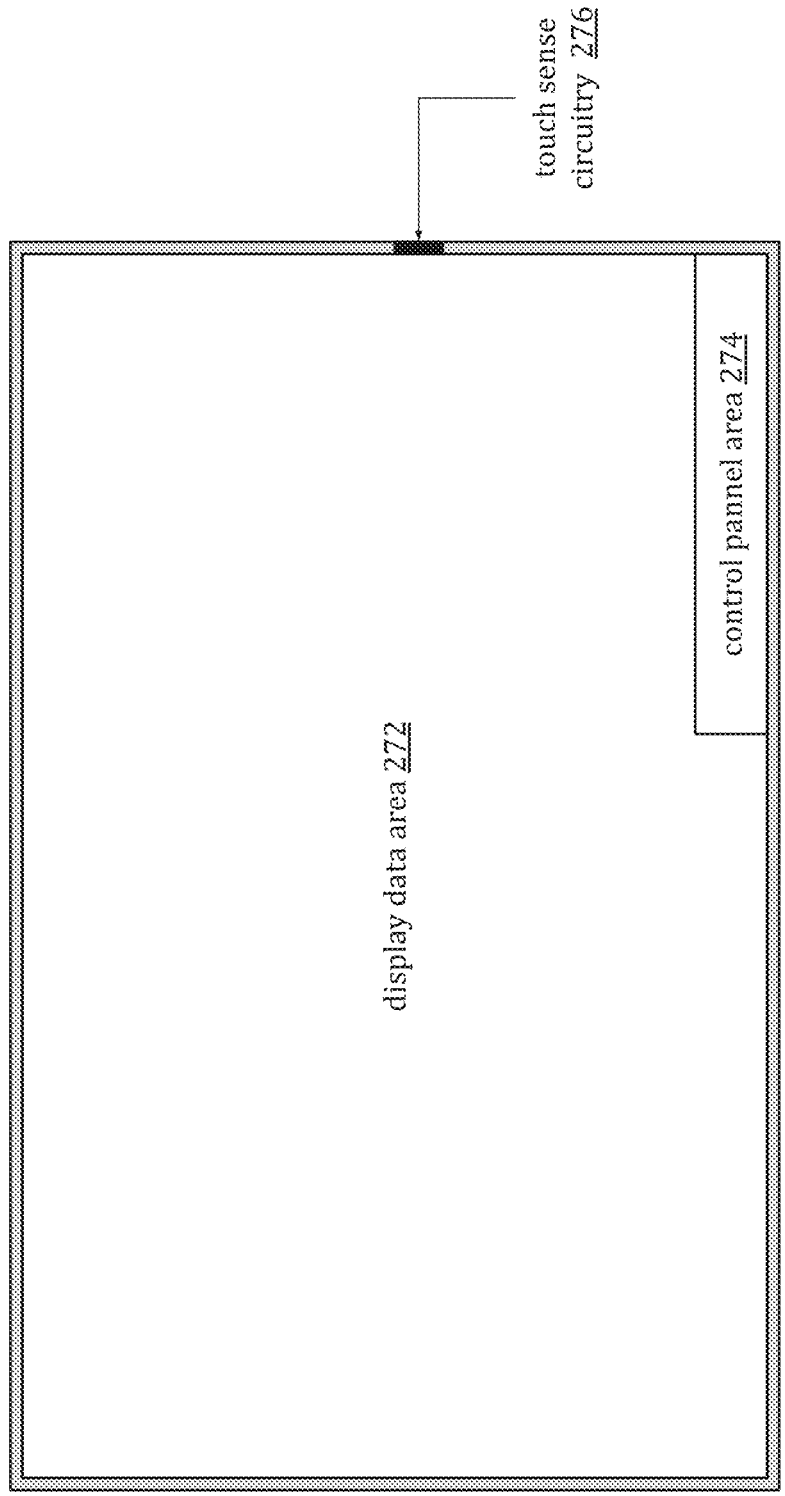
FIG. 52 is a schematic block diagram of an embodiment of a large touch screen display with an on-screen control panel.

FIG. 52 is a schematic block diagram of an embodiment of a large touch screen display 270 with an on-screen control panel area 274, a display data area 272, and touch sense circuitry 276. The display 270 has properties in accordance with the table of paragraph 107 and has a variety of applications. For example, the large touch screen display 270 is utilized as a touch screen white board. As another example, the large touch screen display is used as a menu for selecting a variety of service options and/or shopping options at a service center (e.g., a store, a mall, etc.).

The control panel area 274 is a virtual control panel and may be located anywhere on the display 270. When the control panel is active, it appears in the control panel area 274 and provides for a variety of control functions, which include, but are not limited to, store, change colors, change an application, start, stop, pause. fast-forward, highlight, etc. When the control panel is not active, the control panel area 274 becomes part of the display area.

The display data area 272 displays frames of data. The frames of data include frames of a video, independent frames of images, jump from one image to another, white board drawings, each edit creates a new frame, time interval of data capture on white board for a frame of data, have a background for white board, etc.

The touch screen circuitry 276 is physically positioned in the bezel area of the display 270 (i.e., in the frame). The touch screen circuitry 276, it's physically positioned in the bezel area of the display, are as previously discussed with reference to one or more of FIGS. 36-42.

Figure 53:
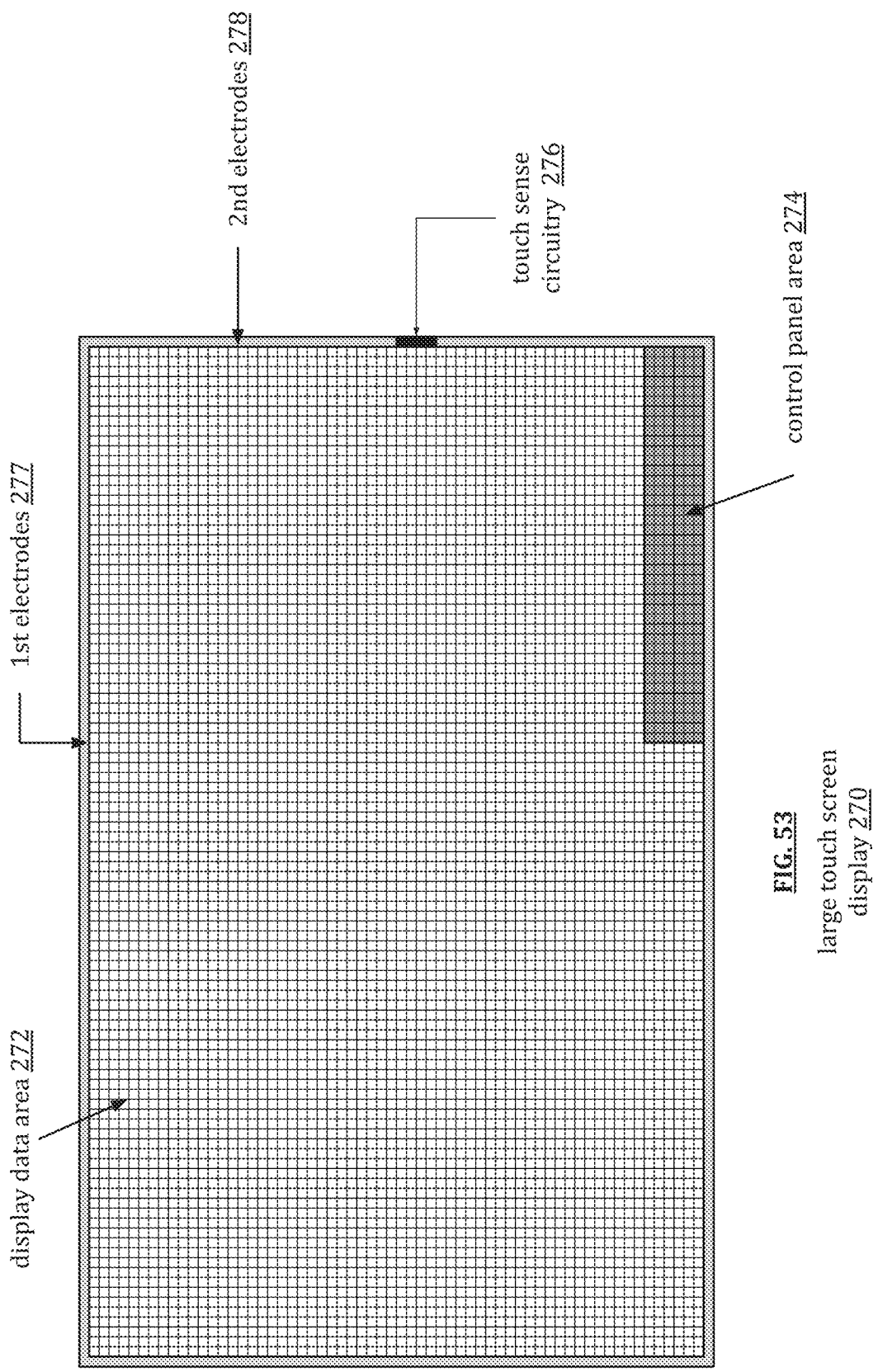
FIG. 53 is a schematic block diagram of another embodiment of a large touch screen display with an on-screen control panel.

FIG. 53 is a schematic block diagram of another embodiment of a large touch screen display 270 with an on-screen control panel area 274, the display data area 272, the touch screen circuitry 276, a first plurality of electrodes 277, and a second plurality of electrodes 278. The electrodes 277 are arranged in a first orientation (e.g., as columns) throughout the display 270 and electrodes 278 are arranged in a second orientation (e.g., as rows) throughout the display 270.

The touch sense circuitry 276 includes first drive sense circuits, second drive sense circuits, and a processing module. The first drive-sense circuits provide a first sensor signals to the first electrodes 277 and generate therefrom first sensed signals. The second drive-sense circuits provide second sensor signals to the second electrodes 278 and generate therefrom second sensed signals. The processing module receives the first and second sensed signals to determine one or more touches of the display 270.

In a control mode (e.g., the control panel area is activated), the processing module creates display data and control panel data and produce, therefrom, a frame of data. The display data is created to be displayed in the display data area 272 and the control panel data is to be simultaneously displayed in the control panel area 274. The processing module associates a first group of row and column electrodes with the control panel data area. The processing module interprets receive signals components of the sensors signals of the control panel electrodes to identify a proximal touch of the control panel data area and executed a corresponding function and/or command.

The processing module associates a second group of column and row electrodes with the display data area. The processing module interprets receive signals components of the sensors signals of the second group of electrodes to identify a proximal touch within the display data area. Note that the rendering of data in the display data area, rendering of data in the control panel area, sensing a touch in the display data area, sensing a touch in the control panel area, executing a command and/or function associated with a touch in the display data area, and/or executing a control function associated with a touch in the control panel area are done currently. As such, there is no alternating operation between sensing a touch and displaying data.

Figure 54:
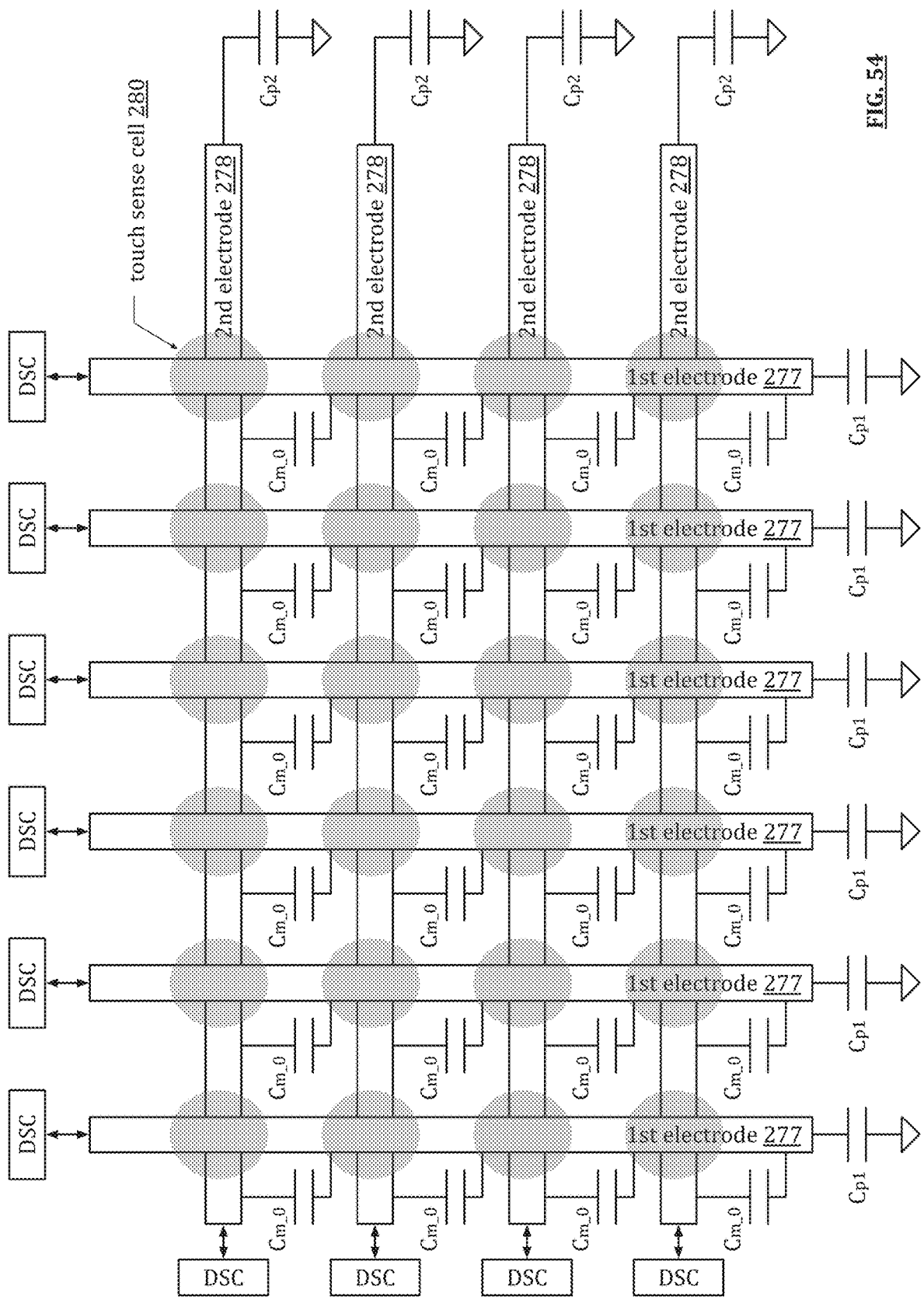
FIG. 54 is a schematic block diagram of an embodiment of a plurality of electrodes creating a plurality of touch sense cells.

FIG. 54 is a schematic block diagram of an embodiment of a plurality of electrodes creating a plurality of touch sense cells 280 within a display. In this embodiment, a few second electrodes 278 are perpendicular and on a different layer of the display than a few of the first electrodes 277. For each crossing of a first electrode and a second electrode, a touch sense cell 280 is created. At each touch sense cell 280, a mutual capacitance ($C_{m\_0}$) is created between the crossing electrodes. Each electrode also includes a self-capacitance (Cp), which is shown as a single parasitic capacitance, but, in some instances, is a distributed R-C circuit.

A drive sense circuit (DSC) is coupled to a corresponding one of the electrodes. The drive sense circuits (DSC) provides sensor signals to the electrodes and determines the loading on the sensors signals of the electrodes. When no touch is present, each touch cell 280 will have a similar mutual capacitance and each electrode of a similar length will have a similar self-capacitance. When a touch is applied on or near a touch sense cell 280, the mutual capacitance of the cell will decrease (creating an increased impedance) and the self-capacitances of the electrodes creating the touch sense cell will increase (creating a decreased impedance). Between these impedance changes, the processing module can detect the location of a touch, or touches.

Figure 55:
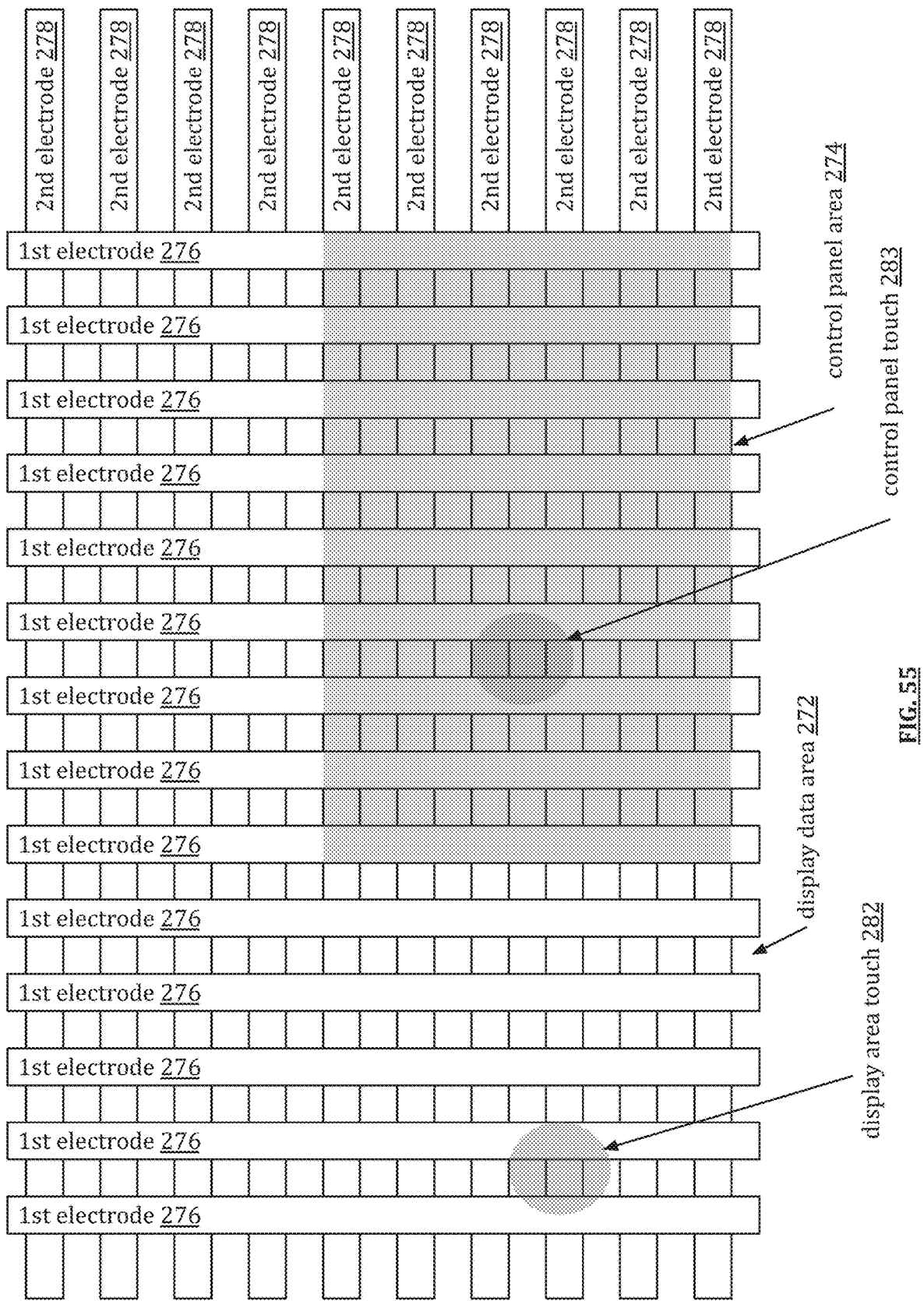
FIG. 55 is a schematic block diagram of another embodiment of a plurality of electrodes creating a display area and a control panel area.

FIG. 55 is a similar diagram to FIG. 54 with the exceptions that some of the first and second electrodes are within the control panel area 274, other electrodes are in the display data area 272, there is a touch 282 in the display data area, and there is a touch 283 in the control panel area. In this example, the touches are determined by the decreased mutual capacitance of the nearby touch sense cells and by the increased self-capacitance of the effect electrodes. The processing module, knowing which electrodes and hence which touch sense cells are part of the control panel area 274, can readily determine that touch 283 is in the control panel area and that touch 282 is in the display data area 272.

Figure 56:
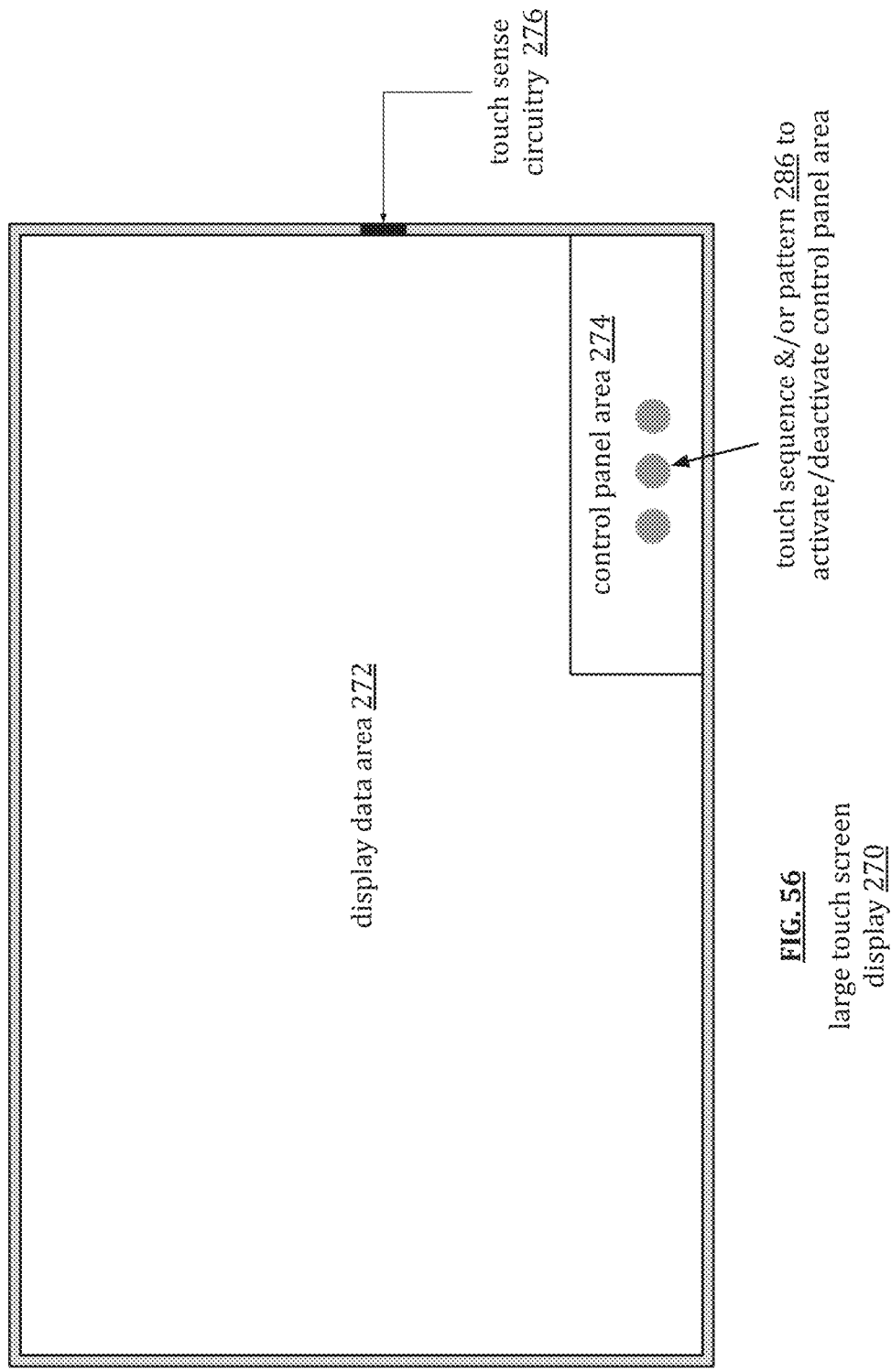
FIG. 56 is a schematic block diagram of an example of activating or deactivating an on-screen control panel on a large touch screen display.

FIG. 56 is a schematic block diagram of an example of activating or deactivating an on-screen control panel on a large touch screen display 270. As in FIG. 52, the display 270 includes the display data area 272, the control panel area 274, and the touch sense circuitry 276. In this example, a touch sequence and/or a touch pattern 286 within the control panel area 274 is used to activate and/or deactivate the control panel. As a specific example, a three-finger touch making an X or a plus sign is the pattern to activate and/or deactivate the control panel. As another specific example, four consecutive touches in the same position on the display is a sequence to activate and/or deactivate the control panel. In an alternate embodiment, any area of the display is useable to activate and/or deactivate the control panel.

Figure 57:
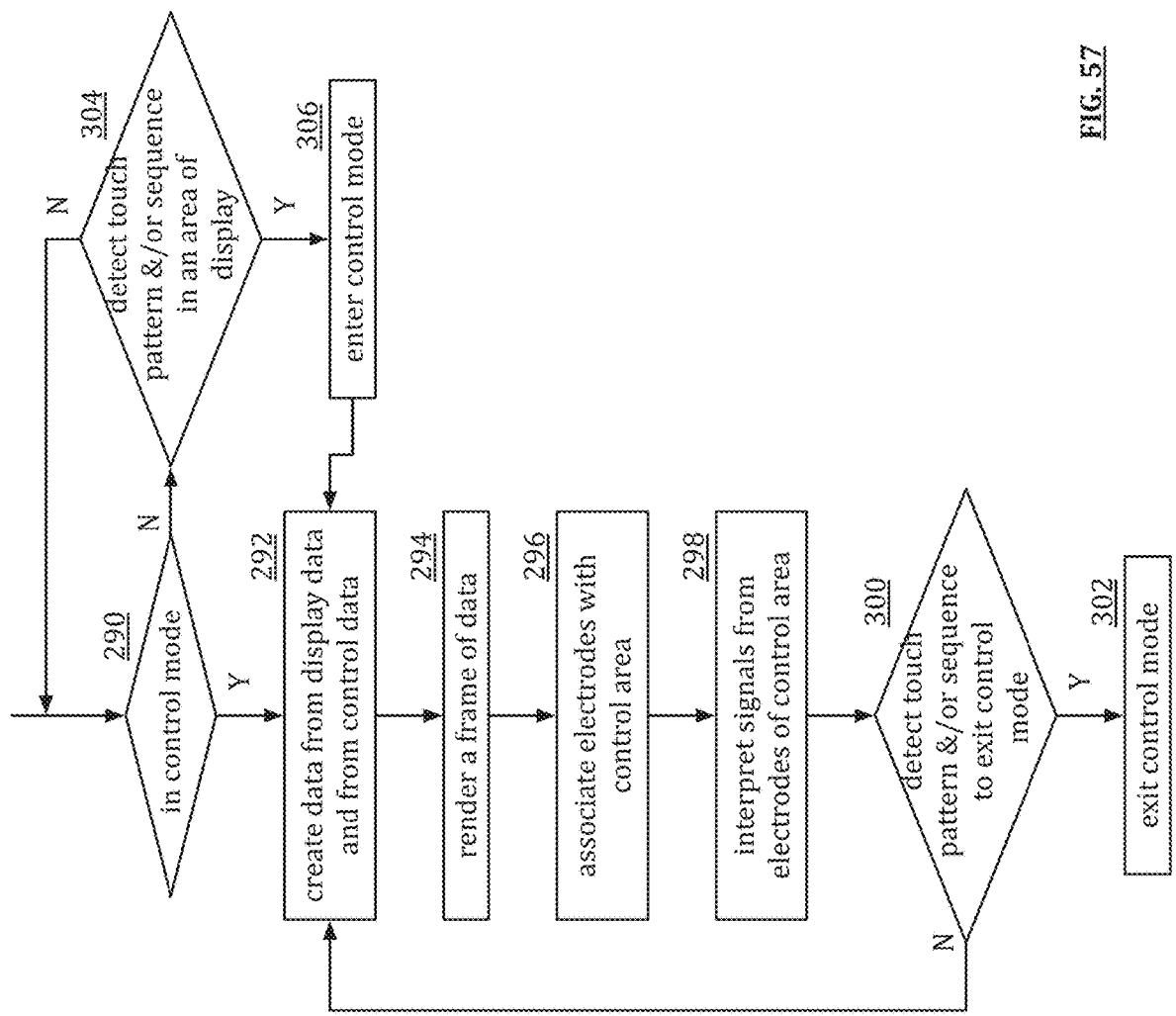
FIG. 57 is a logic diagram of an example of utilizing an on-screen control panel of a large touch screen display.

FIG. 57 is a logic diagram of an example of utilizing an on-screen control panel of a large touch screen display that is executable by a processing module (e.g., 42 and/or 82). The method begins at step 190 where the processing module determines whether the display 270 is in a control mode (e.g., the control panel is enabled and is visible within the control panel area). If not, the method continues at step 304 where the processing module determines whether a unique touch pattern and/or sequence is detected on the display. If not, the method repeats at step 290.

If the unique touch pattern and/or sequence is detected, the method continues at step 306 where the processing module enters the control mode. In the control mode, the method continues at step 292 where the processing module generates display data and control data. The method continues at step 294 where the processing module generates one or more frames of data from the display data and the control data.

The method continues at step 296 where the processing module associates electrodes with the display data area and the control panel area. The method continues at step 298 where the processing module interprets signals form drive sense circuits coupled to the electrodes that are associated with the control panel area. When a touch is detected in the control panel area, the processing module processes it as a control function or command. When a touch is detected in the display data area, the processing module processes it as a data function or command. For example, the control panel area functions like a mouse or touch pad.

The method continues at step 300 where the processing module determines whether a touch pattern and/or sequence is detected to exit the control mode. If not, the method repeats at step 292. If an exit pattern and/or sequence is detected, the method continues at step 302 where the processing module exits the control mode. When not in the control mode, the entire display is treated as part of the display data area.

Figure 58:
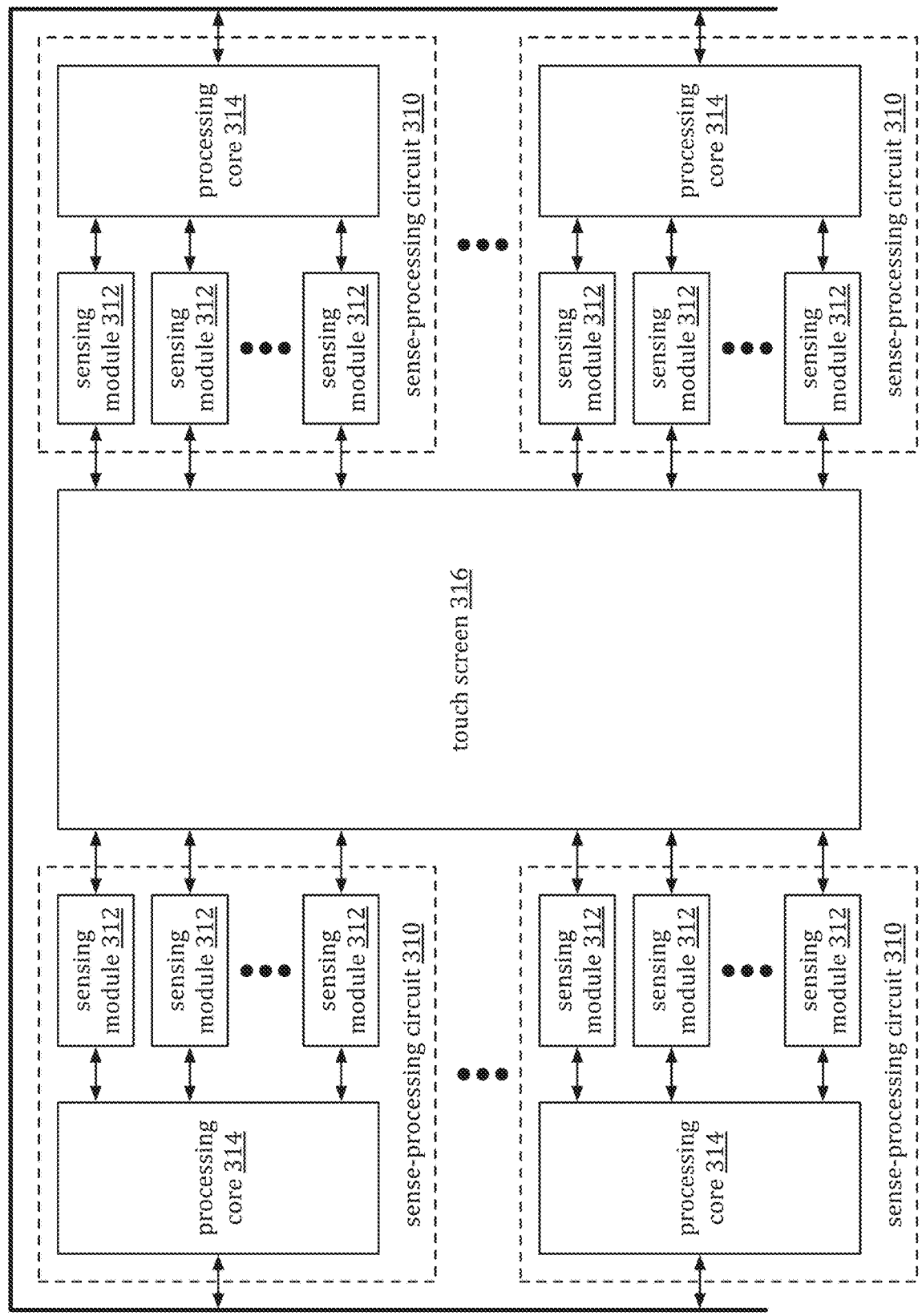
FIG. 58 is a schematic block diagram of an embodiment of a scalable touch screen display.

FIG. 58 is a schematic block diagram of an embodiment of a scalable touch screen display that includes a touch screen 316 and a plurality of sense-processing circuits 310. A sense-processing circuit 310 includes a plurality of sensing modules 312 and a processing core 314. The touch screen 316 includes a plurality of electrodes (e.g., rows and columns) that are in-cell and/or on-cell with a display.

The sensing modules 312 of each of the sense-processing circuits 310 is coupled to an electrode, or sensor, of the touch screen 316. The processing cores 314 are coupled together via a wired and/or wireless communication bus. Specific embodiments of the sensing modules and the processing cores will be described in greater detail with reference to FIG. 59.

A sense-processing circuit 310 includes a number of sensing modules 312 (e.g., from less than 100 to more than 1,000). Each sense-processing circuit 310 is identical, thus making scaling for large scale touch screen displays commercially viable. For instance, a sense-processing circuit 310 is implemented on a die. An integrated circuit (IC) includes one or more of the sense-processing circuit dies. As such, one or more ICs with one or more dies can be used to provide the touch sense circuitry of a display.

Figure 59:
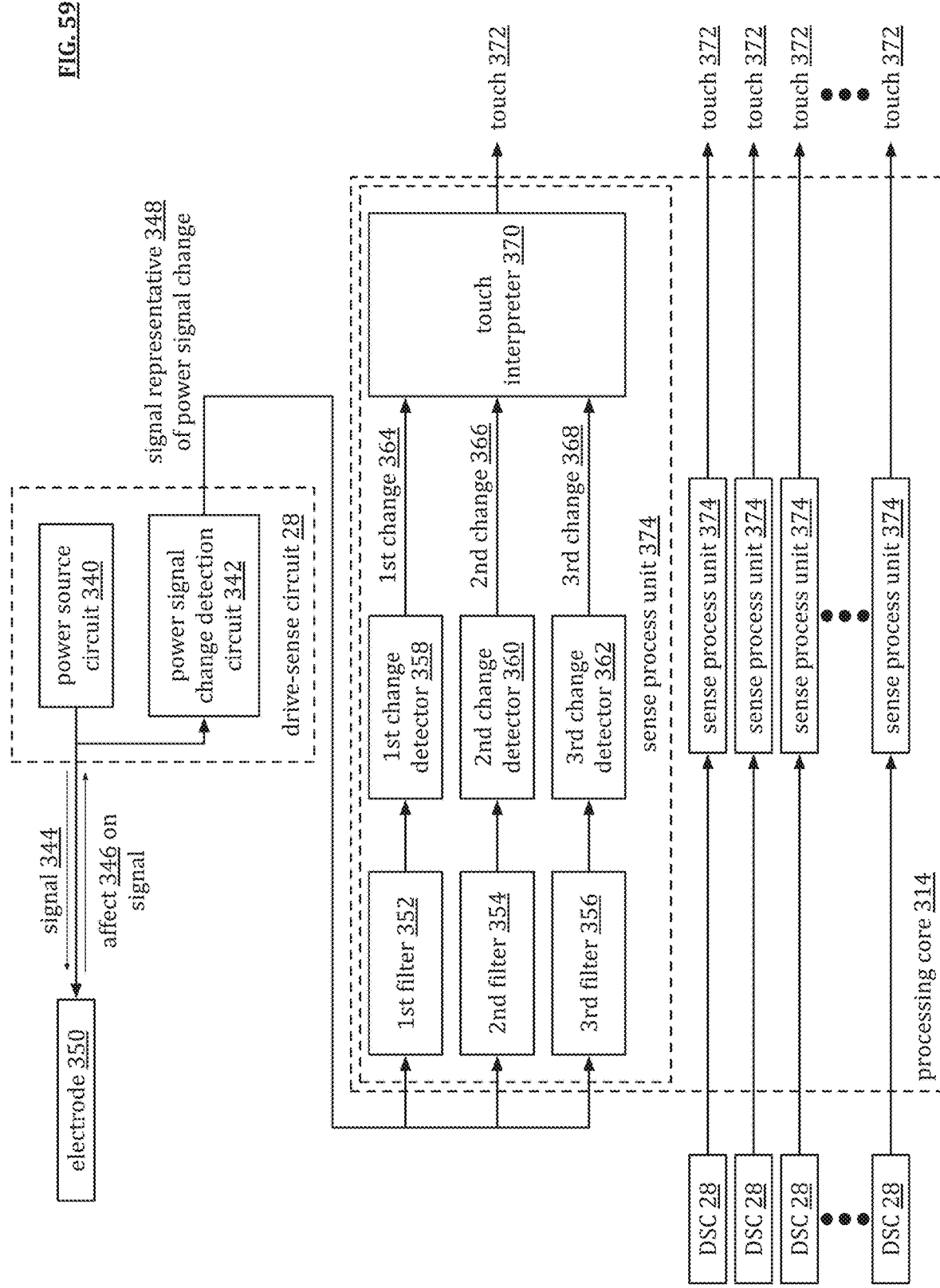
FIG. 59 is a schematic block diagram of an embodiment of a sense-processing circuit of a scalable touch screen display.

FIG. 59 is a schematic block diagram of an embodiment of a sense-processing circuit 310 that includes a drive sense circuit 28 as a sensing module 312 and a sense process unit 314 implemented within the processing core 314. The processing core 314 includes a processing module, memory, and a communication interface. The communication interface allows the processing core to communicate with other processing cores and/or with processing modules (e.g., 42) of the display and/or of a computing device. For example, the communication interface is one of a PCI connection, a USB connection, a Bluetooth connection, etc.

The drive sense circuit 28 includes a power source circuit 340 and a power signal change detection circuit 342. The power source circuit 340 is operably coupled to the electrode 350 and, when enabled (e.g., from a control signal from the processing core, power is applied, a switch is closed, a reference signal is received, etc.) provides a signal 344 to the electrode 350. The power source circuit 340 may be a voltage supply circuit (e.g., a battery, a linear regulator, an unregulated DC-to-DC converter, etc.) to produce a voltage-based power signal, a current supply circuit (e.g., a current source circuit, a current mirror circuit, etc.) to produce a current-based power signal, or a circuit that provide a desired power level to the sensor and substantially matches impedance of the sensor. The power source circuit 340 generates the signal 344 to include a DC (direct current) component and/or an oscillating component.

When receiving the signal 344, the impedance of the electrode affects 346 the signal. When the power signal change detection circuit 342 is enabled, it detects the impedance effect 346 on the signal. For example, the signal is a 1.5 voltage signal and, when there is no touch, the electrode draws 1 micro-amp of current, which corresponds to an impedance of 1.5 M Ohms. When a touch is present, the signal remains at 1.5 volts and the current increases to 1.5 micro-amps. As such, the impedance of the electrode changed from 1.5 M Ohms to 1 M Ohms. The power signal change detection circuit 112 determines this change and generates a representative signal 348 of the change to the power signal.

The processing core 314 is configured to include, for each sense process unit 374, a first filter 352, a second filter 354, a third filter 356, a first change detector 358, a second change detector 360, a third change detector 362, and a touch interpreter 370. The first filter 352 is operable to produce a first filtered signal of the signal 348 representation corresponding to self-capacitance of the sensed electrode. The second filter 354 produces a second filtered signal of the signal 348 representation corresponding to mutual capacitance of the sensed electrode. The third filter produces a third filtered signal of the signal 348 representation corresponding to a pen touch of the sensed electrode.

The first change detector 358 determines whether the self-capacitance of the sensed electrode has changed to produce a first change 364. The second change detector 360 determines whether the mutual-capacitance of the sensed electrode has changed to produce a second change 366. The third change detector 362 determines whether the pen-capacitance of the sensed electrode has changed to produce a third change 368.

The touch interpreter 372 determines whether the sensed electrode is experiences a touch based on the first, second, and or third changes. For example, if the touch interpreter 372 determines that the self-capacitance of the sensed electrode has increased, the touch interpreter 372 indicates that the sensed electrode is effected by a touch (e.g., a finger touch). As another example, if the touch interpreter 372 determines that the mutual-capacitance of the sensed electrode has decreased, the touch interpreter 372 indicates that the sensed electrode is effected by a touch (e.g., a finger touch). As yet another example, if the touch interpreter 372 determines that the pen-capacitance of the sensed electrode has increased, the touch interpreter 372 indicates that the sensed electrode is effected by a pen touch.

The other drive-sense circuits 28 in combination with the other sense processing units 374 function as described above for their respective electrodes. The processing core 314 provides the touch information 372 to a processing module, to another sense-processing circuit 310, and/or to itself for further processing to equate the touch information to a particular location on the display and meaning of the touch.

Figure 60:
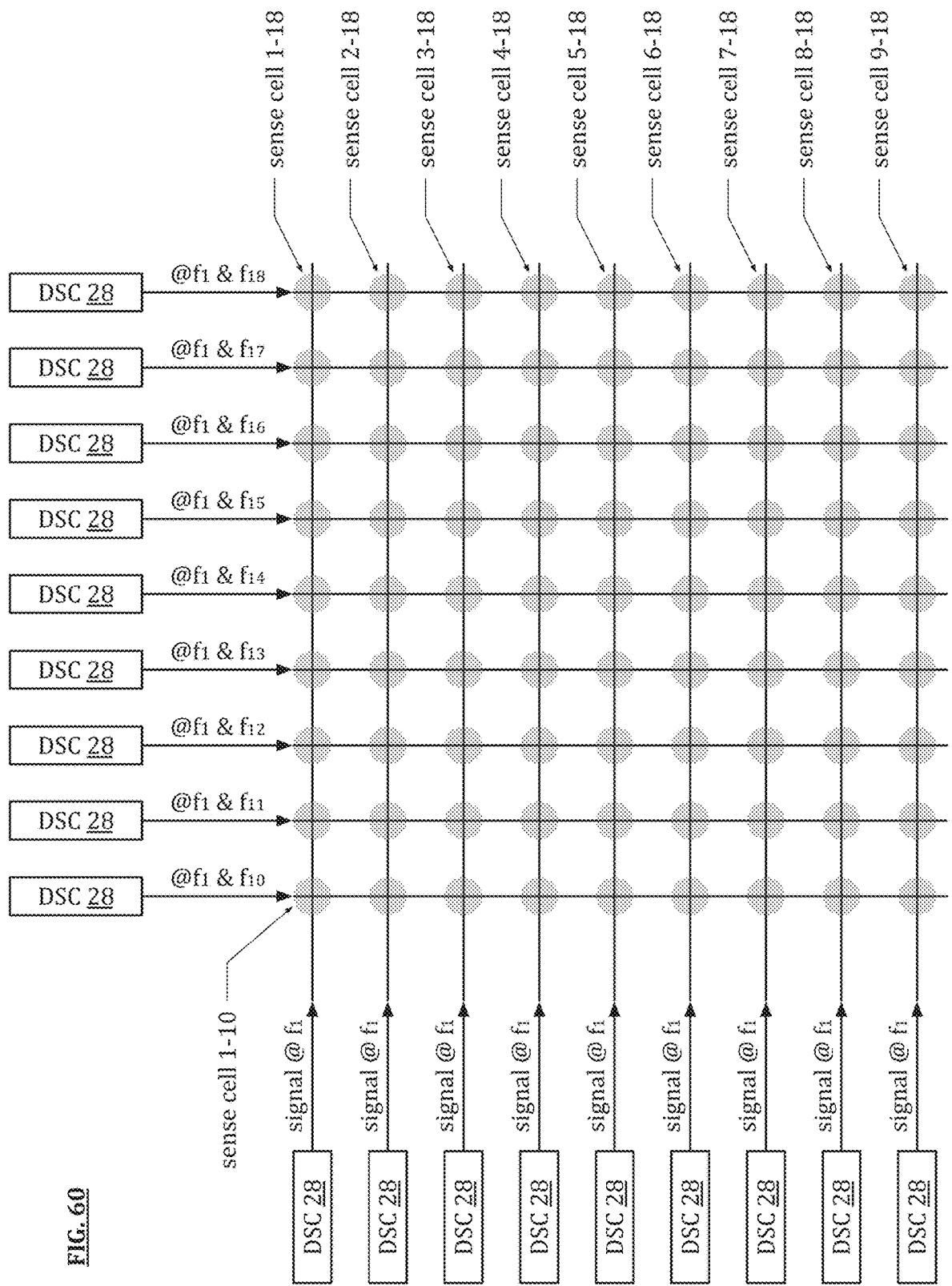
FIG. 60 is a schematic block diagram of an example of frequency dividing for reference signals for drive-sense circuits of a touch screen display.

FIG. 60 is a schematic block diagram of an example of frequency dividing for reference signals for drive-sense circuits 28 of a touch screen display. In this example, a few row electrodes and a few column electrodes are shown. Each electrode is coupled to a drive sense circuit (DSC) 28. The crossover of a row electrode with a column electrode creates a sense cell. In this example, there are nine row electrodes and nine column electrodes, creating 81 sense cells. To allow for simultaneous self-capacitance sensing and mutual sensing of the electrodes, the drive sense circuits use different frequencies to simulate the electrodes.

For self-capacitance, all of the drive sense circuits use the f1 frequency component. This creates near zero potential difference between the electrodes, thereby eliminating cross coupling between the electrodes. In this manner, the self-capacitance measurements made by the drive sense circuits are effectively shielded (i.e., low noise, yielding a high signal to noise ratio).

For mutual capacitance, the column electrodes also transmit a frequency component at another frequency. For example, the first column DSC 28 transmits it signal with frequency components at f1 and at f10: the second column DSC 28 transmits it signal with frequency components at f1 and at f11: the third column DSC 28 transmits it signal with frequency components at f1 and at f12; and so on. The additional frequency components (f10-f18) allow the row DSCs 28 to determine mutual capacitance at the sense cells.

For example, the first row DSC 28 senses its self-capacitance via its transmitted signal with the f1 frequency component and determines the mutual capacitance of the sense cells 1-10, 1-11, 1-12, 1-13, 1-14, 1-15, 1-16, 1-17, and 1-18. As a specific example, for sense cell 1-10, the first row DSC 28 determines the mutual capacitance between the first row electrode and the first column electrode based on the frequency f10: determines the mutual capacitance between the first row electrode and the second column electrode based on the frequency f11: determines the mutual capacitance between the first row electrode and the third column electrode based on the frequency f12; and so on.

Figure 61:
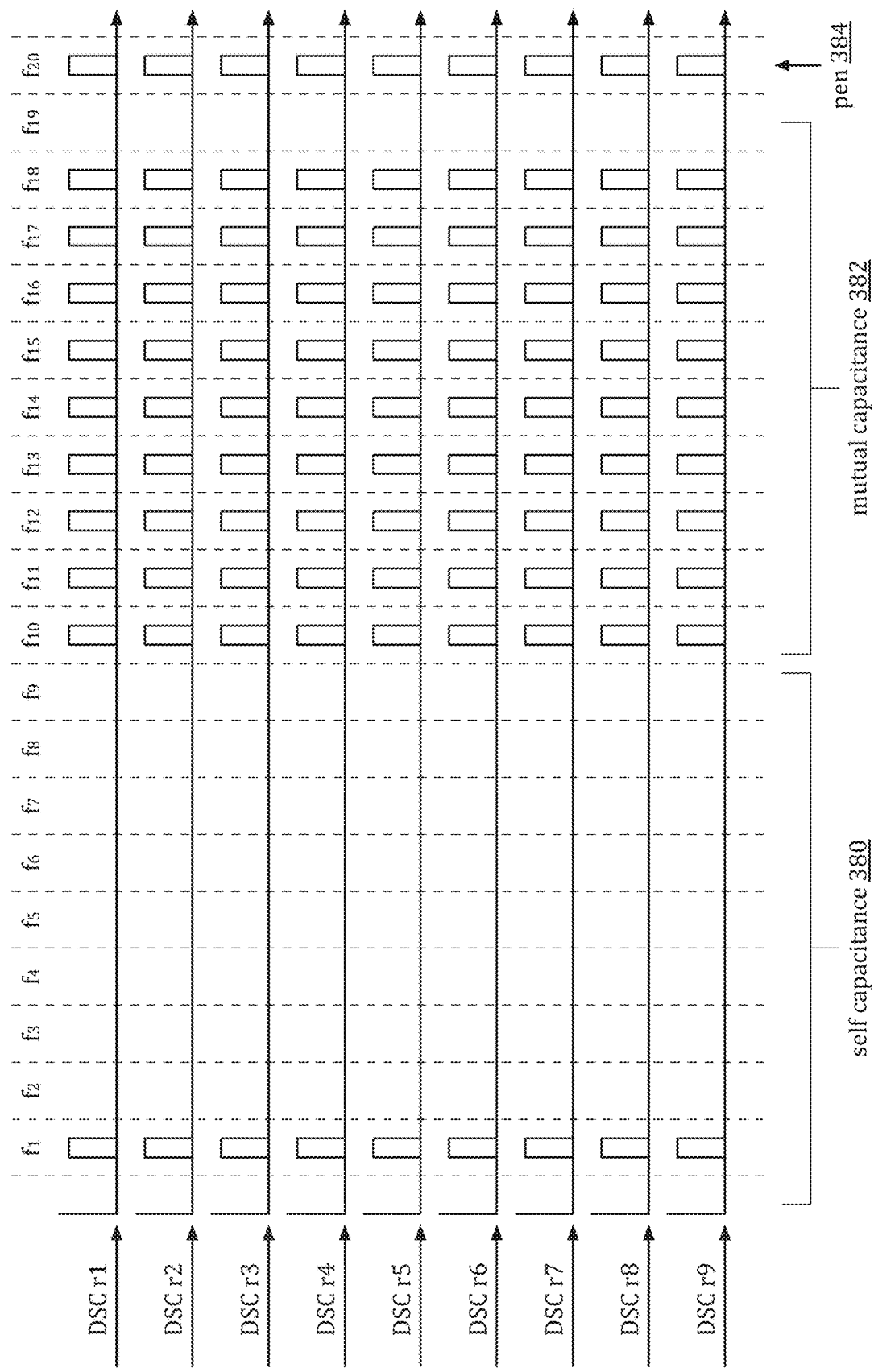
FIG. 61 is a schematic block diagram of an example of bandpass filtering for the frequency dividing of the reference signals for drive-sense circuits of a touch screen display.

FIG. 61 is a schematic block diagram of an example of bandpass filtering for the frequency dividing of the reference signals for drive-sense circuits affiliated with the row electrodes of FIG. 60. In this example, the filtering in the sense process unit 374 of the processing core 314 affiliated with the row drive sense circuits has bandpass filters to detect signals at f1, f10-f18, and f20 384 (f1 for self-capacitance, f10-f18 for mutual capacitance, and f20 for a pen transmit signal).

As shown, frequency f1 corresponds to the self-capacitance 380 of the row electrodes and frequencies f10-f18 correspond to mutual capacitance 382 of the row electrodes and their corresponding intersecting column electrodes. With concurrent sensing of self-capacitance and mutual capacitance, multiple touches are detectable with a high degree of accuracy.

Figure 62:
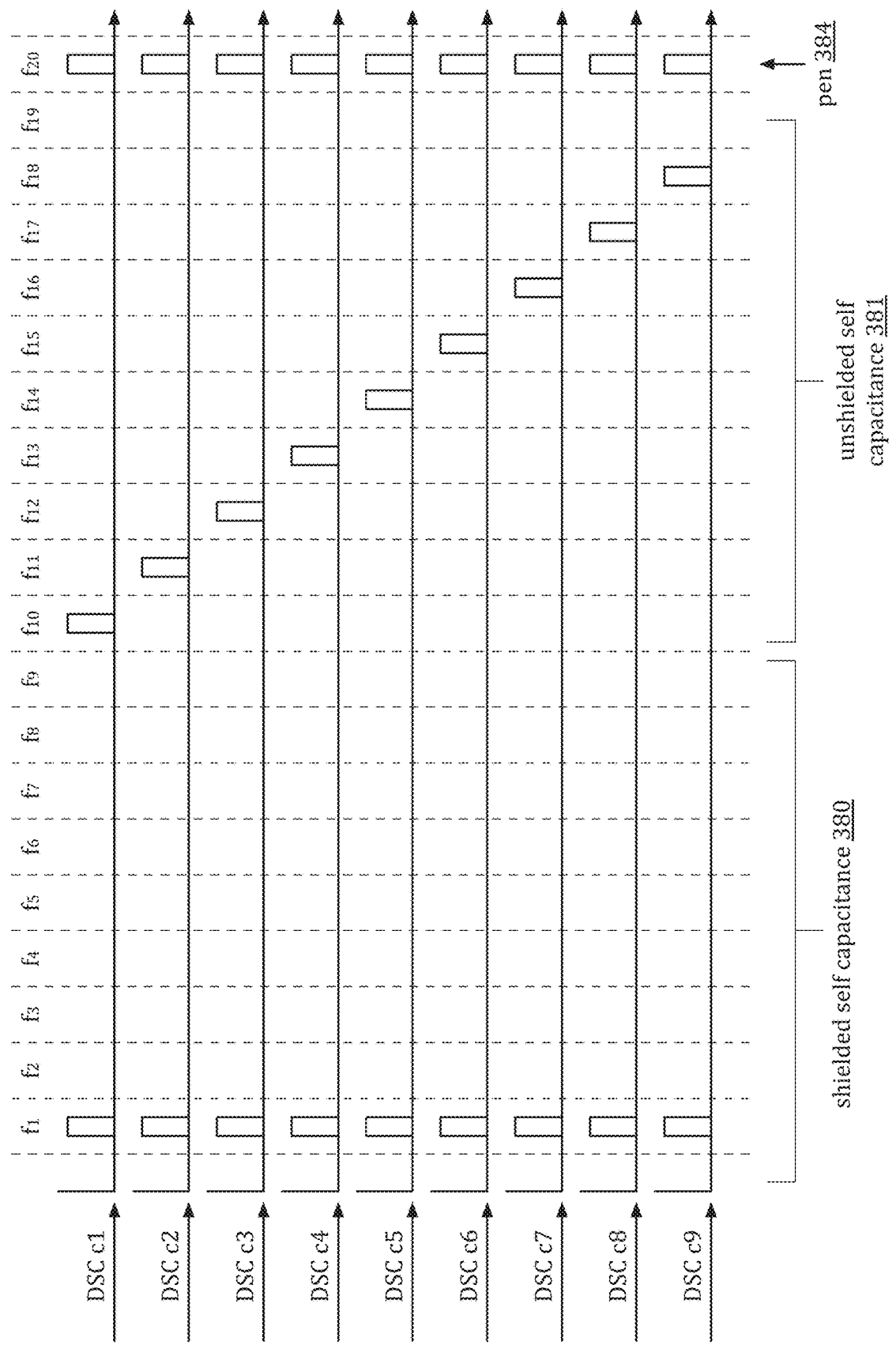
FIG. 62 is a schematic block diagram of another example of bandpass filtering for the frequency dividing of the reference signals for drive-sense circuits of a touch screen display.

FIG. 62 is a schematic block diagram of another example of bandpass filtering for the frequency dividing of the reference signals for drive-sense circuits affiliated with the column electrodes of FIG. 60. In this example, the filtering in the sense process unit 374 of the processing core 314 affiliated with the drive sense circuits has bandpass filters to detect signals at f1-f9, f10, and f20 384 (for a pen transmit signal).

As shown, frequency f1 corresponds to the shielded self-capacitance 380 of the column electrodes and frequencies f10-f18 correspond to unshielded self-capacitance 381 of the column electrodes. With concurrent sensing of self-capacitance and mutual capacitance, multiple touches are detectable with a high degree of accuracy. Note that there are a variety of combinations for sensing and filtering based on FIGS. 60-62. For example, only self-capacitance of the electrodes could be used to detect location of touches. As another example, the column DCSs could sense and processing the mutual capacitance. As another example, the unshielded self-capacitance is processed to determine levels of interference between the electrodes.

FIG. 63 is a schematic block diagram of an example of frequency and time dividing for reference signals for drive-sense circuits 28 of a touch screen display. In this example, a few row electrodes and a few column electrodes are shown. Each electrode is coupled to a drive sense circuit (DSC) 28. The crossover of a row electrode with a column electrode creates a sense cell. In this example, there are nine row electrodes and nine column electrodes, creating 81 sense cells. To allow for time-frequency division self-capacitance sensing and mutual sensing of the electrodes, the drive sense circuits affiliated with column electrodes use the same frequency f1 for self-capacitance and use a set of different frequencies (f10-f13) at different times (time 1, time 2) for mutual capacitance. The drive sense circuits affiliated with row electrodes use the same frequency (f1) for each of the different times.

Figure 64A:
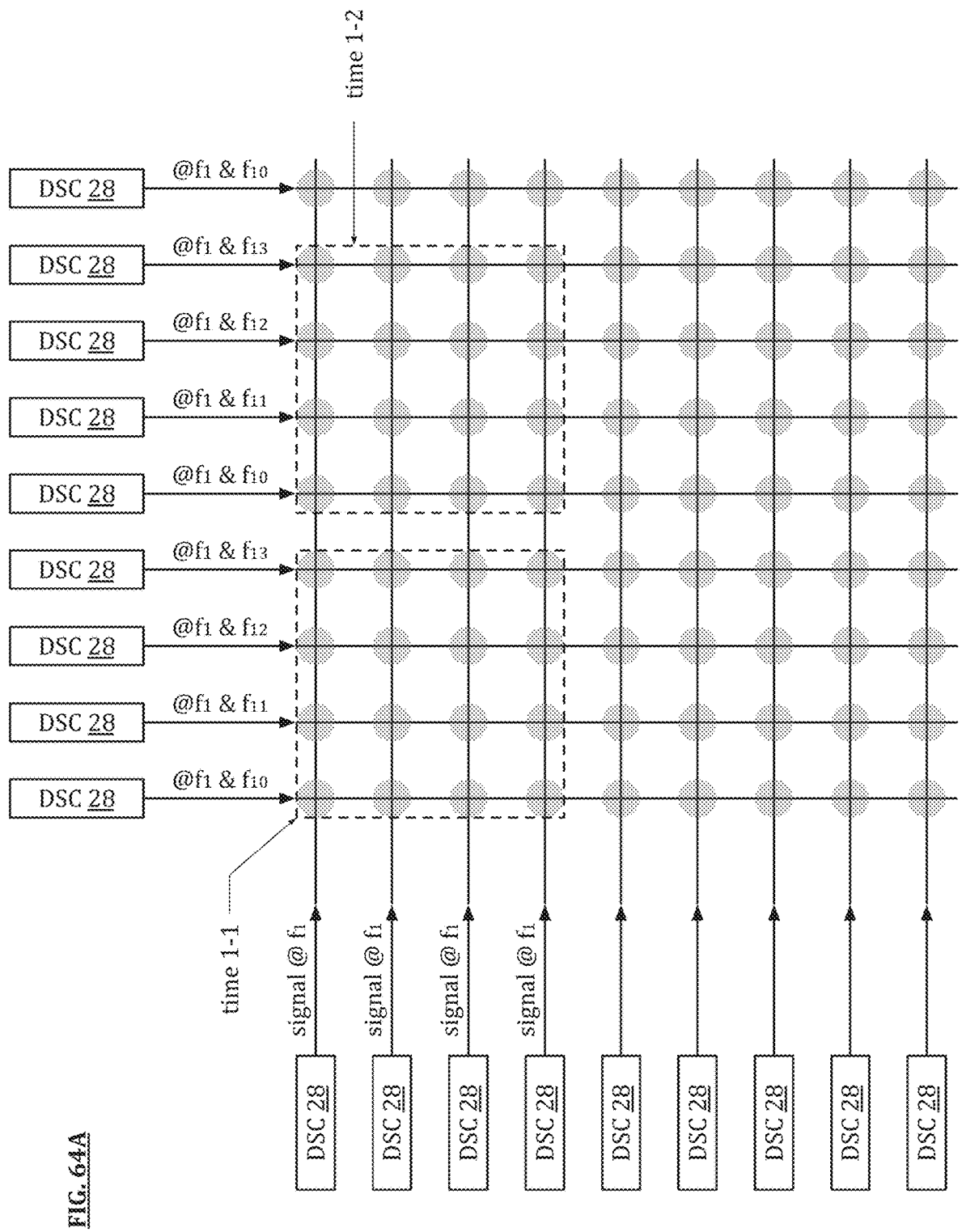
FIGS. 64A and 64B are a schematic block diagram of another example of frequency and time dividing for reference signals for drive-sense circuits of a touch screen display.
Figure 64B:
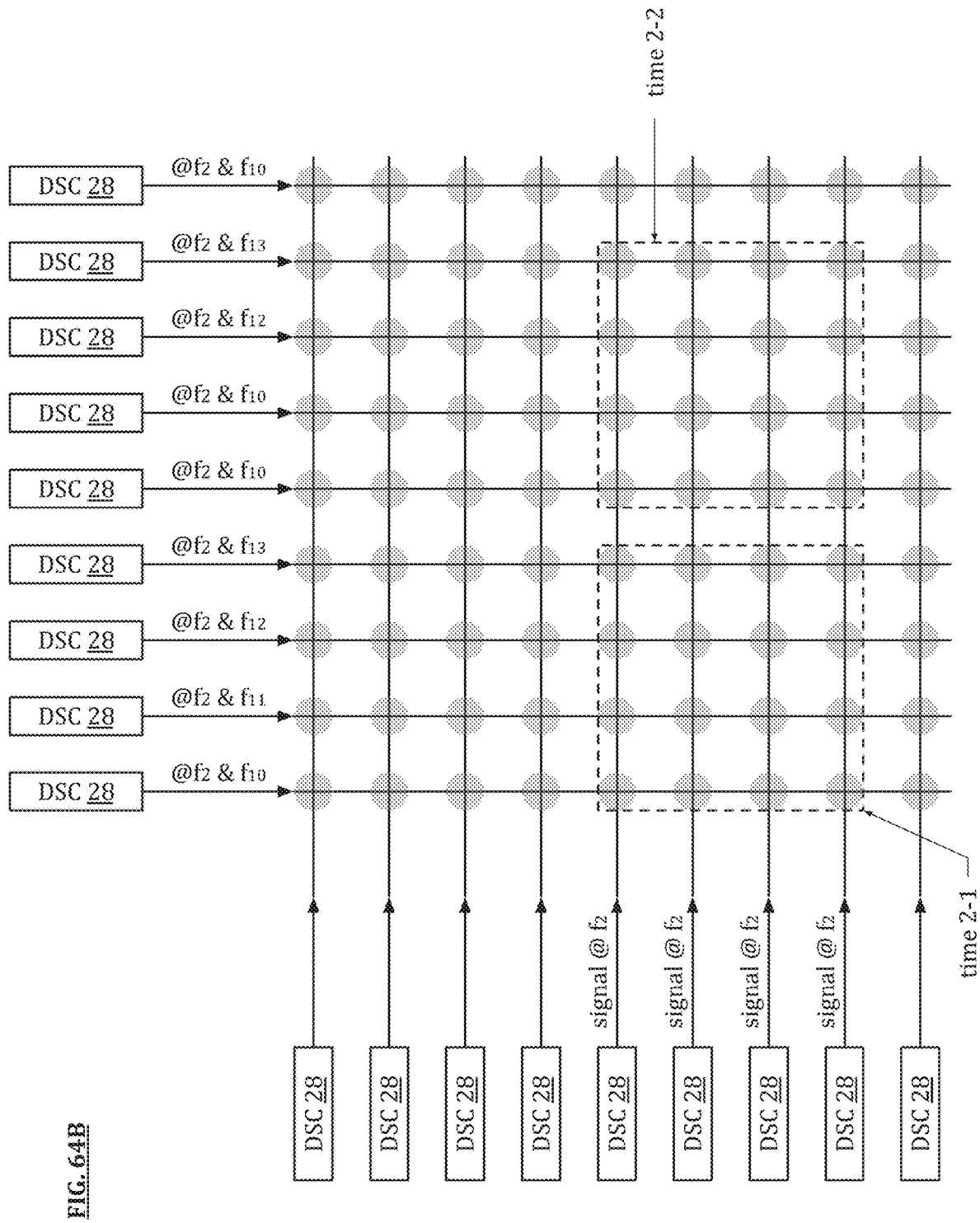

FIGS. 64A and 64B are a schematic block diagram of an example of frequency and time dividing for reference signals for drive-sense circuits (DSCs) 28 of a touch screen display. In this example, a few row electrodes and a few column electrodes are shown. Each electrode is coupled to a drive sense circuit (DSC) 28. The crossover of a row electrode with a column electrode creates a sense cell. In this example, there are nine row electrodes and nine column electrodes, creating 81 sense cells. To allow for time-frequency division self-capacitance sensing and mutual sensing of the electrodes, the drive sense circuits are grouped. Each group uses the same frequency f1 for self-capacitance and uses a set of frequencies f10-f13 for mutual capacitance but at different times.

For example, during time 1-1, the drive sense circuits affiliated with the first four row electrodes 1-4 use frequency f1 for self-capacitance and drive sense circuits affiliated with the first four column electrodes 1-4 use frequency f1 for self-capacitance and frequencies f10-f13 for mutual capacitance. As another example, during time 1-2, the drive sense circuits affiliated with the first four row electrodes 1-4 use frequency f1 for self-capacitance and the drive sense circuits affiliated with the second four column electrodes 5-8 use frequency f1 for self-capacitance and frequencies f5-f8 mutual capacitance.

Continuing with the example in FIG. 64B, during time 2-1, the drive sense circuits affiliated with the second four row electrodes 1-4 use frequency f1 for self-capacitance and drive sense circuits affiliated with the second four column electrodes 5-8 use frequency f1 for self-capacitance and frequencies f10-f13 for mutual capacitance. As another example, during time 2-2, the drive sense circuits affiliated with the second four row electrodes 5-8 use frequency f1 for self-capacitance and the drive sense circuits affiliated with the second four column electrodes 5-8 use frequency f1 for self-capacitance and frequencies f5-f8 mutual capacitance.

Figure 65A:
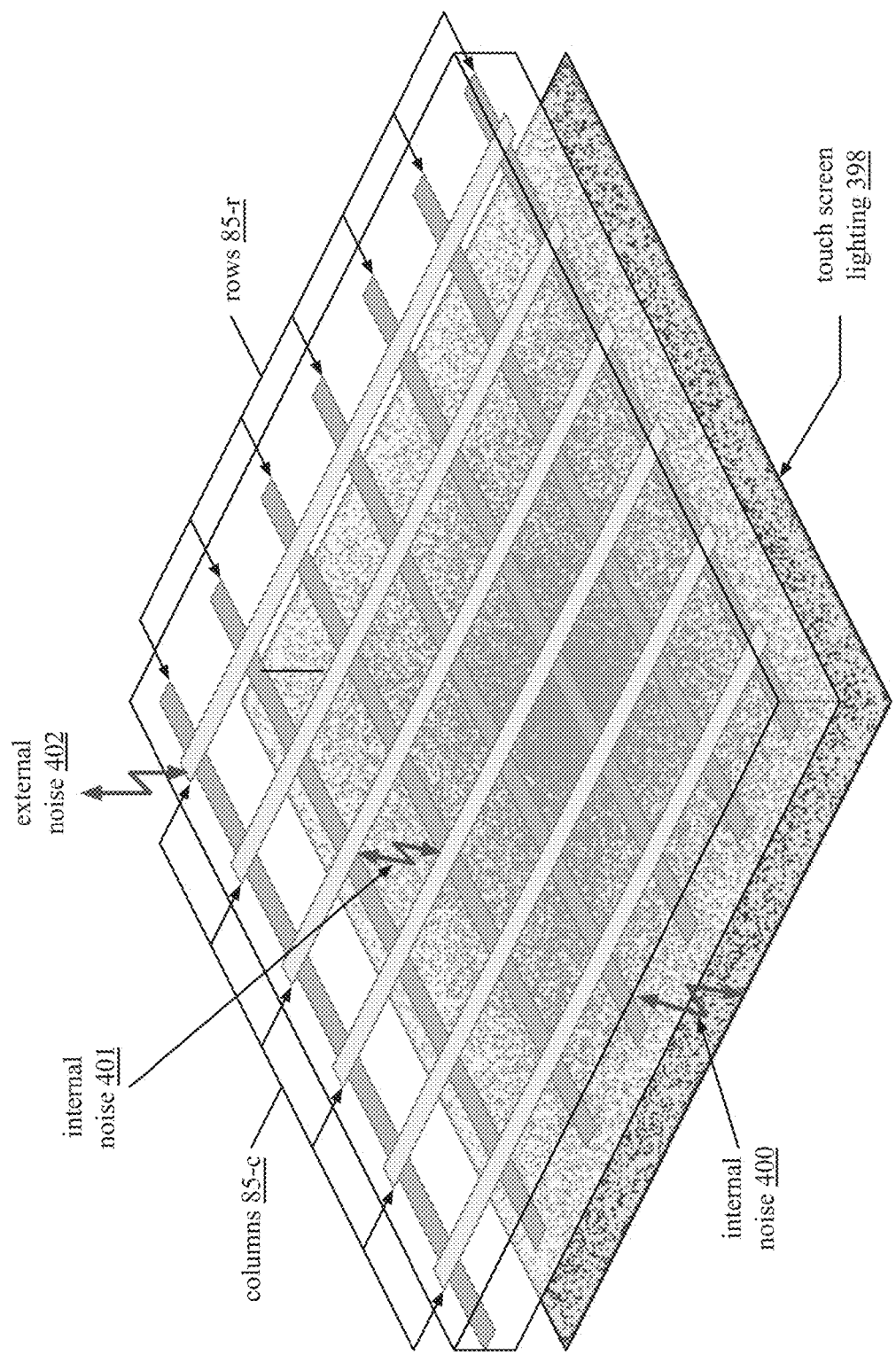
FIG. 65A is a schematic block diagram of an embodiment of a touch screen display.

FIG. 65A is a schematic block diagram of an embodiment of a touch screen display 80 that includes touch screen lighting 398, a plurality of rows of electrodes 85-$r$, and a plurality of columns 85-$c$ of electrodes. In an example, the touch screen lighting 398 includes more components such as lighting layers 77 as discussed with reference to FIGS. 9A and 9J. As illustrated, the electrodes 85-$c$ and 85-$r$ are exposed to various types of internal and external noise 400-402. Noise includes, but is not limited to, one or more of shot noise, thermal noise, partition noise, flicker noise, burst noise, image noise, capacitive coupling noise, intermodulation noise, crosstalk noise, interference noise, atmospheric noise, or any other unwanted signal that is present on or affects a desired signal (e.g., a drive-sense signal at a particular frequency) on an electrode.

As an example, internal noise 400 (e.g., image noise) from touch screen lighting 398 couples onto an electrode 85 affecting the signaling the electrode 85. As another example, internal noise 401 from a first electrode couples on to one or more other row and column electrodes 85. As yet another example, external noise (e.g., noise originating from outside touch screen 12) 402 affects signaling on one or more row and column electrodes 85.

When noise on an electrode 85 increases, the signal to noise ratio (SNR) of signaling on the electrode 85 decreases. To maintain a desired SNR as noise increases, either the noise needs to be reduced (e.g., removed, cancelled, etc.) and/or the level (e.g., amplitude, power, etc.) of the signaling needs to increase (e.g., at least proportional to the noise increase). Conversely, when noise decreases (e.g., by filtering, by cancelling, etc.), the SNR of the signaling increases (e.g., as long as the signal does not decrease more than a threshold, etc.).

There are numerous benefits to maintaining or increasing a desired SNR by performing one or more of removing noise of the signaling on an electrode 85 and increasing a level of the signaling on the electrode. For example, with lower noise, the power of signaling can be reduced while maintaining accurate detection of a touch on the touch screen display 80. As another example, by increasing a magnitude of a signal during a touch event, more noise can be tolerated while maintaining accurate detection of the touch. In an example, the magnitude is increased only for a portion of the touch event (e.g., when a sampling frequency is >2× greater than a touch screen refresh rate).

Figure 65D:
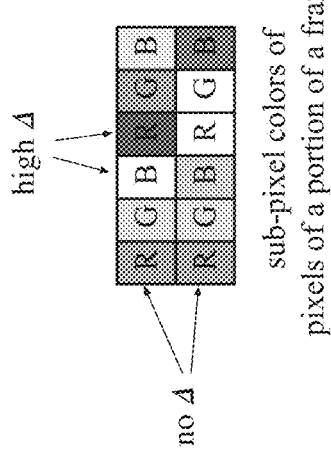
FIG. 65D is a schematic block diagram of an embodiment of sub-pixels of a portion of a frame.
Figure 65B:
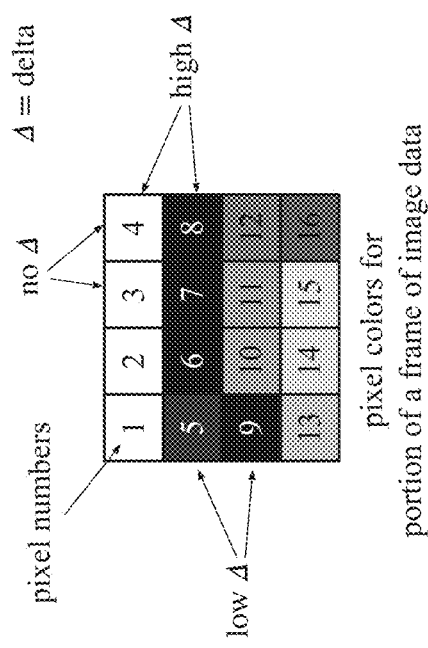
FIG. 65B is a schematic block diagram of an embodiment of a portion of a frame.

FIG. 65B is a schematic block diagram of an embodiment of a portion of a touch screen display displaying a frame of image data. When the image data is video, the frame may be one or more of an I-frame, a key frame, an intra-frame, a P-frame, a reference B-frame, and a non-reference B-frame. The image data may be associated with a video, an image, an application, and other display items (e.g., gif, logo, text box, etc.). In an instance, the image data corresponds to a portion of a digital painting image that is displayed on the touch screen. In another instance, the portion is an application being displayed on the touch screen display. In an example, the type of frame (e.g., I, P, B, etc.) can be used to estimated image noise. For example, a processing module determines that image noise for a row increases during an I-frame and decreases during a P-frame. As another example, the processing module determines that noise increases from a B to I frame transition, and thus activates a noise reduction technique for the row to use during the transition.

In this example, the portion includes sixteen total pixels (1-16) comprised of four rows of pixels and four columns of pixels. When activated, each pixel displays a color (or lack thereof for black) based on the image data. For example, the image data for the frame indicates pixels 1-4 are white, pixel 5 is dark grey, pixels 6-9 are black, pixel 10 is a light green, pixel 11 is green, pixel 12 is red, pixel 13 is a light blue, pixel 14 is a light pink, pixel 15 is yellow, and pixel 16 is purple.

Based on the image data, different voltages are applied to components associated with the pixels to produce the color. As an example, in LED touch screen display, a pixel has a red (R), green (G), and blue (B) sub-pixel, where each of the RGB sub-pixels can tune its voltage from off to fully on in various increments. As a specific example, the voltage tuning has 256 increments from 0 to 255, corresponding with 0 to 2.4 volts, which modifies the output of the R. G. or B subpixel. This specific example results in 16.7 million possible different colors combinations for each pixel.

As another example, to produce the color of each pixel, a certain voltage is applied to the liquid crystal display of the touch screen to allow a certain amount of light (e.g., brightness) from each of a red, green, and blue sub-pixel LED of the pixel. As such, more voltage (e.g., 2.4 volts) is required for a white pixel (e.g., red, green, and blue at 100%) than a blue pixel (e.g., 2.1 volts), and more voltage is required for the blue pixel than a dark grey pixel (e.g., 1.7 volts).

In general, a pixel with a higher voltage will produce more image noise than a pixel with a lower voltage. Thus, more image noise will come from pixels 1-4 that are white during this frame than pixels 5-8 that are dark grey and black during this frame. Spatially, noise varies, or has a delta (0.1), as the image color varies intraframe (e.g. within the same frame). For example, pixels 3 and 4 have substantially no intraframe spatial noise difference, pixels 5 and 9 have a low intraframe spatial noise difference and pixels 4 and 8 have a high intraframe spatial noise difference.

In an example, the color white has the highest overall voltage and color black has the lowest overall voltage. In general, as voltages from the image data increase, image noise (noise from the lighting components that couple onto electrodes associated with the pixel) for that pixel increases. Thus, as pixel voltages increase, the signal to noise ratio (SNR) of signaling (e.g., a drive-sense signal, a mutual capacitance sense signal, etc.) on the electrodes decreases.

In an example, the image data is used to determine, estimate, measure, and/or predict image noise that will affect signaling on the pixel electrodes. The image noise also may be used to predict, determine, estimate and/or measure a difference across adjacent (e.g., directly next to one another), proximal (any pixel that contributes noise to another electrode), or contiguous (two or more adjacent) pixels. This can be utilized to determine a slope of the image noise across a portion of the pixels of the touch screen display. The portion is one or more of a row, a column, a portion of a row, a portion of column, and a diagonal combination of adjacent pixels. As a specific example, the portion is a fifth row. As another specific example, the portion is 2 rows separated by 2 pixels and the first 20 columns of each of the 2 rows. In an example, the slope of a first row or column can be utilized in removing noise from a second row or columns. In another example, the image noise determined for pixels of a first column can be utilized in removing image noise from a second column.

In the example of FIG. 65B, a slope of the first row (pixels 1-4) is substantially flat (e.g., voltage varies less than 10%, color brightness varies less than 5%, etc.) as all pixels are displaying the color white. The slope of the second row (pixels 5-8) is also substantially flat overall with a slight decrease from pixel 5 to pixel 6. The slope of the third row (pixels 9-12) increases from pixel 9 to 11 than flattens out (e.g., when voltages for R and G sub-pixels are substantially similar) from pixels 11-12. Note that slopes can also be determined for a column and/or diagonally across one or more rows and columns. In an example, a slope of a first row, and a weighted slope of a second row is used to estimate the slope of third row (e.g., when an electrode associated with the third row is being touched). As another example, the slope is determined diagonally across pixels 1, 6, 11, and 16.

Figure 65C:
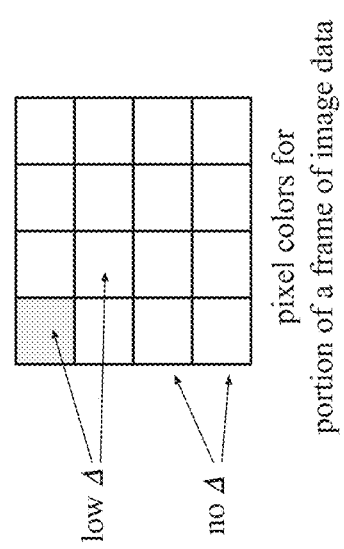
FIG. 65C is a schematic block diagram of another embodiment of a portion of a frame.

FIG. 65C is a schematic block diagram of an embodiment of a portion of a frame displaying image data. This example shows a portion where pixel colors have a low overall spatial delta \ as the slopes of noise from pixel to pixel (e.g., along a row, along a column, diagonally) is substantially even with slight slopes around pixel 1. However, as all of the pixels are bright (e.g., LED voltage over a threshold), the portion of the frame contributes higher overall image noise than the portion of the frame of FIG. 65B. Thus, depending on the image noise for a row, a column, or a portion of a row and/or a column, a first increasing SNR technique may be used for a first row or portion of the touch screen, and a second increasing SNR technique may be used for a second row or portion of the touch screen.

Note that depending on the orientation and placement of electrodes of the touch screen used for detecting a touch, certain rows and/or columns of pixels may contribute more image noise to signaling on an electrode. For example, the pixel is directly beneath the touch electrode. As another example, there are 5 pixels beneath a touch electrode and depending on the distance and electrical characteristics of the components (e.g., elements (e.g., transistor, resistor, etc.)) of the 5 pixels, certain pixels contribute more noise to the electrode than others. These can be determined and utilized in one or more increasing signal to noise ratio techniques as described in one or more of the other Figures.

FIG. 65D is a schematic block diagram of an embodiment of sub-pixels of a portion of a frame. In this example, the red subpixel of the left top and bottom pixels has substantially no spatial delta. The blue subpixel of the left top pixel and the red subpixel on the right top pixel has a high spatial delta (e.g., the red subpixel fully on, and the blue sub pixel fully off).

Depending on the orientation and placement of electrodes of the touch screen used for detecting a touch, certain sub-pixels may contribute more image noise to signaling on an electrode. This can be determined and utilized in one or more increasing signal to noise ratio techniques as described in one or more other Figures. In an example, there is more noise on a pixel when the variation of sub-pixels is higher (e.g., orange higher noise than grey, as grey sub-pixels are uniform in spatial voltages (e.g., R,B,G subpixels substantially the same column voltage).

Figure 65E:
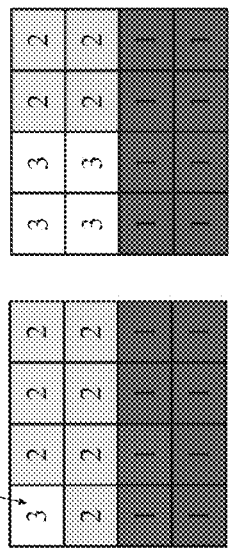
FIG. 65E is a schematic block diagram of an embodiment of five frames of image data.

FIG. 65E is a schematic block diagram of an embodiment of five frames of image data. The image data corresponds with a 16 pixel portion (e.g., 4 pixel rows and 4 pixel columns) of a touch screen as shown. In this specific example, the image data is video of a white baseball flying in front of an outfield wall that has a green base and a yellow home run line. In frames 3-5, a black baseball glove enters the frames as a player is diving to catch the baseball.

The numbers in each pixel represent the number of light emitting diodes (LEDs) that are turned on (e.g., activated, have a voltage applied, etc.) for the pixel. For example, the white pixel of the upper left corner of frame 1 has 3 subpixel LEDs on (e.g., each of its red, green, and blue LEDs), the yellow pixel directly below the white pixel has two subpixel LEDs on (e.g., the green and blue LEDs) to produce the color yellow, and the green pixel directly below the yellow pixel has one subpixel LED on (e.g., the green LED). Thus, in an example, the first two rows of frame 1 contribute more image noise than the last two rows of frame 1.

During each frame there is intraframe noise variations due to variations in pixel colors, and interframe noise variations from a preceding frame to the current frame due to variation in pixel colors from the preceding frame to the current frame. For example, an intraframe noise curve for row 1 of frame 1 would be high for the first pixel (e.g., column 1) and would decrease moving to pixel 2 and remain substantially constant through pixel 4.

Figure 65F:
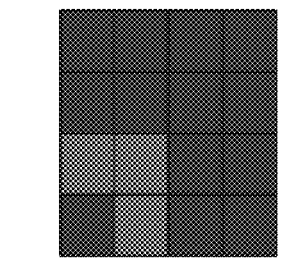
FIG. 65F is a schematic block diagram of an embodiment of interframe pixel deltas.

FIG. 65F is a schematic block diagram of an embodiment of interframe (e.g., adjacent frames) pixel deltas for frames 1-5 of FIG. 65E. FIG. 65F also includes a legend for the interframe pixel deltas to illustrate the variation of pixel colors from frame to frame. For example, a white frame to frame pixel delta is associated with a high change of color of a pixel from frame to frame (e.g., pixel 1 is black (e.g., zero RGB LEDs activated) during frame 2 and is white (e.g., 3 RGB LEDs activated, a white LED activated, etc.) during frame 3). A light grey frame to frame pixel delta is associated with a medium change of color (e.g., pixel 9 is green in frame 2 and is white is frame 3). A mid-grey frame to frame pixel delta is associated with a low change of color (e.g., pixel 5 is yellow in frame 1 and is white in frame 2). A dark grey frame to frame pixel delta is associated with substantially no change of color (e.g., pixel 13 is green in frame 1 and is green in frame 2).

In an example, the LEDs for a pixel have a voltage tuning with 256 increments, the no change of color corresponds with the first 64 increments (e.g., 0-63), the low change of color corresponds with a next 64 increments (e.g., 64-127), the medium change of color corresponds with a next 64 increments (e.g., 128-191), and the medium change of color corresponds with a next 64 increments (e.g., 192-255).

In another example, the none-high thresholds are based on one or more voltages that correspond with a level of image noise. For example, voltages 0 V through 1.2 V cause less than 10% of the image noise as compared with a maximum voltage (e.g., 2.4V) and thus are associated with a none threshold, voltages 1.21-1.75 V cause 11-50% of the image noise as compared with the maximum voltage and thus are associated with a low threshold, voltages 1.76-2.2V cause 51-80% of the image noise and thus are associated with a medium threshold, and voltages 2.21-2.4V cause 81-100% of the image noise and thus are associated with a high threshold.

In an example, the interframe noise increases as the voltage increases and decreases as the voltage decreases. For example, in frame 3 to frame 4Δs, the tenth pixel (e.g., row 3, col 2) changes from 3 to 11 subpixels on. This would indicate a drop in voltage for the tenth pixel from frame 3 to frame 4. Further, in frame 4 to frame 5 Δs, the fifteenth pixel (e.g., row 4, col 3) changes from 1 to 3 subpixels on. This would indicate a rise in voltage for the fifteenth pixel from frame 4 to frame 5. In an example, although both the tenth and fifteenth pixels change 2 subpixels on/off from frame 3 to frame 4, more image noise would come from pixel fifteen as its voltage is increasing to a higher voltage than the voltage to which pixel 10 is decreasing. In another example, more image noise is generated from pixel 7 in frame 4 than pixel 8, even though during the frame 4 they are the same color due to the interframe noise associated with pixel 7 from frame 3 to frame 4 (e.g., 3 to 2 subpixels on). In an example, the interframe noise is due to characteristics (voltage, RC time constant, etc.) of elements (e.g., transistors, capacitors, etc.) associated with the pixel resulting in noise on the electrode.

Figure 65G:
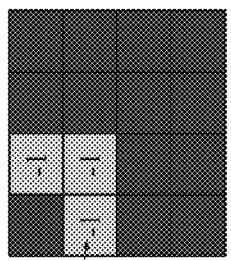
FIG. 65G is a schematic block diagram of an embodiment of determining an interframe difference in a characteristic of a pixel.

FIG. 65G is a schematic block diagram of an embodiment of determining an interframe difference in a characteristic of a pixel from frame to frame of FIG. 65E. For example, a light blue pixel represents a difference of minus one in the number of RGB subpixel diodes that are on compared with the pixel in the preceding frame. As another example, a red pixel represents a difference of plus three in the number of RGB subpixel diodes that are on compared with the pixel in the preceding frame.

Depending on the increasing signal to noise ratio (e.g., signal increasing, noise reducing) technique implementation, this subpixel image data can be utilized in determining an increasing signal to noise ratio technique for the pixel. For example, when the frame to frame difference for the portion of the frame is less than a threshold (e.g., <+1), the increasing signal to noise ratio is a first technique, and when the frame to frame deltas for the portion of the frame are equal to or greater than the threshold (e.g., 2 or greater), the increasing signal to noise ratio is a second technique.

In an instance, the first increasing signal to noise ratio technique is no noise reduction needed (e.g., when a voltage level is below a voltage threshold (e.g., <0.8V) and the frame to frame difference (e.g., <+1) is below the threshold). In another instance, the first increasing signal to noise ratio technique is a spatial filter noise reduction technique and the second increasing signal to noise ratio technique is a forward error drive sense signal correction noise reduction technique. The spatial filter noise reduction technique will be discussed in greater detail with reference to FIGS. 66A-R. The forward error drive sense signal correction noise reduction technique will be discussed in greater detail with reference to FIGS. 68A-B.

The frame to frame subpixel RGB diode change can be utilized in determining one or more increasing SNR techniques. The frame to frame subpixel RGB diode change can be determined on one or more of a row by row basis, a column by column basis, a continuous adjacent frame basis, a proximal electrode to another proximal electrode basis, a pixel by pixel basis, and a macroblock (e.g., rows and columns) by macroblock basis.

Figure 65H:
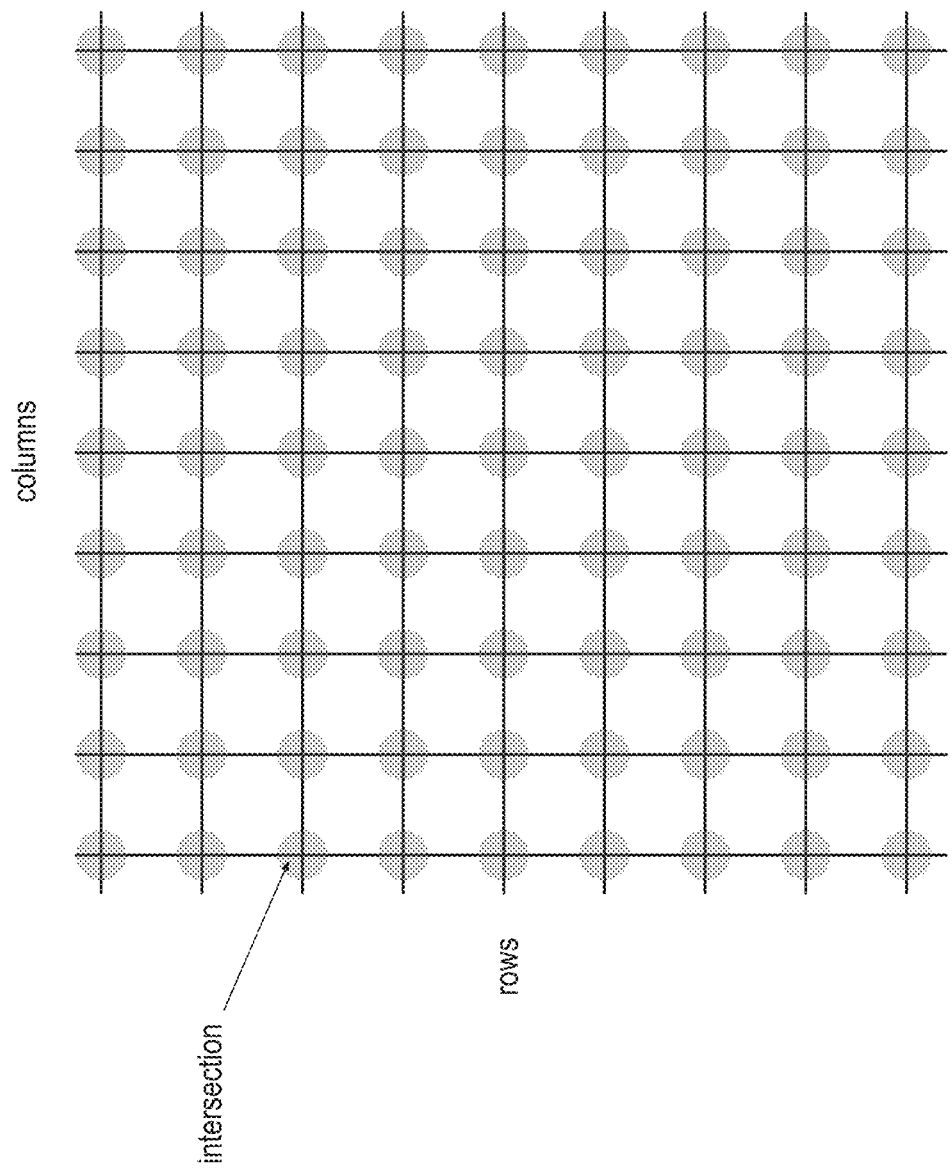
FIG. 65H is a schematic block diagram of an embodiment of intersections of rows and columns of electrodes of a touch screen display.

FIG. 65H is a schematic block diagram of an embodiment of intersections (grey circles) of rows and columns of electrodes of a touch screen display of a touch screen computing device. Each of the rows and columns are connected to a drive sense circuit of the touch screen computing device. Note there may be more than one row or column connected to the same drive sense circuit. For example, a first and second row are both connected to the same drive sense circuit.

In an example, the touch screen computing device runs a noise detection process to determine a noise level on the intersections. An as example, a drive-sense circuit connected to an electrode drives a signal onto the electrode and senses changes in the signal to determine the noise. The noise detection process may include one or more sub-processes. A sub-process includes one or more of a no display setup sub-process, an image noise sub-process, and an in use touch sub-process.

The no display setup process includes a drive sense circuit sensing a frequency signal at an intersection while the display is off, comparing the sensed frequency signal to a known frequency signal, and determining a first noise component based on the comparing. The image noise sub-process includes sensing the frequency signal at an intersection while a pixel associated with the intersection is varied across a plurality of colors. The affect of the image noise from the pixel is measured and recorded for at least some of the plurality of colors and for transitions (e.g., first noise from black to white pixel transition, second noise from white to block pixel transition). The image noise may further be determined by measuring a first noise from the image noise sub-process and subtracting out a second noise from the no display setup sub-process to produce the image noise. The in-use sub-process includes displaying a touch area on the display, sensing a touch on the touch area via one or more frequency signals, and determining characteristics of the touch and noise on intersections associated with the touch area.

One or more of the sub-process may be utilized (e.g., averaged, selected, combined, etc.) to determine estimated noise information for an intersection. In an instance, a map of various noise estimations is generated and saved for future use. For example, having determined estimated noise at a first time (e.g., sample 1 during frame 1, factory setup, etc.) under a first condition (e.g., pixel color, touch area, pixel brightness, etc.) for an intersection, the estimated noise can be utilized during a second time (e.g., sample 2 during frame 1, sample 1 during frame two, display in use in the field, etc.) under the first condition to improve the SNR by either removing the estimated noise or by increasing signal power for the second time.

FIG. 65I is a schematic block diagram of an embodiment of row-column intersections of a touch screen. In this example, the numbers represent a noise level (e.g., amplitude, power, percentage of maximum, etc.) of noise that is affecting a signal at the intersection. For example, the noise level is determined utilizing the noise detection process as described in FIG. 65H. Thus, in an instance, the noise level is a current noise being measured at the intersection. In another instance, the noise level is an estimated noise. The estimated noise can be estimated utilizing one or more proximal (e.g., adjacent) intersections, and/or estimated based on saved parameters and/or saved image noise data.

An issue can arise when attempting to determine random noise at an intersection that is currently being touched. For example, measuring changes to a known signal (e.g., first frequency with a particular amplitude) on the third and fourth row electrodes without a touch can be determined by subtracting the known signal from the measured signal to produce the random noise.

However, when a touch is present, the noise being random and the touch also including uncertainty on how it will affect the signal (e.g., surface area of finger contacting touch screen, pressure of touch, length of touch, etc.) on to the electrode causes an issue in directly measuring the random noise at the intersections where the touch is present. Depending on how each row and column is driven and sensed (e.g., how many different frequencies are used in self and mutual capacitances of the intersections), random noise on an affected electrode (e.g., rows three and four in this example) may be unable to be directly determined when the touch is present. In an example, a proximal row (e.g., an adjacent row (e.g., row 2 for row 3 and row 5 for row 4)) may be utilized to estimate and remove the estimated noise on the row effected by touch event.

Figure 65J:
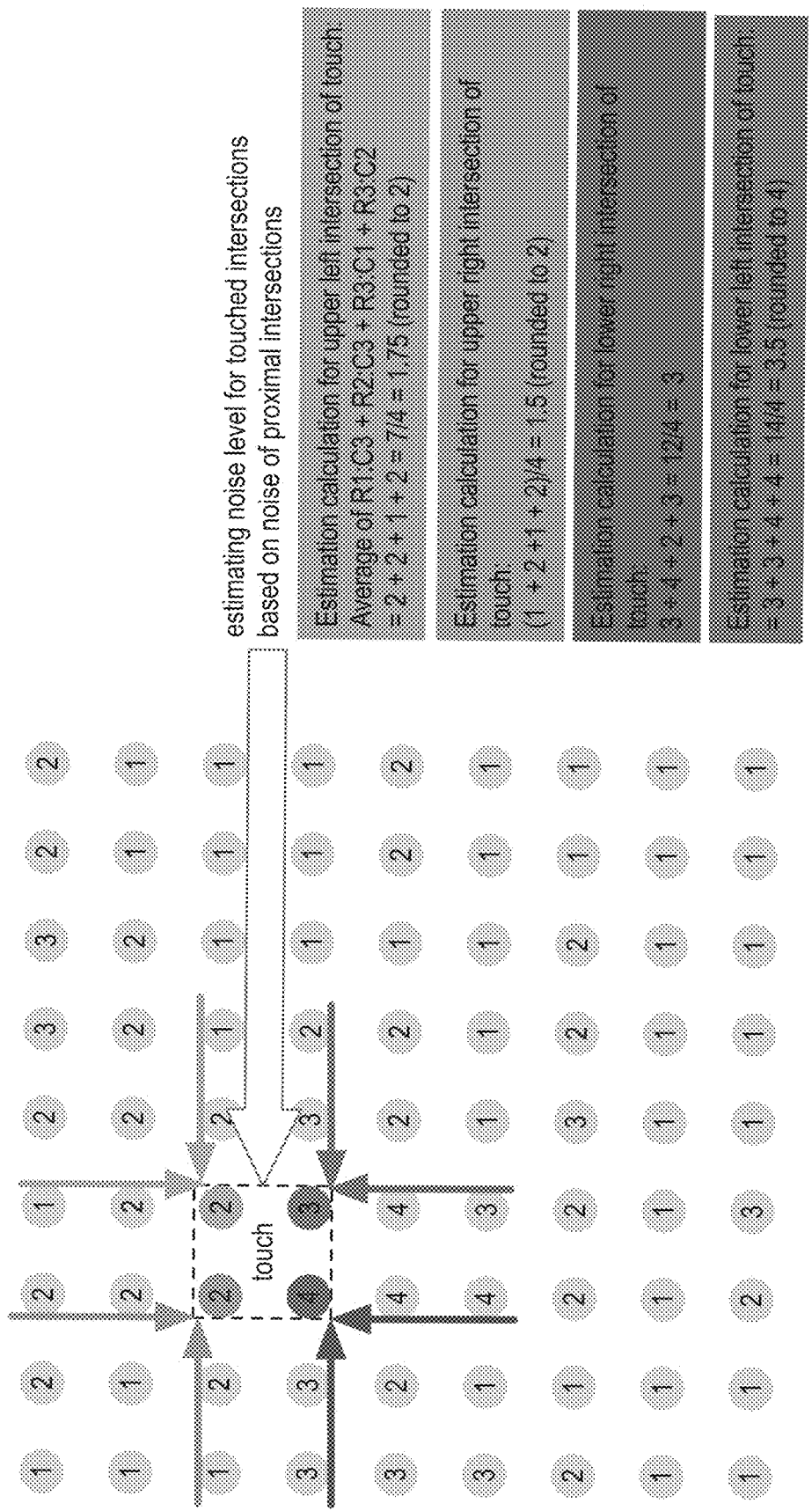
FIG. 65J is a schematic block diagram of an embodiment illustrating estimating noise associated with one or more intersections.

FIG. 65J is a schematic block diagram of an embodiment illustrating estimating noise associated with one or more intersections where a touch is present. The estimating noise includes a variety of noise estimating approaches. A noise estimating approach includes one or more of copying an adjacent intersection noise value, adding and averaging two or more proximal intersection noise values, using a weighted average of two or more proximal intersection noise values, rounding up noise values, rounding down noise values, determining a slope of proximal intersection noise values, mapping a function across a contiguous row of intersections, where the contiguous row includes an intersection where the touch is present, etc.

In this specific example, noise level estimations for the touch are two for the upper left touch intersection, two for the upper right touch intersection, four for the lower left touch intersection, and three for the lower right touch intersection. The upper left touch intersection is calculated by adding the two intersections directly above and the two intersections to the left, then taking the average. The result is then rounded to nearest integer in this example for ease of illustration, however, in practice can be rounded up to 10 or more decimal places (e.g., 2.1438203847).

The upper right intersection is calculated by adding the two intersections directly above and the two intersections to the right, then taking the average. The result is then rounded to nearest integer. The lower right intersection is calculated by adding the two intersections directly below and the two intersections to the right, then taking the average. The lower left intersection is calculated by adding the two intersections directly below and the two intersections to the left, then taking the average. In an example, when a path (e.g., along the arrow to a touch event intersection) varies above a threshold, the noise estimating approach can be changed. For example, when the path varies by a noise level of 2 or more, the noise estimating approach is modified (e.g., from an addition to a slope noise estimating approach).

Figure 65K:
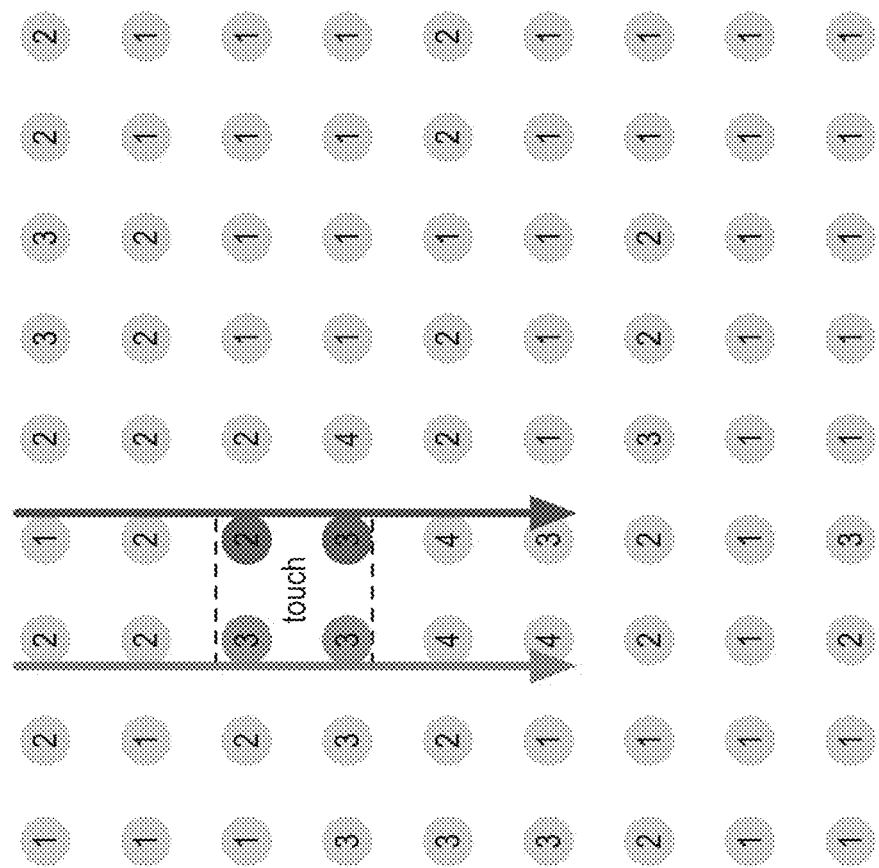
FIG. 65K is a schematic block diagram of another embodiment illustrating estimating noise associated with one or more intersections.

FIG. 65K is a schematic block diagram of an embodiment illustrating estimating noise associated with one or more intersections where a touch is present. In this example, the noise is estimated using a slope of intersections that intersect the touch event. For example, the slope of the green line is determined starting from row 1, column 3 through row 6, column 3. Based on the slope, the left two intersections (e.g., green color) are determined to have a noise level of three. As another example, the slope of the red line is determined starting from row 1, column 4 is through row 6, column 4. Based on the slope, the right two intersections (e.g., red color) are estimated to have a noise level of two and three.

In an example, thermal noise increases for higher frequency signals on a row, this can be utilized in determining the noise estimation for an intersection. For example, a second row below the row being touched is driven at 600 Hertz, and the row being touched that includes the intersection is driven at 300 Hertz. Thus the thermal noise level of a second intersection of the second row that is adjacent to the intersection, should be less than the thermal noise for the second row. Thus, the slope can be reduced based on as estimated thermal noise difference resulting from the different frequencies one each row. As a specific example, row four, column three is changed from a noise level of 2 to a noise level of one based on the thermal noise estimation component.

Figure 65L:
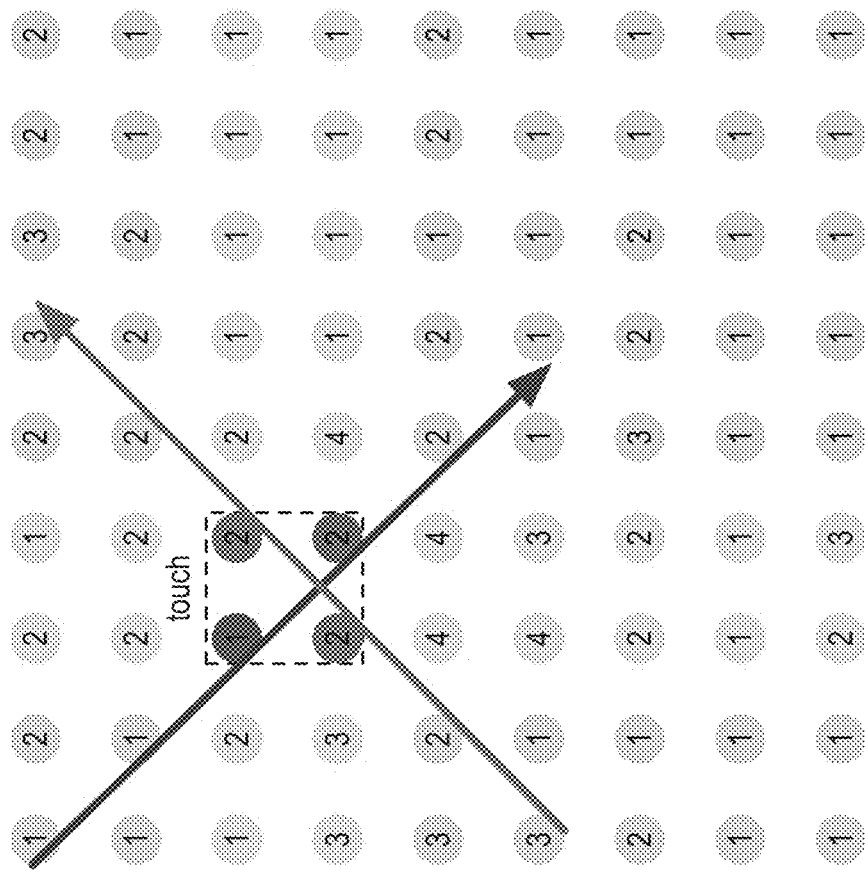
FIG. 65L is a schematic block diagram of another embodiment illustrating estimating noise associated with one or more intersections.

FIG. 65L is a schematic block diagram of another embodiment illustrating estimating noise associated with one or more intersections where a touch is present. In this specific example, when the touch is present, rows and columns associated with the touch are not used to estimate the noise. Thus, one example of estimating the noise is by utilizing one or more diagonal proximal intersections" noise values. For example, a function of the blue line is determined. In another example, the closest diagonal value is copied to the touch intersection. For example, row 2, column 2 noise value is copied to row 3, column 3, and row 5, column 2 is copied to row 4, column 3, and so on.

FIG. 65M is a diagram illustrating another embodiment of estimating noise associated with one or more intersections during a touch event while the touch screen display is displaying a frame n of image data. In this example, there is no touch at a first time t1, which occurs while the frame n of image data is being displayed on the touch screen. A touch occurs during a second time, t2, where the frame n of image data is still being displayed. As such, the noise for the touch area from time t1 is used to estimate the noise for the touch occurring in time t2. In an example, times t1 and t2 correspond with a touch signal sampling rate and frames of the image data have a data frame rate that is less than the sampling rate. This is discussed in further detail with reference to FIGS. 69A-H.

FIG. 65N is a diagram illustrating another embodiment of estimating noise associated with one or more intersections during a touch event during multiple frames of image data. During time to, a noise level is estimated for intersections associated with pixels of frame n−1 that is being displayed on a touch screen computing device. At or during time t1, frame n−1 ends and a new frame n is displayed on the touch screen. Still during time t1, a touch occurs on the touch screen at the red intersection pixels (e.g., at rows 3 and 4 on columns 3 and 4). Because a new frame of image data is being displayed since a last noise level estimation, the noise levels for the touch area are not known. In a first example of estimating the noise levels for the touch area while frame n is displayed, a processing module of the touch screen computing device obtains image data regarding one or more of the frame n and the previous frame n−1. The processing module may perform a lookup based on the image data to determine a previous noise level for similar image data. For example, the image data indicates the pixels associated with the touch area are the color white for frame n, the processing module performs a lookup in an image noise level to color lookup table and determines that the estimated noise level for pixel 1 (e.g., top left) of touch area is 3, the estimated noise level for pixel 2 (e.g., top right) of touch area is 2, the estimated noise level for pixel 3 of touch area is 3, and the estimated noise level for pixel 4 of touch area is 3.

In a second example, the processing module determines a pixel delta (e.g., of FIG. 65F) and modifies the previous frame's (frame n−1) noise level values based on the delta. For example, when the pixel delta for the first pixel is high, the processing module add a value corresponding to high pixel delta to the previous noise level vale for the first pixel. As a specific example, the processing module adds 2 to the previous first pixel noise level value of 3 to give the first pixel noise level a value of 5 for time t1 of frame n.

Figure 65P:
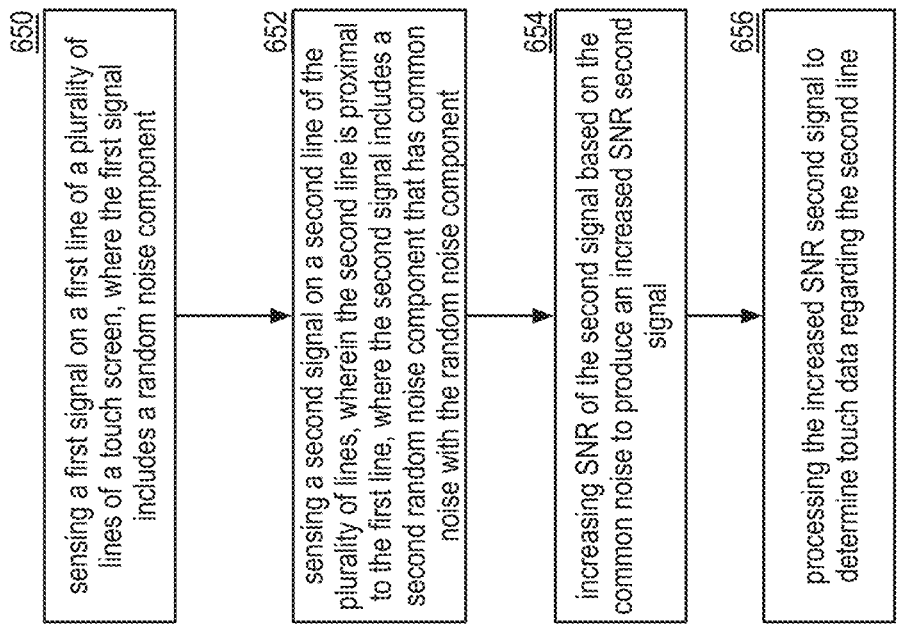
FIG. 65P is flowchart illustrating an example of a method of increasing a signal to noise ratio for a signal on a line of a touch screen display.

FIG. 65P is flowchart illustrating an example of a method of increasing SNR for a signal on a line of a touch screen display. The method includes step 650, where a computing device senses a first signal on a first line (e.g., an electrode) of a plurality of lines of a touch screen, wherein the first signal includes a random noise component (e.g., image noise from the touch screen display, etc.). For example, a drive sense circuit of the computing device drives and senses affects from the random noise on the first signal. As another example, a first drive sense circuit of the computing device drives the first signal and a second drive sense circuit of the computing device drives another signal and senses the random noise affects on the first signal.

The method further includes step 652, where the computing device senses a second signal on a second line of the plurality of lines, wherein the second line is proximal (e.g., adjacent, intersecting, includes at least some noise that is common to the first and second lines, etc.) to the first line. In an example, the first line is a first row electrode and the second line is a second row electrode. In another example, the first line is a first column electrode, and the second line is a third column electrode. In an example, the second signal is driven on to the second line by a second drive sense circuit of the computing device and is sensed by the second drive sense circuit. In another example, the second signal is drive onto the second line by a first drive sense circuit of the computing device and is sensed by the second drive sense circuit.

The method further includes step 654, where the computing device increases the signal to noise ratio (SNR) of the second signal based on the first signal to produce an increased SNR second signal. For example, the computing device determines a difference between the first signal and a noise affected first signal to produce a first noise estimate. In an example, the first noise estimate is for one or more intersections associated with the first line. The computing device then subtracts the first noise estimate from the second signal to produce the increased SNR second signal. As another example, after determining the first noise estimate, the processing module increases a power of the second signal (e.g., to maintain an acceptable SNR, to increase the SNR, etc.) to produce the increased SNR second signal.

The method further includes step 656, wherein the computing device processes the increased SNR second signal to determine touch data regarding the second line. For example, the computing device determines a touch occurred at a first point of the second line (e.g., an intersection) based on a characteristic (e.g., amplitude, power, etc.) of the increased SNR second signal exceeding a touch threshold value at the first point.

FIG. 66A is a schematic block diagram of an embodiment of a portion of a touch screen display that includes a row electrode and a plurality of column electrodes oriented substantially perpendicular to the row electrode. A sensor signal (e.g., fm) is driven onto the row electrode via a drive sense circuit (DSC). The sensor signal includes one or more frequencies corresponding to frequencies for sensing self and mutual capacitances. Note the DSC also senses any changes to the sensor signal.

The touch display also includes columns driven and sensed by one or more other drive sense circuits. At each intersection with a column of the touch display, there is a mutual capacitance (e.g., Cm1-Cm8) between the row and each column. Each of the column drive sense circuits receive the frequency signal (fm) as images Im0-Im7, where each image includes the desired signal (e.g., what fm is known to be) and a random noise component (e.g., image noise, flicker noise, etc.). Generally, the random noise is correlated (e.g., constant, changing with a slight slope, etc.) spatially across adjacent columns of the row. Thus, a differential measurement of two adjacent columns (e.g., Im6+Im7, etc.) or proximal (e.g., Im5 and Im7) can subtract a majority of the image noise out of the signal as the image noise difference is generally substantially minimal between two adjacent or proximal columns of the same row. Note that in an example, a column DSC drives a frequency signal and each row DSC that intersects with the column receives the frequency signal. In this example, noise correlated across columns of the row can be spatially filtered as will be discussed in one or more subsequent Figures.

FIG. 66B is a graph illustrating examples of spatial correlation of image noise across at least a portion of a row of a touch screen. As illustrated, image noise presents as a direct current (DC) offset across a row of mutual capacitances (e.g., shown in FIG. 66A). The DC offset can be flat or have a slope or curve to it in the spatial dimension x.

For example, image noise couples to the touch screen based on an image being displayed on the touch screen display. As illustrated with the red line, the spatial correlation of pixel noise amplitude may be flat (e.g., DC offset of image noise substantially constant across a portion of the row). For example, when the image does not vary much (e.g., all shades of black) across consecutive pixels of the row, the image noise coupling of the image is substantially constant. As illustrated with the blue line, the spatial correlation of pixel noise amplitude of the image may have one or more slopes (e.g., noise differs across a portion of the row). For example, when the image does vary (e.g., $1^{st}$ pixel grey, $2^{nd}$ pixel black, $3^{rd}$ pixel blue, $4^{th}$ pixel white, etc.) across consecutive pixels of the row, the image noise varies for the pixels.

FIG. 66C1 is a time series graph of a specific example of image noise on a row of a touch display across a plurality of columns (e.g., approx. 40). Each individual column is represented by a different colored line. As shown, when image noise is present, it is spatially correlated. FIG. 66C2 is a zoomed in portion of FIG. 66C1 to better show the spatial correlation of the image noise. As shown, the image noise while random, is correlated across the columns of a row of the touch screen. For example, during a first time period (e.g., the 0.1 seconds from about 1.3 to 1.4 seconds), the amplitudes of the image noise are random (e.g., not identical), but they are correlated (e.g., similar slopes, similar amplitudes, etc.).

FIG. 66D is an example of a noise power spectral density graph of the image noise for the row of the touch screen of FIG. 66C1. The noise power spectral density shows that while random, spectrally the image noise is following a correlated (e.g., within a threshold amplitude difference) path across the frequency spectrum.

FIG. 66E is a schematic block diagram of an embodiment of a processing chain that includes a plurality of drive-sense circuits 28, a plurality of decimation filter circuits 660, one or more discrete Fourier transform (DFT) circuits 661, a spatial filter active noise cancellation (ANC) circuit 600, an adaptive filter 662 and a plurality of lowpass filters (LPF) 664. The spatial filter ANC 600 functions to reduce noise of the first signal 621 and the second signal 623 such that the processing chain produces a noise reduced (NR) first signal 621-1 and a NR second signal 623-1.

FIG. 66F is a schematic block diagram of another embodiment of a processing chain that includes a drive-sense circuit 28, an analog to digital (ADC) converter 130, a decimation filter 660, a discrete Fourier transform (DFT) circuit 661, a spatial filter ANC 600, and one or more lowpass filters (LPF) 664. The spatial filter ANC 600 functions to reduce noise of the third signal 625 such that the processing chain produces a noise reduced (NR) third signal 625-1. Note in some embodiments the spatial filter ANC 600 may be at different points along the processing chain. For example, the spatial filter ANC 600 and the adaptive filter 662 is implemented after the LPFs 664. As another example, the spatial filter ANC 600 is implemented after the DSC 28. In yet another example, the spatial filter ANC 600 is implemented by a processing module executing operational instructions stored in at least on memory section of a computing device.

FIG. 66G is a schematic block diagram of an embodiment of a spatial filter active noise cancellation (ANC) circuit 600 that includes a derivative circuit 602, and an integrator circuit 604. The spatial filter functions to produce filtered touch data 630 from input touch data 620. For example, at time t1, the filtered touch data 630 represents mutual capacitances from sense cells (e.g., intersections with column electrodes) along a row electrode. In another example, at time t1, the filtered touch data represents the self-capacitance of a corresponding row electrode, and when the filtered touch data 630 represents a touch, at time t2, drive sense circuits of the columns are activated to drive mutual frequencies that are received by the row electrode, and the filtered touch data 630 represents mutual capacitances from sense cells based on the mutual frequencies.

In an example, this is performed by monitoring for a change in the row electrode self-capacitance and then activating the mutual capacitance frequencies on transmit electrodes (e.g., columns). Alternatively, or in addition to, band pass filters for the mutual frequencies are activated upon detecting the change in the row electrode self-capacitance. This can save power by not driving mutual frequencies until a touch is detected on a row, and/or by not activating filters for the mutual frequencies until the touch is detected.

FIG. 66H is a schematic block diagram of another embodiment of a spatial filter ANC 600 that includes the derivative circuit 602, the integrator circuit 604, and a normalizing circuit 606. The normalizing gain circuit 606 functions to normalize the output of integrator 604 caused by the differential delay value (beta (B)) of derivative circuit 602. For example, increasing beta (B) increases the spatial distance of columns of the row being derived. Note when B=1, the normalizing gain circuit does not need to be activated.

In an embodiment, the transfer function H(z) of the spatial filter ANC 600 is given by the formula:

$$H(z) = \frac{1-z^{-\beta}}{\beta(1-az^{-1})},$$

where α is the integral feedback weighting, and β is the differential delay. In a specific example, the filtered touch data 630, which corresponds with the output y[n.row.col] of the spatial filter ANC 600 is given by the formula shown in FIG. 66H.

Note that n is a discrete time sample of the row data 620, "row" is a discrete spatial sample (y), and "col" is a discrete spatial sample (x) that produces an output y[n] based on an input x[n] in accordance with a transfer function H, where the symbol alpha is an integral feedback weighting, the symbol beta is a differential delay. Thus, in this example, the spatial filter is examining the row's spatial component and subtracting the noise that is common to adjacent columns as is shown in one or more subsequent Figures.

In an example, when processing in one direction (e.g., columns from left to right across a row) the right side of a processed touch event having areas that dip below zero amplitude which leads to an asymmetrical output of the processed touch event. As such, the spatial filter ANC 600 will process in a second direction (e.g., right to left across the row) which will result and the left side of a processed touch event that has areas that dip below zero amplitude. By combining the right to left processed touch event with the left to right processed touch event to produce a combined processed touch event, and then by normalizing the combined processed touch event (e.g., dividing by Beta) this leads to greater symmetry of the output of the processed touch event which increases the likelihood that a touch event will be accurately determined.

Note that the combination may be done in various orders as the addition is communitive. For example, a processing module combines a first four columns of the left to right processed touch event with the last four columns of the right to left processed touch event to produce a first portion of the combined processed touch event. As another example, processing module combines every even column and then every odd column to produce the processed touch event output.

FIG. 66I is a schematic block diagram of an embodiment of the derivative circuit 602. As shown, the derivative circuit functions to substantially remove image noise form the touch event data. In an example, the derivative circuit performs the 1−z$^{-\beta}$ portion of the transfer function discussed with reference to FIG. 66H above. However, the derivative circuit also attenuates the signal due to the negative slope on the right edge of the touch event. Further, the response of the derivative circuit increases with frequency (e.g., as shown in FIG. 66L).

The integrator circuit 604 of FIG. 66J operates to reconstruct the touch event signal by summing a weighted feedback of a previous output of the derivative circuit to a current output of the derivative circuit 602. In an example, the integrator circuit performs the 1−az$^{-1}$ portion of the transfer function discussed with reference to FIG. 66H above. This reconstructs touch event data with substantially no image noise (e.g., only the difference of noise between adjacent columns as defined by beta of the derivative circuit 602). When the beta is greater than 1 (e.g., 2, 3, etc.), the touch event data output from integrator circuit 604 needs to be normalized. As such, when beta is greater than 1, a normalized gain circuit 606 of FIG. 66K is activated to normalize the touch event data output from integrator circuit 604 to produce filtered touch data regarding the row.

FIG. 66L is a graph illustrating the spatial filter frequency response 660 of spatial filter ANC 600. In this example, alpha is 0.85, and beta is 1. Modifying alpha can change the corner frequency of the spatial filter. In an example, moving the corner frequency up can decrease the amount of flicker noise present in the touch data signal and also gives the integrator a finite gain at DC.

As such, in some embodiments, the alpha is either increased or decreased depending on how much flicker noise is being upconverted 163 onto a carrier signal 165 as shown in power spectral density graph 781 shown in FIG. 66M and/or based on a desired bandwidth for a low pass filter response. For example, when flicker noise is below a threshold level, the processing module increases the alpha to .95, which moves the corner frequency down near 1 Hz. In another example of removing flicker noise, when the flicker noise is common between channels, the spatial filter will cancel the common flicker noise as well as the image noise.

FIG. 66N is a schematic block diagram of an example of an adaptive filter circuit 610 that includes a first summation circuit, an adaptive tap weighting circuit (k), a second summation circuit, and a feedback circuit, The adaptive filter circuit 610 is configured to receive an output from a spatial filter ANC 600 and noise smooth pixel data of the spatial filter ANC output. In general, the adaptive filter circuit functions as a low pass filter when k is below a threshold and functions as an all pass filter with k is greater than or equal to the threshold.

The transfer function of the adaptive filter is given as:

$$H(z) = \frac{k}{1 - (1-k)z^{-1}}.$$

The adaptive filter is configured to modify the adaptive tap weighting k when a touch is detected to speed up the touch response. For example, k is set at, 125 (e.g., when a noise variance is below a threshold) as shown in FIG. 66O. When a touch is detected (e.g., noise variance exceeds a threshold), k is set to 1 as shown in FIG. 66P. As such, the adaptive filter can smooth the noise while maintaining an adequate touch response.

FIG. 66Q is a logic flowchart of an example of a method of reducing image noise and/or other noise associated with a touch signal. The method includes step 690, where a touch screen computing device (e.g., that includes a processing module, a spatial filter ANC, etc.) obtains a touch signal associated with a row electrode of a touch screen, wherein the touch signal is affected by image noise. The method further includes step 692 where the computing device spatially filters the touch signal in a first direction to produce first touch signal data. For example, for a row electrode that intersects with forty columns 1-40 left to right, the computing device starts the spatial filtering with column 1 and moves right to column 40. The method further includes step 692, where the computing device spatially filters the touch signal in a second direction to produce second touch signal data. For example, the computing device starts the spatial filtering with column 40 and moves left to column 1.

The method further includes step 696, where the computing device combines the first and second touch signal data to produce a filtered touch signal. For example, the computing device adds the result of the left to right spatial filtering with the result of the right to left spatial filtering to produce the filtered touch signal. The method further includes step 698, where the computing device processes the filtered touch signal to produce touch data. For example, the computing device determines a touch event on columns 4, 5, and 6 based on the filtered touch signal exceeded a threshold magnitude for columns 4, 5, and 6. In an example, one advantage of the spatial filter is the fact that no prior noise data or image noise prediction is needed.

FIG. 66R is a logic flowchart illustrating an example of a method of noise smoothing on a filtered touch signal associated with a pixel (e.g., intersection of a row and column electrode). The method includes step 691, where an adaptive filter monitors a pixel noise variance of a pixel associated with the filtered touch signal. For example, the adaptive filter determines whether a pixel noise variance exceeds a noise variance threshold (e.g., slope exceeds threshold, current sample is twice the amplitude of last sample, etc.). When the noise variance does not exceed the noise variance threshold, the method continues to step 695, where the adaptive filter maintains an adaptive tap weighting (k) for the adaptive filter. For example, when the adaptive tap weighting is set based on the noise variance being less than the noise variance threshold, the adaptive filter acts as a low pass filter. The method then continues to step 699, where the filter outputs the signal associated with the pixel.

When the noise variance is equal to or greater than the noise variance threshold, the method continues to step 697, where the adaptive filter modifies the adaptive tap weighting (k) of the adaptive filter to modulate an equivalent noise bandwidth of the adaptive filter. For example, when the adaptive tap weighting is set based on the noise variance being equal to or greater than the noise variance threshold, the adaptive filter acts as an all pass filter. The method then continues to step 699.

FIG. 67A is a graph illustrating an example of image noise associated with a row of a touch screen display. In an example, each row represents one frequency of noise. In this specific example, the image drive lines of the touch screen are perpendicular to the touch receive lines of the touch screen. This figure shows the specific example of one thousand frames of image data, where each colored line represents a frame of the one thousand frames and the frames' corresponding random image noise. The y-axis is in amplitude and the x-axis is columns of the row. As shown, the noise on the individual rows follow a general curve across the columns of the touch screen for multiple frames. The source of the image noise is a random process (e.g., based on pixel voltage, pixel color, pixel color interframe delta, etc.) that modulates an amplitude of the curve and/or invert the curve. To remove the noise from the source image, an estimate of the amplitude for a row is determined, and then the estimate is subtracted from the source image received on the received lines.

FIG. 67B is graph illustrating an example of removing frames from image noise data that have image noise energy less than an image noise energy threshold. It can be seen that the image noise seems to have a curve that moves horizontally across the columns.

FIG. 67C is a graph illustrating an example of normalizing the noise of image data. From this graph, it can be seen that the image noise, while random, is generally following a substantially similar curve over a plurality of frames (e.g., 100, 2000, 5,000,000, etc.).

FIG. 67D is a graph illustrating an example of a result from averaging the curves for the frames of image data to produce a prototype function. In an example, at least a portion of the frames are using in averaging the curves. The portions is one or more of every nth frame of the frames, where n is an integer greater than or equal to 1, a random selection of a threshold number (e.g., 10%, 40%, etc.) of the frames, a pseudo random selection of a number of the frames, and a selection of frames based on a function. The prototype curve maps the image noise on the row of the touch screen. As such, subtracting the prototype function curve from the received signal removes noise from the received signal, which improves the SNR of the signal.

In an example, the function for a first row may be used to estimate a function for a second row that is proximal to the first row. In another example, a correlation of a relationship between a function of the first row and the second row is determined. For example, a difference function is determined that represents variances or differences in the curve of the first row as compared to the function of the second row. In an instance, this difference function may be utilized to update a second row's function based on an update to the first row function. Thus, an update of one row's function can be utilized to update prototype function for other proximal rows.

In another example, a prototype function can be estimated and/or updated based on proximal columns of a row. For example, for frame 1, 80% of the noise on column A of row 1 couples into column B of row 1. For frame 2, 80% of the noise on column A again couples into column B. Thus, for frame 3, once the noise on column A is determined, column B can be estimated at 80% of the determined noise on column A.

As illustrated in FIGS. 67A-D, over time (e.g., a threshold number of frames) image noise tends to follow the same general noise curve for the row. This is due to the property that the image noise has substantially the same coupling factor into each individual row. For example, if a first column experiences 80% of the image noise from a second column for x number of frames, where x is an integer greater than or equal to 1, then the first column should experience substantially the same percentage (e.g., 80%+/−5%) of the image noise for subsequent frames independent of the amount of image noise.

FIG. 67E is a logic flowchart of an example of a method of noise reduction for image noise on a touch screen via image noise modeling. The method includes step 710, where a processing module of a computing device obtains a prototype noise curve for the row of pixels of a touch screen display. The prototype noise curve includes one or more of a prototype function (e.g., of FIG. 67D) and a gain, k. For example, the processing module obtaining a prototype function for a row, obtains signaling on the row, and determines the gain (k) such that the prototype function substantially matches the signaling on the row.

As a specific example of noise reduction modeling, the prototype noise curve includes a constant prototype function, p(x), and a gain, k, that changes from frame to frame depending on the image noise. If the input signal is s(x), then the corrected signal is c(x) is given by: c(x)=s(x)−kp(x). For each row, k is estimated such that kp(x) matches s(x) as close as possible. In an example, the k is estimated using a least-squares cost function of: $f(k)=\Sigma_x s^2(x)-2k\, \Sigma_x s(x)p(x)+k^2\Sigma_x p^2(x)$, wherein the minimum of the least-squares cost function is given by f'(k)=0, thus $-2\, \Sigma_x s(x)p(x)+2k\, \Sigma_x p^2(x)=0$, and solving for k gives $$k = \frac{\sum_x s(x)p(x)}{\sum_x p^2(x)}.$$

The image noise prototype functions may be determined at the factory or during use when no touches are present on the row by utilizing images that are designed to excite specific frequencies. As a specific example, the process includes extracting the rows where the image noise energy is greater than a predetermined threshold, inverting the rows that have a negative curve, normalizing the rows to a root-mean-square amplitude of 1, accumulating averages for the rows, and once enough averages are acquired to estimate the image noise curve, updating and normalization the prototype function for the rows.

The method of FIG. 67E continues with step 712, where the processing module obtains a touch signal that includes a touch event on the row of pixels (e.g., associated with a row electrode) of the touch screen. For example, the touch signal includes random image noise for each column across a row that is added to a desired touch signal (e.g., a first frequency) on the row. The method further includes step 714, where the processing module subtracts the prototype noise curve from the touch signal to produce a noise reduced touch signal.

In an example of reducing image noise by modeling a prototype curve, a first step includes determining $\Sigma_x s(x)p(x)$ over the row. A second step includes determining k by multiplying the first step by the constant $[\Sigma_x p^2(x)]^{-1}$. A third step includes correcting the row with c(x)=s(x)−kp(x). In an instance, the second step is eliminated when $\Sigma_x p^2(x)$ is normalized to 1, which leads to the gain $k=\Sigma_x s(x)p(x)$.

The method further includes step 716, where the processing module determines touch data regarding the noise reduced touch signal. For example, the processing module determines a touch on columns (e.g., pixels of the row associated with a column electrode) 17, 18, and 24 based on the touch data. Note the prototype noise curve for a row may be updated based on one or more of a command, a pre-determination (e.g., every $100^{th}$ frame, every hour, etc.), a lookup, a pseudo random function, and a noise level exceeding a noise threshold.

FIG. 68A is a schematic block diagram of an embodiment of a touch screen computing device that includes a drive sense circuit 28-b, an electrode 785, a reference signal generator 149, a processing module 42, and a video graphics processing module 48. The drive sense circuit 28-b includes a power source circuit 210-1, a regulation circuit 220 and a change detection circuit 212-1. Note in other embodiments, the drive sense circuit may be implemented by a different drive sense circuit embodiment (e.g., DSC 28-1, DSC 28-2, etc.).

In general, the change detection circuit 212-1 operates to keep the source signal 732 substantially the same as a reference signal and produces an output signal 740 representative of changes to the source signal. However, when the touch event 735 (e.g., finger of FIG. 18, pen of FIG. 19, etc.) and image noise 730 are both affecting the source signal 732 on electrode 785, the signal includes affects from both the touch event 735 and the image noise 730. This can cause issues in accurately determining the touch event 735. In an example, the image noise causes a touch event to not be detected. In another example, the image noise reduces the signal to noise ratio (SNR) for detecting the touch event.

The touch screen computing device functions to reduce the affect of image noise 730 on the source signal 732 by estimating the image noise based on video frame data from video graphics processing module 48 and modifying the output of the reference signal generator 149 based on the estimated image noise. This provides a better signal to noise ratio (SNR), allows for less signal power to maintain a desired SNR, and/or increases sensitivity for determining touch data, among other advantages. Note that although a source signal is illustrated, a receive signal originally driven on to an electrode from another drive sense circuit may also be affected by image noise and/or the touch event and the processing module generates control signal 747 to remove estimated image noise from the receive signal.

In an example of operation, one or more processing module(s) 42 obtains video frame data 720 from video graphics processing module 48. For example, video frame data includes voltage data for image drive lines of the touch screen. As another example, video frame data includes a color identifier for each pixel of the touch screen. As yet another example, video frame data includes compression type (e.g., MPEG-2, H.265/HEVC, etc.), frame type (e.g., I-frame, B-frame. P-frame, etc.) and other information regarding the frames of image data. Note in an example, video frame data is regarding a video, an image, and/or a series of non-continuous images (e.g., different files, substantially different images (e.g., not a video), etc.).

The processing module(s) 42 determines an estimate image noise 722 for at least a portion of the electrode 785 based on the video frame data 720. For example, the processing module determines a first image noise estimate for the electrode for frame 1, determines a second noise estimate for frame 2, and determines a third noise estimate for frame 3. As a specific example, at a first time t1 (e.g., at or about the time when frame 1 is displayed on) the processing module determines a pixel associated (adjacent, proximal, at a distance that affects signaling on the electrode, an intersection, etc.) with the electrode 785 will be red, at a second time t2 the processing module determines the pixel will be orange, and at a third time t3 the processing module determines the pixel will be black. The processing module determines a noise amplitude estimation of 7 for t1, 5 for t2 and 0.08 for t3 for the pixel (e.g., a column electrode intersecting with the row electrode).

The processing module(s) 42 generates output control signal 747 based on the estimated image noise 722. Reference signal generator 149 generates a noise reducing reference signal 726 (e.g., a DC offset, an AC magnitude shift and/or a phase shift of a standard reference signal) based on the control signal 747. For example, at time t1 the reference signal generator generates the noise reducing reference signal as a first frequency minus an amplitude of 7, and at time t2 generates the noise reducing reference signal as the first frequency minus an amplitude of 5.

As another example, the reference signal generator 149 generates noise reducing reference signal 726 to substantially negate the effect of image noise 730. For example, the reference signal generator modifies a reference signal at a first frequency with a direct current (DC) offset proportional (e.g., 60%, 80%, 100%) to a voltage on an image drive line required to produce the color on the pixel affecting the electrode 785. Note in an example, more than one pixel affects the electrode. As such, processing modules estimate image noise based on video frame data for the more than one pixel.

Change detection circuit 212-1 generates signal 740 based on comparing the noise reducing reference signal 726 to the source signal 732 affected by the touch event and the image noise 730. Due to the noise reducing reference signal, the output signal 740 is substantially representative of only the touch event 735. For example, the image noise is a difference between the estimate image noise and the actual image noise.

FIG. 68B is a logic flowchart illustrating an example of generating a noise reducing reference signal for reducing affects of image noise on an electrode of a touch screen computing device. The method includes step 760, where a processing module of touch screen computing device obtains video frame data from a video graphics processing unit. For example, the video graphics processing unit sends the video frame data to the processing module based on a video frame data request. The method further includes step 762, where the processing module determines an estimated image noise for one or more pixels associated with the electrode based on the frame data. The estimated image noise includes one or more of a voltage, an amplitude, a current, a frequency, a capacitance, and an impedance value.

The method further includes step 764, where the processing module facilitating modifying a reference signal of a drive sense circuit based on the estimated image noise, where the drive sense circuit is connected to an electrode associated with the one or more pixels. For example, the processing module generates a control signal and provides the control signal to a reference signal generator operably coupled to the drive sense circuit. The reference signal generator produces a modified reference signal (e.g., different amplitude, DC voltage offset, different frequency component, etc.) based on the control signal.

The method further includes step 766, where the drive sense circuit drives a noise reducing drive sense signal onto the electrode based on the modified reference signal. The method further includes step 768, where the processing module determines a touch on a pixel of the one or more pixels based on an affect to the noise reducing drive sense signal. Due to the modified reference signal, an output of the drive sense circuit is substantially free from affects of image noise from the pixel, thus increasing the SNR for detecting the touch.

Alternatively, or in addition to, the processing module may generate the control signal 747 to include an increase in magnitude based on the estimate image noise such that the SNR of the signaling on the electrode is above a threshold value even in the presence of the estimated image noise affecting the electrode.

FIG. 69A is a schematic block diagram of an embodiment of a touch screen computing device that includes a drive sense circuit 28-b, a filter 810, one or more processing modules 42, a reference signal generator 149, and an electrode 800. The drive sense circuit 28-b includes a power source circuit 154, a regulation circuit 152 and a change detection circuit 150. Note in other embodiments, the drive sense circuit may be implemented by a different drive sense circuit embodiment (e.g., DSC 28-1, DSC 28-2, etc.). Filter 810 may be analog filter or a digital filter. In an example, filter 810 is filter 352 of FIG. 59. In general, the touch screen computing device functions to remove noise 802 sensed at a first time t1, from a sample of the signal affected by the noise at a second time t2. Note noise 802 may be one or more of noise 400, noise 401, and noise 402 of FIG. 65A.

In an example of operation, drive sense circuit 28-b drives source signal 806 onto electrode 800. Image noise 802 affects 808 the source signal at a first time t1. Change detection circuit 150 compares a reference signal 850 to the affected source signal and produces signal 804, which represents the affect 808 of the image noise on the source signal 806 at time t1.

In general, the sampling of the signal 804 is done more frequently than a refresh rate associated with frames of image data displayed on a touch screen display of the touch screen computing device. For example, the sampling for signal 804 to determine a touch is at 300 Hz and the refresh rate for the display is 60 Hz. As such, the image noise 802 can be determined in a first sample of the sampling at time t1, and then can be removed at a second sample of the sampling at time t2.

For example, the processing module 42 determines the noise 802 at t1, and generates a noise reduction control signal 847 to substantially remove the noise (e.g., common noise present for both t1 and t2) from a second sample at time t2. Note at illustrated, the noise reduction control signal may be provided to the reference signal generator to modify reference signal 850 or may be provided later (e.g., after DSC 28) in the signal processing chain (e.g., to filter 810, processing module 42, etc.) to remove the noise sampled at time t1.

FIG. 69B is a graph illustrating an example of a data sample rate for signaling on electrodes of the touch screen and touch screen frame rate for image data being displayed on the touch screen display. In this example, the data (e.g., a signal on an electrode, an output from a drive sense circuit, etc.) is sampled at a frequency of 300 Hertz (Hz). The touch screen frame rate has a frequency of 60 Hz. As such, the frequency of the data sample rate is five times faster than the touch screen frame rate. This allows noise (e.g., image noise) to be measured in a first sample of the touch data, and then removed in a subsequent sample before the next frame of data is displayed on the touch screen display.

In this specific example, noise is measured during the first two samples and removed (e.g., subtracted, cancelled, etc.) during the third and fourth samples. Note that measuring and/or the removing may include picking one measurement and one sample to use in the removal, an average of measurements, mapping a function to a trend of the measurements, etc.

Note in some embodiments, the sampling rate may be adjusted based on video frame data. For example, video frame data indicates for a pixel associated with an electrode being sampled that the pixel will remain substantially constant (e.g., one or more of less than a threshold voltage change, less than a brightness level change, less than a threshold color change, etc.) for the next 31 frames. As such, the sampling rate is decreased to sample once during each frame as the image noise affect on the electrode from that pixel should also remain substantially constant.

FIG. 69C is a graph illustrating another example of a data sample rate and touch screen frame rate similar to FIG. 69B with a difference being every other data sample is utilized for measuring and then every other subsequent data sample is utilized to remove the measured noise. Note that the removing noise twice during the same data frame can include changing from a first noise reduction technique to a second noise reduction technique. For example, during the second sample of the touch data signal, noise is measured removed based on a noise modeling technique (e.g., FIG. 67F). When the signal to noise ratio of the second sample is below an SNR threshold, the touch screen computing device changes the noise reduction technique to a spatial filter ANC noise reduction technique (e.g., FIG. 66Q) for removing noise in the fourth touch data sample.

As another example, the touch screen computing device measures the noise in the first sample, removes noise from a second sample using a first noise reduction technique, removes noise from a third sample using a second noise reduction technique, and removes noise from a fourth sample using a third noise reduction technique. The touch screen computing device may also combine one or more of the results from the first, second and third noise reduction techniques. In an instance, the touch screen increases a sampling rate of the data (e.g., to 600 Hz) such that enough samples are present to complete and/or combine results from each noise reduction technique.

FIG. 69D is a graph illustrating another example of a data sample rate and touch screen frame rate similar to FIG. 69B with a difference being the first and third data samples are being used to measure noise and remove the measured noise in the fourth touch data sample. For example, the first sample indicates no touch is present on an electrode being sampled. The third sample indicates a touch is present. The measured noise in the first sample is used to remove noise from the fourth sample. In some examples, the touch is occurring before an image noise on a pixel can be measured. In this instance, a previous noise associated with the pixel (e.g., a preceding frame, a last frame before the touch on the pixel was present, a last pixel with substantially the same image data (e.g., same color), etc.) can be used to remove an estimate of the noise. Alternatively, the touch may end during the frame before the next frame of image data and with another touch data sample remaining. In this case, the sampled noise after the touch can be used to retroactively remove noise from an earlier touch data sample of the frame where the touch was present.

FIG. 69E is a graph illustrating another example of a data sample rate and touch screen frame rate similar to FIG. 69B, with a difference being determining a slope of the noise for the first three touch data samples and removing an amount of noise based on the slope for the fourth sample. For example, an amplitude of the noise for the first sample is 4, an amplitude of the noise for the second sample is 5, and an amplitude of the noise for the third sample is 6. Thus the slope of the noise is 1, and noise with an amplitude of 7 is removed from the fourth sample.

FIG. 69F is a graph illustrating another example of a data sample rate and touch screen frame rate similar to FIG. 69B, with a difference being determining noise at a first sample and removing noise from the fourth sample.

FIG. 69G is a graph illustrating another example of a touch data sample rate and touch screen frame rate similar to FIG. 69B, with a difference being determining an average of noise for the first three samples and removing the averaged noise from the fourth sample.

FIG. 69H is a logic flowchart of an example of a method of removing noise from a touch data sample of a touch screen computing device. The method includes step 870, where a touch screen computing device (e.g., that includes one or more processing module(s)) obtains a first touch data sample of a touch signal associated with a pixel of a touch screen display, wherein frames of image data are displayed on pixels of the touch screen display at a first rate, and wherein the pixels include the pixel, and wherein the sampling of the touch signal is at a second rate.

The association includes image noise from the pixel affecting an electrode having the touch signal. For example, the pixel corresponds to an intersection of row electrodes and column electrodes. As another example, the pixel corresponds to a point along the electrode that is proximal (adjacent, image noise from pixel affects signaling on the electrode, etc.) to an intersection of two or more electrodes.

In an example, the second rate is at least 2× greater than the first rate. In another example, when utilized in conjunction with image data for the pixel, a sample of the image noise is obtained in a first sample occurring during a first data frame, and when image data for the pixel indicates a substantially similar image noise for the second data frame (e.g., color of pixel does not change from first data frame to second data frame), the second rate may be reduced for the second frame.

The method further includes step 872, where the touch screen computing device determines a noise for the pixel based on the first touch data sample. For example, the touch screen computing device compares a reference signal to a touch signal on an electrode associated with the pixel to produce a representation of the noise. In an example, the representation (voltage, amplitude, magnitude, current, impedance, etc.) is a digital value (e.g., 3 mV, .002 mA, etc.) of the noise.

The method further includes step 874, where the touch screen computing device removes the noise from a second touch data sample associated with the pixel to produce a noise reduced second touch sample. For example, the touch screen computing device obtains the second touch data sample, and removes the noise (e.g., during filtering, during processing, etc.) from the second touch data sample to produce noise reduced second touch data sample. As another example, the touch screen computing device modifies a reference signal of a drive sense circuit connected to the electrode to forward noise remove the noise from the touch signal on the electrode such that the second sample produces the noise reduced second touch data sample.

The method continues with step 876, where the touch screen computing device processes the noise reduced second touch data sample to determine touch data regarding a touch of the touch screen at a location (e.g., nearest row/column electrode intersection) corresponding to the pixel. Note that the touch signal power may be reduced for samples after the noise has been obtained while maintaining a desired SNR level. This reduces power for the touch screen computing device among many other advantages associated with reducing noise.

FIG. 70 is a logic flowchart of an example of determining a noise reduction technique for sensing touch signaling on an electrode of a touch screen computing device. The method includes step 900, where the touch screen computing device that includes one or more processing modules obtains touch screen information that includes one or more of frame data, noise data, touch screen device data, and touch signal data.

The frame data includes one or more of video frame data (e.g., interframe pixel color differences, intraframe pixel deltas. RGB LED voltage information, etc.) for one or more frames of image data, application data (e.g., area on touch screen a prompt to touch the area is displayed, etc.) a frame refresh rate, type of video compression, and a type (e.g., I-frame, P-frame, etc.) of video frame. The noise data includes one or more of predicted intersection noise level, type of predicted noise, historical noise data for one or more pixels, historical noise reduction technique data, and a current sample of noise associated with an electrode.

The touch screen device data includes one or more of type of lighting (e.g., LED. LCD. OLED, etc.), voltage range data for the lighting, factory test data (e.g., controlled environment noise tests results, etc.), electrode placement data (e.g., layer identification for an electrode, orientation of electrodes, etc.) and other characteristics (e.g., display thickness, distance between components (e.g., electrodes, voltage sources, voltage sources and electrodes, etc.)). The touch signal data includes one or more of a frequency for a touch signal, an amplitude of the touch signal, a DC offset of the touch signal, and a time period when sampling of the touch signal is to occur.

The method further includes step 902, where the touch screen computing device determines a noise reduction technique from a plurality of noise reduction techniques for touch signaling associated with at least a portion of an electrode of the touch screen device based on the touch screen information. The noise reduction technique includes one or more of a spatial filtering technique, a forward error correcting technique (e.g., to generate a noise reducing reference signal), an interframe sampling technique, and a noise modeling technique. In an example of determining the noise reduction technique, the touch screen computing device selects a forward error correcting technique when the touch screen information includes video frame data. In another example of determining the noise reduction technique, the touch screen computing device selects a spatial filtering technique when the touch screen information does not include video frame data.

The method further includes step 904, where the touch screen computing device senses the signaling associated with the electrode in accordance with the noise reduction technique to produce touch signal data. For example, the touch screen computing device senses affects to a drive sense signal on the electrodes. As another example, a first drive sense circuit of the touch screen computing device senses a signal or affects of the signal on a first electrode that was driven onto a second electrode by a second drive sense circuit. The touch signal data includes one or more of a capacitance value, an impedance value, a current value, a voltage value, touch data (e.g., identification of a touch), a signal to noise ratio value, a noise value, and a representation of affects of noise to a touch signal (e.g., a drive sense signal at a particular frequency).

The method further includes step 906, where the touch screen computing device determines whether to modify the noise reduction technique based on one or more of the touch signal data and the touch screen information. In an example, the determination is based on comparing the touch signal data to a corresponding threshold. For example, when the SNR value of the signaling is below an SNR threshold, the touch screen computing device determines to modify a parameter (e.g., alpha value, beta value, a tap weighting, a gain of a prototype noise curve, amplitude of a noise reducing reference signal, sampling rate, etc.) of the noise reduction technique. As another example, when the SNR value of the signaling is below an SNR threshold, the touch screen computing device determines to change the noise reduction technique.

As another example of determining whether to modify the noise reduction technique, the determination is based on the touch screen information. For example, the touch screen computing device determines, based on the touch screen information, that a new frame of image data will be displayed on a display of the touch screen computing device before a next sample of the touch signal is obtained. As such, the touch screen computing device analyzes the touch screen information and determines to change the noise reduction technique to a different noise reduction technique for the subsequent frame. For example, a predicted noise pattern for the at least a portion of the electrode varies over a threshold and the touch screen computing device changes to the noise reduction technique from a spatial filtering technique to a forward error correcting technique. Note in some examples, when the touch screen computing device determines to change the noise reduction technique, the method continues with step 900 where the touch screen computing device obtains touch screen information to be utilized in the next noise reduction technique.

When the touch screen computing device determines not to change the noise reduction technique, the method continues back to step 904. For example, the touch screen computing device determines the signal to noise ratio of the signaling is above a signal to noise ratio threshold. As such, the touchscreen computing device determines to utilize the current noise reduction technique for a subsequent time period and/or frame of image data.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc. . . . fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules, and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While transistors may be shown in one or more of the above-described figure(s) as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage: (b) a wired or wireless medium for the transportation of data as a signal within a computing device from one element of the computing device to another element of the computing device for temporary storage or persistent storage: (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

As applicable, one or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition-requires "artificial" intelligence—i.e., machine/non-human intelligence.

As applicable, one or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis, or other high speed required by the machines that generate the data, receive the data, convey the data, store the data and/or use the data.

As applicable, one or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

As applicable, one or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

As applicable, one or more functions associated with the methods and/or processes described herein can be implemented in a system that is operable to electronically store digital data in a memory device. Such storage cannot practically be performed by the human mind because the human mind is not equipped to electronically store digital data.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a touch screen computing device, the method comprises:
    obtaining a touch signal associated with a row electrode of a plurality of electrodes of a touch screen display of the touch screen computing device, wherein the touch screen display is operable to render frames of data into visible images, wherein the plurality of electrodes are integrated into the touch screen display and include rows of electrodes oriented with columns of electrodes, and wherein the touch signal is affected by image noise associated with the visible images;
    spatial filtering the touch signal in a first direction of the row electrode with respect to the columns of electrodes that form intersections with the row electrode to produce first direction touch signal data for the row electrode, wherein the spatial filtering removes correlated image noise affecting proximal ones of the intersections;
    spatial filtering the touch signal in a second direction of the row electrode with respect to the intersections to produce second direction touch signal data for the row electrode;
    combining the first and second direction touch signal data to produce a filtered touch signal for the row electrode; and
    processing the filtered touch signal to determine touch data associated with a touch at one or more of the intersections of the touch screen display.

2. The method of claim 1, wherein the touch signal is generated by a row electrode drive sense circuit of the touch screen computing device, and wherein the row electrode drive sense circuit drives the touch signal onto the row electrode at a first frequency.

3. The method of claim 2, wherein the touch signal is received by a plurality of column electrode drive sense circuits associated with the columns of electrodes.

4. The method of claim 1, wherein the first direction touch signal data for the row electrode comprises:
    a plurality of column touch signal values, wherein the plurality of column touch signal values includes a respective column touch signal value for each intersection that a column electrode of the columns of electrodes forms with the row electrode.

5. The method of claim 4, wherein the spatial filtering in the first direction comprises:
    for each intersection:
        subtracting a current column touch signal value from a preceding proximal column touch signal value in accordance with a differential delay value and the first direction to produce a derivative touch signal output value of the touch signal for the current respective intersection, and wherein the differential delay value is regarding a distance in columns between the current column and the preceding proximal column electrodes in accordance with the first direction; and
        adding the derivative touch signal output value to a feedback integral value of the derivative touch signal output value to produce an integrator output of the touch signal for the respective intersection, wherein the feedback integral value includes an integral feedback weighting.

6. The method of claim 5 further comprises:
    combining each integrator output of the touch signal for all intersections to produce the first direction touch signal data.

7. The method of claim 5, wherein the spatial filtering in the second direction comprises:
    for each intersection:
        subtracting a current column touch signal value from a preceding proximal column touch signal value in accordance with a differential delay value and the second direction to produce a derivative touch signal output value of the touch signal for the respective intersection, and wherein the differential delay value is regarding the distance in columns between the current column and the preceding proximal column in accordance with the second direction; and
        adding the derivative touch signal output value to a feedback integral value of the derivative touch signal output value to produce an integrator output of the touch signal for the respective intersection, wherein the feedback integral value includes an integral feedback weighting.

8. The method of claim 7, wherein the integral feedback weighing is determined in accordance with a desired cutoff frequency response of the touch signal.

9. The method of claim 1 further comprises:
    receiving the filtered touch signal by an adaptive filter of the touch screen computing device;
    monitoring, by the adaptive filter, noise variance for the filtered touch signal;
    when the noise variance is equal to or greater than a noise variance threshold, modifying an adaptive tap weighting of the adaptive filter to modulate an equivalent noise bandwidth of the adaptive filter; and
    outputting the filtered touch signal for processing.

10. The method of claim 9 further comprises:
when the noise variance is less than the noise variance threshold, maintaining the adaptive tap weighting of the adaptive filter; and
outputting the filtered touch signal for processing.

11. A touch screen computing device comprises:
memory;
an interface;
a spatial filter operable to:
obtain a touch signal associated with a row electrode of a plurality of electrodes of a touch screen display of the touch screen computing device, wherein the touch screen display is operable to render frames of data into visible images, wherein the plurality of electrodes are integrated into the touch screen display and include rows of electrodes oriented with columns of electrodes, and wherein the touch signal is affected by image noise associated with the visible images;
spatial filter the touch signal in a first direction of the row electrode with respect to the columns of electrodes that form intersections with the row electrode to produce first direction touch signal data for the row electrode, wherein the spatial filtering removes correlated image noise affecting proximal ones of the intersections;
spatial filter the touch signal in a second direction of the row electrode with respect to the intersections to produce second direction touch signal data for the row electrode; and
a processing module operably coupled to the memory, the spatial filter, and the interface, wherein the processing module is operable to:
obtain the first direction touch signal data;
obtain the second direction touch signal data;
combine the first and second direction touch signal data to produce a filtered touch signal for the row electrode; and
determine touch data associated with a touch at one or more of the intersections of the touch screen display based on the filtered touch signal.

12. The touch screen computing device of claim 11 further comprises:
a row electrode drive sense circuit configured to:
generate the touch signal having a first frequency; and
drive the touch signal onto the row electrode.

13. The touch screen computing device of claim 12 further comprises:
a plurality of column electrode drive sense circuits associated with the columns of electrodes, wherein the plurality of column electrode drive sense circuits are configured to receive the touch signal.

14. The touch screen computing device of claim 11, wherein the first direction touch signal data for the row electrode comprises:
a plurality of column touch signal values, wherein the plurality of column touch signal values includes a respective column touch signal value for each intersection that a column electrode of the columns of electrodes forms with the row electrode.

15. The touch screen computing device of claim 14, wherein the spatial filter is configured to perform the spatial filtering in the first direction by:
for each intersection:
subtracting a current column touch signal value from a preceding proximal column touch signal value in accordance with a differential delay value and the first direction to produce a derivative touch signal output value of the touch signal for the respective intersection, and wherein the differential delay value is regarding a distance in columns between the current column and the preceding proximal column in accordance with the first direction; and
adding the derivative touch signal output value to a feedback integral value of the derivative touch signal output value to produce an integrator output of the touch signal for the respective intersection, wherein the feedback integral value includes an integral feedback weighting.

16. The touch screen computing device of claim 15, wherein one or more of the spatial filter and the processing module is further operable to:
combine each integrator output of the touch signal for all intersections to produce the first direction touch signal data.

17. The touch screen computing device of claim 15, wherein the spatial filter is further configured to perform the spatial filtering in the second direction by:
for each intersection:
subtracting a current column touch signal value from a preceding proximal column touch signal value in accordance with a differential delay value and the second direction to produce a derivative touch signal output value of the touch signal for the respective intersection, and wherein the differential delay value is regarding the distance in columns between the current column and the preceding proximal column in accordance with the second direction; and
adding the derivative touch signal output value to a feedback integral value of the derivative touch signal output value to produce an integrator output of the touch signal for the respective intersection, wherein the feedback integral value includes an integral feedback weighting.

18. The touch screen computing device of claim 17, wherein the processing module is operable to determine the integral feedback weighing in accordance with a desired cutoff frequency response of the touch signal.

19. The touch screen computing device of claim 11 further comprises:
an adaptive filter configured to:
receiving the filtered touch signal;
monitor noise variance for the filtered touch signal;
when the noise variance is equal to or greater than a noise variance threshold, modifying an adaptive tap weighting of the adaptive filter to modulate an equivalent noise bandwidth of the adaptive filter; and
output the filtered touch signal to the processing module for processing.

20. The touch screen computing device of claim 19, wherein the adaptive filter is further configured to:
when the noise variance is less than the noise variance threshold, maintain the adaptive tap weighting of the adaptive filter; and
output the filtered touch signal to the processing module for processing.

* * * * *